(12) United States Patent
Theofilopoulos

(10) Patent No.: US 12,205,334 B2
(45) Date of Patent: Jan. 21, 2025

(54) OBJECT PERCEPTION SYSTEM AND METHOD

(71) Applicant: Constantine Theofilopoulos, Pickering (CA)

(72) Inventor: Constantine Theofilopoulos, Pickering (CA)

(73) Assignee: Constantine Theofilopoulos, Pickering (CA)

( * ) Notice: Subject to any disclaimer, the term of this patent is extended or adjusted under 35 U.S.C. 154(b) by 505 days.

(21) Appl. No.: 17/652,603

(22) Filed: Feb. 25, 2022

(65) Prior Publication Data

US 2022/0406028 A1    Dec. 22, 2022

Related U.S. Application Data

(60) Provisional application No. 63/153,973, filed on Feb. 26, 2021.

(51) Int. Cl.
| | | |
|---|---|---|
| *G06V 10/14* | (2022.01) | |
| *G06V 10/56* | (2022.01) | |
| *G06V 10/60* | (2022.01) | |

(52) U.S. Cl.
CPC ............. *G06V 10/14* (2022.01); *G06V 10/56* (2022.01); *G06V 10/60* (2022.01)

(58) Field of Classification Search
None
See application file for complete search history.

(56) References Cited

U.S. PATENT DOCUMENTS

| 7,064,498 | B2 | 6/2006 | Dowling et al. |
| 8,603,613 | B2 | 12/2013 | Larson |
| 8,791,811 | B2 | 7/2014 | Park |
| 9,408,422 | B2 | 8/2016 | Hartnett et al. |
| 9,787,951 | B2 | 10/2017 | Kannon et al. |
| 9,992,842 | B2 | 6/2018 | Chiang et al. |
| 11,297,286 | B1 * | 4/2022 | Bikumandla ........... G06T 7/593 |
| 2008/0258999 | A1 | 10/2008 | Doom |
| 2013/0179035 | A1 | 7/2013 | Adachi et al. |

(Continued)

OTHER PUBLICATIONS

Expanding the Vision of Sensors (1995), Chapter 1, "Introduction to Sensors", National Academies Press.

(Continued)

*Primary Examiner* — Wilson Lee
(74) *Attorney, Agent, or Firm* — Daniel C. Pierron; Widerman Malek, PL

(57) ABSTRACT

A system and method for object perception is provided comprising one or more sensors for sensing and delivering to a processor environmental data inputs with reference to an object viewing point. The processor uses the data inputs to determine and select light outputs to be emitted from one or more displays. The light outputs are modulated to comprise one or more wavelengths of light that elicit one or more targeted vision responses in order to facilitate object perception from the object viewing point. The light outputs can be modulated according to how the environmental parameters sensed change over time (e.g light conditions). Light outputs may include the emission of equiluminance based wavelengths of light and peak sensitivity wavelengths of light to elicit peripheral and foveal vision responses, respectively.

20 Claims, 66 Drawing Sheets

(56) References Cited

U.S. PATENT DOCUMENTS

| | | | |
|---|---|---|---|
| 2016/0178593 A1* | 6/2016 | Miller | G06V 10/143 |
| | | | 382/191 |
| 2019/0130171 A1* | 5/2019 | Alameh | G06V 20/64 |
| 2019/0387185 A1* | 12/2019 | Hicks | G06V 20/58 |
| 2020/0132845 A1* | 4/2020 | Panas | G01S 7/4817 |
| 2022/0245914 A1* | 8/2022 | Bourdis | G06V 20/90 |
| 2022/0404905 A1* | 12/2022 | Haelvoet | G06F 3/0304 |

OTHER PUBLICATIONS

Wolfe J. Visual attention. In: De Valois KK, editor. Seeing. 2nd ed. San Diego, CA: Academic Press; 2000. p. 335-386.
Garmin Varia Smart Bike Lights, Oct. 29, 2019 (https://www.garmin.com/en-US/p/506138).
Biographical Memoirs (1998), vol. 74, National Academy of Sciences, p. 198.
New rules will allow blue emergency lights on fire trucks and ambulances, Dec. 14, 2017.
Press Release: Luminous motorbike clothing for enhanced safety on the road, Mar. 7, 2019 (www.osram.com).
Press Release: Premiere for work clothing with active illumination, Oct. 18, 2017 (www.osram.com).
Purves D, Augustine GJ, Fitzpatrick D, et al., "Retinal Circuits for Detecting Differences in Luminance"editors. Neuroscience. 2nd edition. Sunderland (MA): Sinauer Associates; 2001.
"Why are fire trucks across Greater Victoria different colours?", Victoria News, Nov. 2, 2018 (www.vicnews.com at https://www.vicnews.com/news/why-are-fire-trucks-across-greater-victoria-different-colours/).
"Wearable bike lighting system catches the tech Wayv", New Atlas, Mar. 8, 2019.
LS2 Helmets Full Face Street Breaker Helmet (https://www.amazon.ca/LS2-Breaker-Pinball-Fallout-Motorcycle/dp/B07GJZBWLN).
The Light Magic of Squid, Nautilus Magazine (https://nautil.us/the-light-magic-of-squid-11894/).
I Am Not a Monster, Nautilus Magazine (https://nautil.us/i-am-not-a-monster-6640/).
Specialized Angular and G-Force indicator sensor (https://www.capsbicycleshop.com/articles/specialized-angi-helmet-bg225.htm).
Generic Static Motorcycle Jacket in one colour (https://joerocket.ca/collections/jackets/products/reactor-textile-jacket).
Triviz Electroluminescent Lighting System (https://www.provizsports.com/en-us/triviz-electroluminescent-lighting-system.html).
Microsoft Bets Its Future on a Reprogrammable Computer Chip (https://www.wired.com/2016/09/microsoft-bets-future-chip-reprogram-fly/).

* cited by examiner

Figure 3
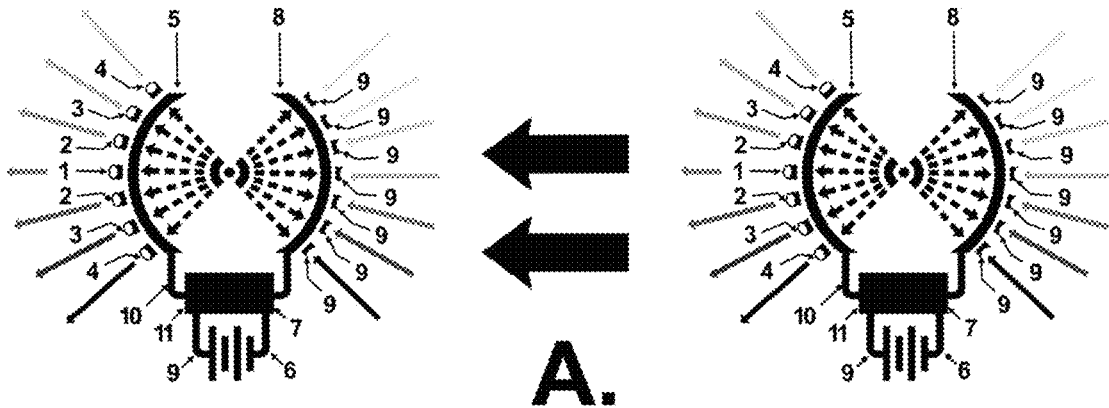
A.
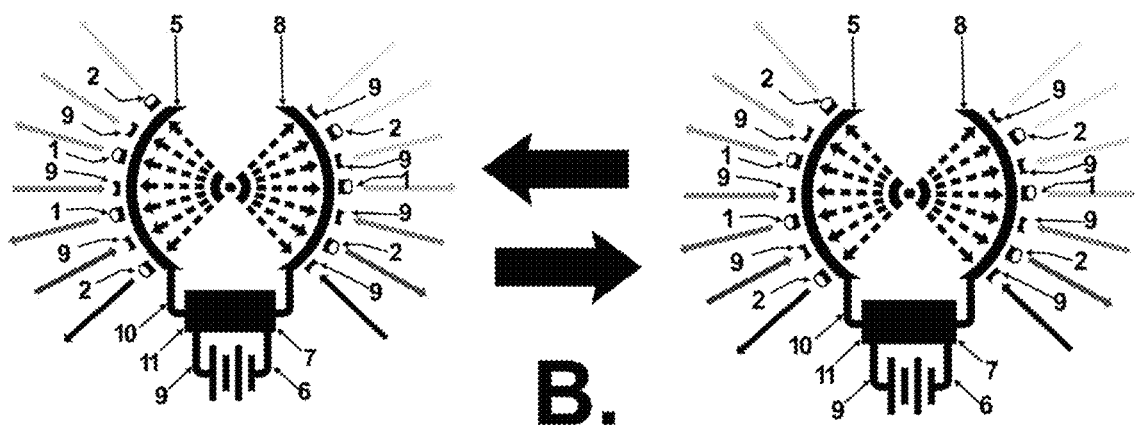
B.
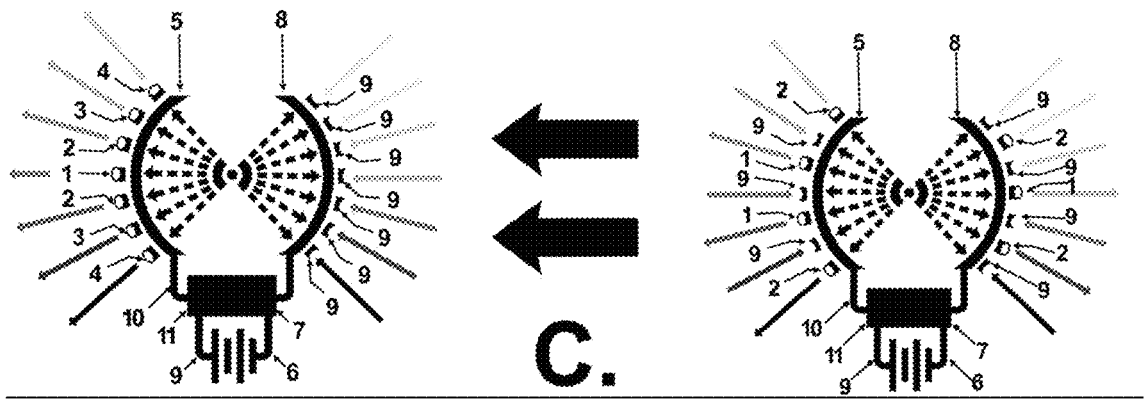
C.

Front View    Left Side View    Top View

Figure 6
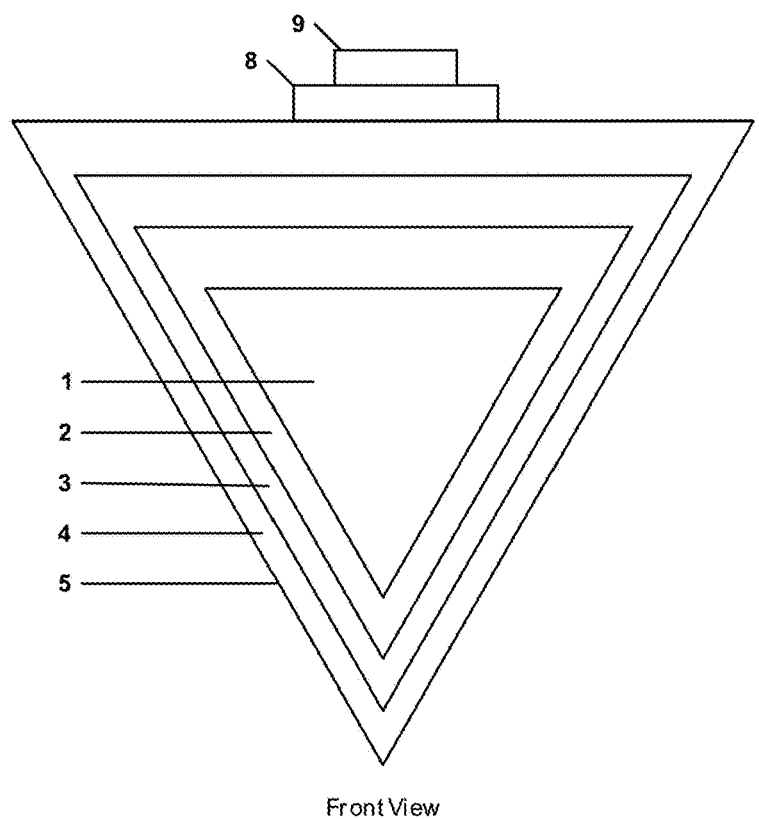
Front View
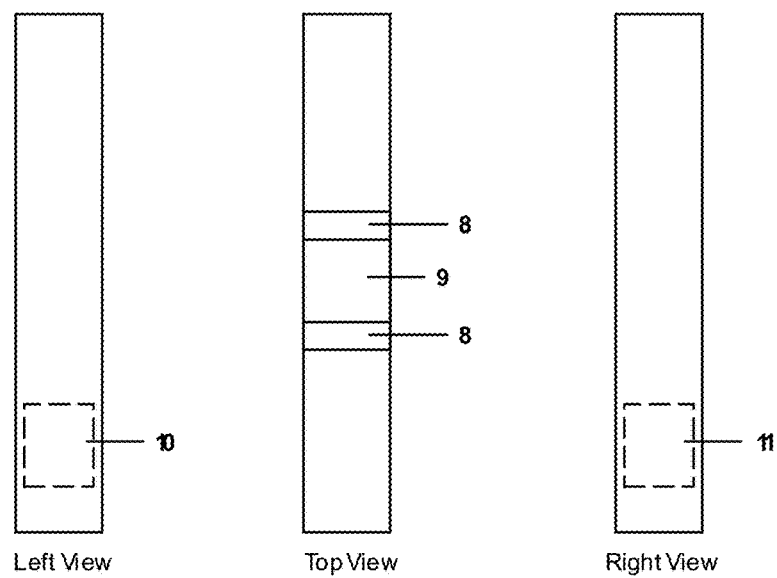
Left View     Top View     Right View

Figure 7
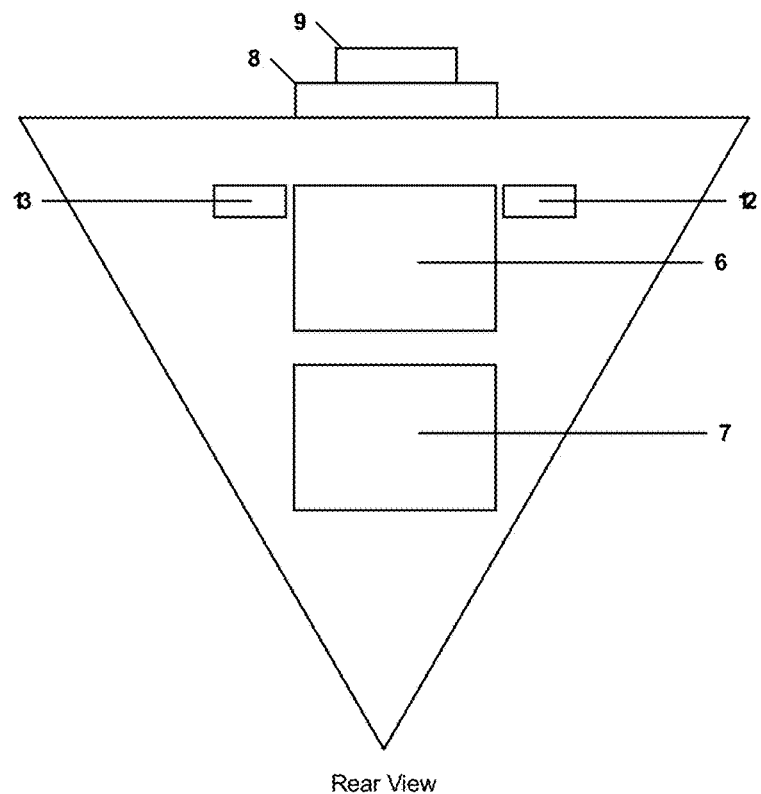
Rear View
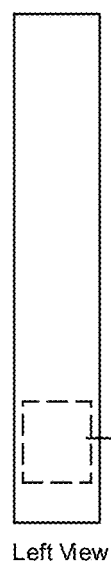
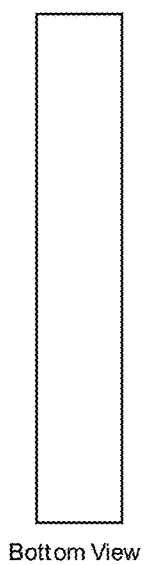
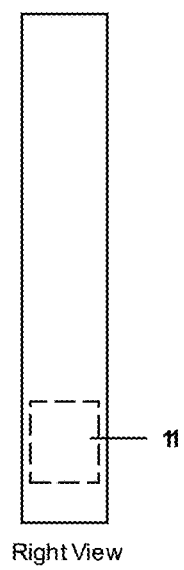
Left View    Bottom View    Right View Figure 8
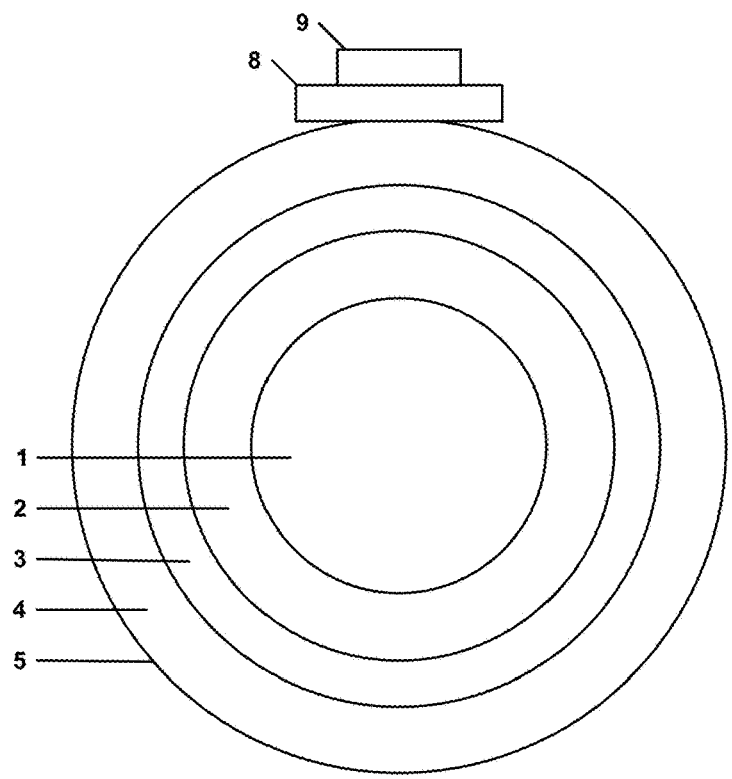
Front View
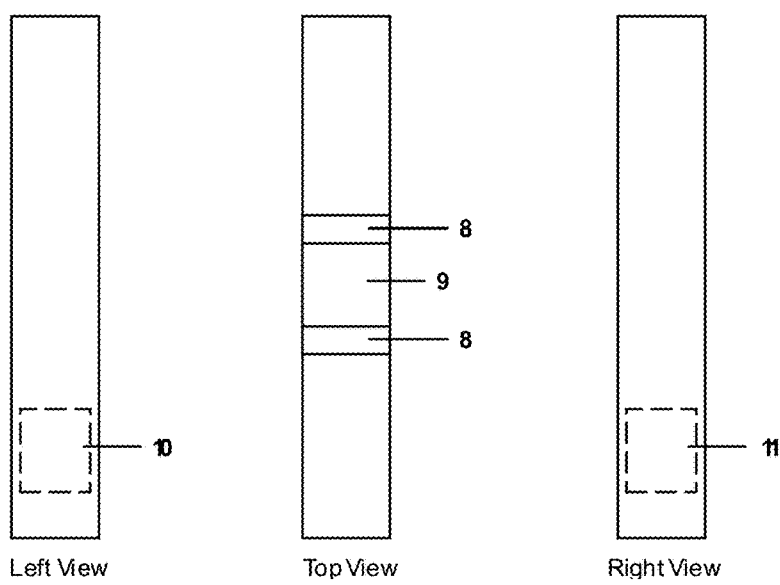
Left View · Top View · Right View Figure 9
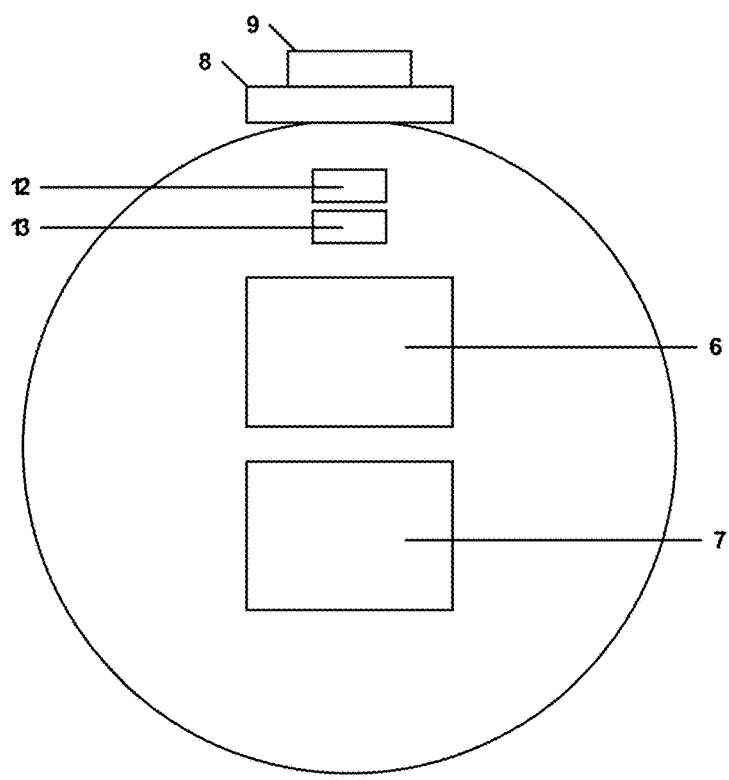
Rear View
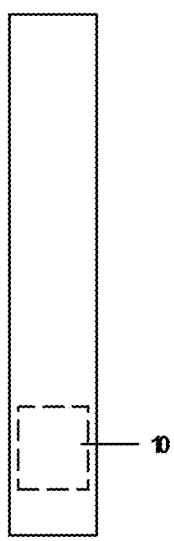
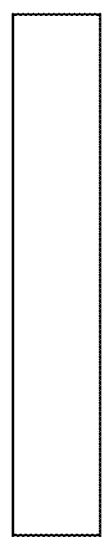
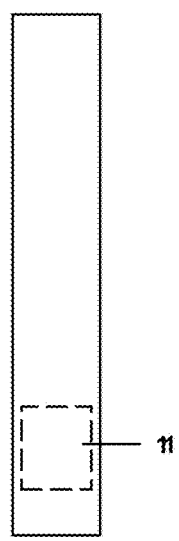
Left View　　　　Bottom View　　　　Right View

Figure 16

Purkinje Cone Ratio Engine (PCRE)

(PCRE) Formula =

287 — IF Scenery Luminance is in the Mesopic Vision Range, THEN
    increase luminance for Red colours selected by the Peripheral Vision Engine to 200 from 100.

Therefore if(
   (0.003 cd/m2 > MinL < 3 cd/m2) + (pEQuH = 0) + (pEQuS = 100) + (pEQuL = 50)
   , Φv = 200
   , Φv = 100)

b3ff00
RGB:179,255,0
HSL:78,100,50

66CCFF
RGB:102,204,255
HSL:200,100,70

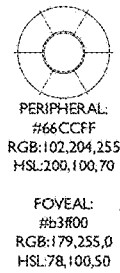

PERIPHERAL:
66CCFF
RGB:102,204,255
HSL:200,100,70

FOVEAL:
b3ff00
RGB:179,255,0
HSL:78,100,50

Adaptation Curve Engine (ACE)

ß Dark Adaptation Curve (DAC) Formula =
IF Scenery Luminance Δ is Light to Dark, THEN
    from t = 0 to 8 min, rapidly increase luminance for Peak Sensitivity Colour for Cones
    from t = 0 to 8 min, maintain luminance for Equiluminance Colour for Rods 288 — from t = 8 min and onwards, maintain luminance for Peak Sensitivity Colour for Cones
    from t = 8 min and onwards, rapidly increase luminance for Equiluminance Colour for Rods Light Adaptation Curve à (LAC) Formula =
IF Scenery Luminance Δ is Dark to Light, THEN
    from t = 0 to 8 min, maintain luminance for Peak Sensitivity Colour for Cones
    from t = 0 to 8 min, rapidly increase luminance for Equiluminance Colour for Rods from t = 8 min and onwards, rapidly increase luminance for Peak Sensitivity Colour for Cones
    from t = 8 min and onwards, maintain luminance for Equiluminance Colour for Rods

UV Engine (UVE)

(UVE) Formula =
IF Scenery Irradiance is greater than 1000 w/m2, THEN
    - from t = 0 until Scenery Irradiance is less than 1000 w/m2, rapidly increase luminance + do not include
380-440 nms for Peak Sensitivity Colour for Cones (aka Violet colour in HSL Codes)
289 —  - if Violet equiluminance colour is selected by PVE then replace with the first split compliment colour as
an alternative just as effective.

Therefore
if(
   pIRr > 1000 cd/m2
   , ((pEQuH NE 300) + (pEQuS NE 76) + (pEQuL NE 72))
   , (pSE1H) + (pSE1S) + (pSE1L))

Blue Light Blocking Engine (BLBE)

(BLBE) Formula =
*Same as UVE for now, thinking of future windshield tints etc
IF Scenery Irradiance is greater than 1000 w/m2, THEN
    - from t = 0 until Scenery Irradiance is less than 1000 w/m2, rapidly increase luminance + do not include
380-440 nms for Peak Sensitivity Colour for Cones (aka Violet colour in HSL Codes)
290 —  - if Violet equiluminance colour is selected by PVE then replace with the first split compliment colour as
an alternative just as effective.

Therefore
if(
   pIRr > 1000 cd/m2
   , ((pEQuH NE 300) + (pEQuS NE 76) + (pEQuL NE 72))
   , (pSE1H) + (pSE1S) + (pSE1L))

Zero Saturation Engine (ZSE)
    Ongoing adjustments due to the presence of colours with no saturation values in the current
environment being monitored.

The invention accounts for colours that have no saturation value. Colour that is fully saturated is
considered the truest version and vice versa. A colour with a 0% saturation level will appear as a shade of grey,
therefore not allowing the calculation of an equiluminant colour or variant.
291 —
(ZSE) Formula =

IF Scenery Saturation = 0 AND Lightness < 50, THEN Lightness = 100, ELSE use the Scenery Lightness IF Scenery Saturation = 0 AND Lightness > 50, THEN Lightness = 0, ELSE use the Scenery Lightness Scenario 1

Scenario 2

Scenario 2

Scenario 3

HSL Colour Model Values    Figure 39-1

| | Input Sensor Colour | | | | Equiluminant Colour | | | Triadic Colour 1 | | | Triadic Colour 2 | | |
|---|---|---|---|---|---|---|---|---|---|---|---|---|---|
| | Hexidecimal triplet | Hue | Saturation | Lightness | f=MOD(Kn+180,360) | f=same | f=same | f=MOD(Kn+120,360) | f=same | f=same | f=MOD(Kn-120,360) | f=same | f=same |
| Name | c | h | s% | l% | h | s | l | h | s | l | h | s | l |
| Air Force Blue (Raf) | #5d8aa8 | 204 | 30 | 51 | 24 | 30 | 51 | 324 | 30 | 51 | 84 | 30 | 51 |
| Air Force Blue (Usaf) | #00308f | 220 | 100 | 28 | 40 | 100 | 28 | 340 | 100 | 28 | 100 | 100 | 28 |
| Air Superiority Blue | #72a0c1 | 205 | 39 | 60 | 25 | 39 | 60 | 325 | 39 | 60 | 85 | 39 | 60 |
| Alabama Crimson | #a32638 | 351 | 62 | 39 | 171 | 62 | 39 | 111 | 62 | 39 | 231 | 62 | 39 |
| Alice Blue | #f0f8ff | 208 | 100 | 97 | 28 | 100 | 97 | 328 | 100 | 97 | 88 | 100 | 97 |
| Alizarin Crimson | #e32636 | 355 | 77 | 52 | 175 | 77 | 52 | 115 | 77 | 52 | 235 | 77 | 52 |
| Alloy Orange | #c46210 | 27 | 85 | 42 | 207 | 85 | 42 | 147 | 85 | 42 | 267 | 85 | 42 |
| Almond | #efdecd | 30 | 51.5 | 87.1 | 210 | 51.5 | 87.1 | 150 | 51.5 | 87.1 | 270 | 51.5 | 87.1 |
| Amaranth | #e52b50 | 348.1 | 78.2 | 53.3 | 168.1 | 78.2 | 53.3 | 108.1 | 78.2 | 53.3 | 228 | 78.2 | 53.3 |
| Amber | #ffbf00 | 44.9 | 100 | 50 | 224.9 | 100 | 50 | 164.9 | 100 | 50 | 285 | 100 | 50 |
| Amber (Sae/Ece) | #ff7e00 | 29.6 | 100 | 50 | 209.6 | 100 | 50 | 149.6 | 100 | 50 | 270 | 100 | 50 |
| American Rose | #ff033e | 346 | 100 | 50.6 | 166 | 100 | 50.6 | 106 | 100 | 50.6 | 226 | 100 | 50.6 |
| Amethyst | #9966cc | 270 | 50 | 60 | 90 | 50 | 60 | 30 | 50 | 60 | 150 | 50 | 60 |
| Android Green | #a4c639 | 74.5 | 55.3 | 50 | 254.5 | 55.3 | 50 | 194.5 | 55.3 | 50 | 315 | 55.3 | 50 |
| Anti-Flash White | #f2f3f4 | 210 | 8.3 | 95.3 | 30 | 8.3 | 95.3 | 330 | 8.3 | 95.3 | 90 | 8.3 | 95.3 |
| Antique Brass | #cd9575 | 21.8 | 46.8 | 63.1 | 201.8 | 46.8 | 63.1 | 141.8 | 46.8 | 63.1 | 262 | 46.8 | 63.1 |
| Antique Fuchsia | #915c83 | 315.8 | 22.4 | 46.5 | 135.8 | 22.4 | 46.5 | 75.8 | 22.4 | 46.5 | 196 | 22.4 | 46.5 |
| Antique Ruby | #841b2d | 349.7 | 66 | 31.2 | 169.7 | 66 | 31.2 | 109.7 | 66 | 31.2 | 230 | 66 | 31.2 |
| Antique White | #faebd7 | 34.3 | 77.8 | 91.2 | 214.3 | 77.8 | 91.2 | 154.3 | 77.8 | 91.2 | 274 | 77.8 | 91.2 |
| Ao (English) | #008000 | 120 | 100 | 25.1 | 300 | 100 | 25.1 | 240 | 100 | 25.1 | 0 | 100 | 25.1 |
| Apple Green | #8db600 | 73.5 | 100 | 35.7 | 253.5 | 100 | 35.7 | 193.5 | 100 | 35.7 | 314 | 100 | 35.7 |
| Apricot | #fbceb1 | 23.5 | 90.2 | 83.9 | 203.5 | 90.2 | 83.9 | 143.5 | 90.2 | 83.9 | 264 | 90.2 | 83.9 |
| Aqua | #00ffff | 180 | 100 | 50 | 0 | 100 | 50 | 300 | 100 | 50 | 60 | 100 | 50 |
| Aquamarine | #7fffd4 | 159.8 | 100 | 74.9 | 339.8 | 100 | 74.9 | 279.8 | 100 | 74.9 | 40 | 100 | 74.9 |
| Army Green | #4b5320 | 69.4 | 44.3 | 22.5 | 249.4 | 44.3 | 22.5 | 189.4 | 44.3 | 22.5 | 309 | 44.3 | 22.5 |
| Arsenic | #3b444b | 206.3 | 11.9 | 26.3 | 26.3 | 11.9 | 26.3 | 326.3 | 11.9 | 26.3 | 86 | 11.9 | 26.3 |
| Arylide Yellow | #e9d66b | 51 | 74.1 | 66.7 | 231 | 74.1 | 66.7 | 171 | 74.1 | 66.7 | 291 | 74.1 | 66.7 |
| Ash Grey | #b2beb5 | 135 | 8.5 | 72.2 | 315 | 8.5 | 72.2 | 255 | 8.5 | 72.2 | 15 | 8.5 | 72.2 |
| Asparagus | #87a96b | 92.9 | 26.5 | 54.1 | 272.9 | 26.5 | 54.1 | 212.9 | 26.5 | 54.1 | 333 | 26.5 | 54.1 |
| Atomic Tangerine | #ff9966 | 20 | 100 | 70 | 200 | 100 | 70 | 140 | 100 | 70 | 260 | 100 | 70 |
| Auburn | #a52a2a | 0 | 59.4 | 40.6 | 180 | 59.4 | 40.6 | 120 | 59.4 | 40.6 | 240 | 59.4 | 40.6 |
| Aureolin | #fdee00 | 56.4 | 100 | 49.6 | 236.4 | 100 | 49.6 | 176.4 | 100 | 49.6 | 296 | 100 | 49.6 |
| Aurometalsaurus | #6e7f80 | 183.3 | 7.6 | 46.7 | 3.3 | 7.6 | 46.7 | 303.3 | 7.6 | 46.7 | 63 | 7.6 | 46.7 |
| Avocado | #568203 | 80.8 | 95.5 | 26.1 | 260.8 | 95.5 | 26.1 | 200.8 | 95.5 | 26.1 | 321 | 95.5 | 26.1 |
| Azure | #007fff | 210.1 | 100 | 50 | 30.1 | 100 | 50 | 330.1 | 100 | 50 | 90 | 100 | 50 |
| Azure Mist/Web | #f0ffff | 180 | 100 | 97.1 | 0 | 100 | 97.1 | 300 | 100 | 97.1 | 60 | 100 | 97.1 |
| Baby Blue | #89cff0 | 199.2 | 77.4 | 73.9 | 19.2 | 77.4 | 73.9 | 319.2 | 77.4 | 73.9 | 79 | 77.4 | 73.9 |
| Baby Blue Eyes | #a1caf1 | 209.2 | 74.1 | 78.8 | 29.2 | 74.1 | 78.8 | 329.2 | 74.1 | 78.8 | 89 | 74.1 | 78.8 |
| Baby Pink | #f4c2c2 | 0 | 69.4 | 85.9 | 180 | 69.4 | 85.9 | 120 | 69.4 | 85.9 | 240 | 69.4 | 85.9 |
| Ball Blue | #21abcd | 191.9 | 72.3 | 46.7 | 11.9 | 72.3 | 46.7 | 311.9 | 72.3 | 46.7 | 72 | 72.3 | 46.7 |
| Banana Mania | #fae7b5 | 43.5 | 87.3 | 84.5 | 223.5 | 87.3 | 84.5 | 163.5 | 87.3 | 84.5 | 284 | 87.3 | 84.5 |
| Banana Yellow | #ffe135 | 51.1 | 100 | 60.4 | 231.1 | 100 | 60.4 | 171.1 | 100 | 60.4 | 291 | 100 | 60.4 |
| Barn Red | #7c0a02 | 3.9 | 96.8 | 24.7 | 183.9 | 96.8 | 24.7 | 123.9 | 96.8 | 24.7 | 244 | 96.8 | 24.7 |
| Battleship Grey | #848482 | 60 | 0.8 | 51.4 | 240 | 0.8 | 51.4 | 180 | 0.8 | 51.4 | 300 | 0.8 | 51.4 |
| Bazaar | #98777b | 352.7 | 13.8 | 53.1 | 172.7 | 13.8 | 53.1 | 112.7 | 13.8 | 53.1 | 233 | 13.8 | 53.1 |
| Beau Blue | #bcd4e6 | 205.7 | 45.7 | 82 | 25.7 | 45.7 | 82 | 325.7 | 45.7 | 82 | 86 | 45.7 | 82 |
| Beaver | #9f8170 | 21.7 | 19.7 | 53.1 | 201.7 | 19.7 | 53.1 | 141.7 | 19.7 | 53.1 | 262 | 19.7 | 53.1 |
| Beige | #f5f5dc | 60 | 55.6 | 91.2 | 240 | 55.6 | 91.2 | 180 | 55.6 | 91.2 | 300 | 55.6 | 91.2 |
| Big Dip O'Ruby | #9c2542 | 345.4 | 61.7 | 37.8 | 165.4 | 61.7 | 37.8 | 105.4 | 61.7 | 37.8 | 225 | 61.7 | 37.8 |
| Bisque | #ffe4c4 | 32.5 | 100 | 88.4 | 212.5 | 100 | 88.4 | 152.5 | 100 | 88.4 | 273 | 100 | 88.4 |
| Bistre | #3d2b1f | 24 | 32.6 | 18 | 204 | 32.6 | 18 | 144 | 32.6 | 18 | 264 | 32.6 | 18 |
| Bittersweet | #fe6f5e | 6.4 | 98.8 | 68.2 | 186.4 | 98.8 | 68.2 | 126.4 | 98.8 | 68.2 | 246 | 98.8 | 68.2 |
| Bittersweet Shimmer | #bf4f51 | 358.9 | 46.7 | 52.9 | 178.9 | 46.7 | 52.9 | 118.9 | 46.7 | 52.9 | 239 | 46.7 | 52.9 |
| Black | #000000 | 0 | 0 | 0 | 180 | 0 | 0 | 120 | 0 | 0 | 240 | 0 | 0 |
| Black Bean | #3d0c02 | 10.2 | 93.7 | 12.4 | 190.2 | 93.7 | 12.4 | 130.2 | 93.7 | 12.4 | 250 | 93.7 | 12.4 |
| Black Leather Jacket | #253529 | 135 | 17.8 | 17.6 | 315 | 17.8 | 17.6 | 255 | 17.8 | 17.6 | 15 | 17.8 | 17.6 |
| Black Olive | #3b3c36 | 70 | 5.3 | 22.4 | 250 | 5.3 | 22.4 | 190 | 5.3 | 22.4 | 310 | 5.3 | 22.4 |
| Blanched Almond | #ffebcd | 36 | 100 | 90.2 | 216 | 100 | 90.2 | 156 | 100 | 90.2 | 276 | 100 | 90.2 |
| Blast-Off Bronze | #a57164 | 12 | 26.5 | 52 | 192 | 26.5 | 52 | 132 | 26.5 | 52 | 252 | 26.5 | 52 |
| Bleu De France | #318ce7 | 210 | 79.1 | 54.9 | 30 | 79.1 | 54.9 | 330 | 79.1 | 54.9 | 90 | 79.1 | 54.9 |
| Blizzard Blue | #ace5ee | 188.2 | 66 | 80.4 | 8.2 | 66 | 80.4 | 308.2 | 66 | 80.4 | 68 | 66 | 80.4 |
| Blond | #faf0be | 50 | 85.7 | 86.3 | 230 | 85.7 | 86.3 | 170 | 85.7 | 86.3 | 290 | 85.7 | 86.3 |
| Blue | #0000ff | 240 | 100 | 50 | 60 | 100 | 50 | 0 | 100 | 50 | 120 | 100 | 50 |
| Blue Bell | #a2a2d0 | 240 | 32.9 | 72.5 | 60 | 32.9 | 72.5 | 0 | 32.9 | 72.5 | 120 | 32.9 | 72.5 |
| Blue (Crayola) | #1f75fe | 216.9 | 99.1 | 55.9 | 36.9 | 99.1 | 55.9 | 336.9 | 99.1 | 55.9 | 97 | 99.1 | 55.9 |
| Blue Gray | #6699cc | 210 | 50 | 60 | 30 | 50 | 60 | 330 | 50 | 60 | 90 | 50 | 60 |
| Blue-Green | #0d98ba | 191.8 | 86.9 | 39 | 11.8 | 86.9 | 39 | 311.8 | 86.9 | 39 | 72 | 86.9 | 39 |
| Blue (Munsell) | #0093af | 189.6 | 100 | 34.3 | 9.6 | 100 | 34.3 | 309.6 | 100 | 34.3 | 70 | 100 | 34.3 |
| Blue (Ncs) | #0087bd | 197.1 | 100 | 37.1 | 17.1 | 100 | 37.1 | 317.1 | 100 | 37.1 | 77 | 100 | 37.1 |
| Blue (Pigment) | #333399 | 240 | 50 | 40 | 60 | 50 | 40 | 0 | 50 | 40 | 120 | 50 | 40 |
| Blue (Ryb) | #0247fe | 223.6 | 99.2 | 50.2 | 43.6 | 99.2 | 50.2 | 343.6 | 99.2 | 50.2 | 104 | 99.2 | 50.2 |
| Blue Sapphire | #126180 | 196.9 | 75.3 | 28.6 | 16.9 | 75.3 | 28.6 | 316.9 | 75.3 | 28.6 | 77 | 75.3 | 28.6 |
| Blue-Violet | #8a2be2 | 271.1 | 75.9 | 52.7 | 91.1 | 75.9 | 52.7 | 31.1 | 75.9 | 52.7 | 151 | 75.9 | 52.7 |

HSL Colour Model Values      Figure 39-2

| | Input Sensor Colour | | | | Equiluminant Colour | | | Triadic Colour 1 | | | Triadic Colour 2 | | |
|---|---|---|---|---|---|---|---|---|---|---|---|---|---|
| | Hexidecmal triplet | Hue | Saturation | Lightness | f=MOD(Kn +180,360) | f=same | f=same | f=MOD(Kn +120,360) | f=same | f=same | f=MOD(Kn-120,360) | f=same | f=same |
| Name | c | h | s% | l% | h | s | l | h | s | l | h | s | l |
| Blush | #de5d83 | 342.3 | 66.2 | 61.8 | 162.3 | 66.2 | 61.8 | 102.3 | 66.2 | 61.8 | 222 | 66.2 | 61.8 |
| Bole | #79443b | 8.7 | 34.4 | 35.3 | 188.7 | 34.4 | 35.3 | 128.7 | 34.4 | 35.3 | 249 | 34.4 | 35.3 |
| Bondi Blue | #0095b6 | 190.9 | 100 | 35.7 | 10.9 | 100 | 35.7 | 310.9 | 100 | 35.7 | 71 | 100 | 35.7 |
| Bone | #e3dac9 | 39.2 | 31.7 | 83.9 | 219.2 | 31.7 | 83.9 | 159.2 | 31.7 | 83.9 | 279 | 31.7 | 83.9 |
| Boston University Red | #cc0000 | 0 | 100 | 40 | 180 | 100 | 40 | 120 | 100 | 40 | 240 | 100 | 40 |
| Bottle Green | #006a4e | 164.2 | 100 | 20.8 | 344.2 | 100 | 20.8 | 284.2 | 100 | 20.8 | 44 | 100 | 20.8 |
| Boysenberry | #873260 | 327.5 | 45.9 | 36.3 | 147.5 | 45.9 | 36.3 | 87.5 | 45.9 | 36.3 | 208 | 45.9 | 36.3 |
| Brandeis Blue | #0070ff | 213.6 | 100 | 50 | 33.6 | 100 | 50 | 333.6 | 100 | 50 | 94 | 100 | 50 |
| Brass | #b5a642 | 52.2 | 46.6 | 48.4 | 232.2 | 46.6 | 48.4 | 172.2 | 46.6 | 48.4 | 292 | 46.6 | 48.4 |
| Brick Red | #cb4154 | 351.7 | 57 | 52.5 | 171.7 | 57 | 52.5 | 111.7 | 57 | 52.5 | 232 | 57 | 52.5 |
| Bright Cerulean | #1dacd6 | 193.6 | 76.1 | 47.6 | 13.6 | 76.1 | 47.6 | 313.6 | 76.1 | 47.6 | 74 | 76.1 | 47.6 |
| Bright Green | #66ff00 | 96 | 100 | 50 | 276 | 100 | 50 | 216 | 100 | 50 | 336 | 100 | 50 |
| Bright Lavender | #bf94e4 | 272.3 | 59.7 | 73.7 | 92.3 | 59.7 | 73.7 | 32.3 | 59.7 | 73.7 | 152 | 59.7 | 73.7 |
| Bright Maroon | #c32148 | 345.6 | 71.1 | 44.7 | 165.6 | 71.1 | 44.7 | 105.6 | 71.1 | 44.7 | 226 | 71.1 | 44.7 |
| Bright Pink | #ff007f | 330.1 | 100 | 50 | 150.1 | 100 | 50 | 90.1 | 100 | 50 | 210 | 100 | 50 |
| Bright Turquoise | #08e8de | 177.3 | 93.3 | 47.1 | 357.3 | 93.3 | 47.1 | 297.3 | 93.3 | 47.1 | 57 | 93.3 | 47.1 |
| Bright Ube | #d19fe8 | 281.1 | 61.3 | 76.7 | 101.1 | 61.3 | 76.7 | 41.1 | 61.3 | 76.7 | 161 | 61.3 | 76.7 |
| Brilliant Lavender | #f4bbff | 290.3 | 100 | 86.7 | 110.3 | 100 | 86.7 | 50.3 | 100 | 86.7 | 170 | 100 | 86.7 |
| Brilliant Rose | #ff55a3 | 332.5 | 100 | 66.7 | 152.5 | 100 | 66.7 | 92.5 | 100 | 66.7 | 213 | 100 | 66.7 |
| Brink Pink | #fb607f | 348 | 95.1 | 68 | 168 | 95.1 | 68 | 108 | 95.1 | 68 | 228 | 95.1 | 68 |
| British Racing Green | #004225 | 153.6 | 100 | 12.9 | 333.6 | 100 | 12.9 | 273.6 | 100 | 12.9 | 34 | 100 | 12.9 |
| Bronze | #cd7f32 | 29.8 | 60.8 | 50 | 209.8 | 60.8 | 50 | 149.8 | 60.8 | 50 | 270 | 60.8 | 50 |
| Brown (Traditional) | #964b00 | 30 | 100 | 29.4 | 210 | 100 | 29.4 | 150 | 100 | 29.4 | 270 | 100 | 29.4 |
| Brown (Web) | #a52a2a | 0 | 59.4 | 40.6 | 180 | 59.4 | 40.6 | 120 | 59.4 | 40.6 | 240 | 59.4 | 40.6 |
| Bubble Gum | #ffc1cc | 349.4 | 100 | 87.8 | 169.4 | 100 | 87.8 | 109.4 | 100 | 87.8 | 229 | 100 | 87.8 |
| Bubbles | #e7feff | 182.5 | 100 | 95.3 | 2.5 | 100 | 95.3 | 302.5 | 100 | 95.3 | 63 | 100 | 95.3 |
| Buff | #f0dc82 | 49.1 | 78.6 | 72.5 | 229.1 | 78.6 | 72.5 | 169.1 | 78.6 | 72.5 | 289 | 78.6 | 72.5 |
| Bulgarian Rose | #480607 | 359.1 | 84.6 | 15.3 | 179.1 | 84.6 | 15.3 | 119.1 | 84.6 | 15.3 | 239 | 84.6 | 15.3 |
| Burgundy | #800020 | 345 | 100 | 25.1 | 165 | 100 | 25.1 | 105 | 100 | 25.1 | 225 | 100 | 25.1 |
| Burlywood | #deb887 | 33.8 | 56.9 | 70 | 213.8 | 56.9 | 70 | 153.8 | 56.9 | 70 | 274 | 56.9 | 70 |
| Burnt Orange | #cc5500 | 25 | 100 | 40 | 205 | 100 | 40 | 145 | 100 | 40 | 265 | 100 | 40 |
| Burnt Sienna | #e97451 | 13.8 | 77.6 | 61.6 | 193.8 | 77.6 | 61.6 | 133.8 | 77.6 | 61.6 | 254 | 77.6 | 61.6 |
| Burnt Umber | #8a3324 | 8.8 | 58.6 | 34.1 | 188.8 | 58.6 | 34.1 | 128.8 | 58.6 | 34.1 | 249 | 58.6 | 34.1 |
| Byzantine | #bd33a4 | 310.9 | 57.5 | 47.1 | 130.9 | 57.5 | 47.1 | 70.9 | 57.5 | 47.1 | 191 | 57.5 | 47.1 |
| Byzantium | #702963 | 311 | 46.4 | 30 | 131 | 46.4 | 30 | 71 | 46.4 | 30 | 191 | 46.4 | 30 |
| Cadet | #536872 | 199.4 | 15.7 | 38.6 | 19.4 | 15.7 | 38.6 | 319.4 | 15.7 | 38.6 | 79 | 15.7 | 38.6 |
| Cadet Blue | #5f9ea0 | 181.8 | 25.5 | 50 | 1.8 | 25.5 | 50 | 301.8 | 25.5 | 50 | 62 | 25.5 | 50 |
| Cadet Grey | #91a3b0 | 205.2 | 16.4 | 62.9 | 25.2 | 16.4 | 62.9 | 325.2 | 16.4 | 62.9 | 85 | 16.4 | 62.9 |
| Cadmium Green | #006b3c | 153.6 | 100 | 21 | 333.6 | 100 | 21 | 273.6 | 100 | 21 | 34 | 100 | 21 |
| Cadmium Orange | #ed872d | 28.1 | 84.2 | 55.3 | 208.1 | 84.2 | 55.3 | 148.1 | 84.2 | 55.3 | 268 | 84.2 | 55.3 |
| Cadmium Red | #e30022 | 351 | 100 | 44.5 | 171 | 100 | 44.5 | 111 | 100 | 44.5 | 231 | 100 | 44.5 |
| Cadmium Yellow | #fff600 | 57.9 | 100 | 50 | 237.9 | 100 | 50 | 177.9 | 100 | 50 | 298 | 100 | 50 |
| Café Au Lait | #a67b5b | 25.6 | 29.6 | 50.4 | 205.6 | 29.6 | 50.4 | 145.6 | 29.6 | 50.4 | 266 | 29.6 | 50.4 |
| Café Noir | #4b3621 | 30 | 38.9 | 21.2 | 210 | 38.9 | 21.2 | 150 | 38.9 | 21.2 | 270 | 38.9 | 21.2 |
| Cal Poly Green | #1e4d2b | 136.6 | 43.9 | 21 | 316.6 | 43.9 | 21 | 256.6 | 43.9 | 21 | 17 | 43.9 | 21 |
| Cambridge Blue | #a3c1ad | 140 | 19.5 | 69.8 | 320 | 19.5 | 69.8 | 260 | 19.5 | 69.8 | 20 | 19.5 | 69.8 |
| Camel | #c19a6b | 32.8 | 41 | 58.8 | 212.8 | 41 | 58.8 | 152.8 | 41 | 58.8 | 273 | 41 | 58.8 |
| Cameo Pink | #efbbcc | 340.4 | 61.9 | 83.5 | 160.4 | 61.9 | 83.5 | 100.4 | 61.9 | 83.5 | 220 | 61.9 | 83.5 |
| Camouflage Green | #78866b | 91.1 | 11.2 | 47.3 | 271.1 | 11.2 | 47.3 | 211.1 | 11.2 | 47.3 | 331 | 11.2 | 47.3 |
| Canary Yellow | #ffef00 | 56.2 | 100 | 50 | 236.2 | 100 | 50 | 176.2 | 100 | 50 | 296 | 100 | 50 |
| Candy Apple Red | #ff0800 | 1.9 | 100 | 50 | 181.9 | 100 | 50 | 121.9 | 100 | 50 | 242 | 100 | 50 |
| Candy Pink | #e4717a | 355.3 | 68 | 66.9 | 175.3 | 68 | 66.9 | 115.3 | 68 | 66.9 | 235 | 68 | 66.9 |
| Capri | #00bfff | 195.1 | 100 | 50 | 15.1 | 100 | 50 | 315.1 | 100 | 50 | 75 | 100 | 50 |
| Caput Mortuum | #592720 | 7.4 | 47.1 | 23.7 | 187.4 | 47.1 | 23.7 | 127.4 | 47.1 | 23.7 | 247 | 47.1 | 23.7 |
| Cardinal | #c41e3a | 349.9 | 73.5 | 44.3 | 169.9 | 73.5 | 44.3 | 109.9 | 73.5 | 44.3 | 230 | 73.5 | 44.3 |
| Caribbean Green | #00cc99 | 165 | 100 | 40 | 345 | 100 | 40 | 285 | 100 | 40 | 45 | 100 | 40 |
| Carmine | #960018 | 350.4 | 100 | 29.4 | 170.4 | 100 | 29.4 | 110.4 | 100 | 29.4 | 230 | 100 | 29.4 |
| Carmine (M&P) | #d70040 | 342.1 | 100 | 42.2 | 162.1 | 100 | 42.2 | 102.1 | 100 | 42.2 | 222 | 100 | 42.2 |
| Carmine Pink | #eb4c42 | 3.6 | 80.9 | 59 | 183.6 | 80.9 | 59 | 123.6 | 80.9 | 59 | 244 | 80.9 | 59 |
| Carmine Red | #ff0038 | 346.8 | 100 | 50 | 166.8 | 100 | 50 | 106.8 | 100 | 50 | 227 | 100 | 50 |
| Carnation Pink | #ffa6c9 | 336.4 | 100 | 82.5 | 156.4 | 100 | 82.5 | 96.4 | 100 | 82.5 | 216 | 100 | 82.5 |
| Carnelian | #b31b1b | 0 | 73.8 | 40.4 | 180 | 73.8 | 40.4 | 120 | 73.8 | 40.4 | 240 | 73.8 | 40.4 |
| Carolina Blue | #99badd | 210.9 | 50 | 73.3 | 30.9 | 50 | 73.3 | 330.9 | 50 | 73.3 | 91 | 50 | 73.3 |
| Carrot Orange | #ed9121 | 32.9 | 85 | 52.9 | 212.9 | 85 | 52.9 | 152.9 | 85 | 52.9 | 273 | 85 | 52.9 |
| Catalina Blue | #062a78 | 221.1 | 90.5 | 24.7 | 41.1 | 90.5 | 24.7 | 341.1 | 90.5 | 24.7 | 101 | 90.5 | 24.7 |
| Ceil | #92a1cf | 225.2 | 38.9 | 69.2 | 45.2 | 38.9 | 69.2 | 345.2 | 38.9 | 69.2 | 105 | 38.9 | 69.2 |
| Celadon | #ace1af | 123.4 | 46.9 | 77.8 | 303.4 | 46.9 | 77.8 | 243.4 | 46.9 | 77.8 | 3 | 46.9 | 77.8 |
| Celadon Blue | #007ba7 | 195.8 | 100 | 32.7 | 15.8 | 100 | 32.7 | 315.8 | 100 | 32.7 | 76 | 100 | 32.7 |
| Celadon Green | #2f847c | 174.4 | 47.5 | 35.1 | 354.4 | 47.5 | 35.1 | 294.4 | 47.5 | 35.1 | 54 | 47.5 | 35.1 |
| Celeste (Colour) | #b2ffff | 180 | 100 | 84.9 | 0 | 100 | 84.9 | 300 | 100 | 84.9 | 60 | 100 | 84.9 |
| Celestial Blue | #4997d0 | 205.3 | 59 | 55.1 | 25.3 | 59 | 55.1 | 325.3 | 59 | 55.1 | 85 | 59 | 55.1 |
| Cerise | #de3163 | 342.7 | 72.4 | 53.1 | 162.7 | 72.4 | 53.1 | 102.7 | 72.4 | 53.1 | 223 | 72.4 | 53.1 |
| Cerise Pink | #ec3b83 | 335.6 | 82.3 | 57.8 | 155.6 | 82.3 | 57.8 | 95.6 | 82.3 | 57.8 | 216 | 82.3 | 57.8 |

HSL Colour Model Values        Figure 39-3

| | Input Sensor Colour | | | | Equiluminant Colour | | | Triadic Colour 1 | | | Triadic Colour 2 | | |
|---|---|---|---|---|---|---|---|---|---|---|---|---|---|
| | Hexidecmal triplet | Hue Saturation Lightness | | | f=MOD(Kn +180,360) | f=same | f=same | f=MOD(Kn +120,360) | f=same | f=same | f=MOD(Kn-120,360) | f=same | f=same |
| Name | c | h | s% | l% | h | s | l | h | s | l | h | s | l |
| Cerulean | #007ba7 | 195.8 | 100 | 32.7 | 15.8 | 100 | 32.7 | 315.8 | 100 | 32.7 | 76 | 100 | 32.7 |
| Cerulean Blue | #2a52be | 223.8 | 63.8 | 45.5 | 43.8 | 63.8 | 45.5 | 343.8 | 63.8 | 45.5 | 104 | 63.8 | 45.5 |
| Cerulean Frost | #6d9bc3 | 207.9 | 41.7 | 59.6 | 27.9 | 41.7 | 59.6 | 327.9 | 41.7 | 59.6 | 88 | 41.7 | 59.6 |
| Cg Blue | #007aa5 | 195.6 | 100 | 32.4 | 15.6 | 100 | 32.4 | 315.6 | 100 | 32.4 | 76 | 100 | 32.4 |
| Cg Red | #e03c31 | 3.8 | 73.8 | 53.5 | 183.8 | 73.8 | 53.5 | 123.8 | 73.8 | 53.5 | 244 | 73.8 | 53.5 |
| Chamoisee | #a0785a | 25.7 | 28 | 49 | 205.7 | 28 | 49 | 145.7 | 28 | 49 | 266 | 28 | 49 |
| Champagne | #fad6a5 | 34.6 | 89.5 | 81.4 | 214.6 | 89.5 | 81.4 | 154.6 | 89.5 | 81.4 | 275 | 89.5 | 81.4 |
| Charcoal | #36454f | 204 | 18.8 | 26.1 | 24 | 18.8 | 26.1 | 324 | 18.8 | 26.1 | 84 | 18.8 | 26.1 |
| Charm Pink | #e68fac | 340 | 63.5 | 73.1 | 160 | 63.5 | 73.1 | 100 | 63.5 | 73.1 | 220 | 63.5 | 73.1 |
| Chartreuse (Traditional) | #dfff00 | 67.5 | 100 | 50 | 247.5 | 100 | 50 | 187.5 | 100 | 50 | 308 | 100 | 50 |
| Chartreuse (Web) | #7fff00 | 90.1 | 100 | 50 | 270.1 | 100 | 50 | 210.1 | 100 | 50 | 330 | 100 | 50 |
| Cherry | #de3163 | 342.7 | 72.4 | 53.1 | 162.7 | 72.4 | 53.1 | 102.7 | 72.4 | 53.1 | 223 | 72.4 | 53.1 |
| Cherry Blossom Pink | #ffb7c5 | 348.3 | 100 | 85.9 | 168.3 | 100 | 85.9 | 108.3 | 100 | 85.9 | 228 | 100 | 85.9 |
| Chestnut | #cd5c5c | 0 | 53.1 | 58.2 | 180 | 53.1 | 58.2 | 120 | 53.1 | 58.2 | 240 | 53.1 | 58.2 |
| China Pink | #de6fa1 | 333 | 62.7 | 65.3 | 153 | 62.7 | 65.3 | 93 | 62.7 | 65.3 | 213 | 62.7 | 65.3 |
| China Rose | #a8516e | 340 | 34.9 | 48.8 | 160 | 34.9 | 48.8 | 100 | 34.9 | 48.8 | 220 | 34.9 | 48.8 |
| Chinese Red | #aa381e | 11.1 | 70 | 39.2 | 191.1 | 70 | 39.2 | 131.1 | 70 | 39.2 | 251 | 70 | 39.2 |
| Chocolate (Traditional) | #7b3f00 | 30.7 | 100 | 24.1 | 210.7 | 100 | 24.1 | 150.7 | 100 | 24.1 | 271 | 100 | 24.1 |
| Chocolate (Web) | #d2691e | 25 | 75 | 47.1 | 205 | 75 | 47.1 | 145 | 75 | 47.1 | 265 | 75 | 47.1 |
| Chrome Yellow | #ffa700 | 39.3 | 100 | 50 | 219.3 | 100 | 50 | 159.3 | 100 | 50 | 279 | 100 | 50 |
| Cinereous | #98817b | 12.4 | 12.3 | 53.9 | 192.4 | 12.3 | 53.9 | 132.4 | 12.3 | 53.9 | 252 | 12.3 | 53.9 |
| Cinnabar | #e34234 | 4.8 | 75.8 | 54.7 | 184.8 | 75.8 | 54.7 | 124.8 | 75.8 | 54.7 | 245 | 75.8 | 54.7 |
| Cinnamon | #d2691e | 25 | 75 | 47.1 | 205 | 75 | 47.1 | 145 | 75 | 47.1 | 265 | 75 | 47.1 |
| Citrine | #e4d00a | 54.5 | 91.6 | 46.7 | 234.5 | 91.6 | 46.7 | 174.5 | 91.6 | 46.7 | 295 | 91.6 | 46.7 |
| Classic Rose | #fbcce7 | 325.5 | 85.5 | 89.2 | 145.5 | 85.5 | 89.2 | 85.5 | 85.5 | 89.2 | 206 | 85.5 | 89.2 |
| Cobalt | #0047ab | 215.1 | 100 | 33.5 | 35.1 | 100 | 33.5 | 335.1 | 100 | 33.5 | 95 | 100 | 33.5 |
| Cocoa Brown | #d2691e | 25 | 75 | 47.1 | 205 | 75 | 47.1 | 145 | 75 | 47.1 | 265 | 75 | 47.1 |
| Coffee | #6f4e37 | 24.6 | 33.7 | 32.5 | 204.6 | 33.7 | 32.5 | 144.6 | 33.7 | 32.5 | 265 | 33.7 | 32.5 |
| Columbia Blue | #9bddff | 200.4 | 100 | 80.4 | 20.4 | 100 | 80.4 | 320.4 | 100 | 80.4 | 80 | 100 | 80.4 |
| Congo Pink | #f88379 | 4.7 | 90.1 | 72.4 | 184.7 | 90.1 | 72.4 | 124.7 | 90.1 | 72.4 | 245 | 90.1 | 72.4 |
| Cool Black | #002e63 | 212.1 | 100 | 19.4 | 32.1 | 100 | 19.4 | 332.1 | 100 | 19.4 | 92 | 100 | 19.4 |
| Cool Grey | #8c92ac | 228.8 | 16.2 | 61.2 | 48.8 | 16.2 | 61.2 | 348.8 | 16.2 | 61.2 | 109 | 16.2 | 61.2 |
| Copper | #b87333 | 28.9 | 56.6 | 46.1 | 208.9 | 56.6 | 46.1 | 148.9 | 56.6 | 46.1 | 269 | 56.6 | 46.1 |
| Copper (Crayola) | #da8a67 | 18.3 | 60.8 | 62.9 | 198.3 | 60.8 | 62.9 | 138.3 | 60.8 | 62.9 | 258 | 60.8 | 62.9 |
| Copper Penny | #ad6f69 | 5.3 | 29.3 | 54.5 | 185.3 | 29.3 | 54.5 | 125.3 | 29.3 | 54.5 | 245 | 29.3 | 54.5 |
| Copper Red | #cb6d51 | 13.8 | 54 | 55.7 | 193.8 | 54 | 55.7 | 133.8 | 54 | 55.7 | 254 | 54 | 55.7 |
| Copper Rose | #996666 | 0 | 20 | 50 | 180 | 20 | 50 | 120 | 20 | 50 | 240 | 20 | 50 |
| Coquelicot | #ff3800 | 13.2 | 100 | 50 | 193.2 | 100 | 50 | 133.2 | 100 | 50 | 253 | 100 | 50 |
| Coral | #ff7f50 | 16.1 | 100 | 65.7 | 196.1 | 100 | 65.7 | 136.1 | 100 | 65.7 | 256 | 100 | 65.7 |
| Coral Pink | #f88379 | 4.7 | 90.1 | 72.4 | 184.7 | 90.1 | 72.4 | 124.7 | 90.1 | 72.4 | 245 | 90.1 | 72.4 |
| Coral Red | #ff4040 | 0 | 100 | 62.5 | 180 | 100 | 62.5 | 120 | 100 | 62.5 | 240 | 100 | 62.5 |
| Cordovan | #893f45 | 355.1 | 37 | 39.2 | 175.1 | 37 | 39.2 | 115.1 | 37 | 39.2 | 235 | 37 | 39.2 |
| Corn | #fbec5d | 54.3 | 95.2 | 67.5 | 234.3 | 95.2 | 67.5 | 174.3 | 95.2 | 67.5 | 294 | 95.2 | 67.5 |
| Cornell Red | #b31b1b | 0 | 73.8 | 40.4 | 180 | 73.8 | 40.4 | 120 | 73.8 | 40.4 | 240 | 73.8 | 40.4 |
| Cornflower Blue | #6495ed | 218.5 | 79.2 | 66.1 | 38.5 | 79.2 | 66.1 | 338.5 | 79.2 | 66.1 | 99 | 79.2 | 66.1 |
| Cornsilk | #fff8dc | 48 | 100 | 93.1 | 228 | 100 | 93.1 | 168 | 100 | 93.1 | 288 | 100 | 93.1 |
| Cosmic Latte | #fff8e7 | 42.5 | 100 | 95.3 | 222.5 | 100 | 95.3 | 162.5 | 100 | 95.3 | 283 | 100 | 95.3 |
| Cotton Candy | #ffbcd9 | 334 | 100 | 86.9 | 154 | 100 | 86.9 | 94 | 100 | 86.9 | 214 | 100 | 86.9 |
| Cream | #fffdd0 | 57.4 | 100 | 90.8 | 237.4 | 100 | 90.8 | 177.4 | 100 | 90.8 | 297 | 100 | 90.8 |
| Crimson | #dc143c | 348 | 83.3 | 47.1 | 168 | 83.3 | 47.1 | 108 | 83.3 | 47.1 | 228 | 83.3 | 47.1 |
| Crimson Glory | #be0032 | 344.2 | 100 | 37.3 | 164.2 | 100 | 37.3 | 104.2 | 100 | 37.3 | 224 | 100 | 37.3 |
| Cyan | #00ffff | 180 | 100 | 50 | 0 | 100 | 50 | 300 | 100 | 50 | 60 | 100 | 50 |
| Cyan (Process) | #00b7eb | 193.3 | 100 | 46.1 | 13.3 | 100 | 46.1 | 313.3 | 100 | 46.1 | 73 | 100 | 46.1 |
| Daffodil | #ffff31 | 60 | 100 | 59.6 | 240 | 100 | 59.6 | 180 | 100 | 59.6 | 300 | 100 | 59.6 |
| Dandelion | #f0e130 | 55.3 | 86.5 | 56.5 | 235.3 | 86.5 | 56.5 | 175.3 | 86.5 | 56.5 | 295 | 86.5 | 56.5 |
| Dark Blue | #00008b | 240 | 100 | 27.3 | 60 | 100 | 27.3 | 0 | 100 | 27.3 | 120 | 100 | 27.3 |
| Dark Brown | #654321 | 30 | 50.7 | 26.3 | 210 | 50.7 | 26.3 | 150 | 50.7 | 26.3 | 270 | 50.7 | 26.3 |
| Dark Byzantium | #5d3954 | 315 | 24 | 29.4 | 135 | 24 | 29.4 | 75 | 24 | 29.4 | 195 | 24 | 29.4 |
| Dark Candy Apple Red | #a40000 | 0 | 100 | 32.2 | 180 | 100 | 32.2 | 120 | 100 | 32.2 | 240 | 100 | 32.2 |
| Dark Cerulean | #08457e | 209 | 88.1 | 26.3 | 29 | 88.1 | 26.3 | 329 | 88.1 | 26.3 | 89 | 88.1 | 26.3 |
| Dark Chestnut | #986960 | 9.6 | 22.6 | 48.6 | 189.6 | 22.6 | 48.6 | 129.6 | 22.6 | 48.6 | 250 | 22.6 | 48.6 |
| Dark Coral | #cd5b45 | 9.7 | 57.6 | 53.7 | 189.7 | 57.6 | 53.7 | 129.7 | 57.6 | 53.7 | 250 | 57.6 | 53.7 |
| Dark Cyan | #008b8b | 180 | 100 | 27.3 | 0 | 100 | 27.3 | 300 | 100 | 27.3 | 60 | 100 | 27.3 |
| Dark Electric Blue | #536878 | 205.9 | 18.2 | 39.8 | 25.9 | 18.2 | 39.8 | 325.9 | 18.2 | 39.8 | 86 | 18.2 | 39.8 |
| Dark Goldenrod | #b8860b | 42.7 | 88.7 | 38.2 | 222.7 | 88.7 | 38.2 | 162.7 | 88.7 | 38.2 | 283 | 88.7 | 38.2 |
| Dark Gray | #a9a9a9 | 0 | 0 | 66.3 | 180 | 0 | 66.3 | 120 | 0 | 66.3 | 240 | 0 | 66.3 |
| Dark Green | #013220 | 158 | 96.1 | 10 | 338 | 96.1 | 10 | 278 | 96.1 | 10 | 38 | 96.1 | 10 |
| Dark Imperial Blue | #00416a | 203.2 | 100 | 20.8 | 23.2 | 100 | 20.8 | 323.2 | 100 | 20.8 | 83 | 100 | 20.8 |
| Dark Jungle Green | #1a2421 | 162 | 16.1 | 12.2 | 342 | 16.1 | 12.2 | 282 | 16.1 | 12.2 | 42 | 16.1 | 12.2 |
| Dark Khaki | #bdb76b | 55.6 | 38.3 | 58 | 235.6 | 38.3 | 58 | 175.6 | 38.3 | 58 | 296 | 38.3 | 58 |
| Dark Lava | #483c32 | 27.3 | 18 | 23.9 | 207.3 | 18 | 23.9 | 147.3 | 18 | 23.9 | 267 | 18 | 23.9 |
| Dark Lavender | #734f96 | 270.4 | 31 | 44.9 | 90.4 | 31 | 44.9 | 30.4 | 31 | 44.9 | 150 | 31 | 44.9 |
| Dark Magenta | #8b008b | 300 | 100 | 27.3 | 120 | 100 | 27.3 | 60 | 100 | 27.3 | 180 | 100 | 27.3 |

HSL Colour Model Values     Figure 39-4

| | Input Sensor Colour | | | Equiluminant Colour | | | Triadic Colour 1 | | | Triadic Colour 2 | | |
|---|---|---|---|---|---|---|---|---|---|---|---|---|
| | Hexidecmal triplet | Hue Saturation Lightness | | | f=MOD(Kn+180,360) | f=same | f=same | f=MOD(Kn+120,360) | f=same | f=same | f=MOD(Kn-120,360) | f=same | f=same |
| Name | c | h | s% | l% | h | s | l | h | s | l | h | s | l |
| Dark Midnight Blue | #003366 | 210 | 100 | 20 | 30 | 100 | 20 | 330 | 100 | 20 | 90 | 100 | 20 |
| Dark Olive Green | #556b2f | 82 | 39 | 30.2 | 262 | 39 | 30.2 | 202 | 39 | 30.2 | 322 | 39 | 30.2 |
| Dark Orange | #ff8c00 | 32.9 | 100 | 50 | 212.9 | 100 | 50 | 152.9 | 100 | 50 | 273 | 100 | 50 |
| Dark Orchid | #9932cc | 280.1 | 60.6 | 49.8 | 100.1 | 60.6 | 49.8 | 40.1 | 60.6 | 49.8 | 160 | 60.6 | 49.8 |
| Dark Pastel Blue | #779ecb | 212.1 | 44.7 | 63.1 | 32.1 | 44.7 | 63.1 | 332.1 | 44.7 | 63.1 | 92 | 44.7 | 63.1 |
| Dark Pastel Green | #03c03c | 138.1 | 96.9 | 38.2 | 318.1 | 96.9 | 38.2 | 258.1 | 96.9 | 38.2 | 18 | 96.9 | 38.2 |
| Dark Pastel Purple | #966fd6 | 262.7 | 55.7 | 63.7 | 82.7 | 55.7 | 63.7 | 22.7 | 55.7 | 63.7 | 143 | 55.7 | 63.7 |
| Dark Pastel Red | #c23b22 | 9.4 | 70.2 | 44.7 | 189.4 | 70.2 | 44.7 | 129.4 | 70.2 | 44.7 | 249 | 70.2 | 44.7 |
| Dark Pink | #e75480 | 342 | 75.4 | 61.8 | 162 | 75.4 | 61.8 | 102 | 75.4 | 61.8 | 222 | 75.4 | 61.8 |
| Dark Powder Blue | #039 | 240 | 100 | 11.2 | 60 | 100 | 11.2 | 0 | 100 | 11.2 | 120 | 100 | 11.2 |
| Dark Raspberry | #872657 | 329.7 | 56.1 | 33.9 | 149.7 | 56.1 | 33.9 | 89.7 | 56.1 | 33.9 | 210 | 56.1 | 33.9 |
| Dark Red | #8b0000 | 0 | 100 | 27.3 | 180 | 100 | 27.3 | 120 | 100 | 27.3 | 240 | 100 | 27.3 |
| Dark Salmon | #e9967a | 15.1 | 71.6 | 69.6 | 195.1 | 71.6 | 69.6 | 135.1 | 71.6 | 69.6 | 255 | 71.6 | 69.6 |
| Dark Scarlet | #560319 | 344.1 | 93.3 | 17.5 | 164.1 | 93.3 | 17.5 | 104.1 | 93.3 | 17.5 | 224 | 93.3 | 17.5 |
| Dark Sea Green | #8fbc8f | 120 | 25.1 | 64.9 | 300 | 25.1 | 64.9 | 240 | 25.1 | 64.9 | 0 | 25.1 | 64.9 |
| Dark Sienna | #3c1414 | 0 | 50 | 15.7 | 180 | 50 | 15.7 | 120 | 50 | 15.7 | 240 | 50 | 15.7 |
| Dark Slate Blue | #483d8b | 248.5 | 39 | 39.2 | 68.5 | 39 | 39.2 | 8.5 | 39 | 39.2 | 129 | 39 | 39.2 |
| Dark Slate Gray | #2f4f4f | 180 | 25.4 | 24.7 | 0 | 25.4 | 24.7 | 300 | 25.4 | 24.7 | 60 | 25.4 | 24.7 |
| Dark Spring Green | #177245 | 150.3 | 66.4 | 26.9 | 330.3 | 66.4 | 26.9 | 270.3 | 66.4 | 26.9 | 30 | 66.4 | 26.9 |
| Dark Tan | #918151 | 45 | 28.3 | 44.3 | 225 | 28.3 | 44.3 | 165 | 28.3 | 44.3 | 285 | 28.3 | 44.3 |
| Dark Tangerine | #ffa812 | 38 | 100 | 53.5 | 218 | 100 | 53.5 | 158 | 100 | 53.5 | 278 | 100 | 53.5 |
| Dark Taupe | #483c32 | 27.3 | 18 | 23.9 | 207.3 | 18 | 23.9 | 147.3 | 18 | 23.9 | 267 | 18 | 23.9 |
| Dark Terra Cotta | #cc4e5c | 353.3 | 55.3 | 55.3 | 173.3 | 55.3 | 55.3 | 113.3 | 55.3 | 55.3 | 233 | 55.3 | 55.3 |
| Dark Turquoise | #00ced1 | 180.9 | 100 | 41 | 0.9 | 100 | 41 | 300.9 | 100 | 41 | 61 | 100 | 41 |
| Dark Violet | #9400d3 | 282.1 | 100 | 41.4 | 102.1 | 100 | 41.4 | 42.1 | 100 | 41.4 | 162 | 100 | 41.4 |
| Dark Yellow | #9b870c | 51.6 | 85.6 | 32.7 | 231.6 | 85.6 | 32.7 | 171.6 | 85.6 | 32.7 | 292 | 85.6 | 32.7 |
| Dartmouth Green | #00703c | 152.1 | 100 | 22 | 332.1 | 100 | 22 | 272.1 | 100 | 22 | 32 | 100 | 22 |
| Davy'S Grey | #555555 | 0 | 0 | 33.3 | 180 | 0 | 33.3 | 120 | 0 | 33.3 | 240 | 0 | 33.3 |
| Debian Red | #d70a53 | 338.6 | 91.1 | 44.1 | 158.6 | 91.1 | 44.1 | 98.6 | 91.1 | 44.1 | 219 | 91.1 | 44.1 |
| Deep Carmine | #a9203e | 346.9 | 68.2 | 39.4 | 166.9 | 68.2 | 39.4 | 106.9 | 68.2 | 39.4 | 227 | 68.2 | 39.4 |
| Deep Carmine Pink | #ef3038 | 357.5 | 85.7 | 56.3 | 177.5 | 85.7 | 56.3 | 117.5 | 85.7 | 56.3 | 238 | 85.7 | 56.3 |
| Deep Carrot Orange | #e9692c | 19.4 | 81.1 | 54.3 | 199.4 | 81.1 | 54.3 | 139.4 | 81.1 | 54.3 | 259 | 81.1 | 54.3 |
| Deep Cerise | #da3287 | 329.6 | 69.4 | 52.5 | 149.6 | 69.4 | 52.5 | 89.6 | 69.4 | 52.5 | 210 | 69.4 | 52.5 |
| Deep Champagne | #fad6a5 | 34.6 | 89.5 | 81.4 | 214.6 | 89.5 | 81.4 | 154.6 | 89.5 | 81.4 | 275 | 89.5 | 81.4 |
| Deep Chestnut | #b94e48 | 3.2 | 44.7 | 50.4 | 183.2 | 44.7 | 50.4 | 123.2 | 44.7 | 50.4 | 243 | 44.7 | 50.4 |
| Deep Coffee | #704241 | 1.3 | 26.6 | 34.7 | 181.3 | 26.6 | 34.7 | 121.3 | 26.6 | 34.7 | 241 | 26.6 | 34.7 |
| Deep Fuchsia | #c154c1 | 300 | 46.8 | 54.3 | 120 | 46.8 | 54.3 | 60 | 46.8 | 54.3 | 180 | 46.8 | 54.3 |
| Deep Jungle Green | #004b49 | 178.4 | 100 | 14.7 | 358.4 | 100 | 14.7 | 298.4 | 100 | 14.7 | 58 | 100 | 14.7 |
| Deep Lilac | #9955bb | 280 | 42.9 | 53.3 | 100 | 42.9 | 53.3 | 40 | 42.9 | 53.3 | 160 | 42.9 | 53.3 |
| Deep Magenta | #cc00cc | 300 | 100 | 40 | 120 | 100 | 40 | 60 | 100 | 40 | 180 | 100 | 40 |
| Deep Peach | #ffcba4 | 25.7 | 100 | 82.2 | 205.7 | 100 | 82.2 | 145.7 | 100 | 82.2 | 266 | 100 | 82.2 |
| Deep Pink | #ff1493 | 327.6 | 100 | 53.9 | 147.6 | 100 | 53.9 | 87.6 | 100 | 53.9 | 208 | 100 | 53.9 |
| Deep Ruby | #843f5b | 335.7 | 35.4 | 38.2 | 155.7 | 35.4 | 38.2 | 95.7 | 35.4 | 38.2 | 216 | 35.4 | 38.2 |
| Deep Saffron | #ff9933 | 30 | 100 | 60 | 210 | 100 | 60 | 150 | 100 | 60 | 270 | 100 | 60 |
| Deep Sky Blue | #00bfff | 195.1 | 100 | 50 | 15.1 | 100 | 50 | 315.1 | 100 | 50 | 75 | 100 | 50 |
| Deep Tuscan Red | #66424d | 341.7 | 21.4 | 32.9 | 161.7 | 21.4 | 32.9 | 101.7 | 21.4 | 32.9 | 222 | 21.4 | 32.9 |
| Denim | #1560bd | 213.2 | 80 | 41.2 | 33.2 | 80 | 41.2 | 333.2 | 80 | 41.2 | 93 | 80 | 41.2 |
| Desert | #c19a6b | 32.8 | 41 | 58.8 | 212.8 | 41 | 58.8 | 152.8 | 41 | 58.8 | 273 | 41 | 58.8 |
| Desert Sand | #edc9af | 25.2 | 63.3 | 80.8 | 205.2 | 63.3 | 80.8 | 145.2 | 63.3 | 80.8 | 265 | 63.3 | 80.8 |
| Dim Gray | #696969 | 0 | 0 | 41.2 | 180 | 0 | 41.2 | 120 | 0 | 41.2 | 240 | 0 | 41.2 |
| Dodger Blue | #1e90ff | 209.6 | 100 | 55.9 | 29.6 | 100 | 55.9 | 329.6 | 100 | 55.9 | 90 | 100 | 55.9 |
| Dogwood Rose | #d71868 | 334.9 | 79.9 | 46.9 | 154.9 | 79.9 | 46.9 | 94.9 | 79.9 | 46.9 | 215 | 79.9 | 46.9 |
| Dollar Bill | #85bb65 | 97.7 | 38.7 | 56.5 | 277.7 | 38.7 | 56.5 | 217.7 | 38.7 | 56.5 | 338 | 38.7 | 56.5 |
| Drab | #967117 | 42.5 | 73.4 | 33.9 | 222.5 | 73.4 | 33.9 | 162.5 | 73.4 | 33.9 | 283 | 73.4 | 33.9 |
| Duke Blue | #00009c | 240 | 100 | 30.6 | 60 | 100 | 30.6 | 0 | 100 | 30.6 | 120 | 100 | 30.6 |
| Earth Yellow | #e1a95f | 34.2 | 68.4 | 62.7 | 214.2 | 68.4 | 62.7 | 154.2 | 68.4 | 62.7 | 274 | 68.4 | 62.7 |
| Ebony | #555d50 | 96.9 | 7.5 | 33.9 | 276.9 | 7.5 | 33.9 | 216.9 | 7.5 | 33.9 | 337 | 7.5 | 33.9 |
| Ecru | #c2b280 | 45.5 | 35.1 | 63.1 | 225.5 | 35.1 | 63.1 | 165.5 | 35.1 | 63.1 | 286 | 35.1 | 63.1 |
| Eggplant | #614051 | 329.1 | 20.5 | 31.6 | 149.1 | 20.5 | 31.6 | 89.1 | 20.5 | 31.6 | 209 | 20.5 | 31.6 |
| Eggshell | #f0ead6 | 46.2 | 46.4 | 89 | 226.2 | 46.4 | 89 | 166.2 | 46.4 | 89 | 286 | 46.4 | 89 |
| Egyptian Blue | #1034a6 | 225.6 | 82.4 | 35.7 | 45.6 | 82.4 | 35.7 | 345.6 | 82.4 | 35.7 | 106 | 82.4 | 35.7 |
| Electric Blue | #7df9ff | 182.8 | 100 | 74.5 | 2.8 | 100 | 74.5 | 302.8 | 100 | 74.5 | 63 | 100 | 74.5 |
| Electric Crimson | #ff003f | 345.2 | 100 | 50 | 165.2 | 100 | 50 | 105.2 | 100 | 50 | 225 | 100 | 50 |
| Electric Cyan | #00ffff | 180 | 100 | 50 | 0 | 100 | 50 | 300 | 100 | 50 | 60 | 100 | 50 |
| Electric Green | #00ff00 | 120 | 100 | 50 | 300 | 100 | 50 | 240 | 100 | 50 | 0 | 100 | 50 |
| Electric Indigo | #6f00ff | 266.1 | 100 | 50 | 86.1 | 100 | 50 | 26.1 | 100 | 50 | 146 | 100 | 50 |
| Electric Lavender | #f4bbff | 290.3 | 100 | 86.7 | 110.3 | 100 | 86.7 | 50.3 | 100 | 86.7 | 170 | 100 | 86.7 |
| Electric Lime | #ccff00 | 72 | 100 | 50 | 252 | 100 | 50 | 192 | 100 | 50 | 312 | 100 | 50 |
| Electric Purple | #bf00ff | 284.9 | 100 | 50 | 104.9 | 100 | 50 | 44.9 | 100 | 50 | 165 | 100 | 50 |
| Electric Ultramarine | #3f00ff | 254.8 | 100 | 50 | 74.8 | 100 | 50 | 14.8 | 100 | 50 | 135 | 100 | 50 |
| Electric Violet | #8f00ff | 273.6 | 100 | 50 | 93.6 | 100 | 50 | 33.6 | 100 | 50 | 154 | 100 | 50 |
| Electric Yellow | #ffff00 | 60 | 100 | 50 | 240 | 100 | 50 | 180 | 100 | 50 | 300 | 100 | 50 |
| Emerald | #50c878 | 140 | 52.2 | 54.9 | 320 | 52.2 | 54.9 | 260 | 52.2 | 54.9 | 20 | 52.2 | 54.9 |

HSL Colour Model Values

Figure 39-5

| Name | Input Sensor Colour | | | | Equiluminant Colour | | | Triadic Colour 1 | | | Triadic Colour 2 | | |
|---|---|---|---|---|---|---|---|---|---|---|---|---|---|
| | Hexidecmal triplet | Hue | Saturation | Lightness | f=MOD(Kn+180,360) | f=same | f=same | f=MOD(Kn+120,360) | f=same | f=same | f=MOD(Kn-120,360) | f=same | f=same |
| | c | h | s% | l% | h | s | l | h | s | l | h | s | l |
| English Lavender | #b48395 | 338 | 24.6 | 61 | 158 | 24.6 | 61 | 98 | 24.6 | 61 | 218 | 24.6 | 61 |
| Eton Blue | #96c8a2 | 134.4 | 31.2 | 68.6 | 314.4 | 31.2 | 68.6 | 254.4 | 31.2 | 68.6 | 14 | 31.2 | 68.6 |
| Fallow | #c19a6b | 32.8 | 41 | 58.8 | 212.8 | 41 | 58.8 | 152.8 | 41 | 58.8 | 273 | 41 | 58.8 |
| Falu Red | #801818 | 0 | 68.4 | 29.8 | 180 | 68.4 | 29.8 | 120 | 68.4 | 29.8 | 240 | 68.4 | 29.8 |
| Fandango | #b53389 | 320.3 | 56 | 45.5 | 140.3 | 56 | 45.5 | 80.3 | 56 | 45.5 | 200 | 56 | 45.5 |
| Fashion Fuchsia | #ff00a1 | 320.4 | 100 | 47.8 | 140.4 | 100 | 47.8 | 80.4 | 100 | 47.8 | 200 | 100 | 47.8 |
| Fawn | #e5aa70 | 29.7 | 69.2 | 66.9 | 209.7 | 69.2 | 66.9 | 149.7 | 69.2 | 66.9 | 270 | 69.2 | 66.9 |
| Feldgrau | #4d5d53 | 142.5 | 9.4 | 33.3 | 322.5 | 9.4 | 33.3 | 262.5 | 9.4 | 33.3 | 23 | 9.4 | 33.3 |
| Fern Green | #4f7942 | 105.8 | 29.4 | 36.7 | 285.8 | 29.4 | 36.7 | 225.8 | 29.4 | 36.7 | 346 | 29.4 | 36.7 |
| Ferrari Red | #ff2800 | 9.4 | 100 | 50 | 189.4 | 100 | 50 | 129.4 | 100 | 50 | 249 | 100 | 50 |
| Field Drab | #6c541e | 41.5 | 56.5 | 27.1 | 221.5 | 56.5 | 27.1 | 161.5 | 56.5 | 27.1 | 282 | 56.5 | 27.1 |
| Fire Engine Red | #ce2029 | 356.9 | 73.1 | 46.7 | 176.9 | 73.1 | 46.7 | 116.9 | 73.1 | 46.7 | 237 | 73.1 | 46.7 |
| Firebrick | #b22222 | 0 | 67.9 | 41.6 | 180 | 67.9 | 41.6 | 120 | 67.9 | 41.6 | 240 | 67.9 | 41.6 |
| Flame | #e25822 | 16.9 | 76.8 | 51 | 196.9 | 76.8 | 51 | 136.9 | 76.8 | 51 | 257 | 76.8 | 51 |
| Flamingo Pink | #fc8eac | 343.6 | 94.8 | 77.3 | 163.6 | 94.8 | 77.3 | 103.6 | 94.8 | 77.3 | 224 | 94.8 | 77.3 |
| Flavescent | #f7e98e | 52 | 86.8 | 76.3 | 232 | 86.8 | 76.3 | 172 | 86.8 | 76.3 | 292 | 86.8 | 76.3 |
| Flax | #eedc82 | 50 | 76.1 | 72.2 | 230 | 76.1 | 72.2 | 170 | 76.1 | 72.2 | 290 | 76.1 | 72.2 |
| Floral White | #fffaf0 | 40 | 100 | 97.1 | 220 | 100 | 97.1 | 160 | 100 | 97.1 | 280 | 100 | 97.1 |
| Fluorescent Orange | #ffbf00 | 44.9 | 100 | 50 | 224.9 | 100 | 50 | 164.9 | 100 | 50 | 285 | 100 | 50 |
| Fluorescent Pink | #ff1493 | 327.6 | 100 | 53.9 | 147.6 | 100 | 53.9 | 87.6 | 100 | 53.9 | 208 | 100 | 53.9 |
| Fluorescent Yellow | #ccff00 | 72 | 100 | 50 | 252 | 100 | 50 | 192 | 100 | 50 | 312 | 100 | 50 |
| Folly | #ff004f | 341.4 | 100 | 50 | 161.4 | 100 | 50 | 101.4 | 100 | 50 | 221 | 100 | 50 |
| Forest Green (Traditional) | #014421 | 148.7 | 97.1 | 13.5 | 328.7 | 97.1 | 13.5 | 268.7 | 97.1 | 13.5 | 29 | 97.1 | 13.5 |
| Forest Green (Web) | #228b22 | 120 | 60.7 | 33.9 | 300 | 60.7 | 33.9 | 240 | 60.7 | 33.9 | 0 | 60.7 | 33.9 |
| French Beige | #a67b5b | 25.6 | 29.6 | 50.4 | 205.6 | 29.6 | 50.4 | 145.6 | 29.6 | 50.4 | 266 | 29.6 | 50.4 |
| French Blue | #0072bb | 203.4 | 100 | 36.7 | 23.4 | 100 | 36.7 | 323.4 | 100 | 36.7 | 83 | 100 | 36.7 |
| French Lilac | #86608e | 289.6 | 19.3 | 46.7 | 109.6 | 19.3 | 46.7 | 49.6 | 19.3 | 46.7 | 170 | 19.3 | 46.7 |
| French Lime | #ccff00 | 72 | 100 | 50 | 252 | 100 | 50 | 192 | 100 | 50 | 312 | 100 | 50 |
| French Raspberry | #c72c48 | 349.2 | 63.8 | 47.6 | 169.2 | 63.8 | 47.6 | 109.2 | 63.8 | 47.6 | 229 | 63.8 | 47.6 |
| French Rose | #f64a8a | 337.7 | 90.5 | 62.7 | 157.7 | 90.5 | 62.7 | 97.7 | 90.5 | 62.7 | 218 | 90.5 | 62.7 |
| Fuchsia | #ff00ff | 300 | 100 | 50 | 120 | 100 | 50 | 60 | 100 | 50 | 180 | 100 | 50 |
| Fuchsia (Crayola) | #c154c1 | 300 | 46.8 | 54.3 | 120 | 46.8 | 54.3 | 60 | 46.8 | 54.3 | 180 | 46.8 | 54.3 |
| Fuchsia Pink | #ff77ff | 300 | 100 | 73.3 | 120 | 100 | 73.3 | 60 | 100 | 73.3 | 180 | 100 | 73.3 |
| Fuchsia Rose | #c74375 | 337.3 | 54.1 | 52.2 | 157.3 | 54.1 | 52.2 | 97.3 | 54.1 | 52.2 | 217 | 54.1 | 52.2 |
| Fulvous | #e48400 | 34.7 | 100 | 44.7 | 214.7 | 100 | 44.7 | 154.7 | 100 | 44.7 | 275 | 100 | 44.7 |
| Fuzzy Wuzzy | #cc6666 | 0 | 50 | 60 | 180 | 50 | 60 | 120 | 50 | 60 | 240 | 50 | 60 |
| Gainsboro | #dcdcdc | 0 | 0 | 86.3 | 180 | 0 | 86.3 | 120 | 0 | 86.3 | 240 | 0 | 86.3 |
| Gamboge | #e49b0f | 39.4 | 87.7 | 47.6 | 219.4 | 87.7 | 47.6 | 159.4 | 87.7 | 47.6 | 279 | 87.7 | 47.6 |
| Ghost White | #f8f8ff | 240 | 100 | 98.6 | 60 | 100 | 98.6 | 0 | 100 | 98.6 | 120 | 100 | 98.6 |
| Ginger | #b06500 | 34.4 | 100 | 34.5 | 214.4 | 100 | 34.5 | 154.4 | 100 | 34.5 | 274 | 100 | 34.5 |
| Glaucous | #6082b6 | 216.3 | 37.1 | 54.5 | 36.3 | 37.1 | 54.5 | 336.3 | 37.1 | 54.5 | 96 | 37.1 | 54.5 |
| Glitter | #e6e8fa | 234 | 66.7 | 94.1 | 54 | 66.7 | 94.1 | 354 | 66.7 | 94.1 | 114 | 66.7 | 94.1 |
| Gold (Metallic) | #d4af37 | 45.9 | 64.6 | 52.4 | 225.9 | 64.6 | 52.4 | 165.9 | 64.6 | 52.4 | 286 | 64.6 | 52.4 |
| Gold (Web) (Golden) | #ffd700 | 50.6 | 100 | 50 | 230.6 | 100 | 50 | 170.6 | 100 | 50 | 291 | 100 | 50 |
| Golden Brown | #996515 | 36.4 | 75.9 | 34.1 | 216.4 | 75.9 | 34.1 | 156.4 | 75.9 | 34.1 | 276 | 75.9 | 34.1 |
| Golden Poppy | #fcc200 | 46.2 | 100 | 49.4 | 226.2 | 100 | 49.4 | 166.2 | 100 | 49.4 | 286 | 100 | 49.4 |
| Golden Yellow | #ffdf00 | 52.5 | 100 | 50 | 232.5 | 100 | 50 | 172.5 | 100 | 50 | 293 | 100 | 50 |
| Goldenrod | #daa520 | 42.9 | 74.4 | 49 | 222.9 | 74.4 | 49 | 162.9 | 74.4 | 49 | 283 | 74.4 | 49 |
| Granny Smith Apple | #a8e4a0 | 112.9 | 55.7 | 76.1 | 292.9 | 55.7 | 76.1 | 232.9 | 55.7 | 76.1 | 353 | 55.7 | 76.1 |
| Gray | #808080 | 0 | 0 | 50.2 | 180 | 0 | 50.2 | 120 | 0 | 50.2 | 240 | 0 | 50.2 |
| Gray-Asparagus | #465945 | 117 | 12.7 | 31 | 297 | 12.7 | 31 | 237 | 12.7 | 31 | 357 | 12.7 | 31 |
| Gray (Html/Css Gray) | #808080 | 0 | 0 | 50.2 | 180 | 0 | 50.2 | 120 | 0 | 50.2 | 240 | 0 | 50.2 |
| Gray (X11 Gray) | #bebebe | 0 | 0 | 74.5 | 180 | 0 | 74.5 | 120 | 0 | 74.5 | 240 | 0 | 74.5 |
| Green (Color Wheel) (X11 Green) | #00ff00 | 120 | 100 | 50 | 300 | 100 | 50 | 240 | 100 | 50 | 0 | 100 | 50 |
| Green (Crayola) | #1cac78 | 158.3 | 72 | 39.2 | 338.3 | 72 | 39.2 | 278.3 | 72 | 39.2 | 38 | 72 | 39.2 |
| Green (Html/Css Green) | #008000 | 120 | 100 | 25.1 | 300 | 100 | 25.1 | 240 | 100 | 25.1 | 0 | 100 | 25.1 |
| Green (Munsell) | #00a877 | 162.5 | 100 | 32.9 | 342.5 | 100 | 32.9 | 282.5 | 100 | 32.9 | 43 | 100 | 32.9 |
| Green (Ncs) | #009f6b | 160.4 | 100 | 31.2 | 340.4 | 100 | 31.2 | 280.4 | 100 | 31.2 | 40 | 100 | 31.2 |
| Green (Pigment) | #00a550 | 149.1 | 100 | 32.4 | 329.1 | 100 | 32.4 | 269.1 | 100 | 32.4 | 29 | 100 | 32.4 |
| Green (Ryb) | #66b032 | 95.2 | 55.8 | 44.3 | 275.2 | 55.8 | 44.3 | 215.2 | 55.8 | 44.3 | 335 | 55.8 | 44.3 |
| Green-Yellow | #adff2f | 83.7 | 100 | 59.2 | 263.7 | 100 | 59.2 | 203.7 | 100 | 59.2 | 324 | 100 | 59.2 |
| Grullo | #a99a86 | 34.3 | 16.9 | 59.4 | 214.3 | 16.9 | 59.4 | 154.3 | 16.9 | 59.4 | 274 | 16.9 | 59.4 |
| Guppie Green | #00ff7f | 149.9 | 100 | 50 | 329.9 | 100 | 50 | 269.9 | 100 | 50 | 30 | 100 | 50 |
| Halayà Übe | #663854 | 323.5 | 29.1 | 31 | 143.5 | 29.1 | 31 | 83.5 | 29.1 | 31 | 204 | 29.1 | 31 |
| Han Blue | #446ccf | 222.7 | 59.1 | 53.9 | 42.7 | 59.1 | 53.9 | 342.7 | 59.1 | 53.9 | 103 | 59.1 | 53.9 |
| Han Purple | #5218fa | 255.4 | 95.8 | 53.7 | 75.4 | 95.8 | 53.7 | 15.4 | 95.8 | 53.7 | 135 | 95.8 | 53.7 |
| Hansa Yellow | #e9d66b | 51 | 74.1 | 66.7 | 231 | 74.1 | 66.7 | 171 | 74.1 | 66.7 | 291 | 74.1 | 66.7 |
| Harlequin | #3fff00 | 105.2 | 100 | 50 | 285.2 | 100 | 50 | 225.2 | 100 | 50 | 345 | 100 | 50 |
| Harvard Crimson | #c90016 | 353.4 | 100 | 39.4 | 173.4 | 100 | 39.4 | 113.4 | 100 | 39.4 | 233 | 100 | 39.4 |
| Harvest Gold | #da9100 | 39.9 | 100 | 42.7 | 219.9 | 100 | 42.7 | 159.9 | 100 | 42.7 | 280 | 100 | 42.7 |
| Heart Gold | #808000 | 60 | 100 | 25.1 | 240 | 100 | 25.1 | 180 | 100 | 25.1 | 300 | 100 | 25.1 |
| Heliotrope | #df73ff | 286.3 | 100 | 72.5 | 106.3 | 100 | 72.5 | 46.3 | 100 | 72.5 | 166 | 100 | 72.5 |
| Hollywood Cerise | #ff00a1 | 320.4 | 100 | 47.8 | 140.4 | 100 | 47.8 | 80.4 | 100 | 47.8 | 200 | 100 | 47.8 |

HSL Colour Model Values

Figure 39-6

| Name | Input Sensor Colour | | | | Equiluminant Colour | | | Triadic Colour 1 | | | Triadic Colour 2 | | |
|---|---|---|---|---|---|---|---|---|---|---|---|---|---|
| | Hexidecmal triplet | Hue | Saturation | Lightness | f=MOD(Kn+180,360) | f=same | f=same | f=MOD(Kn+120,360) | f=same | f=same | f=MOD(Kn-120,360) | f=same | f=same |
| | c | h | s% | l% | h | s | l | h | s | l | h | s | l |
| Honeydew | #f0fff0 | 120 | 100 | 97.1 | 300 | 100 | 97.1 | 240 | 100 | 97.1 | 0 | 100 | 97.1 |
| Honolulu Blue | #007fbf | 200.1 | 100 | 37.5 | 20.1 | 100 | 37.5 | 320.1 | 100 | 37.5 | 80 | 100 | 37.5 |
| Hooker's Green | #49796b | 162.5 | 24.7 | 38 | 342.5 | 24.7 | 38 | 282.5 | 24.7 | 38 | 43 | 24.7 | 38 |
| Hot Magenta | #ff1dce | 313 | 100 | 55.7 | 133 | 100 | 55.7 | 73 | 100 | 55.7 | 193 | 100 | 55.7 |
| Hot Pink | #ff69b4 | 330 | 100 | 70.6 | 150 | 100 | 70.6 | 90 | 100 | 70.6 | 210 | 100 | 70.6 |
| Hunter Green | #355e3b | 128.8 | 27.9 | 28.8 | 308.8 | 27.9 | 28.8 | 248.8 | 27.9 | 28.8 | 9 | 27.9 | 28.8 |
| Iceberg | #71a6d2 | 207.2 | 51.9 | 63.3 | 27.2 | 51.9 | 63.3 | 327.2 | 51.9 | 63.3 | 87 | 51.9 | 63.3 |
| Icterine | #fcf75e | 58.1 | 96.3 | 67.8 | 238.1 | 96.3 | 67.8 | 178.1 | 96.3 | 67.8 | 298 | 96.3 | 67.8 |
| Imperial Blue | #002395 | 225.9 | 100 | 29.2 | 45.9 | 100 | 29.2 | 345.9 | 100 | 29.2 | 106 | 100 | 29.2 |
| Inchworm | #b2ec5d | 84.3 | 79 | 64.5 | 264.3 | 79 | 64.5 | 204.3 | 79 | 64.5 | 324 | 79 | 64.5 |
| India Green | #138808 | 114.8 | 88.9 | 28.2 | 294.8 | 88.9 | 28.2 | 234.8 | 88.9 | 28.2 | 355 | 88.9 | 28.2 |
| Indian Red | #cd5c5c | 0 | 53.1 | 58.2 | 180 | 53.1 | 58.2 | 120 | 53.1 | 58.2 | 240 | 53.1 | 58.2 |
| Indian Yellow | #e3a857 | 34.7 | 71.4 | 61.6 | 214.7 | 71.4 | 61.6 | 154.7 | 71.4 | 61.6 | 275 | 71.4 | 61.6 |
| Indigo | #6f00ff | 266.1 | 100 | 50 | 86.1 | 100 | 50 | 26.1 | 100 | 50 | 146 | 100 | 50 |
| Indigo (Dye) | #00416a | 203.2 | 100 | 20.8 | 23.2 | 100 | 20.8 | 323.2 | 100 | 20.8 | 83 | 100 | 20.8 |
| Indigo (Web) | #4b0082 | 274.6 | 100 | 25.5 | 94.6 | 100 | 25.5 | 34.6 | 100 | 25.5 | 155 | 100 | 25.5 |
| International Klein Blue | #002fa7 | 223.1 | 100 | 32.7 | 43.1 | 100 | 32.7 | 343.1 | 100 | 32.7 | 103 | 100 | 32.7 |
| International Orange (Aerospace) | #ff4f00 | 18.6 | 100 | 50 | 198.6 | 100 | 50 | 138.6 | 100 | 50 | 259 | 100 | 50 |
| International Orange (Engineering) | #ba160c | 3.4 | 87.9 | 38.8 | 183.4 | 87.9 | 38.8 | 123.4 | 87.9 | 38.8 | 243 | 87.9 | 38.8 |
| International Orange (Golden Gate Bridge) | #c0362c | 4.1 | 62.7 | 46.3 | 184.1 | 62.7 | 46.3 | 124.1 | 62.7 | 46.3 | 244 | 62.7 | 46.3 |
| Iris | #5a4fcf | 245.2 | 57.1 | 56.1 | 65.2 | 57.1 | 56.1 | 5.2 | 57.1 | 56.1 | 125 | 57.1 | 56.1 |
| Isabelline | #f4f0ec | 30 | 26.7 | 94.1 | 210 | 26.7 | 94.1 | 150 | 26.7 | 94.1 | 270 | 26.7 | 94.1 |
| Islamic Green | #009000 | 120 | 100 | 28.2 | 300 | 100 | 28.2 | 240 | 100 | 28.2 | 0 | 100 | 28.2 |
| Ivory | #fffff0 | 60 | 100 | 97.1 | 240 | 100 | 97.1 | 180 | 100 | 97.1 | 300 | 100 | 97.1 |
| Jade | #00a86b | 158.2 | 100 | 32.9 | 338.2 | 100 | 32.9 | 278.2 | 100 | 32.9 | 38 | 100 | 32.9 |
| Jasmine | #f8de7e | 47.2 | 89.7 | 73.3 | 227.2 | 89.7 | 73.3 | 167.2 | 89.7 | 73.3 | 287 | 89.7 | 73.3 |
| Jasper | #d73b3e | 358.8 | 66.1 | 53.7 | 178.8 | 66.1 | 53.7 | 118.8 | 66.1 | 53.7 | 239 | 66.1 | 53.7 |
| Jazzberry Jam | #a50b5e | 327.5 | 87.5 | 34.5 | 147.7 | 87.5 | 34.5 | 87.7 | 87.5 | 34.5 | 208 | 87.5 | 34.5 |
| Jet | #343434 | 0 | 0 | 20.4 | 180 | 0 | 20.4 | 120 | 0 | 20.4 | 240 | 0 | 20.4 |
| Jonquil | #fada5e | 47.7 | 94 | 67.5 | 227.7 | 94 | 67.5 | 167.7 | 94 | 67.5 | 288 | 94 | 67.5 |
| June Bud | #bdda57 | 73.3 | 63.9 | 59.8 | 253.3 | 63.9 | 59.8 | 193.3 | 63.9 | 59.8 | 313 | 63.9 | 59.8 |
| Jungle Green | #29ab87 | 163.4 | 61.3 | 41.6 | 343.4 | 61.3 | 41.6 | 283.4 | 61.3 | 41.6 | 43 | 61.3 | 41.6 |
| Kelly Green | #4cbb17 | 100.6 | 78.1 | 41.2 | 280.6 | 78.1 | 41.2 | 220.6 | 78.1 | 41.2 | 341 | 78.1 | 41.2 |
| Kenyan Copper | #7c1c05 | 11.6 | 92.2 | 25.3 | 191.6 | 92.2 | 25.3 | 131.6 | 92.2 | 25.3 | 252 | 92.2 | 25.3 |
| Khaki (Html/Css) (Khaki) | #c3b091 | 37.2 | 29.4 | 66.7 | 217.2 | 29.4 | 66.7 | 157.2 | 29.4 | 66.7 | 277 | 29.4 | 66.7 |
| Khaki (X11) (Light Khaki) | #f0e68c | 54 | 76.9 | 74.5 | 234 | 76.9 | 74.5 | 174 | 76.9 | 74.5 | 294 | 76.9 | 74.5 |
| Ku Crimson | #e8000d | 356.6 | 100 | 45.5 | 176.6 | 100 | 45.5 | 116.6 | 100 | 45.5 | 237 | 100 | 45.5 |
| La Salle Green | #087830 | 141.4 | 87.5 | 25.1 | 321.4 | 87.5 | 25.1 | 261.4 | 87.5 | 25.1 | 21 | 87.5 | 25.1 |
| Languid Lavender | #d6cadd | 277.9 | 21.8 | 82.9 | 97.9 | 21.8 | 82.9 | 37.9 | 21.8 | 82.9 | 158 | 21.8 | 82.9 |
| Lapis Lazuli | #26619c | 210 | 60.8 | 38 | 30 | 60.8 | 38 | 330 | 60.8 | 38 | 90 | 60.8 | 38 |
| Laser Lemon | #fefe22 | 60 | 99.1 | 56.5 | 180 | 99.1 | 56.5 | 180 | 99.1 | 56.5 | 300 | 99.1 | 56.5 |
| Laurel Green | #a9ba9d | 95.2 | 17.4 | 67.3 | 275.2 | 17.4 | 67.3 | 215.2 | 17.4 | 67.3 | 335 | 17.4 | 67.3 |
| Lava | #cf1020 | 355 | 85.7 | 43.7 | 175 | 85.7 | 43.7 | 115 | 85.7 | 43.7 | 235 | 85.7 | 43.7 |
| Lavender Blue | #CCCCFF | 240 | 100 | 90 | 60 | 100 | 90 | 0 | 100 | 90 | 120 | 100 | 90 |
| Lavender Blush | #fff0f5 | 340 | 100 | 97.1 | 160 | 100 | 97.1 | 100 | 100 | 97.1 | 220 | 100 | 97.1 |
| Lavender (Floral) | #b57edc | 275.1 | 57.3 | 67.8 | 95.1 | 57.3 | 67.8 | 35.1 | 57.3 | 67.8 | 155 | 57.3 | 67.8 |
| Lavender Gray | #c4c3d0 | 244.6 | 12.1 | 79 | 64.6 | 12.1 | 79 | 4.6 | 12.1 | 79 | 125 | 12.1 | 79 |
| Lavender Indigo | #9457eb | 264.7 | 78.7 | 63.1 | 84.7 | 78.7 | 63.1 | 24.7 | 78.7 | 63.1 | 145 | 78.7 | 63.1 |
| Lavender Magenta | #ee82ee | 300 | 76.1 | 72.2 | 120 | 76.1 | 72.2 | 60 | 76.1 | 72.2 | 180 | 76.1 | 72.2 |
| Lavender Mist | #e6e6fa | 240 | 66.7 | 94.1 | 60 | 66.7 | 94.1 | 0 | 66.7 | 94.1 | 120 | 66.7 | 94.1 |
| Lavender Pink | #fbaed2 | 331.9 | 90.6 | 83.3 | 151.9 | 90.6 | 83.3 | 91.9 | 90.6 | 83.3 | 212 | 90.6 | 83.3 |
| Lavender Purple | #967bb6 | 267.5 | 28.8 | 59.8 | 87.5 | 28.8 | 59.8 | 27.5 | 28.8 | 59.8 | 148 | 28.8 | 59.8 |
| Lavender Rose | #fba0e3 | 315.8 | 91.9 | 80.6 | 135.8 | 91.9 | 80.6 | 75.8 | 91.9 | 80.6 | 196 | 91.9 | 80.6 |
| Lavender (Web) | #e6e6fa | 240 | 66.7 | 94.1 | 60 | 66.7 | 94.1 | 0 | 66.7 | 94.1 | 120 | 66.7 | 94.1 |
| Lawn Green | #7cfc00 | 90.5 | 100 | 49.4 | 270.5 | 100 | 49.4 | 210.5 | 100 | 49.4 | 331 | 100 | 49.4 |
| Lemon | #fff700 | 58.1 | 100 | 50 | 238.1 | 100 | 50 | 178.1 | 100 | 50 | 298 | 100 | 50 |
| Lemon Chiffon | #fffacd | 54 | 100 | 90.2 | 234 | 100 | 90.2 | 174 | 100 | 90.2 | 294 | 100 | 90.2 |
| Lemon Lime | #e3ff00 | 66.6 | 100 | 50 | 246.6 | 100 | 50 | 186.6 | 100 | 50 | 307 | 100 | 50 |
| Licorice | #1a1110 | 6 | 23.8 | 8.2 | 186 | 23.8 | 8.2 | 126 | 23.8 | 8.2 | 246 | 23.8 | 8.2 |
| Light Apricot | #fdd5b1 | 28.4 | 95 | 84.3 | 208.4 | 95 | 84.3 | 148.4 | 95 | 84.3 | 268 | 95 | 84.3 |
| Light Blue | #add8e6 | 194.7 | 53.3 | 79 | 14.7 | 53.3 | 79 | 314.7 | 53.3 | 79 | 75 | 53.3 | 79 |
| Light Brown | #b5651d | 28.4 | 72.4 | 41.2 | 208.4 | 72.4 | 41.2 | 148.4 | 72.4 | 41.2 | 268 | 72.4 | 41.2 |
| Light Carmine Pink | #e66771 | 355.3 | 71.8 | 65.3 | 175.3 | 71.8 | 65.3 | 115.3 | 71.8 | 65.3 | 235 | 71.8 | 65.3 |
| Light Coral | #f08080 | 0 | 78.9 | 72.2 | 180 | 78.9 | 72.2 | 120 | 78.9 | 72.2 | 240 | 78.9 | 72.2 |
| Light Cornflower Blue | #93ccea | 200.7 | 67.4 | 74.7 | 20.7 | 67.4 | 74.7 | 320.7 | 67.4 | 74.7 | 81 | 67.4 | 74.7 |
| Light Crimson | #f56991 | 342.9 | 87.5 | 68.6 | 162.9 | 87.5 | 68.6 | 102.9 | 87.5 | 68.6 | 223 | 87.5 | 68.6 |
| Light Cyan | #e0ffff | 180 | 100 | 93.9 | 0 | 100 | 93.9 | 300 | 100 | 93.9 | 60 | 100 | 93.9 |
| Light Fuchsia Pink | #f984ef | 305.1 | 90.7 | 74.7 | 125.1 | 90.7 | 74.7 | 65.1 | 90.7 | 74.7 | 185 | 90.7 | 74.7 |
| Light Goldenrod Yellow | #fafad2 | 60 | 80 | 90.2 | 240 | 80 | 90.2 | 180 | 80 | 90.2 | 300 | 80 | 90.2 |
| Light Gray | #d3d3d3 | 0 | 0 | 82.7 | 180 | 0 | 82.7 | 120 | 0 | 82.7 | 240 | 0 | 82.7 |
| Light Green | #90ee90 | 120 | 73.4 | 74.9 | 300 | 73.4 | 74.9 | 240 | 73.4 | 74.9 | 0 | 73.4 | 74.9 |
| Light Khaki | #f0e68c | 54 | 76.9 | 74.5 | 234 | 76.9 | 74.5 | 174 | 76.9 | 74.5 | 294 | 76.9 | 74.5 |
| Light Pastel Purple | #b19cd9 | 260.7 | 44.5 | 73.1 | 80.7 | 44.5 | 73.1 | 20.7 | 44.5 | 73.1 | 141 | 44.5 | 73.1 |

HSL Colour Model Values

Figure 39-7

| | Input Sensor Colour | | | | Equiluminant Colour | | | Triadic Colour 1 | | | Triadic Colour 2 | | |
|---|---|---|---|---|---|---|---|---|---|---|---|---|---|
| | | | | | f=MOD(Kn +180,360) | f=same | f=same | f=MOD(Kn +120,360) | f=same | f=same | f=MOD(Kn -120,360) | f=same | f=same |
| | Hexidecmal triplet | Hue | Saturation | Lightness | | | | | | | | | |
| Name | c | h | s% | l% | h | s | l | h | s | l | h | s | l |
| Light Pink | #ffb6c1 | 351 | 100 | 85.7 | 171 | 100 | 85.7 | 111 | 100 | 85.7 | 231 | 100 | 85.7 |
| Light Red Ochre | #e97451 | 13.8 | 77.6 | 61.6 | 193.8 | 77.6 | 61.6 | 133.8 | 77.6 | 61.6 | 254 | 77.6 | 61.6 |
| Light Salmon | #ffa07a | 17.1 | 100 | 73.9 | 197.1 | 100 | 73.9 | 137.1 | 100 | 73.9 | 257 | 100 | 73.9 |
| Light Salmon Pink | #ff9999 | 0 | 100 | 80 | 180 | 100 | 80 | 120 | 100 | 80 | 240 | 100 | 80 |
| Light Sea Green | #20b2aa | 176.7 | 69.5 | 41.2 | 356.7 | 69.5 | 41.2 | 296.7 | 69.5 | 41.2 | 57 | 69.5 | 41.2 |
| Light Sky Blue | #87cefa | 203 | 92 | 75.5 | 23 | 92 | 75.5 | 323 | 92 | 75.5 | 83 | 92 | 75.5 |
| Light Slate Gray | #778899 | 210 | 14.3 | 53.3 | 30 | 14.3 | 53.3 | 330 | 14.3 | 53.3 | 90 | 14.3 | 53.3 |
| Light Taupe | #b38b6d | 25.7 | 31.5 | 56.5 | 205.7 | 31.5 | 56.5 | 145.7 | 31.5 | 56.5 | 266 | 31.5 | 56.5 |
| Light Thulian Pink | #e68fac | 340 | 63.5 | 73.1 | 160 | 63.5 | 73.1 | 100 | 63.5 | 73.1 | 220 | 63.5 | 73.1 |
| Light Yellow | #ffffe0 | 60 | 100 | 93.9 | 240 | 100 | 93.9 | 180 | 100 | 93.9 | 300 | 100 | 93.9 |
| Lilac | #c8a2c8 | 300 | 25.7 | 71 | 120 | 25.7 | 71 | 60 | 25.7 | 71 | 180 | 25.7 | 71 |
| Lime (Color Wheel) | #bfff00 | 75.1 | 100 | 50 | 255.1 | 100 | 50 | 195.1 | 100 | 50 | 315 | 100 | 50 |
| Lime Green | #32cd32 | 120 | 60.8 | 50 | 300 | 60.8 | 50 | 240 | 60.8 | 50 | 0 | 60.8 | 50 |
| Lime (Web) (X11 Green) | #00ff00 | 120 | 100 | 50 | 300 | 100 | 50 | 240 | 100 | 50 | 0 | 100 | 50 |
| Limerick | #9dc209 | 72 | 91.1 | 39.8 | 252 | 91.1 | 39.8 | 192 | 91.1 | 39.8 | 312 | 91.1 | 39.8 |
| Lincoln Green | #195905 | 105.7 | 89.4 | 18.4 | 285.7 | 89.4 | 18.4 | 225.7 | 89.4 | 18.4 | 346 | 89.4 | 18.4 |
| Linen | #faf0e6 | 30 | 66.7 | 94.1 | 210 | 66.7 | 94.1 | 150 | 66.7 | 94.1 | 270 | 66.7 | 94.1 |
| Lion | #c19a6b | 32.8 | 41 | 58.8 | 212.8 | 41 | 58.8 | 152.8 | 41 | 58.8 | 273 | 41 | 58.8 |
| Little Boy Blue | #6ca0dc | 212.1 | 61.5 | 64.3 | 32.1 | 61.5 | 64.3 | 332.1 | 61.5 | 64.3 | 92 | 61.5 | 64.3 |
| Liver | #534b4f | 330 | 5.1 | 31 | 150 | 5.1 | 31 | 90 | 5.1 | 31 | 210 | 5.1 | 31 |
| Lust | #e62020 | 0 | 79.8 | 51.4 | 180 | 79.8 | 51.4 | 120 | 79.8 | 51.4 | 240 | 79.8 | 51.4 |
| Magenta | #ff00ff | 300 | 100 | 50 | 120 | 100 | 50 | 60 | 100 | 50 | 180 | 100 | 50 |
| Magenta (Dye) | #ca1f7b | 327.7 | 73.4 | 45.7 | 147.7 | 73.4 | 45.7 | 87.7 | 73.4 | 45.7 | 208 | 73.4 | 45.7 |
| Magenta (Process) | #ff0090 | 326.1 | 100 | 50 | 146.1 | 100 | 50 | 86.1 | 100 | 50 | 206 | 100 | 50 |
| Magic Mint | #aaf0d1 | 153.4 | 70 | 80.4 | 333.4 | 70 | 80.4 | 273.4 | 70 | 80.4 | 33 | 70 | 80.4 |
| Magnolia | #f8f4ff | 261.8 | 100 | 97.8 | 81.8 | 100 | 97.8 | 21.8 | 100 | 97.8 | 142 | 100 | 97.8 |
| Mahogany | #c04000 | 20 | 100 | 37.6 | 200 | 100 | 37.6 | 140 | 100 | 37.6 | 260 | 100 | 37.6 |
| Maize | #fbec5d | 54.3 | 95.2 | 67.5 | 234.3 | 95.2 | 67.5 | 174.3 | 95.2 | 67.5 | 294 | 95.2 | 67.5 |
| Majorelle Blue | #6050dc | 246.9 | 66.7 | 58.8 | 66.9 | 66.7 | 58.8 | 6.9 | 66.7 | 58.8 | 127 | 66.7 | 58.8 |
| Malachite | #0bda51 | 140.3 | 90.4 | 44.9 | 320.3 | 90.4 | 44.9 | 260.3 | 90.4 | 44.9 | 20 | 90.4 | 44.9 |
| Manatee | #979aaa | 230.5 | 10.1 | 62.9 | 50.5 | 10.1 | 62.9 | 350.5 | 10.1 | 62.9 | 111 | 10.1 | 62.9 |
| Mango Tango | #ff8243 | 20.1 | 100 | 63.1 | 200.1 | 100 | 63.1 | 140.1 | 100 | 63.1 | 260 | 100 | 63.1 |
| Mantis | #74c365 | 110.4 | 43.9 | 58 | 290.4 | 43.9 | 58 | 230.4 | 43.9 | 58 | 350 | 43.9 | 58 |
| Mardi Gras | #880085 | 301.3 | 100 | 26.7 | 121.3 | 100 | 26.7 | 61.3 | 100 | 26.7 | 181 | 100 | 26.7 |
| Maroon (Crayola) | #c32148 | 345.6 | 71.1 | 44.7 | 165.6 | 71.1 | 44.7 | 105.6 | 71.1 | 44.7 | 226 | 71.1 | 44.7 |
| Maroon (Html/Css) | #800000 | 0 | 100 | 25.1 | 180 | 100 | 25.1 | 120 | 100 | 25.1 | 240 | 100 | 25.1 |
| Maroon (X11) | #b03060 | 337.5 | 57.1 | 43.9 | 157.5 | 57.1 | 43.9 | 97.5 | 57.1 | 43.9 | 218 | 57.1 | 43.9 |
| Mauve | #e0b0ff | 276.5 | 100 | 84.5 | 96.5 | 100 | 84.5 | 36.5 | 100 | 84.5 | 157 | 100 | 84.5 |
| Mauve Taupe | #915f6d | 343.2 | 20.8 | 47.1 | 163.2 | 20.8 | 47.1 | 103.2 | 20.8 | 47.1 | 223 | 20.8 | 47.1 |
| Mauvelous | #ef98aa | 347.6 | 73.1 | 76.7 | 167.6 | 73.1 | 76.7 | 107.6 | 73.1 | 76.7 | 228 | 73.1 | 76.7 |
| Maya Blue | #73c2fb | 205.1 | 94.4 | 71.8 | 25.1 | 94.4 | 71.8 | 325.1 | 94.4 | 71.8 | 85 | 94.4 | 71.8 |
| Meat Brown | #e5b73b | 43.8 | 76.6 | 56.5 | 223.8 | 76.6 | 56.5 | 163.8 | 76.6 | 56.5 | 284 | 76.6 | 56.5 |
| Medium Aquamarine | #66ddaa | 154.3 | 63.6 | 63.3 | 334.3 | 63.6 | 63.3 | 274.3 | 63.6 | 63.3 | 34 | 63.6 | 63.3 |
| Medium Blue | #0000cd | 240 | 100 | 40.2 | 60 | 100 | 40.2 | 0 | 100 | 40.2 | 120 | 100 | 40.2 |
| Medium Candy Apple Red | #e2062c | 349.6 | 94.8 | 45.5 | 169.6 | 94.8 | 45.5 | 109.6 | 94.8 | 45.5 | 230 | 94.8 | 45.5 |
| Medium Carmine | #af4035 | 5.4 | 53.5 | 44.7 | 185.4 | 53.5 | 44.7 | 125.4 | 53.5 | 44.7 | 245 | 53.5 | 44.7 |
| Medium Champagne | #f3e5ab | 48.3 | 75 | 81.2 | 228.3 | 75 | 81.2 | 168.3 | 75 | 81.2 | 288 | 75 | 81.2 |
| Medium Electric Blue | #035096 | 208.6 | 96.1 | 30 | 28.6 | 96.1 | 30 | 328.6 | 96.1 | 30 | 89 | 96.1 | 30 |
| Medium Jungle Green | #1c352d | 160.8 | 30.9 | 15.9 | 340.8 | 30.9 | 15.9 | 280.8 | 30.9 | 15.9 | 41 | 30.9 | 15.9 |
| Medium Lavender Magenta | #dda0dd | 300 | 47.3 | 74.7 | 120 | 47.3 | 74.7 | 60 | 47.3 | 74.7 | 180 | 47.3 | 74.7 |
| Medium Orchid | #ba55d3 | 288.1 | 58.9 | 58 | 108.1 | 58.9 | 58 | 48.1 | 58.9 | 58 | 168 | 58.9 | 58 |
| Medium Persian Blue | #0067a5 | 202.5 | 100 | 32.4 | 22.5 | 100 | 32.4 | 322.5 | 100 | 32.4 | 83 | 100 | 32.4 |
| Medium Purple | #9370db | 259.6 | 59.8 | 64.9 | 79.6 | 59.8 | 64.9 | 19.6 | 59.8 | 64.9 | 140 | 59.8 | 64.9 |
| Medium Red-Violet | #bb3385 | 323.8 | 57.1 | 46.7 | 143.8 | 57.1 | 46.7 | 83.8 | 57.1 | 46.7 | 204 | 57.1 | 46.7 |
| Medium Ruby | #aaa069 | 336.8 | 45.3 | 45.9 | 156.8 | 45.3 | 45.9 | 96.8 | 45.3 | 45.9 | 217 | 45.3 | 45.9 |
| Medium Sea Green | #3cb371 | 146.7 | 49.8 | 46.9 | 326.7 | 49.8 | 46.9 | 266.7 | 49.8 | 46.9 | 27 | 49.8 | 46.9 |
| Medium Slate Blue | #7b68ee | 248.5 | 79.8 | 67.1 | 68.5 | 79.8 | 67.1 | 8.5 | 79.8 | 67.1 | 129 | 79.8 | 67.1 |
| Medium Spring Bud | #c9dc87 | 73.4 | 54.8 | 69.6 | 253.4 | 54.8 | 69.6 | 193.4 | 54.8 | 69.6 | 313 | 54.8 | 69.6 |
| Medium Spring Green | #00fa9a | 157 | 100 | 49 | 337 | 100 | 49 | 277 | 100 | 49 | 37 | 100 | 49 |
| Medium Taupe | #674c47 | 9.4 | 18.4 | 34.1 | 189.4 | 18.4 | 34.1 | 129.4 | 18.4 | 34.1 | 249 | 18.4 | 34.1 |
| Medium Turquoise | #48d1cc | 177.8 | 59.8 | 55.1 | 357.8 | 59.8 | 55.1 | 297.8 | 59.8 | 55.1 | 58 | 59.8 | 55.1 |
| Medium Tuscan Red | #79443b | 8.7 | 34.4 | 35.3 | 188.7 | 34.4 | 35.3 | 128.7 | 34.4 | 35.3 | 249 | 34.4 | 35.3 |
| Medium Vermilion | #d9603b | 14.1 | 67.5 | 54.1 | 194.1 | 67.5 | 54.1 | 134.1 | 67.5 | 54.1 | 254 | 67.5 | 54.1 |
| Medium Violet-Red | #c71585 | 322.2 | 80.9 | 43.1 | 142.2 | 80.9 | 43.1 | 82.2 | 80.9 | 43.1 | 202 | 80.9 | 43.1 |
| Mellow Apricot | #f8b878 | 30 | 90.1 | 72.2 | 210 | 90.1 | 72.2 | 150 | 90.1 | 72.2 | 270 | 90.1 | 72.2 |
| Mellow Yellow | #f8de7e | 47.2 | 89.7 | 73.3 | 227.2 | 89.7 | 73.3 | 167.2 | 89.7 | 73.3 | 287 | 89.7 | 73.3 |
| Melon | #fdbcb4 | 6.6 | 94.8 | 84.9 | 186.6 | 94.8 | 84.9 | 126.6 | 94.8 | 84.9 | 247 | 94.8 | 84.9 |
| Midnight Blue | #191970 | 240 | 63.5 | 26.9 | 60 | 63.5 | 26.9 | 0 | 63.5 | 26.9 | 120 | 63.5 | 26.9 |
| Midnight Green (Eagle Green) | #004953 | 187.2 | 100 | 16.3 | 7.2 | 100 | 16.3 | 307.2 | 100 | 16.3 | 67 | 100 | 16.3 |
| Mikado Yellow | #ffc40c | 45.4 | 100 | 52.4 | 225.4 | 100 | 52.4 | 165.4 | 100 | 52.4 | 285 | 100 | 52.4 |
| Mint | #3eb489 | 158.1 | 48.8 | 47.5 | 338.1 | 48.8 | 47.5 | 278.1 | 48.8 | 47.5 | 38 | 48.8 | 47.5 |
| Mint Cream | #f5fffa | 150 | 100 | 98 | 330 | 100 | 98 | 270 | 100 | 98 | 30 | 100 | 98 |
| Mint Green | #98ff98 | 120 | 100 | 79.8 | 300 | 100 | 79.8 | 240 | 100 | 79.8 | 0 | 100 | 79.8 |

HSL Colour Model Values — Figure 39-8

| Name | Input Sensor Colour Hexidecmal triplet | Hue h | Saturation s% | Lightness l% | Equiluminant Colour f=MOD(Kn+180,360) h | f=same s | f=same l | Triadic Colour 1 f=MOD(Kn+120,360) h | f=same s | f=same l | Triadic Colour 2 f=MOD(Kn-120,360) h | f=same s | f=same l |
|---|---|---|---|---|---|---|---|---|---|---|---|---|---|
| Misty Rose | #ffe4e1 | 6 | 100 | 94.1 | 186 | 100 | 94.1 | 126 | 100 | 94.1 | 246 | 100 | 94.1 |
| Moccasin | #faebd7 | 34.3 | 77.8 | 91.2 | 214.3 | 77.8 | 91.2 | 154.3 | 77.8 | 91.2 | 274 | 77.8 | 91.2 |
| Mode Beige | #967117 | 42.5 | 73.4 | 33.9 | 222.5 | 73.4 | 33.9 | 162.5 | 73.4 | 33.9 | 283 | 73.4 | 33.9 |
| Moonstone Blue | #73a9c2 | 199 | 39.3 | 60.6 | 19 | 39.3 | 60.6 | 319 | 39.3 | 60.6 | 79 | 39.3 | 60.6 |
| Mordant Red 19 | #ae0c00 | 4.1 | 100 | 34.1 | 184.1 | 100 | 34.1 | 124.1 | 100 | 34.1 | 244 | 100 | 34.1 |
| Moss Green | #addfad | 120 | 43.9 | 77.6 | 300 | 43.9 | 77.6 | 240 | 43.9 | 77.6 | 0 | 43.9 | 77.6 |
| Mountain Meadow | #30ba8f | 161.3 | 59 | 45.9 | 341.3 | 59 | 45.9 | 281.3 | 59 | 45.9 | 41 | 59 | 45.9 |
| Mountbatten Pink | #997a8d | 323.2 | 13.2 | 53.9 | 143.2 | 13.2 | 53.9 | 83.2 | 13.2 | 53.9 | 203 | 13.2 | 53.9 |
| Msu Green | #18453b | 166.7 | 48.4 | 18.2 | 346.7 | 48.4 | 18.2 | 286.7 | 48.4 | 18.2 | 47 | 48.4 | 18.2 |
| Mulberry | #c54b8c | 328 | 51.3 | 53.3 | 148 | 51.3 | 53.3 | 88 | 51.3 | 53.3 | 208 | 51.3 | 53.3 |
| Mustard | #ffdb58 | 47.1 | 100 | 67.3 | 227.1 | 100 | 67.3 | 167.1 | 100 | 67.3 | 287 | 100 | 67.3 |
| Myrtle | #21421e | 115 | 37.5 | 18.8 | 295 | 37.5 | 18.8 | 235 | 37.5 | 18.8 | 355 | 37.5 | 18.8 |
| Nadeshiko Pink | #f6adc6 | 339.5 | 80.2 | 82.2 | 159.5 | 80.2 | 82.2 | 99.5 | 80.2 | 82.2 | 220 | 80.2 | 82.2 |
| Napier Green | #2a8000 | 100.3 | 100 | 25.1 | 280.3 | 100 | 25.1 | 220.3 | 100 | 25.1 | 340 | 100 | 25.1 |
| Naples Yellow | #fada5e | 47.7 | 94 | 67.5 | 227.7 | 94 | 67.5 | 167.7 | 94 | 67.5 | 288 | 94 | 67.5 |
| Navajo White | #ffdead | 35.9 | 100 | 83.9 | 215.9 | 100 | 83.9 | 155.9 | 100 | 83.9 | 276 | 100 | 83.9 |
| Navy Blue | #000080 | 240 | 100 | 25.1 | 60 | 100 | 25.1 | 0 | 100 | 25.1 | 120 | 100 | 25.1 |
| Neon Carrot | #ffa343 | 30.6 | 100 | 63.1 | 210.6 | 100 | 63.1 | 150.6 | 100 | 63.1 | 271 | 100 | 63.1 |
| Neon Fuchsia | #fe4164 | 348.9 | 99 | 62.5 | 168.9 | 99 | 62.5 | 108.9 | 99 | 62.5 | 229 | 99 | 62.5 |
| Neon Green | #39ff14 | 110.6 | 100 | 53.9 | 290.6 | 100 | 53.9 | 230.6 | 100 | 53.9 | 351 | 100 | 53.9 |
| New York Pink | #d7837f | 2.7 | 52.4 | 67.1 | 182.7 | 52.4 | 67.1 | 122.7 | 52.4 | 67.1 | 243 | 52.4 | 67.1 |
| Non-Photo Blue | #a4dded | 193.2 | 67 | 78.6 | 13.2 | 67 | 78.6 | 313.2 | 67 | 78.6 | 73 | 67 | 78.6 |
| North Texas Green | #059033 | 139.9 | 93.3 | 29.2 | 319.9 | 93.3 | 29.2 | 259.9 | 93.3 | 29.2 | 20 | 93.3 | 29.2 |
| Ocean Boat Blue | #0077be | 202.4 | 100 | 37.3 | 22.4 | 100 | 37.3 | 322.4 | 100 | 37.3 | 82 | 100 | 37.3 |
| Ochre | #cc7722 | 30 | 71.4 | 46.7 | 210 | 71.4 | 46.7 | 150 | 71.4 | 46.7 | 270 | 71.4 | 46.7 |
| Office Green | #008000 | 120 | 100 | 25.1 | 300 | 100 | 25.1 | 240 | 100 | 25.1 | 0 | 100 | 25.1 |
| Old Gold | #cfb53b | 49.5 | 60.7 | 52.2 | 229.5 | 60.7 | 52.2 | 169.5 | 60.7 | 52.2 | 290 | 60.7 | 52.2 |
| Old Lace | #fdf5e6 | 39.1 | 85.2 | 94.7 | 219.1 | 85.2 | 94.7 | 159.1 | 85.2 | 94.7 | 279 | 85.2 | 94.7 |
| Old Lavender | #796878 | 303.5 | 7.6 | 44.1 | 123.5 | 7.6 | 44.1 | 63.5 | 7.6 | 44.1 | 184 | 7.6 | 44.1 |
| Old Mauve | #673147 | 335.6 | 35.5 | 29.8 | 155.6 | 35.5 | 29.8 | 95.6 | 35.5 | 29.8 | 216 | 35.5 | 29.8 |
| Old Rose | #c08081 | 359.1 | 33.7 | 62.7 | 179.1 | 33.7 | 62.7 | 119.1 | 33.7 | 62.7 | 239 | 33.7 | 62.7 |
| Olive | #808000 | 60 | 100 | 25.1 | 240 | 100 | 25.1 | 180 | 100 | 25.1 | 300 | 100 | 25.1 |
| Olive Drab #7 | #3c341f | 43.4 | 31.9 | 17.8 | 223.4 | 31.9 | 17.8 | 163.4 | 31.9 | 17.8 | 283 | 31.9 | 17.8 |
| Olive Drab (Web) (Olive Drab #3) | #6b8e23 | 79.6 | 60.5 | 34.7 | 259.6 | 60.5 | 34.7 | 199.6 | 60.5 | 34.7 | 320 | 60.5 | 34.7 |
| Olivine | #9ab973 | 86.6 | 33.3 | 58.8 | 266.6 | 33.3 | 58.8 | 206.6 | 33.3 | 58.8 | 327 | 33.3 | 58.8 |
| Onyx | #353839 | 195 | 3.6 | 21.6 | 15 | 3.6 | 21.6 | 315 | 3.6 | 21.6 | 75 | 3.6 | 21.6 |
| Opera Mauve | #b784a7 | 318.8 | 26.2 | 61.8 | 138.8 | 26.2 | 61.8 | 78.8 | 26.2 | 61.8 | 199 | 26.2 | 61.8 |
| Orange (Color Wheel) | #ff7f00 | 29.9 | 100 | 500 | 209.9 | 100 | 500 | 149.9 | 100 | 500 | 270 | 100 | 500 |
| Orange Peel | #ff9f00 | 37.4 | 100 | 50 | 217.4 | 100 | 50 | 157.4 | 100 | 50 | 277 | 100 | 50 |
| Orange-Red | #ff4500 | 16.2 | 100 | 50 | 196.2 | 100 | 50 | 136.2 | 100 | 50 | 256 | 100 | 50 |
| Orange (Ryb) | #fb9902 | 36.4 | 98.4 | 49.6 | 216.4 | 98.4 | 49.6 | 156.4 | 98.4 | 49.6 | 276 | 98.4 | 49.6 |
| Orange (Web Color) | #ffa500 | 38.8 | 100 | 50 | 218.8 | 100 | 50 | 158.8 | 100 | 50 | 279 | 100 | 50 |
| Orchid | #da70d6 | 302.3 | 58.9 | 64.7 | 122.3 | 58.9 | 64.7 | 62.3 | 58.9 | 64.7 | 182 | 58.9 | 64.7 |
| Otter Brown | #654321 | 30 | 50.7 | 26.3 | 210 | 50.7 | 26.3 | 150 | 50.7 | 26.3 | 270 | 50.7 | 26.3 |
| Ou Crimson Red | #990000 | 0 | 100 | 30 | 180 | 100 | 30 | 120 | 100 | 30 | 240 | 100 | 30 |
| Outer Space | #414a4c | 190.9 | 7.8 | 27.6 | 10.9 | 7.8 | 27.6 | 310.9 | 7.8 | 27.6 | 71 | 7.8 | 27.6 |
| Outrageous Orange | #ff6e4a | 11.9 | 100 | 64.5 | 191.9 | 100 | 64.5 | 131.9 | 100 | 64.5 | 252 | 100 | 64.5 |
| Oxford Blue | #002147 | 212.1 | 100 | 13.9 | 32.1 | 100 | 13.9 | 332.1 | 100 | 13.9 | 92 | 100 | 13.9 |
| Pakistan Green | #006600 | 120 | 100 | 20 | 300 | 100 | 20 | 240 | 100 | 20 | 0 | 100 | 20 |
| Palatinate Blue | #273be2 | 233.6 | 76.3 | 52 | 53.6 | 76.3 | 52 | 353.6 | 76.3 | 52 | 114 | 76.3 | 52 |
| Palatinate Purple | #682860 | 307.5 | 44.4 | 28.2 | 127.5 | 44.4 | 28.2 | 67.5 | 44.4 | 28.2 | 188 | 44.4 | 28.2 |
| Pale Aqua | #bcd4e6 | 205.7 | 45.7 | 82 | 25.7 | 45.7 | 82 | 325.7 | 45.7 | 82 | 86 | 45.7 | 82 |
| Pale Blue | #afeeee | 180 | 64.9 | 81 | 0 | 64.9 | 81 | 300 | 64.9 | 81 | 60 | 64.9 | 81 |
| Pale Brown | #987654 | 30 | 28.8 | 46.3 | 210 | 28.8 | 46.3 | 150 | 28.8 | 46.3 | 270 | 28.8 | 46.3 |
| Pale Carmine | #af4035 | 5.4 | 53.5 | 44.7 | 185.4 | 53.5 | 44.7 | 125.4 | 53.5 | 44.7 | 245 | 53.5 | 44.7 |
| Pale Cerulean | #9bc4e2 | 205.4 | 55 | 74.7 | 25.4 | 55 | 74.7 | 325.4 | 55 | 74.7 | 85 | 55 | 74.7 |
| Pale Chestnut | #ddadaf | 357.5 | 41.4 | 77.3 | 177.5 | 41.4 | 77.3 | 117.5 | 41.4 | 77.3 | 238 | 41.4 | 77.3 |
| Pale Copper | #da8a67 | 18.3 | 60.8 | 62.9 | 198.3 | 60.8 | 62.9 | 138.3 | 60.8 | 62.9 | 258 | 60.8 | 62.9 |
| Pale Cornflower Blue | #abcdef | 210 | 68 | 80.4 | 30 | 68 | 80.4 | 330 | 68 | 80.4 | 90 | 68 | 80.4 |
| Pale Gold | #e6be8a | 33.9 | 64.8 | 72.2 | 213.9 | 64.8 | 72.2 | 153.9 | 64.8 | 72.2 | 274 | 64.8 | 72.2 |
| Pale Goldenrod | #eee8aa | 54.7 | 66.7 | 80 | 234.7 | 66.7 | 80 | 174.7 | 66.7 | 80 | 295 | 66.7 | 80 |
| Pale Green | #98fb98 | 120 | 92.5 | 79 | 300 | 92.5 | 79 | 240 | 92.5 | 79 | 0 | 92.5 | 79 |
| Pale Lavender | #dcd0ff | 255.3 | 100 | 90.8 | 75.3 | 100 | 90.8 | 15.3 | 100 | 90.8 | 135 | 100 | 90.8 |
| Pale Magenta | #f984e5 | 310.3 | 90.7 | 74.7 | 130.3 | 90.7 | 74.7 | 70.3 | 90.7 | 74.7 | 190 | 90.7 | 74.7 |
| Pale Pink | #fadadd | 354.4 | 76.2 | 91.8 | 174.4 | 76.2 | 91.8 | 114.4 | 76.2 | 91.8 | 234 | 76.2 | 91.8 |
| Pale Plum | #dda0dd | 300 | 47.3 | 74.7 | 120 | 47.3 | 74.7 | 60 | 47.3 | 74.7 | 180 | 47.3 | 74.7 |
| Pale Red-Violet | #db7093 | 340.4 | 59.8 | 64.9 | 160.4 | 59.8 | 64.9 | 100.4 | 59.8 | 64.9 | 220 | 59.8 | 64.9 |
| Pale Robin Egg Blue | #96ded1 | 169.2 | 52.2 | 72.9 | 349.2 | 52.2 | 72.9 | 289.2 | 52.2 | 72.9 | 49 | 52.2 | 72.9 |
| Pale Silver | #c9c0bb | 21.4 | 11.5 | 76.1 | 201.4 | 11.5 | 76.1 | 141.4 | 11.5 | 76.1 | 261 | 11.5 | 76.1 |
| Pale Spring Bud | #ecebbd | 58.7 | 55.3 | 83.3 | 238.7 | 55.3 | 83.3 | 178.7 | 55.3 | 83.3 | 299 | 55.3 | 83.3 |
| Pale Taupe | #bc987e | 25.2 | 31.6 | 61.6 | 205.2 | 31.6 | 61.6 | 145.2 | 31.6 | 61.6 | 265 | 31.6 | 61.6 |
| Pale Violet-Red | #db7093 | 340.4 | 59.8 | 64.9 | 160.4 | 59.8 | 64.9 | 100.4 | 59.8 | 64.9 | 220 | 59.8 | 64.9 |
| Pansy Purple | #78184a | 328.8 | 66.7 | 28.2 | 148.8 | 66.7 | 28.2 | 88.8 | 66.7 | 28.2 | 209 | 66.7 | 28.2 |

HSL Colour Model Values      Figure 39-9

| Name | Input Sensor Colour | | | | Equiluminant Colour | | | Triadic Colour 1 | | | Triadic Colour 2 | | |
|---|---|---|---|---|---|---|---|---|---|---|---|---|---|
| | Hexidecmal triplet | Hue | Saturation | Lightness | f=MOD(Kn+180,360) | f=same | f=same | f=MOD(Kn+120,360) | f=same | f=same | f=MOD(Kn-120,360) | f=same | f=same |
| | c | h | s% | l% | h | s | l | h | s | l | h | s | l |
| Papaya Whip | #ffefd5 | 37.1 | 100 | 91.8 | 217.1 | 100 | 91.8 | 157.1 | 100 | 91.8 | 277 | 100 | 91.8 |
| Paris Green | #50c878 | 140 | 52.2 | 54.9 | 320 | 52.2 | 54.9 | 260 | 52.2 | 54.9 | 20 | 52.2 | 54.9 |
| Pastel Blue | #aec6cf | 196.4 | 25.6 | 74.7 | 16.4 | 25.6 | 74.7 | 316.4 | 25.6 | 74.7 | 76 | 25.6 | 74.7 |
| Pastel Brown | #836953 | 27.5 | 22.4 | 42 | 207.5 | 22.4 | 42 | 147.5 | 22.4 | 42 | 268 | 22.4 | 42 |
| Pastel Gray | #cfcfc4 | 60 | 10.3 | 79 | 240 | 10.3 | 79 | 180 | 10.3 | 79 | 300 | 10.3 | 79 |
| Pastel Green | #77dd77 | 120 | 60 | 66.7 | 300 | 60 | 66.7 | 240 | 60 | 66.7 | 0 | 60 | 66.7 |
| Pastel Magenta | #f49ac2 | 333.3 | 80.4 | 78 | 153.3 | 80.4 | 78 | 93.3 | 80.4 | 78 | 213 | 80.4 | 78 |
| Pastel Orange | #ffb347 | 35.2 | 100 | 63.9 | 215.2 | 100 | 63.9 | 155.2 | 100 | 63.9 | 275 | 100 | 63.9 |
| Pastel Pink | #dea5a4 | 1 | 46.8 | 75.7 | 181 | 46.8 | 75.7 | 121 | 46.8 | 75.7 | 241 | 46.8 | 75.7 |
| Pastel Purple | #b39eb5 | 294.8 | 13.5 | 66.5 | 114.8 | 13.5 | 66.5 | 54.8 | 13.5 | 66.5 | 175 | 13.5 | 66.5 |
| Pastel Red | #ff6961 | 3 | 100 | 69 | 183 | 100 | 69 | 123 | 100 | 69 | 243 | 100 | 69 |
| Pastel Violet | #cb99c9 | 302.4 | 32.5 | 69.8 | 122.4 | 32.5 | 69.8 | 62.4 | 32.5 | 69.8 | 182 | 32.5 | 69.8 |
| Pastel Yellow | #fdfd96 | 60 | 96.3 | 79 | 240 | 96.3 | 79 | 180 | 96.3 | 79 | 300 | 96.3 | 79 |
| Patriarch | #800080 | 300 | 100 | 25.1 | 120 | 100 | 25.1 | 60 | 100 | 25.1 | 180 | 100 | 25.1 |
| Payne'S Grey | #536878 | 205.9 | 18.2 | 39.8 | 25.9 | 18.2 | 39.8 | 325.9 | 18.2 | 39.8 | 86 | 18.2 | 39.8 |
| Peach | #ffe5b4 | 39.2 | 100 | 85.3 | 219.2 | 100 | 85.3 | 159.2 | 100 | 85.3 | 279 | 100 | 85.3 |
| Peach (Crayola) | #ffcba4 | 25.7 | 100 | 82.2 | 205.7 | 100 | 82.2 | 145.7 | 100 | 82.2 | 266 | 100 | 82.2 |
| Peach-Orange | #ffcc99 | 30 | 100 | 80 | 210 | 100 | 80 | 150 | 100 | 80 | 270 | 100 | 80 |
| Peach Puff | #ffdab9 | 28.3 | 100 | 86.3 | 208.3 | 100 | 86.3 | 148.3 | 100 | 86.3 | 268 | 100 | 86.3 |
| Peach-Yellow | #fadfad | 39 | 88.5 | 82.9 | 219 | 88.5 | 82.9 | 159 | 88.5 | 82.9 | 279 | 88.5 | 82.9 |
| Pear | #d1e231 | 65.8 | 75.3 | 53.9 | 245.8 | 75.3 | 53.9 | 185.8 | 75.3 | 53.9 | 306 | 75.3 | 53.9 |
| Pearl | #eae0c8 | 42.4 | 44.7 | 85.1 | 222.4 | 44.7 | 85.1 | 162.4 | 44.7 | 85.1 | 282 | 44.7 | 85.1 |
| Pearl Aqua | #88d8c0 | 162 | 50.6 | 69 | 342 | 50.6 | 69 | 282 | 50.6 | 69 | 42 | 50.6 | 69 |
| Pearly Purple | #b768a2 | 315.9 | 35.4 | 56.3 | 135.9 | 35.4 | 56.3 | 75.9 | 35.4 | 56.3 | 196 | 35.4 | 56.3 |
| Peridot | #e6e200 | 59 | 100 | 45.1 | 239 | 100 | 45.1 | 179 | 100 | 45.1 | 299 | 100 | 45.1 |
| Periwinkle | #ccccff | 240 | 100 | 90 | 60 | 100 | 90 | 0 | 100 | 90 | 120 | 100 | 90 |
| Persian Blue | #1c39bb | 229.1 | 74 | 42.2 | 49.1 | 74 | 42.2 | 349.1 | 74 | 42.2 | 109 | 74 | 42.2 |
| Persian Green | #00a693 | 173.1 | 100 | 32.5 | 353.1 | 100 | 32.5 | 293.1 | 100 | 32.5 | 53 | 100 | 32.5 |
| Persian Indigo | #32127a | 258.5 | 74.3 | 27.5 | 78.5 | 74.3 | 27.5 | 18.5 | 74.3 | 27.5 | 139 | 74.3 | 27.5 |
| Persian Orange | #d99058 | 26 | 62.9 | 59.8 | 206 | 62.9 | 59.8 | 146 | 62.9 | 59.8 | 266 | 62.9 | 59.8 |
| Persian Pink | #f77fbe | 328.5 | 88.2 | 73.3 | 148.5 | 88.2 | 73.3 | 88.5 | 88.2 | 73.3 | 209 | 88.2 | 73.3 |
| Persian Plum | #701c1c | 0 | 60 | 27.5 | 180 | 60 | 27.5 | 120 | 60 | 27.5 | 240 | 60 | 27.5 |
| Persian Red | #cc3333 | 0 | 60 | 50 | 180 | 60 | 50 | 120 | 60 | 50 | 240 | 60 | 50 |
| Persian Rose | #fe28a2 | 325.8 | 99.1 | 57.6 | 145.8 | 99.1 | 57.6 | 85.8 | 99.1 | 57.6 | 206 | 99.1 | 57.6 |
| Persimmon | #ec5800 | 22.4 | 100 | 46.3 | 202.4 | 100 | 46.3 | 142.4 | 100 | 46.3 | 262 | 100 | 46.3 |
| Peru | #cd853f | 29.6 | 58.7 | 52.5 | 209.6 | 58.7 | 52.5 | 149.6 | 58.7 | 52.5 | 270 | 58.7 | 52.5 |
| Phlox | #df00ff | 292.5 | 100 | 50 | 112.5 | 100 | 50 | 52.5 | 100 | 50 | 173 | 100 | 50 |
| Phthalo Blue | #000f89 | 233.4 | 100 | 26.9 | 53.4 | 100 | 26.9 | 353.4 | 100 | 26.9 | 113 | 100 | 26.9 |
| Phthalo Green | #123524 | 150.9 | 49.3 | 13.9 | 330.9 | 49.3 | 13.9 | 270.9 | 49.3 | 13.9 | 31 | 49.3 | 13.9 |
| Piggy Pink | #fddde6 | 343.1 | 88.9 | 92.9 | 163.1 | 88.9 | 92.9 | 103.1 | 88.9 | 92.9 | 223 | 88.9 | 92.9 |
| Pine Green | #01796f | 175 | 98.4 | 23.9 | 355 | 98.4 | 23.9 | 295 | 98.4 | 23.9 | 55 | 98.4 | 23.9 |
| Pink | #ffc0cb | 349.5 | 100 | 87.6 | 169.5 | 100 | 87.6 | 109.5 | 100 | 87.6 | 230 | 100 | 87.6 |
| Pink Lace | #ffddf4 | 319.4 | 100 | 93.3 | 139.4 | 100 | 93.3 | 79.4 | 100 | 93.3 | 199 | 100 | 93.3 |
| Pink-Orange | #ff9966 | 20 | 100 | 70 | 200 | 100 | 70 | 140 | 100 | 70 | 260 | 100 | 70 |
| Pink Pearl | #e7accf | 324.4 | 55.1 | 79 | 144.4 | 55.1 | 79 | 84.4 | 55.1 | 79 | 204 | 55.1 | 79 |
| Pink Sherbet | #f78fa7 | 346.2 | 86.7 | 76.5 | 166.2 | 86.7 | 76.5 | 106.2 | 86.7 | 76.5 | 226 | 86.7 | 76.5 |
| Pistachio | #93c572 | 96.1 | 41.7 | 61 | 276.1 | 41.7 | 61 | 216.1 | 41.7 | 61 | 336 | 41.7 | 61 |
| Platinum | #e5e4e2 | 40 | 5.5 | 89.2 | 220 | 5.5 | 89.2 | 160 | 5.5 | 89.2 | 280 | 5.5 | 89.2 |
| Plum (Traditional) | #8e4585 | 307.4 | 34.6 | 41.4 | 127.4 | 34.6 | 41.4 | 67.4 | 34.6 | 41.4 | 187 | 34.6 | 41.4 |
| Plum (Web) | #dda0dd | 300 | 47.3 | 74.7 | 120 | 47.3 | 74.7 | 60 | 47.3 | 74.7 | 180 | 47.3 | 74.7 |
| Portland Orange | #ff5a36 | 10.7 | 100 | 60.6 | 190.7 | 100 | 60.6 | 130.7 | 100 | 60.6 | 251 | 100 | 60.6 |
| Powder Blue (Web) | #b0e0e6 | 186.7 | 51.9 | 79.6 | 6.7 | 51.9 | 79.6 | 306.7 | 51.9 | 79.6 | 67 | 51.9 | 79.6 |
| Princeton Orange | #ff8f00 | 33.6 | 100 | 50 | 213.6 | 100 | 50 | 153.6 | 100 | 50 | 274 | 100 | 50 |
| Prune | #701c1c | 0 | 60 | 27.5 | 180 | 60 | 27.5 | 120 | 60 | 27.5 | 240 | 60 | 27.5 |
| Prussian Blue | #003153 | 204.6 | 100 | 16.3 | 24.6 | 100 | 16.3 | 324.6 | 100 | 16.3 | 85 | 100 | 16.3 |
| Psychedelic Purple | #df00ff | 292.5 | 100 | 50 | 112.5 | 100 | 50 | 52.5 | 100 | 50 | 173 | 100 | 50 |
| Puce | #cc8899 | 345 | 40 | 66.7 | 165 | 40 | 66.7 | 105 | 40 | 66.7 | 225 | 40 | 66.7 |
| Pumpkin | #ff7518 | 24.2 | 100 | 54.7 | 204.2 | 100 | 54.7 | 144.2 | 100 | 54.7 | 264 | 100 | 54.7 |
| Purple Heart | #69359c | 270.3 | 49.3 | 41 | 90.3 | 49.3 | 41 | 30.3 | 49.3 | 41 | 150 | 49.3 | 41 |
| Purple (Html/Css) | #800080 | 300 | 100 | 25.1 | 120 | 100 | 25.1 | 60 | 100 | 25.1 | 180 | 100 | 25.1 |
| Purple Mountain Majesty | #9678b6 | 269 | 29.8 | 59.2 | 89 | 29.8 | 59.2 | 29 | 29.8 | 59.2 | 149 | 29.8 | 59.2 |
| Purple (Munsell) | #9f00c5 | 288.4 | 100 | 38.6 | 108.4 | 100 | 38.6 | 48.4 | 100 | 38.6 | 168 | 100 | 38.6 |
| Purple Pizzazz | #fe4eda | 312.3 | 98.9 | 65.1 | 132.3 | 98.9 | 65.1 | 72.3 | 98.9 | 65.1 | 192 | 98.9 | 65.1 |
| Purple Taupe | #50404d | 311.3 | 11.1 | 28.2 | 131.3 | 11.1 | 28.2 | 71.3 | 11.1 | 28.2 | 191 | 11.1 | 28.2 |
| Purple (X11) | #a020f0 | 276.9 | 87.4 | 53.3 | 96.9 | 87.4 | 53.3 | 36.9 | 87.4 | 53.3 | 157 | 87.4 | 53.3 |
| Quartz | #51484f | 313.3 | 5.9 | 30 | 133.3 | 5.9 | 30 | 73.3 | 5.9 | 30 | 193 | 5.9 | 30 |
| Rackley | #5d8aa8 | 204 | 30.1 | 51.2 | 24 | 30.1 | 51.2 | 324 | 30.1 | 51.2 | 84 | 30.1 | 51.2 |
| Radical Red | #ff355e | 347.8 | 100 | 60.4 | 167.8 | 100 | 60.4 | 107.8 | 100 | 60.4 | 228 | 100 | 60.4 |
| Rajah | #fbab60 | 29 | 95.1 | 68 | 209 | 95.1 | 68 | 149 | 95.1 | 68 | 269 | 95.1 | 68 |
| Raspberry | #e30b5d | 337.2 | 90.8 | 46.7 | 157.2 | 90.8 | 46.7 | 97.2 | 90.8 | 46.7 | 217 | 90.8 | 46.7 |
| Raspberry Glace | #915f6d | 343.2 | 20.8 | 47.1 | 163.2 | 20.8 | 47.1 | 103.2 | 20.8 | 47.1 | 223 | 20.8 | 47.1 |
| Raspberry Pink | #e25098 | 330.4 | 71.6 | 60 | 150.4 | 71.6 | 60 | 90.4 | 71.6 | 60 | 210 | 71.6 | 60 |
| Raspberry Rose | #b3446c | 338.4 | 44.9 | 48.4 | 158.4 | 44.9 | 48.4 | 98.4 | 44.9 | 48.4 | 218 | 44.9 | 48.4 |

HSL Colour Model Values          Figure 39-10

| | Input Sensor Colour | | | | Equiluminant Colour | | | Triadic Colour 1 | | | Triadic Colour 2 | | |
|---|---|---|---|---|---|---|---|---|---|---|---|---|---|
| | Hexidecmal triplet | Hue Saturation Lightness | | | f=MOD(Kn +180,360) | f=same | f=same | f=MOD(Kn +120,360) | f=same | f=same | f=MOD(Kn-120,360) | f=same | f=same |
| Name | c | h | s% | l% | h | s | l | h | s | l | h | s | l |
| Raw Umber | #826644 | 32.9 | 31.3 | 38.8 | 212.9 | 31.3 | 38.8 | 152.9 | 31.3 | 38.8 | 273 | 31.3 | 38.8 |
| Razzle Dazzle Rose | #FF33CC | 315 | 100 | 60 | 135 | 100 | 60 | 75 | 100 | 60 | 195 | 100 | 60 |
| Razzmatazz | #e3256b | 337.9 | 77.2 | 51.8 | 157.9 | 77.2 | 51.8 | 97.9 | 77.2 | 51.8 | 218 | 77.2 | 51.8 |
| Red | #ff0000 | 0 | 100 | 50 | 180 | 100 | 50 | 120 | 100 | 50 | 240 | 100 | 50 |
| Red-Brown | #a52a2a | 0 | 59.4 | 40.6 | 180 | 59.4 | 40.6 | 120 | 59.4 | 40.6 | 240 | 59.4 | 40.6 |
| Red Devil | #860111 | 352.8 | 98.5 | 26.5 | 172.8 | 98.5 | 26.5 | 112.8 | 98.5 | 26.5 | 233 | 98.5 | 26.5 |
| Red (Munsell) | #f2003c | 345.1 | 100 | 47.5 | 165.1 | 100 | 47.5 | 105.1 | 100 | 47.5 | 225 | 100 | 47.5 |
| Red (Ncs) | #c40233 | 344.8 | 98 | 38.8 | 164.8 | 98 | 38.8 | 104.8 | 98 | 38.8 | 225 | 98 | 38.8 |
| Red-Orange | #ff5349 | 3.3 | 100 | 64.3 | 183.3 | 100 | 64.3 | 123.3 | 100 | 64.3 | 243 | 100 | 64.3 |
| Red (Pigment) | #ed1c24 | 357.7 | 85.3 | 52 | 177.7 | 85.3 | 52 | 117.7 | 85.3 | 52 | 238 | 85.3 | 52 |
| Red (Ryb) | #fe2712 | 5.3 | 99.2 | 53.3 | 185.3 | 99.2 | 53.3 | 125.3 | 99.2 | 53.3 | 245 | 99.2 | 53.3 |
| Red-Violet | #c71585 | 322.2 | 80.9 | 43.1 | 142.2 | 80.9 | 43.1 | 82.2 | 80.9 | 43.1 | 202 | 80.9 | 43.1 |
| Redwood | #ab4e52 | 357.4 | 37.3 | 48.8 | 177.4 | 37.3 | 48.8 | 117.4 | 37.3 | 48.8 | 237 | 37.3 | 48.8 |
| Regalia | #522d80 | 266.7 | 48 | 33.9 | 86.7 | 48 | 33.9 | 26.7 | 48 | 33.9 | 147 | 48 | 33.9 |
| Resolution Blue | #002387 | 224.4 | 100 | 26.5 | 44.4 | 100 | 26.5 | 344.4 | 100 | 26.5 | 104 | 100 | 26.5 |
| Rich Black | #004040 | 180 | 100 | 12.5 | 0 | 100 | 12.5 | 300 | 100 | 12.5 | 60 | 100 | 12.5 |
| Rich Brilliant Lavender | #f1a7fe | 291 | 97.8 | 82.5 | 111 | 97.8 | 82.5 | 51 | 97.8 | 82.5 | 171 | 97.8 | 82.5 |
| Rich Carmine | #d70040 | 342.1 | 100 | 42.2 | 162.1 | 100 | 42.2 | 102.1 | 100 | 42.2 | 222 | 100 | 42.2 |
| Rich Electric Blue | #0892d0 | 198.6 | 92.6 | 42.4 | 18.6 | 92.6 | 42.4 | 318.6 | 92.6 | 42.4 | 79 | 92.6 | 42.4 |
| Rich Lavender | #a76bcf | 276 | 51 | 61.6 | 96 | 51 | 61.6 | 36 | 51 | 61.6 | 156 | 51 | 61.6 |
| Rich Lilac | #b666d2 | 284.4 | 54.5 | 61.2 | 104.4 | 54.5 | 61.2 | 44.4 | 54.5 | 61.2 | 164 | 54.5 | 61.2 |
| Rich Maroon | #b03060 | 337.5 | 57.1 | 43.9 | 157.5 | 57.1 | 43.9 | 97.5 | 57.1 | 43.9 | 218 | 57.1 | 43.9 |
| Rifle Green | #414833 | 80 | 17.1 | 24.1 | 260 | 17.1 | 24.1 | 200 | 17.1 | 24.1 | 320 | 17.1 | 24.1 |
| Robin Egg Blue | #00cccc | 180 | 100 | 40 | 0 | 100 | 40 | 300 | 100 | 40 | 60 | 100 | 40 |
| Rose | #ff007f | 330.1 | 100 | 50 | 150.1 | 100 | 50 | 90.1 | 100 | 50 | 210 | 100 | 50 |
| Rose Bonbon | #f9429e | 329.8 | 93.8 | 61.8 | 149.8 | 93.8 | 61.8 | 89.8 | 93.8 | 61.8 | 210 | 93.8 | 61.8 |
| Rose Ebony | #674846 | 3.6 | 19.1 | 33.9 | 183.6 | 19.1 | 33.9 | 123.6 | 19.1 | 33.9 | 244 | 19.1 | 33.9 |
| Rose Gold | #b76e79 | 351 | 33.6 | 57.5 | 171 | 33.6 | 57.5 | 111 | 33.6 | 57.5 | 231 | 33.6 | 57.5 |
| Rose Madder | #e32636 | 354.9 | 77.1 | 52 | 174.9 | 77.1 | 52 | 114.9 | 77.1 | 52 | 235 | 77.1 | 52 |
| Rose Pink | #ff66cc | 320 | 100 | 70 | 140 | 100 | 70 | 80 | 100 | 70 | 200 | 100 | 70 |
| Rose Quartz | #aa98a9 | 303.3 | 9.6 | 63.1 | 123.3 | 9.6 | 63.1 | 63.3 | 9.6 | 63.1 | 183 | 9.6 | 63.1 |
| Rose Taupe | #905d5d | 0 | 21.5 | 46.5 | 180 | 21.5 | 46.5 | 120 | 21.5 | 46.5 | 240 | 21.5 | 46.5 |
| Rose Vale | #ab4e52 | 357.4 | 37.3 | 48.8 | 177.4 | 37.3 | 48.8 | 117.4 | 37.3 | 48.8 | 237 | 37.3 | 48.8 |
| Rosewood | #65000b | 353.5 | 100 | 19.8 | 173.5 | 100 | 19.8 | 113.5 | 100 | 19.8 | 234 | 100 | 19.8 |
| Rosso Corsa | #d40000 | 0 | 100 | 41.6 | 180 | 100 | 41.6 | 120 | 100 | 41.6 | 240 | 100 | 41.6 |
| Rosy Brown | #bc8f8f | 0 | 25.1 | 64.9 | 180 | 25.1 | 64.9 | 120 | 25.1 | 64.9 | 240 | 25.1 | 64.9 |
| Royal Azure | #0038a8 | 220 | 100 | 32.9 | 40 | 100 | 32.9 | 340 | 100 | 32.9 | 100 | 100 | 32.9 |
| Royal Blue (Traditional) | #002366 | 219.4 | 100 | 20 | 39.4 | 100 | 20 | 339.4 | 100 | 20 | 99 | 100 | 20 |
| Royal Blue (Web) | #4169e1 | 225 | 72.7 | 56.9 | 45 | 72.7 | 56.9 | 345 | 72.7 | 56.9 | 105 | 72.7 | 56.9 |
| Royal Fuchsia | #ca2c92 | 321.3 | 64.2 | 48.2 | 141.3 | 64.2 | 48.2 | 81.3 | 64.2 | 48.2 | 201 | 64.2 | 48.2 |
| Royal Purple | #7851a9 | 266.6 | 35.2 | 49 | 86.6 | 35.2 | 49 | 26.6 | 35.2 | 49 | 147 | 35.2 | 49 |
| Royal Yellow | #fada5e | 47.7 | 94 | 67.5 | 227.7 | 94 | 67.5 | 167.7 | 94 | 67.5 | 288 | 94 | 67.5 |
| Rubine Red | #d10056 | 335.3 | 100 | 41 | 155.3 | 100 | 41 | 95.3 | 100 | 41 | 215 | 100 | 41 |
| Ruby | #e0115f | 337.4 | 85.9 | 47.3 | 157.4 | 85.9 | 47.3 | 97.4 | 85.9 | 47.3 | 217 | 85.9 | 47.3 |
| Ruby Red | #9b111e | 354.3 | 80.2 | 33.7 | 174.3 | 80.2 | 33.7 | 114.3 | 80.2 | 33.7 | 234 | 80.2 | 33.7 |
| Ruddy | #ff0028 | 350.6 | 100 | 50 | 170.6 | 100 | 50 | 110.6 | 100 | 50 | 231 | 100 | 50 |
| Ruddy Brown | #bb6528 | 24.9 | 64.8 | 44.5 | 204.9 | 64.8 | 44.5 | 144.9 | 64.8 | 44.5 | 265 | 64.8 | 44.5 |
| Ruddy Pink | #e18e96 | 354.2 | 58 | 72 | 174.2 | 58 | 72 | 114.2 | 58 | 72 | 234 | 58 | 72 |
| Rufous | #a81c07 | 7.8 | 92 | 34.3 | 187.8 | 92 | 34.3 | 127.8 | 92 | 34.3 | 248 | 92 | 34.3 |
| Russet | #80461b | 25.5 | 65.2 | 30.4 | 205.5 | 65.2 | 30.4 | 145.5 | 65.2 | 30.4 | 266 | 65.2 | 30.4 |
| Rust | #b7410e | 18.1 | 85.8 | 38.6 | 198.1 | 85.8 | 38.6 | 138.1 | 85.8 | 38.6 | 258 | 85.8 | 38.6 |
| Rusty Red | #da2c43 | 352.1 | 70.2 | 51.4 | 172.1 | 70.2 | 51.4 | 112.1 | 70.2 | 51.4 | 232 | 70.2 | 51.4 |
| Sacramento State Green | #00563f | 164 | 100 | 16.9 | 344 | 100 | 16.9 | 284 | 100 | 16.9 | 44 | 100 | 16.9 |
| Saddle Brown | #8b4513 | 25 | 75.9 | 31 | 205 | 75.9 | 31 | 145 | 75.9 | 31 | 265 | 75.9 | 31 |
| Safety Orange (Blaze Orange) | #ff6700 | 24.2 | 100 | 50 | 204.2 | 100 | 50 | 144.2 | 100 | 50 | 264 | 100 | 50 |
| Saffron | #f4c430 | 45.3 | 89.9 | 57.3 | 225.3 | 89.9 | 57.3 | 165.3 | 89.9 | 57.3 | 285 | 89.9 | 57.3 |
| Salmon | #ff8c69 | 14 | 100 | 70.6 | 194 | 100 | 70.6 | 134 | 100 | 70.6 | 254 | 100 | 70.6 |
| Salmon Pink | #ff91a4 | 349.6 | 100 | 78.4 | 169.6 | 100 | 78.4 | 109.6 | 100 | 78.4 | 230 | 100 | 78.4 |
| Sand | #c2b280 | 45.5 | 35.1 | 63.1 | 225.5 | 35.1 | 63.1 | 165.5 | 35.1 | 63.1 | 286 | 35.1 | 63.1 |
| Sand Dune | #967117 | 42.5 | 73.4 | 33.9 | 222.5 | 73.4 | 33.9 | 162.5 | 73.4 | 33.9 | 283 | 73.4 | 33.9 |
| Sandstorm | #ecd540 | 52 | 81.9 | 58.8 | 232 | 81.9 | 58.8 | 172 | 81.9 | 58.8 | 292 | 81.9 | 58.8 |
| Sandy Brown | #f4a460 | 27.6 | 87.1 | 66.7 | 207.6 | 87.1 | 66.7 | 147.6 | 87.1 | 66.7 | 268 | 87.1 | 66.7 |
| Sandy Taupe | #967117 | 42.5 | 73.4 | 33.9 | 222.5 | 73.4 | 33.9 | 162.5 | 73.4 | 33.9 | 283 | 73.4 | 33.9 |
| Sangria | #92000a | 355.9 | 100 | 28.6 | 175.9 | 100 | 28.6 | 115.9 | 100 | 28.6 | 236 | 100 | 28.6 |
| Sap Green | #507d2a | 92.5 | 49.7 | 32.7 | 272.5 | 49.7 | 32.7 | 212.5 | 49.7 | 32.7 | 333 | 49.7 | 32.7 |
| Sapphire | #0f52ba | 216.5 | 85.1 | 39.4 | 36.5 | 85.1 | 39.4 | 336.5 | 85.1 | 39.4 | 97 | 85.1 | 39.4 |
| Sapphire Blue | #0067a5 | 202.5 | 100 | 32.4 | 22.5 | 100 | 32.4 | 322.5 | 100 | 32.4 | 83 | 100 | 32.4 |
| Satin Sheen Gold | #cba135 | 43.2 | 59.1 | 50.2 | 223.2 | 59.1 | 50.2 | 163.2 | 59.1 | 50.2 | 283 | 59.1 | 50.2 |
| Scarlet | #ff2400 | 8.5 | 100 | 50 | 188.5 | 100 | 50 | 128.5 | 100 | 50 | 249 | 100 | 50 |
| Scarlet (Crayola) | #fd0e35 | 350.2 | 98.4 | 52.4 | 170.2 | 98.4 | 52.4 | 110.2 | 98.4 | 52.4 | 230 | 98.4 | 52.4 |
| School Bus Yellow | #ffd800 | 50.8 | 100 | 50 | 230.8 | 100 | 50 | 170.8 | 100 | 50 | 291 | 100 | 50 |
| Screamin' Green | #76ff7a | 121.8 | 100 | 73.1 | 301.8 | 100 | 73.1 | 241.8 | 100 | 73.1 | 2 | 100 | 73.1 |
| Sea Blue | #006994 | 197.4 | 100 | 29 | 17.4 | 100 | 29 | 317.4 | 100 | 29 | 77 | 100 | 29 |

HSL Colour Model Values        Figure 39-11

| | Input Sensor Colour | | | | Equiluminant Colour | | | Triadic Colour 1 | | | Triadic Colour 2 | | |
|---|---|---|---|---|---|---|---|---|---|---|---|---|---|
| | Hexidecmal triplet | Hue Saturation Lightness | | | f=MOD(Kn+180,360) | f=same | f=same | f=MOD(Kn+120,360) | f=same | f=same | f=MOD(Kn-120,360) | f=same | f=same |
| Name | c | h | s% | l% | h | s | l | h | s | l | h | s | l |
| Sea Green | #2e8b57 | 146.5 | 50.3 | 36.3 | 326.5 | 50.3 | 36.3 | 266.5 | 50.3 | 36.3 | 27 | 50.3 | 36.3 |
| Seal Brown | #321414 | 0 | 42.9 | 13.7 | 180 | 42.9 | 13.7 | 120 | 42.9 | 13.7 | 240 | 42.9 | 13.7 |
| Seashell | #fff5ee | 24.7 | 100 | 96.7 | 204.7 | 100 | 96.7 | 144.7 | 100 | 96.7 | 265 | 100 | 96.7 |
| Selective Yellow | #ffba00 | 43.8 | 100 | 50 | 223.8 | 100 | 50 | 163.8 | 100 | 50 | 284 | 100 | 50 |
| Sepia | #704214 | 30 | 69.7 | 25.9 | 210 | 69.7 | 25.9 | 150 | 69.7 | 25.9 | 270 | 69.7 | 25.9 |
| Shadow | #8a795d | 37.3 | 19.5 | 45.3 | 217.3 | 19.5 | 45.3 | 157.3 | 19.5 | 45.3 | 277 | 19.5 | 45.3 |
| Shamrock Green | #009e60 | 156.5 | 100 | 31 | 336.5 | 100 | 31 | 276.5 | 100 | 31 | 37 | 100 | 31 |
| Shocking Pink | #fc0fc0 | 315.2 | 97.5 | 52.4 | 135.2 | 97.5 | 52.4 | 75.2 | 97.5 | 52.4 | 195 | 97.5 | 52.4 |
| Shocking Pink (Crayola) | #ff6fff | 300 | 100 | 71.8 | 120 | 100 | 71.8 | 60 | 100 | 71.8 | 180 | 100 | 71.8 |
| Sienna | #882d17 | 11.7 | 71.1 | 31.2 | 191.7 | 71.1 | 31.2 | 131.7 | 71.1 | 31.2 | 252 | 71.1 | 31.2 |
| Silver | #c0c0c0 | 0 | 0 | 75.3 | 180 | 0 | 75.3 | 120 | 0 | 75.3 | 240 | 0 | 75.3 |
| Sinopia | #cb410b | 16.9 | 89.7 | 42 | 196.9 | 89.7 | 42 | 136.9 | 89.7 | 42 | 257 | 89.7 | 42 |
| Skobeloff | #007474 | 180 | 100 | 22.7 | 0 | 100 | 22.7 | 300 | 100 | 22.7 | 60 | 100 | 22.7 |
| Sky Blue | #87ceeb | 197.4 | 71.4 | 72.5 | 17.4 | 71.4 | 72.5 | 317.4 | 71.4 | 72.5 | 77 | 71.4 | 72.5 |
| Sky Magenta | #cf71af | 320.4 | 49.5 | 62.7 | 140.4 | 49.5 | 62.7 | 80.4 | 49.5 | 62.7 | 200 | 49.5 | 62.7 |
| Slate Blue | #6a5acd | 248.3 | 53.5 | 57.8 | 68.3 | 53.5 | 57.8 | 8.3 | 53.5 | 57.8 | 128 | 53.5 | 57.8 |
| Slate Gray | #708090 | 210 | 12.6 | 50.2 | 30 | 12.6 | 50.2 | 330 | 12.6 | 50.2 | 90 | 12.6 | 50.2 |
| Smalt (Dark Powder Blue) | #003399 | 220 | 100 | 30 | 40 | 100 | 30 | 340 | 100 | 30 | 100 | 100 | 30 |
| Smokey Topaz | #933d41 | 357.2 | 41.3 | 40.8 | 177.2 | 41.3 | 40.8 | 117.2 | 41.3 | 40.8 | 237 | 41.3 | 40.8 |
| Smoky Black | #100c08 | 30 | 33.3 | 4.7 | 210 | 33.3 | 4.7 | 150 | 33.3 | 4.7 | 270 | 33.3 | 4.7 |
| Snow | #fffafa | 0 | 100 | 99 | 180 | 100 | 99 | 120 | 100 | 99 | 240 | 100 | 99 |
| Spiro Disco Ball | #0fc0fc | 195.2 | 97.5 | 52.4 | 15.2 | 97.5 | 52.4 | 315.2 | 97.5 | 52.4 | 75 | 97.5 | 52.4 |
| Spring Bud | #a7fc00 | 80.2 | 100 | 49.4 | 260.2 | 100 | 49.4 | 200.2 | 100 | 49.4 | 320 | 100 | 49.4 |
| Spring Green | #00ff7f | 149.9 | 100 | 50 | 329.9 | 100 | 50 | 269.9 | 100 | 50 | 30 | 100 | 50 |
| St. Patrick'S Blue | #23297a | 235.9 | 55.4 | 30.8 | 55.9 | 55.4 | 30.8 | 355.9 | 55.4 | 30.8 | 116 | 55.4 | 30.8 |
| Steel Blue | #4682b4 | 207.3 | 44 | 49 | 27.3 | 44 | 49 | 327.3 | 44 | 49 | 87 | 44 | 49 |
| Stil De Grain Yellow | #fada5e | 47.7 | 94 | 67.5 | 227.7 | 94 | 67.5 | 167.7 | 94 | 67.5 | 288 | 94 | 67.5 |
| Stizza | #990000 | 0 | 100 | 30 | 180 | 100 | 30 | 120 | 100 | 30 | 240 | 100 | 30 |
| Stormcloud | #4f666a | 188.9 | 14.6 | 36.3 | 8.9 | 14.6 | 36.3 | 308.9 | 14.6 | 36.3 | 69 | 14.6 | 36.3 |
| Straw | #e4d96f | 54.4 | 68.4 | 66.5 | 234.4 | 68.4 | 66.5 | 174.4 | 68.4 | 66.5 | 294 | 68.4 | 66.5 |
| Sunglow | #ffcc33 | 45 | 100 | 60 | 225 | 100 | 60 | 165 | 100 | 60 | 285 | 100 | 60 |
| Sunset | #fad6a5 | 34.6 | 89.5 | 81.4 | 214.6 | 89.5 | 81.4 | 154.6 | 89.5 | 81.4 | 275 | 89.5 | 81.4 |
| Tan | #d2b48c | 34.3 | 43.7 | 68.6 | 214.3 | 43.7 | 68.6 | 154.3 | 43.7 | 68.6 | 274 | 43.7 | 68.6 |
| Tangelo | #f94d00 | 18.6 | 100 | 48.8 | 198.6 | 100 | 48.8 | 138.6 | 100 | 48.8 | 259 | 100 | 48.8 |
| Tangerine | #f28500 | 33 | 100 | 47.5 | 213 | 100 | 47.5 | 153 | 100 | 47.5 | 273 | 100 | 47.5 |
| Tangerine Yellow | #ffcc00 | 48 | 100 | 50 | 228 | 100 | 50 | 168 | 100 | 50 | 288 | 100 | 50 |
| Tango Pink | #e4717a | 355.3 | 68 | 66.9 | 175.3 | 68 | 66.9 | 115.3 | 68 | 66.9 | 235 | 68 | 66.9 |
| Taupe | #483c32 | 27.3 | 18 | 23.9 | 207.3 | 18 | 23.9 | 147.3 | 18 | 23.9 | 267 | 18 | 23.9 |
| Taupe Gray | #8b8589 | 320 | 2.5 | 53.3 | 140 | 2.5 | 53.3 | 80 | 2.5 | 53.3 | 200 | 2.5 | 53.3 |
| Tea Green | #d0f0c0 | 100 | 61.5 | 84.7 | 280 | 61.5 | 84.7 | 220 | 61.5 | 84.7 | 340 | 61.5 | 84.7 |
| Tea Rose (Orange) | #f88379 | 4.7 | 90.1 | 72.4 | 184.7 | 90.1 | 72.4 | 124.7 | 90.1 | 72.4 | 245 | 90.1 | 72.4 |
| Tea Rose (Rose) | #f4c2c2 | 0 | 69.4 | 85.9 | 180 | 69.4 | 85.9 | 120 | 69.4 | 85.9 | 240 | 69.4 | 85.9 |
| Teal | #008080 | 180 | 100 | 25.1 | 0 | 100 | 25.1 | 300 | 100 | 25.1 | 60 | 100 | 25.1 |
| Teal Blue | #367588 | 193.9 | 43.2 | 37.3 | 13.9 | 43.2 | 37.3 | 313.9 | 43.2 | 37.3 | 74 | 43.2 | 37.3 |
| Teal Green | #00827f | 178.6 | 100 | 25.5 | 358.6 | 100 | 25.5 | 298.6 | 100 | 25.5 | 59 | 100 | 25.5 |
| Telemagenta | #cf3476 | 334.5 | 61.8 | 50.8 | 154.5 | 61.8 | 50.8 | 94.5 | 61.8 | 50.8 | 215 | 61.8 | 50.8 |
| Tenné (Tawny) | #cd5700 | 25.5 | 100 | 40.2 | 205.5 | 100 | 40.2 | 145.5 | 100 | 40.2 | 266 | 100 | 40.2 |
| Terra Cotta | #e2725b | 10.2 | 69.9 | 62.2 | 190.2 | 69.9 | 62.2 | 130.2 | 69.9 | 62.2 | 250 | 69.9 | 62.2 |
| Thistle | #d8bfd8 | 300 | 24.3 | 79.8 | 120 | 24.3 | 79.8 | 60 | 24.3 | 79.8 | 180 | 24.3 | 79.8 |
| Thulian Pink | #de6fa1 | 333 | 62.7 | 65.3 | 153 | 62.7 | 65.3 | 93 | 62.7 | 65.3 | 213 | 62.7 | 65.3 |
| Tickle Me Pink | #fc89ac | 341.7 | 95 | 76.3 | 161.7 | 95 | 76.3 | 101.7 | 95 | 76.3 | 222 | 95 | 76.3 |
| Tiffany Blue | #0abab5 | 178.3 | 89.8 | 38.4 | 358.3 | 89.8 | 38.4 | 298.3 | 89.8 | 38.4 | 58 | 89.8 | 38.4 |
| Tiger'S Eye | #e08d3c | 29.6 | 72.6 | 55.7 | 209.6 | 72.6 | 55.7 | 149.6 | 72.6 | 55.7 | 270 | 72.6 | 55.7 |
| Timberwolf | #dbd7d2 | 33.3 | 11.1 | 84.1 | 213.3 | 11.1 | 84.1 | 153.3 | 11.1 | 84.1 | 273 | 11.1 | 84.1 |
| Titanium Yellow | #eee600 | 58 | 100 | 46.7 | 238 | 100 | 46.7 | 178 | 100 | 46.7 | 298 | 100 | 46.7 |
| Tomato | #ff6347 | 9.1 | 100 | 63.9 | 189.1 | 100 | 63.9 | 129.1 | 100 | 63.9 | 249 | 100 | 63.9 |
| Toolbox | #746cc0 | 245.7 | 40 | 58.8 | 65.7 | 40 | 58.8 | 5.7 | 40 | 58.8 | 126 | 40 | 58.8 |
| Topaz | #ffc87c | 34.8 | 100 | 74.3 | 214.8 | 100 | 74.3 | 154.8 | 100 | 74.3 | 275 | 100 | 74.3 |
| Tractor Red | #fd0e35 | 350.2 | 98.4 | 52.4 | 170.2 | 98.4 | 52.4 | 110.2 | 98.4 | 52.4 | 230 | 98.4 | 52.4 |
| Trolley Grey | #808080 | 0 | 0 | 50.2 | 180 | 0 | 50.2 | 120 | 0 | 50.2 | 240 | 0 | 50.2 |
| Tropical Rain Forest | #00755e | 168.2 | 100 | 22.9 | 348.2 | 100 | 22.9 | 288.2 | 100 | 22.9 | 48 | 100 | 22.9 |
| True Blue | #0073cf | 206.7 | 100 | 40.6 | 26.7 | 100 | 40.6 | 326.7 | 100 | 40.6 | 87 | 100 | 40.6 |
| Tufts Blue | #417dc1 | 211.9 | 50.8 | 50.6 | 31.9 | 50.8 | 50.6 | 331.9 | 50.8 | 50.6 | 92 | 50.8 | 50.6 |
| Tumbleweed | #deaa88 | 23.7 | 56.6 | 70.2 | 203.7 | 56.6 | 70.2 | 143.7 | 56.6 | 70.2 | 264 | 56.6 | 70.2 |
| Turkish Rose | #b57281 | 346.6 | 31.2 | 57.8 | 166.6 | 31.2 | 57.8 | 106.6 | 31.2 | 57.8 | 227 | 31.2 | 57.8 |
| Turquoise | #30d5c8 | 175.3 | 66.3 | 51.2 | 355.3 | 66.3 | 51.2 | 295.3 | 66.3 | 51.2 | 55 | 66.3 | 51.2 |
| Turquoise Blue | #00ffef | 176.2 | 100 | 50 | 356.2 | 100 | 50 | 296.2 | 100 | 50 | 56 | 100 | 50 |
| Turquoise Green | #a0d6b4 | 142.2 | 39.7 | 73.3 | 322.2 | 39.7 | 73.3 | 262.2 | 39.7 | 73.3 | 22 | 39.7 | 73.3 |
| Tuscan Red | #7c4848 | 0 | 26.5 | 38.4 | 180 | 26.5 | 38.4 | 120 | 26.5 | 38.4 | 240 | 26.5 | 38.4 |
| Twilight Lavender | #8a496b | 328.6 | 30.8 | 41.4 | 148.6 | 30.8 | 41.4 | 88.6 | 30.8 | 41.4 | 209 | 30.8 | 41.4 |
| Tyrian Purple | #66023c | 325.2 | 96.2 | 20.4 | 145.2 | 96.2 | 20.4 | 85.2 | 96.2 | 20.4 | 205 | 96.2 | 20.4 |
| Ua Blue | #0033aa | 222 | 100 | 33.3 | 42 | 100 | 33.3 | 342 | 100 | 33.3 | 102 | 100 | 33.3 |
| Ua Red | #d9004c | 339 | 100 | 42.5 | 159 | 100 | 42.5 | 99 | 100 | 42.5 | 219 | 100 | 42.5 |

HSL Colour Model Values          Figure 39-12

| Name | Input Sensor Colour | | | | Equiluminant Colour | | | Triadic Colour 1 | | | Triadic Colour 2 | | |
|---|---|---|---|---|---|---|---|---|---|---|---|---|---|
| | Hexidecmal triplet | Hue | Saturation | Lightness | f=MOD(Kn+180,360) | f=same | f=same | f=MOD(Kn+120,360) | f=same | f=same | f=MOD(Kn-120,360) | f=same | f=same |
| | c | h | s% | l% | h | s | l | h | s | l | h | s | l |
| Ube | #8878c3 | 252.8 | 38.5 | 61.8 | 72.8 | 38.5 | 61.8 | 12.8 | 38.5 | 61.8 | 133 | 38.5 | 61.8 |
| Ucla Blue | #536895 | 220.9 | 28.4 | 45.5 | 40.9 | 28.4 | 45.5 | 340.9 | 28.4 | 45.5 | 101 | 28.4 | 45.5 |
| Ucla Gold | #ffb300 | 42.1 | 100 | 50 | 222.1 | 100 | 50 | 162.1 | 100 | 50 | 282 | 100 | 50 |
| Ufo Green | #3cd070 | 141.1 | 61.2 | 52.5 | 321.1 | 61.2 | 52.5 | 261.1 | 61.2 | 52.5 | 21 | 61.2 | 52.5 |
| Ultra Pink | #ff6fff | 300 | 100 | 71.8 | 120 | 100 | 71.8 | 60 | 100 | 71.8 | 180 | 100 | 71.8 |
| Ultramarine | #120a8f | 243.6 | 86.9 | 30 | 63.6 | 86.9 | 30 | 3.6 | 86.9 | 30 | 124 | 86.9 | 30 |
| Ultramarine Blue | #4166f5 | 227.7 | 90 | 60.8 | 47.7 | 90 | 60.8 | 347.7 | 90 | 60.8 | 108 | 90 | 60.8 |
| Umber | #635147 | 21.4 | 16.5 | 33.3 | 201.4 | 16.5 | 33.3 | 141.4 | 16.5 | 33.3 | 261 | 16.5 | 33.3 |
| Unbleached Silk | #ffddca | 21.5 | 100 | 89.6 | 201.5 | 100 | 89.6 | 141.5 | 100 | 89.6 | 262 | 100 | 89.6 |
| United Nations Blue | #5b92e5 | 216.1 | 72.6 | 62.7 | 36.1 | 72.6 | 62.7 | 336.1 | 72.6 | 62.7 | 96 | 72.6 | 62.7 |
| University Of California Gold | #b78727 | 40 | 64.9 | 43.5 | 220 | 64.9 | 43.5 | 160 | 64.9 | 43.5 | 280 | 64.9 | 43.5 |
| Unmellow Yellow | #ffff66 | 60 | 100 | 70 | 240 | 100 | 70 | 180 | 100 | 70 | 300 | 100 | 70 |
| Up Forest Green | #014421 | 148.7 | 97.1 | 13.5 | 328.7 | 97.1 | 13.5 | 268.7 | 97.1 | 13.5 | 29 | 97.1 | 13.5 |
| Up Maroon | #7b1113 | 358.9 | 75.7 | 27.5 | 178.9 | 75.7 | 27.5 | 118.9 | 75.7 | 27.5 | 239 | 75.7 | 27.5 |
| Upsdell Red | #ae2029 | 356.2 | 68.9 | 40.4 | 176.2 | 68.9 | 40.4 | 116.2 | 68.9 | 40.4 | 236 | 68.9 | 40.4 |
| Urobilin | #e1ad21 | 43.8 | 76.2 | 50.6 | 223.8 | 76.2 | 50.6 | 163.8 | 76.2 | 50.6 | 284 | 76.2 | 50.6 |
| Usafa Blue | #004f98 | 208.8 | 100 | 29.8 | 28.8 | 100 | 29.8 | 328.8 | 100 | 29.8 | 89 | 100 | 29.8 |
| Usc Cardinal | #990000 | 0 | 100 | 30 | 180 | 100 | 30 | 120 | 100 | 30 | 240 | 100 | 30 |
| Usc Gold | #ffcc00 | 48 | 100 | 50 | 228 | 100 | 50 | 168 | 100 | 50 | 288 | 100 | 50 |
| Utah Crimson | #d3003f | 342.1 | 100 | 41.4 | 162.1 | 100 | 41.4 | 102.1 | 100 | 41.4 | 222 | 100 | 41.4 |
| Vanilla | #f3e5ab | 48.3 | 75 | 81.2 | 228.3 | 75 | 81.2 | 168.3 | 75 | 81.2 | 288 | 75 | 81.2 |
| Vegas Gold | #c5b358 | 50.1 | 48.4 | 55.9 | 230.1 | 48.4 | 55.9 | 170.1 | 48.4 | 55.9 | 290 | 48.4 | 55.9 |
| Venetian Red | #c80815 | 355.9 | 92.3 | 40.8 | 175.9 | 92.3 | 40.8 | 115.9 | 92.3 | 40.8 | 236 | 92.3 | 40.8 |
| Verdigris | #43b3ae | 177.3 | 45.5 | 48.2 | 357.3 | 45.5 | 48.2 | 297.3 | 45.5 | 48.2 | 57 | 45.5 | 48.2 |
| Vermilion (Cinnabar) | #e34234 | 4.8 | 75.8 | 54.7 | 184.8 | 75.8 | 54.7 | 124.8 | 75.8 | 54.7 | 245 | 75.8 | 54.7 |
| Vermilion (Plochere) | #d9603b | 14.1 | 67.5 | 54.1 | 194.1 | 67.5 | 54.1 | 134.1 | 67.5 | 54.1 | 254 | 67.5 | 54.1 |
| Veronica | #a020f0 | 276.9 | 87.4 | 53.3 | 96.9 | 87.4 | 53.3 | 36.9 | 87.4 | 53.3 | 157 | 87.4 | 53.3 |
| Violet | #8f00ff | 273.6 | 100 | 50 | 93.6 | 100 | 50 | 33.6 | 100 | 50 | 154 | 100 | 50 |
| Violet-Blue | #324ab2 | 228.8 | 56.1 | 44.7 | 48.8 | 56.1 | 44.7 | 348.8 | 56.1 | 44.7 | 109 | 56.1 | 44.7 |
| Violet (Color Wheel) | #7f00ff | 269.9 | 100 | 50 | 89.9 | 100 | 50 | 29.9 | 100 | 50 | 150 | 100 | 50 |
| Violet (Ryb) | #8601af | 285.9 | 98.9 | 34.5 | 105.9 | 98.9 | 34.5 | 45.9 | 98.9 | 34.5 | 166 | 98.9 | 34.5 |
| Violet (Web) | #ee82ee | 300 | 76.1 | 72.2 | 120 | 76.1 | 72.2 | 60 | 76.1 | 72.2 | 180 | 76.1 | 72.2 |
| Viridian | #40826d | 160.9 | 34 | 38 | 340.9 | 34 | 38 | 280.9 | 34 | 38 | 41 | 34 | 38 |
| Vivid Auburn | #922724 | 1.6 | 60.4 | 35.7 | 181.6 | 60.4 | 35.7 | 121.6 | 60.4 | 35.7 | 242 | 60.4 | 35.7 |
| Vivid Burgundy | #9f1d35 | 348.9 | 69.1 | 36.9 | 168.9 | 69.1 | 36.9 | 108.9 | 69.1 | 36.9 | 229 | 69.1 | 36.9 |
| Vivid Cerise | #da1d81 | 328.3 | 76.5 | 48.4 | 148.3 | 76.5 | 48.4 | 88.3 | 76.5 | 48.4 | 208 | 76.5 | 48.4 |
| Vivid Tangerine | #ffa089 | 11.7 | 100 | 76.9 | 191.7 | 100 | 76.9 | 131.7 | 100 | 76.9 | 252 | 100 | 76.9 |
| Vivid Violet | #9f00ff | 277.4 | 100 | 50 | 97.4 | 100 | 50 | 37.4 | 100 | 50 | 157 | 100 | 50 |
| Warm Black | #004242 | 180 | 100 | 12.9 | 0 | 100 | 12.9 | 300 | 100 | 12.9 | 60 | 100 | 12.9 |
| Waterspout | #a4f4f9 | 183.5 | 87.6 | 81 | 3.5 | 87.6 | 81 | 303.5 | 87.6 | 81 | 64 | 87.6 | 81 |
| Wenge | #645452 | 6.7 | 9.9 | 35.7 | 186.7 | 9.9 | 35.7 | 126.7 | 9.9 | 35.7 | 247 | 9.9 | 35.7 |
| Wheat | #f5deb3 | 39.1 | 76.7 | 83.1 | 219.1 | 76.7 | 83.1 | 159.1 | 76.7 | 83.1 | 279 | 76.7 | 83.1 |
| White | #ffff | 0 | 0 | 100 | 180 | 0 | 100 | 120 | 0 | 100 | 240 | 0 | 100 |
| White Smoke | #f5f5f5 | 0 | 0 | 96.1 | 180 | 0 | 96.1 | 120 | 0 | 96.1 | 240 | 0 | 96.1 |
| Wild Blue Yonder | #a2add0 | 225.7 | 32.9 | 72.5 | 45.7 | 32.9 | 72.5 | 345.7 | 32.9 | 72.5 | 106 | 32.9 | 72.5 |
| Wild Strawberry | #ff43a4 | 329 | 100 | 63.1 | 149 | 100 | 63.1 | 89 | 100 | 63.1 | 209 | 100 | 63.1 |
| Wild Watermelon | #fc6c85 | 349.6 | 96 | 70.6 | 169.6 | 96 | 70.6 | 109.6 | 96 | 70.6 | 230 | 96 | 70.6 |
| Wine | #722f37 | 352.8 | 41.6 | 31.6 | 172.8 | 41.6 | 31.6 | 112.8 | 41.6 | 31.6 | 233 | 41.6 | 31.6 |
| Wine Dregs | #673147 | 335.6 | 35.5 | 29.8 | 155.6 | 35.5 | 29.8 | 95.6 | 35.5 | 29.8 | 216 | 35.5 | 29.8 |
| Wisteria | #c9a0dc | 281 | 46.2 | 74.5 | 101 | 46.2 | 74.5 | 41 | 46.2 | 74.5 | 161 | 46.2 | 74.5 |
| Wood Brown | #c19a6b | 32.8 | 41 | 58.8 | 212.8 | 41 | 58.8 | 152.8 | 41 | 58.8 | 273 | 41 | 58.8 |
| Xanadu | #738678 | 135.8 | 7.6 | 48.8 | 315.8 | 7.6 | 48.8 | 255.8 | 7.6 | 48.8 | 16 | 7.6 | 48.8 |
| Yale Blue | #0f4d92 | 211.6 | 81.4 | 31.6 | 31.6 | 81.4 | 31.6 | 331.6 | 81.4 | 31.6 | 92 | 81.4 | 31.6 |
| Yellow | #ffff00 | 60 | 100 | 50 | 240 | 100 | 50 | 180 | 100 | 50 | 300 | 100 | 50 |
| Yellow-Green | #9acd32 | 79.7 | 60.8 | 50 | 259.7 | 60.8 | 50 | 199.7 | 60.8 | 50 | 320 | 60.8 | 50 |
| Yellow (Munsell) | #efcc00 | 51.2 | 100 | 46.9 | 231.2 | 100 | 46.9 | 171.2 | 100 | 46.9 | 291 | 100 | 46.9 |
| Yellow (Ncs) | #ffd300 | 49.6 | 100 | 50 | 229.6 | 100 | 50 | 169.6 | 100 | 50 | 290 | 100 | 50 |
| Yellow Orange | #ffae42 | 34.3 | 100 | 62.9 | 214.3 | 100 | 62.9 | 154.3 | 100 | 62.9 | 274 | 100 | 62.9 |
| Yellow (Process) | #ffef00 | 56.2 | 100 | 50 | 236.2 | 100 | 50 | 176.2 | 100 | 50 | 296 | 100 | 50 |
| Yellow (Ryb) | #fefe33 | 60 | 99 | 59.8 | 240 | 99 | 59.8 | 180 | 99 | 59.8 | 300 | 99 | 59.8 |
| Zaffre | #0014a8 | 232.9 | 100 | 32.9 | 52.9 | 100 | 32.9 | 352.9 | 100 | 32.9 | 113 | 100 | 32.9 |
| Zinnwaldite Brown | #2c1608 | 23.3 | 69.2 | 10.2 | 203.3 | 69.2 | 10.2 | 143.3 | 69.2 | 10.2 | 263 | 69.2 | 10.2 |

HSL Colour Model Values — Figure 40-1

| Name | Input Sensor Colour | | | | Equiluminant Colour | | | Split Complementary Colour 1 | | | Split Complementary Colour 2 | | |
|---|---|---|---|---|---|---|---|---|---|---|---|---|---|
| | Hexidecmal triplet | Hue | Saturation | Lightness | f=MOD(Kn +180,360) | f=same | f=same | f=MOD(Kn +150,360) | f=same | f=same | f=MOD(Kn +210,360) | f=same | f=same |
| | c | h | s% | l% | h | s | l | h | s | l | h | s | l |
| Air Force Blue (Raf) | #5d8aa8 | 204 | 30 | 51 | 24 | 30 | 51 | 354 | 30 | 51 | 54 | 30 | 51 |
| Air Force Blue (Usaf) | #00308f | 220 | 100 | 28 | 40 | 100 | 28 | 10 | 100 | 28 | 70 | 100 | 28 |
| Air Superiority Blue | #72a0c1 | 205 | 39 | 60 | 25 | 39 | 60 | 355 | 39 | 60 | 55 | 39 | 60 |
| Alabama Crimson | #a32638 | 351 | 62 | 39 | 171 | 62 | 39 | 141 | 62 | 39 | 201 | 62 | 39 |
| Alice Blue | #f0f8ff | 208 | 100 | 97 | 28 | 100 | 97 | 358 | 100 | 97 | 58 | 100 | 97 |
| Alizarin Crimson | #e32636 | 355 | 77 | 52 | 175 | 77 | 52 | 145 | 77 | 52 | 205 | 77 | 52 |
| Alloy Orange | #c46210 | 27 | 85 | 42 | 207 | 85 | 42 | 177 | 85 | 42 | 237 | 85 | 42 |
| Almond | #efdecd | 30 | 51.5 | 87.1 | 210 | 51.5 | 87.1 | 180 | 51.5 | 87.1 | 240 | 51.5 | 87.1 |
| Amaranth | #e52b50 | 348.1 | 78.2 | 53.3 | 168.1 | 78.2 | 53.3 | 138.1 | 78.2 | 53.3 | 198.1 | 78.2 | 53.3 |
| Amber | #ffbf00 | 44.9 | 100 | 50 | 224.9 | 100 | 50 | 194.9 | 100 | 50 | 254.9 | 100 | 50 |
| Amber (Sae/Ece) | #ff7e00 | 29.6 | 100 | 50 | 209.6 | 100 | 50 | 179.6 | 100 | 50 | 239.6 | 100 | 50 |
| American Rose | #ff033e | 346 | 100 | 50.6 | 166 | 100 | 50.6 | 136 | 100 | 50.6 | 196 | 100 | 50.6 |
| Amethyst | #9966cc | 270 | 50 | 60 | 90 | 50 | 60 | 60 | 50 | 60 | 120 | 50 | 60 |
| Android Green | #a4c639 | 74.5 | 55.3 | 50 | 254.5 | 55.3 | 50 | 224.5 | 55.3 | 50 | 284.5 | 55.3 | 50 |
| Anti-Flash White | #f2f3f4 | 210 | 8.3 | 95.3 | 30 | 8.3 | 95.3 | 0 | 8.3 | 95.3 | 60 | 8.3 | 95.3 |
| Antique Brass | #cd9575 | 21.8 | 46.8 | 63.1 | 201.8 | 46.8 | 63.1 | 171.8 | 46.8 | 63.1 | 231.8 | 46.8 | 63.1 |
| Antique Fuchsia | #915c83 | 315.8 | 22.4 | 46.5 | 135.8 | 22.4 | 46.5 | 105.8 | 22.4 | 46.5 | 165.8 | 22.4 | 46.5 |
| Antique Ruby | #841b2d | 349.7 | 66 | 31.2 | 169.7 | 66 | 31.2 | 139.7 | 66 | 31.2 | 199.7 | 66 | 31.2 |
| Antique White | #faebd7 | 34.3 | 77.8 | 91.2 | 214.3 | 77.8 | 91.2 | 184.3 | 77.8 | 91.2 | 244.3 | 77.8 | 91.2 |
| Ao (English) | #008000 | 120 | 100 | 25.1 | 300 | 100 | 25.1 | 270 | 100 | 25.1 | 330 | 100 | 25.1 |
| Apple Green | #8db600 | 73.5 | 100 | 35.7 | 253.5 | 100 | 35.7 | 223.5 | 100 | 35.7 | 283.5 | 100 | 35.7 |
| Apricot | #fbceb1 | 23.5 | 90.2 | 83.9 | 203.5 | 90.2 | 83.9 | 173.5 | 90.2 | 83.9 | 233.5 | 90.2 | 83.9 |
| Aqua | #00ffff | 180 | 100 | 50 | 0 | 100 | 50 | 330 | 100 | 50 | 30 | 100 | 50 |
| Aquamarine | #7fffd4 | 159.8 | 100 | 74.9 | 339.8 | 100 | 74.9 | 309.8 | 100 | 74.9 | 9.8 | 100 | 74.9 |
| Army Green | #4b5320 | 69.4 | 44.3 | 22.5 | 249.4 | 44.3 | 22.5 | 219.4 | 44.3 | 22.5 | 279.4 | 44.3 | 22.5 |
| Arsenic | #3b444b | 206.3 | 11.9 | 26.3 | 26.3 | 11.9 | 26.3 | 356.3 | 11.9 | 26.3 | 56.3 | 11.9 | 26.3 |
| Arylide Yellow | #e9d66b | 51 | 74.1 | 66.7 | 231 | 74.1 | 66.7 | 201 | 74.1 | 66.7 | 261 | 74.1 | 66.7 |
| Ash Grey | #b2beb5 | 135 | 8.5 | 72.2 | 315 | 8.5 | 72.2 | 285 | 8.5 | 72.2 | 345 | 8.5 | 72.2 |
| Asparagus | #87a96b | 92.9 | 26.5 | 54.1 | 272.9 | 26.5 | 54.1 | 242.9 | 26.5 | 54.1 | 302.9 | 26.5 | 54.1 |
| Atomic Tangerine | #ff9966 | 20 | 100 | 70 | 200 | 100 | 70 | 170 | 100 | 70 | 230 | 100 | 70 |
| Auburn | #a52a2a | 0 | 59.4 | 40.6 | 180 | 59.4 | 40.6 | 150 | 59.4 | 40.6 | 210 | 59.4 | 40.6 |
| Aureolin | #fdee00 | 56.4 | 100 | 49.6 | 236.4 | 100 | 49.6 | 206.4 | 100 | 49.6 | 266.4 | 100 | 49.6 |
| Aurometalsaurus | #6e7f80 | 183.3 | 7.6 | 46.7 | 3.3 | 7.6 | 46.7 | 333.3 | 7.6 | 46.7 | 33.3 | 7.6 | 46.7 |
| Avocado | #568203 | 80.8 | 95.5 | 26.1 | 260.8 | 95.5 | 26.1 | 230.8 | 95.5 | 26.1 | 290.8 | 95.5 | 26.1 |
| Azure | #007fff | 210.1 | 100 | 50 | 30.1 | 100 | 50 | 0.1 | 100 | 50 | 60.1 | 100 | 50 |
| Azure Mist/Web | #f0ffff | 180 | 100 | 97.1 | 0 | 100 | 97.1 | 330 | 100 | 97.1 | 30 | 100 | 97.1 |
| Baby Blue | #89cff0 | 199.2 | 77.4 | 73.9 | 19.2 | 77.4 | 73.9 | 349.2 | 77.4 | 73.9 | 49.2 | 77.4 | 73.9 |
| Baby Blue Eyes | #a1caf1 | 209.2 | 74.1 | 78.8 | 29.2 | 74.1 | 78.8 | 359.2 | 74.1 | 78.8 | 59.2 | 74.1 | 78.8 |
| Baby Pink | #f4c2c2 | 0 | 69.4 | 85.9 | 180 | 69.4 | 85.9 | 150 | 69.4 | 85.9 | 210 | 69.4 | 85.9 |
| Ball Blue | #21abcd | 191.9 | 72.3 | 46.7 | 11.9 | 72.3 | 46.7 | 341.9 | 72.3 | 46.7 | 41.9 | 72.3 | 46.7 |
| Banana Mania | #fae7b5 | 43.5 | 87.3 | 84.5 | 223.5 | 87.3 | 84.5 | 193.5 | 87.3 | 84.5 | 253.5 | 87.3 | 84.5 |
| Banana Yellow | #ffe135 | 51.1 | 100 | 60.4 | 231.1 | 100 | 60.4 | 201.1 | 100 | 60.4 | 261.1 | 100 | 60.4 |
| Barn Red | #7c0a02 | 3.9 | 96.8 | 24.7 | 183.9 | 96.8 | 24.7 | 153.9 | 96.8 | 24.7 | 213.9 | 96.8 | 24.7 |
| Battleship Grey | #848482 | 60 | 0.8 | 51.4 | 240 | 0.8 | 51.4 | 210 | 0.8 | 51.4 | 270 | 0.8 | 51.4 |
| Bazaar | #98777b | 352.7 | 13.8 | 53.1 | 172.7 | 13.8 | 53.1 | 142.7 | 13.8 | 53.1 | 202.7 | 13.8 | 53.1 |
| Beau Blue | #bcd4e6 | 205.7 | 45.7 | 82 | 25.7 | 45.7 | 82 | 355.7 | 45.7 | 82 | 55.7 | 45.7 | 82 |
| Beaver | #9f8170 | 21.7 | 19.7 | 53.1 | 201.7 | 19.7 | 53.1 | 171.7 | 19.7 | 53.1 | 231.7 | 19.7 | 53.1 |
| Beige | #f5f5dc | 60 | 55.6 | 91.2 | 240 | 55.6 | 91.2 | 210 | 55.6 | 91.2 | 270 | 55.6 | 91.2 |
| Big Dip O'Ruby | #9c2542 | 345.4 | 61.7 | 37.8 | 165.4 | 61.7 | 37.8 | 135.4 | 61.7 | 37.8 | 195.4 | 61.7 | 37.8 |
| Bisque | #ffe4c4 | 32.5 | 100 | 88.4 | 212.5 | 100 | 88.4 | 182.5 | 100 | 88.4 | 242.5 | 100 | 88.4 |
| Bistre | #3d2b1f | 24 | 32.6 | 18 | 204 | 32.6 | 18 | 174 | 32.6 | 18 | 234 | 32.6 | 18 |
| Bittersweet | #fe6f5e | 6.4 | 98.8 | 68.2 | 186.4 | 98.8 | 68.2 | 156.4 | 98.8 | 68.2 | 216.4 | 98.8 | 68.2 |
| Bittersweet Shimmer | #bf4f51 | 358.9 | 46.7 | 52.9 | 178.9 | 46.7 | 52.9 | 148.9 | 46.7 | 52.9 | 208.9 | 46.7 | 52.9 |
| Black | #000000 | 0 | 0 | 0 | 180 | 0 | 0 | 150 | 0 | 0 | 210 | 0 | 0 |
| Black Bean | #3d0c02 | 10.2 | 93.7 | 12.4 | 190.2 | 93.7 | 12.4 | 160.2 | 93.7 | 12.4 | 220.2 | 93.7 | 12.4 |
| Black Leather Jacket | #253529 | 135 | 17.8 | 17.6 | 315 | 17.8 | 17.6 | 285 | 17.8 | 17.6 | 345 | 17.8 | 17.6 |
| Black Olive | #3b3c36 | 70 | 5.3 | 22.4 | 250 | 5.3 | 22.4 | 220 | 5.3 | 22.4 | 280 | 5.3 | 22.4 |
| Blanched Almond | #ffebcd | 36 | 100 | 90.2 | 216 | 100 | 90.2 | 186 | 100 | 90.2 | 246 | 100 | 90.2 |
| Blast-Off Bronze | #a57164 | 12 | 26.5 | 52 | 192 | 26.5 | 52 | 162 | 26.5 | 52 | 222 | 26.5 | 52 |
| Bleu De France | #318ce7 | 210 | 79.1 | 54.9 | 30 | 79.1 | 54.9 | 0 | 79.1 | 54.9 | 60 | 79.1 | 54.9 |
| Blizzard Blue | #ace5ee | 188.2 | 66 | 80.4 | 8.2 | 66 | 80.4 | 338.2 | 66 | 80.4 | 38.2 | 66 | 80.4 |
| Blond | #faf0be | 50 | 85.7 | 86.3 | 230 | 85.7 | 86.3 | 200 | 85.7 | 86.3 | 260 | 85.7 | 86.3 |
| Blue | #0000ff | 240 | 100 | 50 | 60 | 100 | 50 | 30 | 100 | 50 | 90 | 100 | 50 |
| Blue Bell | #a2a2d0 | 240 | 32.9 | 72.5 | 60 | 32.9 | 72.5 | 30 | 32.9 | 72.5 | 90 | 32.9 | 72.5 |
| Blue (Crayola) | #1f75fe | 216.9 | 99.1 | 55.9 | 36.9 | 99.1 | 55.9 | 6.9 | 99.1 | 55.9 | 66.9 | 99.1 | 55.9 |
| Blue Gray | #6699cc | 210 | 50 | 60 | 30 | 50 | 60 | 0 | 50 | 60 | 60 | 50 | 60 |
| Blue-Green | #0d98ba | 191.8 | 86.9 | 39 | 11.8 | 86.9 | 39 | 341.8 | 86.9 | 39 | 41.8 | 86.9 | 39 |
| Blue (Munsell) | #0093af | 189.6 | 100 | 34.3 | 9.6 | 100 | 34.3 | 339.6 | 100 | 34.3 | 39.6 | 100 | 34.3 |
| Blue (Ncs) | #0087bd | 197.1 | 100 | 37.1 | 17.1 | 100 | 37.1 | 347.1 | 100 | 37.1 | 47.1 | 100 | 37.1 |
| Blue (Pigment) | #333399 | 240 | 50 | 40 | 60 | 50 | 40 | 30 | 50 | 40 | 90 | 50 | 40 |
| Blue (Ryb) | #0247fe | 223.6 | 99.2 | 50.2 | 43.6 | 99.2 | 50.2 | 13.6 | 99.2 | 50.2 | 73.6 | 99.2 | 50.2 |
| Blue Sapphire | #126180 | 196.9 | 75.3 | 28.6 | 16.9 | 75.3 | 28.6 | 346.9 | 75.3 | 28.6 | 46.9 | 75.3 | 28.6 |
| Blue-Violet | #8a2be2 | 271.1 | 75.9 | 52.7 | 91.1 | 75.9 | 52.7 | 61.1 | 75.9 | 52.7 | 121.1 | 75.9 | 52.7 |

HSL Colour Model Values

Figure 40-2

| | Input Sensor Colour | | | | Equiluminant Colour | | | Split Complementary Colour 1 | | | Split Complementary Colour 2 | | |
|---|---|---|---|---|---|---|---|---|---|---|---|---|---|
| | Hexidecimal triplet | Hue | Saturation | Lightness | f=MOD(Kn+180,360) | f=same | f=same | f=MOD(Kn+150,360) | f=same | f=same | f=MOD(Kn+210,360) | f=same | f=same |
| Name | c | h | s% | l% | h | s | l | h | s | l | h | s | l |
| Blush | #de5d83 | 342.3 | 66.2 | 61.8 | 162.3 | 66.2 | 61.8 | 132.3 | 66.2 | 61.8 | 192.3 | 66.2 | 61.8 |
| Bole | #79443b | 8.7 | 34.4 | 35.3 | 188.7 | 34.4 | 35.3 | 158.7 | 34.4 | 35.3 | 218.7 | 34.4 | 35.3 |
| Bondi Blue | #0095b6 | 190.9 | 100 | 35.7 | 10.9 | 100 | 35.7 | 340.9 | 100 | 35.7 | 40.9 | 100 | 35.7 |
| Bone | #e3dac9 | 39.2 | 31.7 | 83.9 | 219.2 | 31.7 | 83.9 | 189.2 | 31.7 | 83.9 | 249.2 | 31.7 | 83.9 |
| Boston University Red | #cc0000 | 0 | 100 | 40 | 180 | 100 | 40 | 150 | 100 | 40 | 210 | 100 | 40 |
| Bottle Green | #006a4e | 164.2 | 100 | 20.8 | 344.2 | 100 | 20.8 | 314.2 | 100 | 20.8 | 14.2 | 100 | 20.8 |
| Boysenberry | #873260 | 327.5 | 45.9 | 36.3 | 147.5 | 45.9 | 36.3 | 117.5 | 45.9 | 36.3 | 177.5 | 45.9 | 36.3 |
| Brandeis Blue | #0070ff | 213.6 | 100 | 50 | 33.6 | 100 | 50 | 3.6 | 100 | 50 | 63.6 | 100 | 50 |
| Brass | #b5a642 | 52.2 | 46.6 | 48.4 | 232.2 | 46.6 | 48.4 | 202.2 | 46.6 | 48.4 | 262.2 | 46.6 | 48.4 |
| Brick Red | #cb4154 | 351.7 | 57 | 52.5 | 171.7 | 57 | 52.5 | 141.7 | 57 | 52.5 | 201.7 | 57 | 52.5 |
| Bright Cerulean | #1dacd6 | 193.6 | 76.1 | 47.6 | 13.6 | 76.1 | 47.6 | 343.6 | 76.1 | 47.6 | 43.6 | 76.1 | 47.6 |
| Bright Green | #66ff00 | 96 | 100 | 50 | 276 | 100 | 50 | 246 | 100 | 50 | 306 | 100 | 50 |
| Bright Lavender | #bf94e4 | 272.3 | 59.7 | 73.7 | 92.3 | 59.7 | 73.7 | 62.3 | 59.7 | 73.7 | 122.3 | 59.7 | 73.7 |
| Bright Maroon | #c32148 | 345.6 | 71.1 | 44.7 | 165.6 | 71.1 | 44.7 | 135.6 | 71.1 | 44.7 | 195.6 | 71.1 | 44.7 |
| Bright Pink | #ff007f | 330.1 | 100 | 50 | 150.1 | 100 | 50 | 120.1 | 100 | 50 | 180.1 | 100 | 50 |
| Bright Turquoise | #08e8de | 177.3 | 93.3 | 47.1 | 357.3 | 93.3 | 47.1 | 327.3 | 93.3 | 47.1 | 27.3 | 93.3 | 47.1 |
| Bright Ube | #d19fe8 | 281.1 | 61.3 | 76.7 | 101.1 | 61.3 | 76.7 | 71.1 | 61.3 | 76.7 | 131.1 | 61.3 | 76.7 |
| Brilliant Lavender | #f4bbff | 290.3 | 100 | 86.7 | 110.3 | 100 | 86.7 | 80.3 | 100 | 86.7 | 140.3 | 100 | 86.7 |
| Brilliant Rose | #ff55a3 | 332.5 | 100 | 66.7 | 152.5 | 100 | 66.7 | 122.5 | 100 | 66.7 | 182.5 | 100 | 66.7 |
| Brink Pink | #fb607f | 348 | 95.1 | 68 | 168 | 95.1 | 68 | 138 | 95.1 | 68 | 198 | 95.1 | 68 |
| British Racing Green | #004225 | 153.6 | 100 | 12.9 | 333.6 | 100 | 12.9 | 303.6 | 100 | 12.9 | 3.6 | 100 | 12.9 |
| Bronze | #cd7f32 | 29.8 | 60.8 | 50 | 209.8 | 60.8 | 50 | 179.8 | 60.8 | 50 | 239.8 | 60.8 | 50 |
| Brown (Traditional) | #964b00 | 30 | 100 | 29.4 | 210 | 100 | 29.4 | 180 | 100 | 29.4 | 240 | 100 | 29.4 |
| Brown (Web) | #a52a2a | 0 | 59.4 | 40.6 | 180 | 59.4 | 40.6 | 150 | 59.4 | 40.6 | 210 | 59.4 | 40.6 |
| Bubble Gum | #ffc1cc | 349.4 | 100 | 87.8 | 169.4 | 100 | 87.8 | 139.4 | 100 | 87.8 | 199.4 | 100 | 87.8 |
| Bubbles | #e7feff | 182.5 | 100 | 95.3 | 2.5 | 100 | 95.3 | 332.5 | 100 | 95.3 | 32.5 | 100 | 95.3 |
| Buff | #f0dc82 | 49.1 | 78.6 | 72.5 | 229.1 | 78.6 | 72.5 | 199.1 | 78.6 | 72.5 | 259.1 | 78.6 | 72.5 |
| Bulgarian Rose | #480607 | 359.1 | 84.6 | 15.3 | 179.1 | 84.6 | 15.3 | 149.1 | 84.6 | 15.3 | 209.1 | 84.6 | 15.3 |
| Burgundy | #800020 | 345 | 100 | 25.1 | 165 | 100 | 25.1 | 135 | 100 | 25.1 | 195 | 100 | 25.1 |
| Burlywood | #deb887 | 33.8 | 56.9 | 70 | 213.8 | 56.9 | 70 | 183.8 | 56.9 | 70 | 243.8 | 56.9 | 70 |
| Burnt Orange | #cc5500 | 25 | 100 | 40 | 205 | 100 | 40 | 175 | 100 | 40 | 235 | 100 | 40 |
| Burnt Sienna | #e97451 | 13.8 | 77.6 | 61.6 | 193.8 | 77.6 | 61.6 | 163.8 | 77.6 | 61.6 | 223.8 | 77.6 | 61.6 |
| Burnt Umber | #8a3324 | 8.8 | 58.6 | 34.1 | 188.8 | 58.6 | 34.1 | 158.8 | 58.6 | 34.1 | 218.8 | 58.6 | 34.1 |
| Byzantine | #bd33a4 | 310.9 | 57.5 | 47.1 | 130.9 | 57.5 | 47.1 | 100.9 | 57.5 | 47.1 | 160.9 | 57.5 | 47.1 |
| Byzantium | #702963 | 311 | 46.4 | 30 | 131 | 46.4 | 30 | 101 | 46.4 | 30 | 161 | 46.4 | 30 |
| Cadet | #536872 | 199.4 | 15.7 | 38.6 | 19.4 | 15.7 | 38.6 | 349.4 | 15.7 | 38.6 | 49.4 | 15.7 | 38.6 |
| Cadet Blue | #5f9ea0 | 181.8 | 25.5 | 50 | 1.8 | 25.5 | 50 | 331.8 | 25.5 | 50 | 31.8 | 25.5 | 50 |
| Cadet Grey | #91a3b0 | 205.2 | 16.4 | 62.9 | 25.2 | 16.4 | 62.9 | 355.2 | 16.4 | 62.9 | 55.2 | 16.4 | 62.9 |
| Cadmium Green | #006b3c | 153.6 | 100 | 21 | 333.6 | 100 | 21 | 303.6 | 100 | 21 | 3.6 | 100 | 21 |
| Cadmium Orange | #ed872d | 28.1 | 84.2 | 55.3 | 208.1 | 84.2 | 55.3 | 178.1 | 84.2 | 55.3 | 238.1 | 84.2 | 55.3 |
| Cadmium Red | #e30022 | 351 | 100 | 44.5 | 171 | 100 | 44.5 | 141 | 100 | 44.5 | 201 | 100 | 44.5 |
| Cadmium Yellow | #fff600 | 57.9 | 100 | 50 | 237.9 | 100 | 50 | 207.9 | 100 | 50 | 267.9 | 100 | 50 |
| Café Au Lait | #a67b5b | 25.6 | 29.6 | 50.4 | 205.6 | 29.6 | 50.4 | 175.6 | 29.6 | 50.4 | 235.6 | 29.6 | 50.4 |
| Café Noir | #4b3621 | 30 | 38.9 | 21.2 | 210 | 38.9 | 21.2 | 180 | 38.9 | 21.2 | 240 | 38.9 | 21.2 |
| Cal Poly Green | #1e4d2b | 136.6 | 43.9 | 21 | 316.6 | 43.9 | 21 | 286.6 | 43.9 | 21 | 346.6 | 43.9 | 21 |
| Cambridge Blue | #a3c1ad | 140 | 19.5 | 69.8 | 320 | 19.5 | 69.8 | 290 | 19.5 | 69.8 | 350 | 19.5 | 69.8 |
| Camel | #c19a6b | 32.8 | 41 | 58.8 | 212.8 | 41 | 58.8 | 182.8 | 41 | 58.8 | 242.8 | 41 | 58.8 |
| Cameo Pink | #efbbcc | 340.4 | 61.9 | 83.5 | 160.4 | 61.9 | 83.5 | 130.4 | 61.9 | 83.5 | 190.4 | 61.9 | 83.5 |
| Camouflage Green | #78866b | 91.1 | 11.2 | 47.3 | 271.1 | 11.2 | 47.3 | 241.1 | 11.2 | 47.3 | 301.1 | 11.2 | 47.3 |
| Canary Yellow | #ffef00 | 56.2 | 100 | 50 | 236.2 | 100 | 50 | 206.2 | 100 | 50 | 266.2 | 100 | 50 |
| Candy Apple Red | #ff0800 | 1.9 | 100 | 50 | 181.9 | 100 | 50 | 151.9 | 100 | 50 | 211.9 | 100 | 50 |
| Candy Pink | #e4717a | 355.3 | 68 | 66.9 | 175.3 | 68 | 66.9 | 145.3 | 68 | 66.9 | 205.3 | 68 | 66.9 |
| Capri | #00bfff | 195.1 | 100 | 50 | 15.1 | 100 | 50 | 345.1 | 100 | 50 | 45.1 | 100 | 50 |
| Caput Mortuum | #592720 | 7.4 | 47.1 | 23.7 | 187.4 | 47.1 | 23.7 | 157.4 | 47.1 | 23.7 | 217.4 | 47.1 | 23.7 |
| Cardinal | #c41e3a | 349.9 | 73.5 | 44.3 | 169.9 | 73.5 | 44.3 | 139.9 | 73.5 | 44.3 | 199.9 | 73.5 | 44.3 |
| Caribbean Green | #00cc99 | 165 | 100 | 40 | 345 | 100 | 40 | 315 | 100 | 40 | 15 | 100 | 40 |
| Carmine | #960018 | 350.4 | 100 | 29.4 | 170.4 | 100 | 29.4 | 140.4 | 100 | 29.4 | 200.4 | 100 | 29.4 |
| Carmine (M&P) | #d70040 | 342.1 | 100 | 42.2 | 162.1 | 100 | 42.2 | 132.1 | 100 | 42.2 | 192.1 | 100 | 42.2 |
| Carmine Pink | #eb4c42 | 3.6 | 80.9 | 59 | 183.6 | 80.9 | 59 | 153.6 | 80.9 | 59 | 213.6 | 80.9 | 59 |
| Carmine Red | #ff0038 | 346.8 | 100 | 50 | 166.8 | 100 | 50 | 136.8 | 100 | 50 | 196.8 | 100 | 50 |
| Carnation Pink | #ffa6c9 | 336.4 | 100 | 82.5 | 156.4 | 100 | 82.5 | 126.4 | 100 | 82.5 | 186.4 | 100 | 82.5 |
| Carnelian | #b31b1b | 0 | 73.8 | 40.4 | 180 | 73.8 | 40.4 | 150 | 73.8 | 40.4 | 210 | 73.8 | 40.4 |
| Carolina Blue | #99badd | 210.9 | 50 | 73.3 | 30.9 | 50 | 73.3 | 0.9 | 50 | 73.3 | 60.9 | 50 | 73.3 |
| Carrot Orange | #ed9121 | 32.9 | 85 | 52.9 | 212.9 | 85 | 52.9 | 182.9 | 85 | 52.9 | 242.9 | 85 | 52.9 |
| Catalina Blue | #062a78 | 221.1 | 90.5 | 24.7 | 41.1 | 90.5 | 24.7 | 11.1 | 90.5 | 24.7 | 71.1 | 90.5 | 24.7 |
| Ceil | #92a1cf | 223.2 | 38.9 | 69.2 | 45.2 | 38.9 | 69.2 | 15.2 | 38.9 | 69.2 | 75.2 | 38.9 | 69.2 |
| Celadon | #ace1af | 123.4 | 46.9 | 77.8 | 303.4 | 46.9 | 77.8 | 273.4 | 46.9 | 77.8 | 333.4 | 46.9 | 77.8 |
| Celadon Blue | #007ba7 | 195.8 | 100 | 32.7 | 15.8 | 100 | 32.7 | 345.8 | 100 | 32.7 | 45.8 | 100 | 32.7 |
| Celadon Green | #2f847c | 174.4 | 47.5 | 35.1 | 354.4 | 47.5 | 35.1 | 324.4 | 47.5 | 35.1 | 24.4 | 47.5 | 35.1 |
| Celeste (Colour) | #b2ffff | 180 | 100 | 84.9 | 0 | 100 | 84.9 | 330 | 100 | 84.9 | 30 | 100 | 84.9 |
| Celestial Blue | #4997d0 | 205.3 | 59 | 55.1 | 25.3 | 59 | 55.1 | 355.3 | 59 | 55.1 | 55.3 | 59 | 55.1 |
| Cerise | #de3163 | 342.7 | 72.4 | 53.1 | 162.7 | 72.4 | 53.1 | 132.7 | 72.4 | 53.1 | 192.7 | 72.4 | 53.1 |
| Cerise Pink | #ec3b83 | 335.6 | 82.3 | 57.8 | 155.6 | 82.3 | 57.8 | 125.6 | 82.3 | 57.8 | 185.6 | 82.3 | 57.8 |

HSL Colour Model Values   Figure 40-3

| | Input Sensor Colour | | | | Equiluminant Colour | | | Split Complementary Colour 1 | | | Split Complementary Colour 2 | | |
|---|---|---|---|---|---|---|---|---|---|---|---|---|---|
| | Hexidecmal triplet | Hue | Saturation | Lightness | f=MOD(Kn+180,360) | f=same | f=same | f=MOD(Kn+150,360) | f=same | f=same | f=MOD(Kn+210,360) | f=same | f=same |
| Name | c | h | s% | l% | h | s | l | h | s | l | h | s | l |
| Cerulean | #007ba7 | 195.8 | 100 | 32.7 | 15.8 | 100 | 32.7 | 345.8 | 100 | 32.7 | 45.8 | 100 | 32.7 |
| Cerulean Blue | #2a52be | 223.8 | 63.8 | 45.5 | 43.8 | 63.8 | 45.5 | 13.8 | 63.8 | 45.5 | 73.8 | 63.8 | 45.5 |
| Cerulean Frost | #6d9bc3 | 207.9 | 41.7 | 59.6 | 27.9 | 41.7 | 59.6 | 357.9 | 41.7 | 59.6 | 57.9 | 41.7 | 59.6 |
| Cg Blue | #007aa5 | 195.6 | 100 | 32.4 | 15.6 | 100 | 32.4 | 345.6 | 100 | 32.4 | 45.6 | 100 | 32.4 |
| Cg Red | #e03c31 | 3.8 | 73.8 | 53.5 | 183.8 | 73.8 | 53.5 | 153.8 | 73.8 | 53.5 | 213.8 | 73.8 | 53.5 |
| Chamoisee | #a0785a | 25.7 | 28 | 49 | 205.7 | 28 | 49 | 175.7 | 28 | 49 | 235.7 | 28 | 49 |
| Champagne | #fad6a5 | 34.6 | 89.5 | 81.4 | 214.6 | 89.5 | 81.4 | 184.6 | 89.5 | 81.4 | 244.6 | 89.5 | 81.4 |
| Charcoal | #36454f | 204 | 18.8 | 26.1 | 24 | 18.8 | 26.1 | 354 | 18.8 | 26.1 | 54 | 18.8 | 26.1 |
| Charm Pink | #e68fac | 340 | 63.5 | 73.1 | 160 | 63.5 | 73.1 | 130 | 63.5 | 73.1 | 190 | 63.5 | 73.1 |
| Chartreuse (Traditional) | #dfff00 | 67.5 | 100 | 50 | 247.5 | 100 | 50 | 217.5 | 100 | 50 | 277.5 | 100 | 50 |
| Chartreuse (Web) | #7fff00 | 90.1 | 100 | 50 | 270.1 | 100 | 50 | 240.1 | 100 | 50 | 300.1 | 100 | 50 |
| Cherry | #de3163 | 342.7 | 72.4 | 53.1 | 162.7 | 72.4 | 53.1 | 132.7 | 72.4 | 53.1 | 192.7 | 72.4 | 53.1 |
| Cherry Blossom Pink | #ffb7c5 | 348.3 | 100 | 85.9 | 168.3 | 100 | 85.9 | 138.3 | 100 | 85.9 | 198.3 | 100 | 85.9 |
| Chestnut | #cd5c5c | 0 | 53.1 | 58.2 | 180 | 53.1 | 58.2 | 150 | 53.1 | 58.2 | 210 | 53.1 | 58.2 |
| China Pink | #de6fa1 | 333 | 62.7 | 65.3 | 153 | 62.7 | 65.3 | 123 | 62.7 | 65.3 | 183 | 62.7 | 65.3 |
| China Rose | #a8516e | 340 | 34.9 | 48.8 | 160 | 34.9 | 48.8 | 130 | 34.9 | 48.8 | 190 | 34.9 | 48.8 |
| Chinese Red | #aa381e | 11.1 | 70 | 39.2 | 191.1 | 70 | 39.2 | 161.1 | 70 | 39.2 | 221.1 | 70 | 39.2 |
| Chocolate (Traditional) | #7b3f00 | 30.7 | 100 | 24.1 | 210.7 | 100 | 24.1 | 180.7 | 100 | 24.1 | 240.7 | 100 | 24.1 |
| Chocolate (Web) | #d2691e | 25 | 75 | 47.1 | 205 | 75 | 47.1 | 175 | 75 | 47.1 | 235 | 75 | 47.1 |
| Chrome Yellow | #ffa700 | 39.3 | 100 | 50 | 219.3 | 100 | 50 | 189.3 | 100 | 50 | 249.3 | 100 | 50 |
| Cinereous | #98817b | 12.4 | 12.3 | 53.9 | 192.4 | 12.3 | 53.9 | 162.4 | 12.3 | 53.9 | 222.4 | 12.3 | 53.9 |
| Cinnabar | #e34234 | 4.8 | 75.8 | 54.7 | 184.8 | 75.8 | 54.7 | 154.8 | 75.8 | 54.7 | 214.8 | 75.8 | 54.7 |
| Cinnamon | #d2691e | 25 | 75 | 47.1 | 205 | 75 | 47.1 | 175 | 75 | 47.1 | 235 | 75 | 47.1 |
| Citrine | #e4d00a | 54.5 | 91.6 | 46.7 | 234.5 | 91.6 | 46.7 | 204.5 | 91.6 | 46.7 | 264.5 | 91.6 | 46.7 |
| Classic Rose | #fbcce7 | 325.5 | 85.5 | 89.2 | 145.5 | 85.5 | 89.2 | 115.5 | 85.5 | 89.2 | 175.5 | 85.5 | 89.2 |
| Cobalt | #0047ab | 215.1 | 100 | 33.5 | 35.1 | 100 | 33.5 | 5.1 | 100 | 33.5 | 65.1 | 100 | 33.5 |
| Cocoa Brown | #d2691e | 25 | 75 | 47.1 | 205 | 75 | 47.1 | 175 | 75 | 47.1 | 235 | 75 | 47.1 |
| Coffee | #6f4e37 | 24.6 | 33.7 | 32.5 | 204.6 | 33.7 | 32.5 | 174.6 | 33.7 | 32.5 | 234.6 | 33.7 | 32.5 |
| Columbia Blue | #9bddff | 200.4 | 100 | 80.4 | 20.4 | 100 | 80.4 | 350.4 | 100 | 80.4 | 50.4 | 100 | 80.4 |
| Congo Pink | #f88379 | 4.7 | 90.1 | 72.4 | 184.7 | 90.1 | 72.4 | 154.7 | 90.1 | 72.4 | 214.7 | 90.1 | 72.4 |
| Cool Black | #002e63 | 212.1 | 100 | 19.4 | 32.1 | 100 | 19.4 | 2.1 | 100 | 19.4 | 62.1 | 100 | 19.4 |
| Cool Grey | #8c92ac | 228.8 | 16.2 | 61.2 | 48.8 | 16.2 | 61.2 | 18.8 | 16.2 | 61.2 | 78.8 | 16.2 | 61.2 |
| Copper | #b87333 | 28.9 | 56.6 | 46.1 | 208.9 | 56.6 | 46.1 | 178.9 | 56.6 | 46.1 | 238.9 | 56.6 | 46.1 |
| Copper (Crayola) | #da8a67 | 18.3 | 60.8 | 62.9 | 198.3 | 60.8 | 62.9 | 168.3 | 60.8 | 62.9 | 228.3 | 60.8 | 62.9 |
| Copper Penny | #ad6f69 | 5.3 | 29.3 | 54.5 | 185.3 | 29.3 | 54.5 | 155.3 | 29.3 | 54.5 | 215.3 | 29.3 | 54.5 |
| Copper Red | #cb6d51 | 13.8 | 54 | 55.7 | 193.8 | 54 | 55.7 | 163.8 | 54 | 55.7 | 223.8 | 54 | 55.7 |
| Copper Rose | #996666 | 0 | 20 | 50 | 180 | 20 | 50 | 150 | 20 | 50 | 210 | 20 | 50 |
| Coquelicot | #ff3800 | 13.2 | 100 | 50 | 193.2 | 100 | 50 | 163.2 | 100 | 50 | 223.2 | 100 | 50 |
| Coral | #ff7f50 | 16.1 | 100 | 65.7 | 196.1 | 100 | 65.7 | 166.1 | 100 | 65.7 | 226.1 | 100 | 65.7 |
| Coral Pink | #f88379 | 4.7 | 90.1 | 72.4 | 184.7 | 90.1 | 72.4 | 154.7 | 90.1 | 72.4 | 214.7 | 90.1 | 72.4 |
| Coral Red | #ff4040 | 0 | 100 | 62.5 | 180 | 100 | 62.5 | 150 | 100 | 62.5 | 210 | 100 | 62.5 |
| Cordovan | #893f45 | 355.1 | 37 | 39.2 | 175.1 | 37 | 39.2 | 145.1 | 37 | 39.2 | 205.1 | 37 | 39.2 |
| Corn | #fbec5d | 54.3 | 95.2 | 67.5 | 234.3 | 95.2 | 67.5 | 204.3 | 95.2 | 67.5 | 264.3 | 95.2 | 67.5 |
| Cornell Red | #b31b1b | 0 | 73.8 | 40.4 | 180 | 73.8 | 40.4 | 150 | 73.8 | 40.4 | 210 | 73.8 | 40.4 |
| Cornflower Blue | #6495ed | 218.5 | 79.2 | 66.1 | 38.5 | 79.2 | 66.1 | 8.5 | 79.2 | 66.1 | 68.5 | 79.2 | 66.1 |
| Cornsilk | #fff8dc | 48 | 100 | 93.1 | 228 | 100 | 93.1 | 198 | 100 | 93.1 | 258 | 100 | 93.1 |
| Cosmic Latte | #fff8e7 | 42.5 | 100 | 95.3 | 222.5 | 100 | 95.3 | 192.5 | 100 | 95.3 | 252.5 | 100 | 95.3 |
| Cotton Candy | #ffbcd9 | 334 | 100 | 86.9 | 154 | 100 | 86.9 | 124 | 100 | 86.9 | 184 | 100 | 86.9 |
| Cream | #fffdd0 | 57.4 | 100 | 90.8 | 237.4 | 100 | 90.8 | 207.4 | 100 | 90.8 | 267.4 | 100 | 90.8 |
| Crimson | #dc143c | 348 | 83.3 | 47.1 | 168 | 83.3 | 47.1 | 138 | 83.3 | 47.1 | 198 | 83.3 | 47.1 |
| Crimson Glory | #be0032 | 344.2 | 100 | 37.3 | 164.2 | 100 | 37.3 | 134.2 | 100 | 37.3 | 194.2 | 100 | 37.3 |
| Cyan | #00ffff | 180 | 100 | 50 | 0 | 100 | 50 | 330 | 100 | 50 | 30 | 100 | 50 |
| Cyan (Process) | #00b7eb | 193.3 | 100 | 46.1 | 13.3 | 100 | 46.1 | 343.3 | 100 | 46.1 | 43.3 | 100 | 46.1 |
| Daffodil | #ffff31 | 60 | 100 | 59.6 | 240 | 100 | 59.6 | 210 | 100 | 59.6 | 270 | 100 | 59.6 |
| Dandelion | #f0e130 | 55.3 | 86.5 | 56.5 | 235.3 | 86.5 | 56.5 | 205.3 | 86.5 | 56.5 | 265.3 | 86.5 | 56.5 |
| Dark Blue | #00008b | 240 | 100 | 27.3 | 60 | 100 | 27.3 | 30 | 100 | 27.3 | 90 | 100 | 27.3 |
| Dark Brown | #654321 | 30 | 50.7 | 26.3 | 210 | 50.7 | 26.3 | 180 | 50.7 | 26.3 | 240 | 50.7 | 26.3 |
| Dark Byzantium | #5d3954 | 315 | 24 | 29.4 | 135 | 24 | 29.4 | 105 | 24 | 29.4 | 165 | 24 | 29.4 |
| Dark Candy Apple Red | #a40000 | 0 | 100 | 32.2 | 180 | 100 | 32.2 | 150 | 100 | 32.2 | 210 | 100 | 32.2 |
| Dark Cerulean | #08457e | 209 | 88.1 | 26.3 | 29 | 88.1 | 26.3 | 359 | 88.1 | 26.3 | 59 | 88.1 | 26.3 |
| Dark Chestnut | #986960 | 9.6 | 22.6 | 48.6 | 189.6 | 22.6 | 48.6 | 159.6 | 22.6 | 48.6 | 219.6 | 22.6 | 48.6 |
| Dark Coral | #cd5b45 | 9.7 | 57.6 | 53.7 | 189.7 | 57.6 | 53.7 | 159.7 | 57.6 | 53.7 | 219.7 | 57.6 | 53.7 |
| Dark Cyan | #008b8b | 180 | 100 | 27.3 | 0 | 100 | 27.3 | 330 | 100 | 27.3 | 30 | 100 | 27.3 |
| Dark Electric Blue | #536878 | 205.9 | 18.2 | 39.8 | 25.9 | 18.2 | 39.8 | 355.9 | 18.2 | 39.8 | 55.9 | 18.2 | 39.8 |
| Dark Goldenrod | #b8860b | 42.7 | 88.7 | 38.2 | 222.7 | 88.7 | 38.2 | 192.7 | 88.7 | 38.2 | 252.7 | 88.7 | 38.2 |
| Dark Gray | #a9a9a9 | 0 | 0 | 66.3 | 180 | 0 | 66.3 | 150 | 0 | 66.3 | 210 | 0 | 66.3 |
| Dark Green | #013220 | 158 | 96.1 | 10 | 338 | 96.1 | 10 | 308 | 96.1 | 10 | 8 | 96.1 | 10 |
| Dark Imperial Blue | #00416a | 203.2 | 100 | 20.8 | 23.2 | 100 | 20.8 | 353.2 | 100 | 20.8 | 53.2 | 100 | 20.8 |
| Dark Jungle Green | #1a2421 | 162 | 16.1 | 12.2 | 342 | 16.1 | 12.2 | 312 | 16.1 | 12.2 | 12 | 16.1 | 12.2 |
| Dark Khaki | #bdb76b | 55.6 | 38.3 | 58 | 235.6 | 38.3 | 58 | 205.6 | 38.3 | 58 | 265.6 | 38.3 | 58 |
| Dark Lava | #483c32 | 27.3 | 18 | 23.9 | 207.3 | 18 | 23.9 | 177.3 | 18 | 23.9 | 237.3 | 18 | 23.9 |
| Dark Lavender | #734f96 | 270.4 | 31 | 44.9 | 90.4 | 31 | 44.9 | 60.4 | 31 | 44.9 | 120.4 | 31 | 44.9 |
| Dark Magenta | #8b008b | 300 | 100 | 27.3 | 120 | 100 | 27.3 | 90 | 100 | 27.3 | 150 | 100 | 27.3 |

HSL Colour Model Values

Figure 40-4

| Name | Input Sensor Colour | | | | Equiluminant Colour | | | Split Complementary Colour 1 | | | Split Complementary Colour 2 | | |
|---|---|---|---|---|---|---|---|---|---|---|---|---|---|
| | Hexidecimal triplet | Hue Saturation Lightness | | | f=MOD(Kn +180,360) | f=same | f=same | f=MOD(Kn +150,360) | f=same | f=same | f=MOD(Kn +210,360) | f=same | f=same |
| | c | h | s% | l% | h | s | l | h | s | l | h | s | l |
| Dark Midnight Blue | #003366 | 210 | 100 | 20 | 30 | 100 | 20 | 0 | 100 | 20 | 60 | 100 | 20 |
| Dark Olive Green | #556b2f | 82 | 39 | 30.2 | 262 | 39 | 30.2 | 232 | 39 | 30.2 | 292 | 39 | 30.2 |
| Dark Orange | #ff8c00 | 32.9 | 100 | 50 | 212.9 | 100 | 50 | 182.9 | 100 | 50 | 242.9 | 100 | 50 |
| Dark Orchid | #9932cc | 280.1 | 60.6 | 49.8 | 100.1 | 60.6 | 49.8 | 70.1 | 60.6 | 49.8 | 130.1 | 60.6 | 49.8 |
| Dark Pastel Blue | #779ecb | 212.1 | 44.7 | 63.1 | 32.1 | 44.7 | 63.1 | 2.1 | 44.7 | 63.1 | 62.1 | 44.7 | 63.1 |
| Dark Pastel Green | #03c03c | 138.1 | 96.9 | 38.2 | 318.1 | 96.9 | 38.2 | 288.1 | 96.9 | 38.2 | 348.1 | 96.9 | 38.2 |
| Dark Pastel Purple | #966fd6 | 262.7 | 55.7 | 63.7 | 82.7 | 55.7 | 63.7 | 52.7 | 55.7 | 63.7 | 112.7 | 55.7 | 63.7 |
| Dark Pastel Red | #c23b22 | 9.4 | 70.2 | 44.7 | 189.4 | 70.2 | 44.7 | 159.4 | 70.2 | 44.7 | 219.4 | 70.2 | 44.7 |
| Dark Pink | #e75480 | 342 | 75.4 | 61.8 | 162 | 75.4 | 61.8 | 132 | 75.4 | 61.8 | 192 | 75.4 | 61.8 |
| Dark Powder Blue | #039 | 240 | 100 | 11.2 | 60 | 100 | 11.2 | 30 | 100 | 11.2 | 90 | 100 | 11.2 |
| Dark Raspberry | #872657 | 329.7 | 56.1 | 33.9 | 149.7 | 56.1 | 33.9 | 119.7 | 56.1 | 33.9 | 179.7 | 56.1 | 33.9 |
| Dark Red | #8b0000 | 0 | 100 | 27.3 | 180 | 100 | 27.3 | 150 | 100 | 27.3 | 210 | 100 | 27.3 |
| Dark Salmon | #e9967a | 15.1 | 71.6 | 69.6 | 195.1 | 71.6 | 69.6 | 165.1 | 71.6 | 69.6 | 225.1 | 71.6 | 69.6 |
| Dark Scarlet | #560319 | 344.1 | 93.3 | 17.5 | 164.1 | 93.3 | 17.5 | 134.1 | 93.3 | 17.5 | 194.1 | 93.3 | 17.5 |
| Dark Sea Green | #8fbc8f | 120 | 25.1 | 64.9 | 300 | 25.1 | 64.9 | 270 | 25.1 | 64.9 | 330 | 25.1 | 64.9 |
| Dark Sienna | #3c1414 | 0 | 50 | 15.7 | 180 | 50 | 15.7 | 150 | 50 | 15.7 | 210 | 50 | 15.7 |
| Dark Slate Blue | #483d8b | 248.5 | 39 | 39.2 | 68.5 | 39 | 39.2 | 38.5 | 39 | 39.2 | 98.5 | 39 | 39.2 |
| Dark Slate Gray | #2f4f4f | 180 | 25.4 | 24.7 | 0 | 25.4 | 24.7 | 330 | 25.4 | 24.7 | 30 | 25.4 | 24.7 |
| Dark Spring Green | #177245 | 150.3 | 66.4 | 26.9 | 330.3 | 66.4 | 26.9 | 300.3 | 66.4 | 26.9 | 0.3 | 66.4 | 26.9 |
| Dark Tan | #918151 | 45 | 28.3 | 44.3 | 225 | 28.3 | 44.3 | 195 | 28.3 | 44.3 | 255 | 28.3 | 44.3 |
| Dark Tangerine | #ffa812 | 38 | 100 | 53.5 | 218 | 100 | 53.5 | 188 | 100 | 53.5 | 248 | 100 | 53.5 |
| Dark Taupe | #483c32 | 27.3 | 18 | 23.9 | 207.3 | 18 | 23.9 | 177.3 | 18 | 23.9 | 237.3 | 18 | 23.9 |
| Dark Terra Cotta | #cc4e5c | 353.3 | 55.3 | 55.3 | 173.3 | 55.3 | 55.3 | 143.3 | 55.3 | 55.3 | 203.3 | 55.3 | 55.3 |
| Dark Turquoise | #00ced1 | 180.9 | 100 | 41 | 0.9 | 100 | 41 | 330.9 | 100 | 41 | 30.9 | 100 | 41 |
| Dark Violet | #9400d3 | 282.1 | 100 | 41.4 | 102.1 | 100 | 41.4 | 72.1 | 100 | 41.4 | 132.1 | 100 | 41.4 |
| Dark Yellow | #9b870c | 51.6 | 85.6 | 32.7 | 231.6 | 85.6 | 32.7 | 201.6 | 85.6 | 32.7 | 261.6 | 85.6 | 32.7 |
| Dartmouth Green | #00703c | 152.1 | 100 | 22 | 332.1 | 100 | 22 | 302.1 | 100 | 22 | 2.1 | 100 | 22 |
| Davy's Grey | #555555 | 0 | 0 | 33.3 | 180 | 0 | 33.3 | 150 | 0 | 33.3 | 210 | 0 | 33.3 |
| Debian Red | #d70a53 | 338.6 | 91.1 | 44.1 | 158.6 | 91.1 | 44.1 | 128.6 | 91.1 | 44.1 | 188.6 | 91.1 | 44.1 |
| Deep Carmine | #a9203e | 346.9 | 68.2 | 39.4 | 166.9 | 68.2 | 39.4 | 136.9 | 68.2 | 39.4 | 196.9 | 68.2 | 39.4 |
| Deep Carmine Pink | #ef3038 | 357.5 | 85.7 | 56.3 | 177.5 | 85.7 | 56.3 | 147.5 | 85.7 | 56.3 | 207.5 | 85.7 | 56.3 |
| Deep Carrot Orange | #e9692c | 19.4 | 81.1 | 54.3 | 199.4 | 81.1 | 54.3 | 169.4 | 81.1 | 54.3 | 229.4 | 81.1 | 54.3 |
| Deep Cerise | #da3287 | 329.6 | 69.4 | 52.5 | 149.6 | 69.4 | 52.5 | 119.6 | 69.4 | 52.5 | 179.6 | 69.4 | 52.5 |
| Deep Champagne | #fad6a5 | 34.6 | 89.5 | 81.4 | 214.6 | 89.5 | 81.4 | 184.6 | 89.5 | 81.4 | 244.6 | 89.5 | 81.4 |
| Deep Chestnut | #b94e48 | 3.2 | 44.7 | 50.4 | 183.2 | 44.7 | 50.4 | 153.2 | 44.7 | 50.4 | 213.2 | 44.7 | 50.4 |
| Deep Coffee | #704241 | 1.3 | 26.6 | 34.7 | 181.3 | 26.6 | 34.7 | 151.3 | 26.6 | 34.7 | 211.3 | 26.6 | 34.7 |
| Deep Fuchsia | #c154c1 | 300 | 46.8 | 54.3 | 120 | 46.8 | 54.3 | 90 | 46.8 | 54.3 | 150 | 46.8 | 54.3 |
| Deep Jungle Green | #004b49 | 178.4 | 100 | 14.7 | 358.4 | 100 | 14.7 | 328.4 | 100 | 14.7 | 28.4 | 100 | 14.7 |
| Deep Lilac | #9955bb | 280 | 42.9 | 53.3 | 100 | 42.9 | 53.3 | 70 | 42.9 | 53.3 | 130 | 42.9 | 53.3 |
| Deep Magenta | #cc00cc | 300 | 100 | 40 | 120 | 100 | 40 | 90 | 100 | 40 | 150 | 100 | 40 |
| Deep Peach | #ffcba4 | 25.7 | 100 | 82.2 | 205.7 | 100 | 82.2 | 175.7 | 100 | 82.2 | 235.7 | 100 | 82.2 |
| Deep Pink | #ff1493 | 327.6 | 100 | 53.9 | 147.6 | 100 | 53.9 | 117.6 | 100 | 53.9 | 177.6 | 100 | 53.9 |
| Deep Ruby | #843f5b | 335.7 | 35.4 | 38.2 | 155.7 | 35.4 | 38.2 | 125.7 | 35.4 | 38.2 | 185.7 | 35.4 | 38.2 |
| Deep Saffron | #ff9933 | 30 | 100 | 60 | 210 | 100 | 60 | 180 | 100 | 60 | 240 | 100 | 60 |
| Deep Sky Blue | #00bfff | 195.1 | 100 | 50 | 15.1 | 100 | 50 | 345.1 | 100 | 50 | 45.1 | 100 | 50 |
| Deep Tuscan Red | #66424d | 341.7 | 21.4 | 32.9 | 161.7 | 21.4 | 32.9 | 131.7 | 21.4 | 32.9 | 191.7 | 21.4 | 32.9 |
| Denim | #1560bd | 213.2 | 80 | 41.2 | 33.2 | 80 | 41.2 | 3.2 | 80 | 41.2 | 63.2 | 80 | 41.2 |
| Desert | #c19a6b | 32.8 | 41 | 58.8 | 212.8 | 41 | 58.8 | 182.8 | 41 | 58.8 | 242.8 | 41 | 58.8 |
| Desert Sand | #edc9af | 25.2 | 63.3 | 80.8 | 205.2 | 63.3 | 80.8 | 175.2 | 63.3 | 80.8 | 235.2 | 63.3 | 80.8 |
| Dim Gray | #696969 | 0 | 0 | 41.2 | 180 | 0 | 41.2 | 150 | 0 | 41.2 | 210 | 0 | 41.2 |
| Dodger Blue | #1e90ff | 209.6 | 100 | 55.9 | 29.6 | 100 | 55.9 | 359.6 | 100 | 55.9 | 59.6 | 100 | 55.9 |
| Dogwood Rose | #d71868 | 334.9 | 79.9 | 46.9 | 154.9 | 79.9 | 46.9 | 124.9 | 79.9 | 46.9 | 184.9 | 79.9 | 46.9 |
| Dollar Bill | #85bb65 | 97.7 | 38.7 | 56.5 | 277.7 | 38.7 | 56.5 | 247.7 | 38.7 | 56.5 | 307.7 | 38.7 | 56.5 |
| Drab | #967117 | 42.5 | 73.4 | 33.9 | 222.5 | 73.4 | 33.9 | 192.5 | 73.4 | 33.9 | 252.5 | 73.4 | 33.9 |
| Duke Blue | #00009c | 240 | 100 | 30.6 | 60 | 100 | 30.6 | 30 | 100 | 30.6 | 90 | 100 | 30.6 |
| Earth Yellow | #e1a95f | 34.2 | 68.4 | 62.7 | 214.2 | 68.4 | 62.7 | 184.2 | 68.4 | 62.7 | 244.2 | 68.4 | 62.7 |
| Ebony | #555d50 | 96.9 | 7.5 | 33.9 | 276.9 | 7.5 | 33.9 | 246.9 | 7.5 | 33.9 | 306.9 | 7.5 | 33.9 |
| Ecru | #c2b280 | 45.5 | 35.1 | 63.1 | 225.5 | 35.1 | 63.1 | 195.5 | 35.1 | 63.1 | 255.5 | 35.1 | 63.1 |
| Eggplant | #614051 | 329.1 | 20.5 | 31.6 | 149.1 | 20.5 | 31.6 | 119.1 | 20.5 | 31.6 | 179.1 | 20.5 | 31.6 |
| Eggshell | #f0ead6 | 46.2 | 46.4 | 89 | 226.2 | 46.4 | 89 | 196.2 | 46.4 | 89 | 256.2 | 46.4 | 89 |
| Egyptian Blue | #1034a6 | 225.6 | 82.4 | 35.7 | 45.6 | 82.4 | 35.7 | 15.6 | 82.4 | 35.7 | 75.6 | 82.4 | 35.7 |
| Electric Blue | #7df9ff | 182.8 | 100 | 74.5 | 2.8 | 100 | 74.5 | 332.8 | 100 | 74.5 | 32.8 | 100 | 74.5 |
| Electric Crimson | #ff003f | 345.2 | 100 | 50 | 165.2 | 100 | 50 | 135.2 | 100 | 50 | 195.2 | 100 | 50 |
| Electric Cyan | #00ffff | 180 | 100 | 50 | 0 | 100 | 50 | 330 | 100 | 50 | 30 | 100 | 50 |
| Electric Green | #00ff00 | 120 | 100 | 50 | 300 | 100 | 50 | 270 | 100 | 50 | 330 | 100 | 50 |
| Electric Indigo | #6f00ff | 266.1 | 100 | 50 | 86.1 | 100 | 50 | 56.1 | 100 | 50 | 116.1 | 100 | 50 |
| Electric Lavender | #f4bbff | 290.3 | 100 | 86.7 | 110.3 | 100 | 86.7 | 80.3 | 100 | 86.7 | 140.3 | 100 | 86.7 |
| Electric Lime | #ccff00 | 72 | 100 | 50 | 252 | 100 | 50 | 222 | 100 | 50 | 282 | 100 | 50 |
| Electric Purple | #bf00ff | 284.9 | 100 | 50 | 104.9 | 100 | 50 | 74.9 | 100 | 50 | 134.9 | 100 | 50 |
| Electric Ultramarine | #3f00ff | 254.8 | 100 | 50 | 74.8 | 100 | 50 | 44.8 | 100 | 50 | 104.8 | 100 | 50 |
| Electric Violet | #8f00ff | 273.6 | 100 | 50 | 93.6 | 100 | 50 | 63.6 | 100 | 50 | 123.6 | 100 | 50 |
| Electric Yellow | #ffff00 | 60 | 100 | 50 | 240 | 100 | 50 | 210 | 100 | 50 | 270 | 100 | 50 |
| Emerald | #50c878 | 140 | 52.2 | 54.9 | 320 | 52.2 | 54.9 | 290 | 52.2 | 54.9 | 350 | 52.2 | 54.9 |

HSL Colour Model Values — Figure 40-5

| Name | Input Sensor Colour Hexidecmal triplet | Hue h | Saturation s% | Lightness l% | Equiluminant Colour f=MOD(Kn+180,360) h | f=same s | f=same l | Split Complementary Colour 1 f=MOD(Kn+150,360) h | f=same s | f=same l | Split Complementary Colour 2 f=MOD(Kn+210,360) h | f=same s | f=same l |
|---|---|---|---|---|---|---|---|---|---|---|---|---|---|
| English Lavender | #b48395 | 338 | 24.6 | 61 | 158 | 24.6 | 61 | 128 | 24.6 | 61 | 188 | 24.6 | 61 |
| Eton Blue | #96c8a2 | 134.4 | 31.2 | 68.6 | 314.4 | 31.2 | 68.6 | 284.4 | 31.2 | 68.6 | 344.4 | 31.2 | 68.6 |
| Fallow | #c19a6b | 32.8 | 41 | 58.8 | 212.8 | 41 | 58.8 | 182.8 | 41 | 58.8 | 242.8 | 41 | 58.8 |
| Falu Red | #801818 | 0 | 68.4 | 29.8 | 180 | 68.4 | 29.8 | 150 | 68.4 | 29.8 | 210 | 68.4 | 29.8 |
| Fandango | #b53389 | 320.3 | 56 | 45.5 | 140.3 | 56 | 45.5 | 110.3 | 56 | 45.5 | 170.3 | 56 | 45.5 |
| Fashion Fuchsia | #f400a1 | 320.4 | 100 | 47.8 | 140.4 | 100 | 47.8 | 110.4 | 100 | 47.8 | 170.4 | 100 | 47.8 |
| Fawn | #e5aa70 | 29.7 | 69.2 | 66.9 | 209.7 | 69.2 | 66.9 | 179.7 | 69.2 | 66.9 | 239.7 | 69.2 | 66.9 |
| Feldgrau | #4d5d53 | 142.5 | 9.4 | 33.3 | 322.5 | 9.4 | 33.3 | 292.5 | 9.4 | 33.3 | 352.5 | 9.4 | 33.3 |
| Fern Green | #4f7942 | 105.8 | 29.4 | 36.7 | 285.8 | 29.4 | 36.7 | 255.8 | 29.4 | 36.7 | 315.8 | 29.4 | 36.7 |
| Ferrari Red | #ff2800 | 9.4 | 100 | 50 | 189.4 | 100 | 50 | 159.4 | 100 | 50 | 219.4 | 100 | 50 |
| Field Drab | #6c541e | 41.5 | 56.5 | 27.1 | 221.5 | 56.5 | 27.1 | 191.5 | 56.5 | 27.1 | 251.5 | 56.5 | 27.1 |
| Fire Engine Red | #ce2029 | 356.9 | 73.1 | 46.7 | 176.9 | 73.1 | 46.7 | 146.9 | 73.1 | 46.7 | 206.9 | 73.1 | 46.7 |
| Firebrick | #b22222 | 0 | 67.9 | 41.6 | 180 | 67.9 | 41.6 | 150 | 67.9 | 41.6 | 210 | 67.9 | 41.6 |
| Flame | #e25822 | 16.9 | 76.8 | 51 | 196.9 | 76.8 | 51 | 166.9 | 76.8 | 51 | 226.9 | 76.8 | 51 |
| Flamingo Pink | #fc8eac | 343.6 | 94.8 | 77.3 | 163.6 | 94.8 | 77.3 | 133.6 | 94.8 | 77.3 | 193.6 | 94.8 | 77.3 |
| Flavescent | #f7e98e | 52 | 86.8 | 76.3 | 232 | 86.8 | 76.3 | 202 | 86.8 | 76.3 | 262 | 86.8 | 76.3 |
| Flax | #eedc82 | 50 | 76.1 | 72.2 | 230 | 76.1 | 72.2 | 200 | 76.1 | 72.2 | 260 | 76.1 | 72.2 |
| Floral White | #fffaf0 | 40 | 100 | 97.1 | 220 | 100 | 97.1 | 190 | 100 | 97.1 | 250 | 100 | 97.1 |
| Fluorescent Orange | #ffbf00 | 44.9 | 100 | 50 | 224.9 | 100 | 50 | 194.9 | 100 | 50 | 254.9 | 100 | 50 |
| Fluorescent Pink | #ff1493 | 327.6 | 100 | 53.9 | 147.6 | 100 | 53.9 | 117.6 | 100 | 53.9 | 177.6 | 100 | 53.9 |
| Fluorescent Yellow | #ccff00 | 72 | 100 | 50 | 252 | 100 | 50 | 222 | 100 | 50 | 282 | 100 | 50 |
| Folly | #ff004f | 341.4 | 100 | 50 | 161.4 | 100 | 50 | 131.4 | 100 | 50 | 191.4 | 100 | 50 |
| Forest Green (Traditional) | #014421 | 148.7 | 97.1 | 13.5 | 328.7 | 97.1 | 13.5 | 298.7 | 97.1 | 13.5 | 358.7 | 97.1 | 13.5 |
| Forest Green (Web) | #228b22 | 120 | 60.7 | 33.9 | 300 | 60.7 | 33.9 | 270 | 60.7 | 33.9 | 330 | 60.7 | 33.9 |
| French Beige | #a67b5b | 25.6 | 29.6 | 50.4 | 205.6 | 29.6 | 50.4 | 175.6 | 29.6 | 50.4 | 235.6 | 29.6 | 50.4 |
| French Blue | #0072bb | 203.4 | 100 | 36.7 | 23.4 | 100 | 36.7 | 353.4 | 100 | 36.7 | 53.4 | 100 | 36.7 |
| French Lilac | #86608e | 289.6 | 19.3 | 46.7 | 109.6 | 19.3 | 46.7 | 79.6 | 19.3 | 46.7 | 139.6 | 19.3 | 46.7 |
| French Lime | #ccff00 | 72 | 100 | 50 | 252 | 100 | 50 | 222 | 100 | 50 | 282 | 100 | 50 |
| French Raspberry | #c72c48 | 349.2 | 63.8 | 47.6 | 169.2 | 63.8 | 47.6 | 139.2 | 63.8 | 47.6 | 199.2 | 63.8 | 47.6 |
| French Rose | #f64a8a | 337.7 | 90.5 | 62.7 | 157.7 | 90.5 | 62.7 | 127.7 | 90.5 | 62.7 | 187.7 | 90.5 | 62.7 |
| Fuchsia | #ff00ff | 300 | 100 | 50 | 120 | 100 | 50 | 90 | 100 | 50 | 150 | 100 | 50 |
| Fuchsia (Crayola) | #c154c1 | 300 | 46.8 | 54.3 | 120 | 46.8 | 54.3 | 90 | 46.8 | 54.3 | 150 | 46.8 | 54.3 |
| Fuchsia Pink | #ff77ff | 300 | 100 | 73.3 | 120 | 100 | 73.3 | 90 | 100 | 73.3 | 150 | 100 | 73.3 |
| Fuchsia Rose | #c74375 | 337.3 | 54.1 | 52.2 | 157.3 | 54.1 | 52.2 | 127.3 | 54.1 | 52.2 | 187.3 | 54.1 | 52.2 |
| Fulvous | #e48400 | 34.7 | 100 | 44.7 | 214.7 | 100 | 44.7 | 184.7 | 100 | 44.7 | 244.7 | 100 | 44.7 |
| Fuzzy Wuzzy | #cc6666 | 0 | 50 | 60 | 180 | 50 | 60 | 150 | 50 | 60 | 210 | 50 | 60 |
| Gainsboro | #dcdcdc | 0 | 0 | 86.3 | 180 | 0 | 86.3 | 150 | 0 | 86.3 | 210 | 0 | 86.3 |
| Gamboge | #e49b0f | 39.4 | 87.7 | 47.6 | 219.4 | 87.7 | 47.6 | 189.4 | 87.7 | 47.6 | 249.4 | 87.7 | 47.6 |
| Ghost White | #f8f8ff | 240 | 100 | 98.6 | 60 | 100 | 98.6 | 30 | 100 | 98.6 | 90 | 100 | 98.6 |
| Ginger | #b06500 | 34.4 | 100 | 34.5 | 214.4 | 100 | 34.5 | 184.4 | 100 | 34.5 | 244.4 | 100 | 34.5 |
| Glaucous | #6082b6 | 216.3 | 37.1 | 54.5 | 36.3 | 37.1 | 54.5 | 6.3 | 37.1 | 54.5 | 66.3 | 37.1 | 54.5 |
| Glitter | #e6e8fa | 234 | 66.7 | 94.1 | 54 | 66.7 | 94.1 | 24 | 66.7 | 94.1 | 84 | 66.7 | 94.1 |
| Gold (Metallic) | #d4af37 | 45.9 | 64.6 | 52.4 | 225.9 | 64.6 | 52.4 | 195.9 | 64.6 | 52.4 | 255.9 | 64.6 | 52.4 |
| Gold (Web) (Golden) | #ffd700 | 50.6 | 100 | 50 | 230.6 | 100 | 50 | 200.6 | 100 | 50 | 260.6 | 100 | 50 |
| Golden Brown | #996515 | 36.4 | 75.9 | 34.1 | 216.4 | 75.9 | 34.1 | 186.4 | 75.9 | 34.1 | 246.4 | 75.9 | 34.1 |
| Golden Poppy | #fcc200 | 46.2 | 100 | 49.4 | 226.2 | 100 | 49.4 | 196.2 | 100 | 49.4 | 256.2 | 100 | 49.4 |
| Golden Yellow | #ffdf00 | 52.5 | 100 | 50 | 232.5 | 100 | 50 | 202.5 | 100 | 50 | 262.5 | 100 | 50 |
| Goldenrod | #daa520 | 42.9 | 74.4 | 49 | 222.9 | 74.4 | 49 | 192.9 | 74.4 | 49 | 252.9 | 74.4 | 49 |
| Granny Smith Apple | #a8e4a0 | 112.9 | 55.7 | 76.1 | 292.9 | 55.7 | 76.1 | 262.9 | 55.7 | 76.1 | 322.9 | 55.7 | 76.1 |
| Gray | #808080 | 0 | 0 | 50.2 | 180 | 0 | 50.2 | 150 | 0 | 50.2 | 210 | 0 | 50.2 |
| Gray-Asparagus | #465945 | 117 | 12.7 | 31 | 297 | 12.7 | 31 | 267 | 12.7 | 31 | 327 | 12.7 | 31 |
| Gray (Html/Css Gray) | #808080 | 0 | 0 | 50.2 | 180 | 0 | 50.2 | 150 | 0 | 50.2 | 210 | 0 | 50.2 |
| Gray (X11 Gray) | #bebebe | 0 | 0 | 74.5 | 180 | 0 | 74.5 | 150 | 0 | 74.5 | 210 | 0 | 74.5 |
| Green (Color Wheel) (X11 Green) | #00ff00 | 120 | 100 | 50 | 300 | 100 | 50 | 270 | 100 | 50 | 330 | 100 | 50 |
| Green (Crayola) | #1cac78 | 158.3 | 72 | 39.2 | 338.3 | 72 | 39.2 | 308.3 | 72 | 39.2 | 8.3 | 72 | 39.2 |
| Green (Html/Css Green) | #008000 | 120 | 100 | 25.1 | 300 | 100 | 25.1 | 270 | 100 | 25.1 | 330 | 100 | 25.1 |
| Green (Munsell) | #00a877 | 162.5 | 100 | 32.9 | 342.5 | 100 | 32.9 | 312.5 | 100 | 32.9 | 12.5 | 100 | 32.9 |
| Green (Ncs) | #009f6b | 160.4 | 100 | 31.2 | 340.4 | 100 | 31.2 | 310.4 | 100 | 31.2 | 10.4 | 100 | 31.2 |
| Green (Pigment) | #00a550 | 149.1 | 100 | 32.4 | 329.1 | 100 | 32.4 | 299.1 | 100 | 32.4 | 359.1 | 100 | 32.4 |
| Green (Ryb) | #66b032 | 95.2 | 55.8 | 44.3 | 275.2 | 55.8 | 44.3 | 245.2 | 55.8 | 44.3 | 305.2 | 55.8 | 44.3 |
| Green-Yellow | #adff2f | 83.7 | 100 | 59.2 | 263.7 | 100 | 59.2 | 233.7 | 100 | 59.2 | 293.7 | 100 | 59.2 |
| Grullo | #a99a86 | 34.3 | 16.9 | 59.4 | 214.3 | 16.9 | 59.4 | 184.3 | 16.9 | 59.4 | 244.3 | 16.9 | 59.4 |
| Guppie Green | #00ff7f | 149.9 | 100 | 50 | 329.9 | 100 | 50 | 299.9 | 100 | 50 | 359.9 | 100 | 50 |
| Halayà Úbe | #663854 | 323.5 | 29.1 | 31 | 143.5 | 29.1 | 31 | 113.5 | 29.1 | 31 | 173.5 | 29.1 | 31 |
| Han Blue | #446ccf | 222.7 | 59.1 | 53.9 | 42.7 | 59.1 | 53.9 | 12.7 | 59.1 | 53.9 | 72.7 | 59.1 | 53.9 |
| Han Purple | #5218fa | 255.4 | 95.8 | 53.7 | 75.4 | 95.8 | 53.7 | 45.4 | 95.8 | 53.7 | 105.4 | 95.8 | 53.7 |
| Hansa Yellow | #e9d66b | 51 | 74.1 | 66.7 | 231 | 74.1 | 66.7 | 201 | 74.1 | 66.7 | 261 | 74.1 | 66.7 |
| Harlequin | #3fff00 | 105.2 | 100 | 50 | 285.2 | 100 | 50 | 255.2 | 100 | 50 | 315.2 | 100 | 50 |
| Harvard Crimson | #c90016 | 353.4 | 100 | 39.4 | 173.4 | 100 | 39.4 | 143.4 | 100 | 39.4 | 203.4 | 100 | 39.4 |
| Harvest Gold | #da9100 | 39.9 | 100 | 42.7 | 219.9 | 100 | 42.7 | 189.9 | 100 | 42.7 | 249.9 | 100 | 42.7 |
| Heart Gold | #808000 | 60 | 100 | 25.1 | 240 | 100 | 25.1 | 210 | 100 | 25.1 | 270 | 100 | 25.1 |
| Heliotrope | #df73ff | 286.3 | 100 | 72.5 | 106.3 | 100 | 72.5 | 76.3 | 100 | 72.5 | 136.3 | 100 | 72.5 |
| Hollywood Cerise | #f400a1 | 320.4 | 100 | 47.8 | 140.4 | 100 | 47.8 | 110.4 | 100 | 47.8 | 170.4 | 100 | 47.8 |

HSL Colour Model Values  Figure 40-6

| | Input Sensor Colour | | | | Equiluminant Colour | | | Split Complementary Colour 1 | | | Split Complementary Colour 2 | | |
|---|---|---|---|---|---|---|---|---|---|---|---|---|---|
| | Hexidecmal triplet | Hue | Saturation | Lightness | f=MOD(Kn +180,360) | f=same | f=same | f=MOD(Kn +150,360) | f=same | f=same | f=MOD(Kn +210,360) | f=same | f=same |
| Name | c | h | s% | l% | h | s | l | h | s | l | h | s | l |
| Honeydew | #f0fff0 | 120 | 100 | 97.1 | 300 | 100 | 97.1 | 270 | 100 | 97.1 | 330 | 100 | 97.1 |
| Honolulu Blue | #007fbf | 200.1 | 100 | 37.5 | 20.1 | 100 | 37.5 | 350.1 | 100 | 37.5 | 50.1 | 100 | 37.5 |
| Hooker'S Green | #49796b | 162.5 | 24.7 | 38 | 342.5 | 24.7 | 38 | 312.5 | 24.7 | 38 | 12.5 | 24.7 | 38 |
| Hot Magenta | #ff1dce | 313 | 100 | 55.7 | 133 | 100 | 55.7 | 103 | 100 | 55.7 | 163 | 100 | 55.7 |
| Hot Pink | #ff69b4 | 330 | 100 | 70.6 | 150 | 100 | 70.6 | 120 | 100 | 70.6 | 180 | 100 | 70.6 |
| Hunter Green | #355e3b | 128.8 | 27.9 | 28.8 | 308.8 | 27.9 | 28.8 | 278.8 | 27.9 | 28.8 | 338.8 | 27.9 | 28.8 |
| Iceberg | #71a6d2 | 207.2 | 51.9 | 63.3 | 27.2 | 51.9 | 63.3 | 357.2 | 51.9 | 63.3 | 57.2 | 51.9 | 63.3 |
| Icterine | #fcf75e | 58.1 | 96.3 | 67.8 | 238.1 | 96.3 | 67.8 | 208.1 | 96.3 | 67.8 | 268.1 | 96.3 | 67.8 |
| Imperial Blue | #002395 | 225.9 | 100 | 29.2 | 45.9 | 100 | 29.2 | 15.9 | 100 | 29.2 | 75.9 | 100 | 29.2 |
| Inchworm | #b2ec5d | 84.3 | 79 | 64.5 | 264.3 | 79 | 64.5 | 234.3 | 79 | 64.5 | 294.3 | 79 | 64.5 |
| India Green | #138808 | 114.8 | 88.9 | 28.2 | 294.8 | 88.9 | 28.2 | 264.8 | 88.9 | 28.2 | 324.8 | 88.9 | 28.2 |
| Indian Red | #cd5c5c | 0 | 53.1 | 58.2 | 180 | 53.1 | 58.2 | 150 | 53.1 | 58.2 | 210 | 53.1 | 58.2 |
| Indian Yellow | #e3a857 | 34.7 | 71.4 | 61.6 | 214.7 | 71.4 | 61.6 | 184.7 | 71.4 | 61.6 | 244.7 | 71.4 | 61.6 |
| Indigo | #6f00ff | 266.1 | 100 | 50 | 86.1 | 100 | 50 | 56.1 | 100 | 50 | 116.1 | 100 | 50 |
| Indigo (Dye) | #00416a | 203.2 | 100 | 20.8 | 23.2 | 100 | 20.8 | 353.2 | 100 | 20.8 | 53.2 | 100 | 20.8 |
| Indigo (Web) | #4b0082 | 274.6 | 100 | 25.5 | 94.6 | 100 | 25.5 | 64.6 | 100 | 25.5 | 124.6 | 100 | 25.5 |
| International Klein Blue | #002fa7 | 223.1 | 100 | 32.7 | 43.1 | 100 | 32.7 | 13.1 | 100 | 32.7 | 73.1 | 100 | 32.7 |
| International Orange (Aerospace) | #ff4f00 | 18.6 | 100 | 50 | 198.6 | 100 | 50 | 168.6 | 100 | 50 | 228.6 | 100 | 50 |
| International Orange (Engineering) | #ba160c | 3.4 | 87.9 | 38.8 | 183.4 | 87.9 | 38.8 | 153.4 | 87.9 | 38.8 | 213.4 | 87.9 | 38.8 |
| International Orange (Golden Gate Bridge) | #c0362c | 4.1 | 62.7 | 46.3 | 184.1 | 62.7 | 46.3 | 154.1 | 62.7 | 46.3 | 214.1 | 62.7 | 46.3 |
| Iris | #5a4fcf | 245.2 | 57.1 | 56.1 | 65.2 | 57.1 | 56.1 | 35.2 | 57.1 | 56.1 | 95.2 | 57.1 | 56.1 |
| Isabelline | #f4f0ec | 30 | 26.7 | 94.1 | 210 | 26.7 | 94.1 | 180 | 26.7 | 94.1 | 240 | 26.7 | 94.1 |
| Islamic Green | #009000 | 120 | 100 | 28.2 | 300 | 100 | 28.2 | 270 | 100 | 28.2 | 330 | 100 | 28.2 |
| Ivory | #fffff0 | 60 | 100 | 97.1 | 240 | 100 | 97.1 | 210 | 100 | 97.1 | 270 | 100 | 97.1 |
| Jade | #00a86b | 158.2 | 100 | 32.9 | 338.2 | 100 | 32.9 | 308.2 | 100 | 32.9 | 8.2 | 100 | 32.9 |
| Jasmine | #f8de7e | 47.2 | 89.7 | 73.3 | 227.2 | 89.7 | 73.3 | 197.2 | 89.7 | 73.3 | 257.2 | 89.7 | 73.3 |
| Jasper | #d73b3e | 358.8 | 66.1 | 53.7 | 178.8 | 66.1 | 53.7 | 148.8 | 66.1 | 53.7 | 208.8 | 66.1 | 53.7 |
| Jazzberry Jam | #a50b5e | 327.7 | 87.5 | 34.5 | 147.7 | 87.5 | 34.5 | 117.7 | 87.5 | 34.5 | 177.7 | 87.5 | 34.5 |
| Jet | #343434 | 0 | 0 | 20.4 | 180 | 0 | 20.4 | 150 | 0 | 20.4 | 210 | 0 | 20.4 |
| Jonquil | #fada5e | 47.7 | 94 | 67.5 | 227.7 | 94 | 67.5 | 197.7 | 94 | 67.5 | 257.7 | 94 | 67.5 |
| June Bud | #bdda57 | 73.3 | 63.9 | 59.8 | 253.3 | 63.9 | 59.8 | 223.3 | 63.9 | 59.8 | 283.3 | 63.9 | 59.8 |
| Jungle Green | #29ab87 | 163.4 | 61.3 | 41.6 | 343.4 | 61.3 | 41.6 | 313.4 | 61.3 | 41.6 | 13.4 | 61.3 | 41.6 |
| Kelly Green | #4cbb17 | 100.6 | 78.1 | 41.2 | 280.6 | 78.1 | 41.2 | 250.6 | 78.1 | 41.2 | 310.6 | 78.1 | 41.2 |
| Kenyan Copper | #7c1c05 | 11.6 | 92.2 | 25.3 | 191.6 | 92.2 | 25.3 | 161.6 | 92.2 | 25.3 | 221.6 | 92.2 | 25.3 |
| Khaki (Html/Css) (Khaki) | #c3b091 | 37.2 | 29.4 | 66.7 | 217.2 | 29.4 | 66.7 | 187.2 | 29.4 | 66.7 | 247.2 | 29.4 | 66.7 |
| Khaki (X11) (Light Khaki) | #f0e68c | 54 | 76.9 | 74.5 | 234 | 76.9 | 74.5 | 204 | 76.9 | 74.5 | 264 | 76.9 | 74.5 |
| Ku Crimson | #e8000d | 356.6 | 100 | 45.5 | 176.6 | 100 | 45.5 | 146.6 | 100 | 45.5 | 206.6 | 100 | 45.5 |
| La Salle Green | #087830 | 141.4 | 87.5 | 25.1 | 321.4 | 87.5 | 25.1 | 291.4 | 87.5 | 25.1 | 351.4 | 87.5 | 25.1 |
| Languid Lavender | #d6cadd | 277.9 | 21.8 | 82.9 | 97.9 | 21.8 | 82.9 | 67.9 | 21.8 | 82.9 | 127.9 | 21.8 | 82.9 |
| Lapis Lazuli | #26619c | 210 | 60.8 | 38 | 30 | 60.8 | 38 | 0 | 60.8 | 38 | 60 | 60.8 | 38 |
| Laser Lemon | #fefe22 | 60 | 99.1 | 56.5 | 240 | 99.1 | 56.5 | 210 | 99.1 | 56.5 | 270 | 99.1 | 56.5 |
| Laurel Green | #a9ba9d | 95.2 | 17.4 | 67.3 | 275.2 | 17.4 | 67.3 | 245.2 | 17.4 | 67.3 | 305.2 | 17.4 | 67.3 |
| Lava | #cf1020 | 355 | 85.7 | 43.7 | 175 | 85.7 | 43.7 | 145 | 85.7 | 43.7 | 205 | 85.7 | 43.7 |
| Lavender Blue | #CCCCFF | 240 | 100 | 90 | 60 | 100 | 90 | 30 | 100 | 90 | 90 | 100 | 90 |
| Lavender Blush | #fff0f5 | 340 | 100 | 97.1 | 160 | 100 | 97.1 | 130 | 100 | 97.1 | 190 | 100 | 97.1 |
| Lavender (Floral) | #b57edc | 275.1 | 57.3 | 67.8 | 95.1 | 57.3 | 67.8 | 65.1 | 57.3 | 67.8 | 125.1 | 57.3 | 67.8 |
| Lavender Gray | #c4c3d0 | 244.6 | 12.1 | 79 | 64.6 | 12.1 | 79 | 34.6 | 12.1 | 79 | 94.6 | 12.1 | 79 |
| Lavender Indigo | #9457eb | 264.7 | 78.7 | 63.1 | 84.7 | 78.7 | 63.1 | 54.7 | 78.7 | 63.1 | 114.7 | 78.7 | 63.1 |
| Lavender Magenta | #ee82ee | 300 | 76.1 | 72.2 | 120 | 76.1 | 72.2 | 90 | 76.1 | 72.2 | 150 | 76.1 | 72.2 |
| Lavender Mist | #e6e6fa | 240 | 66.7 | 94.1 | 60 | 66.7 | 94.1 | 30 | 66.7 | 94.1 | 90 | 66.7 | 94.1 |
| Lavender Pink | #fbaed2 | 331.9 | 90.6 | 83.3 | 151.9 | 90.6 | 83.3 | 121.9 | 90.6 | 83.3 | 181.9 | 90.6 | 83.3 |
| Lavender Purple | #967bb6 | 267.5 | 28.8 | 59.8 | 87.5 | 28.8 | 59.8 | 57.5 | 28.8 | 59.8 | 117.5 | 28.8 | 59.8 |
| Lavender Rose | #fba0e3 | 315.8 | 91.9 | 80.6 | 135.8 | 91.9 | 80.6 | 105.8 | 91.9 | 80.6 | 165.8 | 91.9 | 80.6 |
| Lavender (Web) | #e6e6fa | 240 | 66.7 | 94.1 | 60 | 66.7 | 94.1 | 30 | 66.7 | 94.1 | 90 | 66.7 | 94.1 |
| Lawn Green | #7cfc00 | 90.5 | 100 | 49.4 | 270.5 | 100 | 49.4 | 240.5 | 100 | 49.4 | 300.5 | 100 | 49.4 |
| Lemon | #fff700 | 58.1 | 100 | 50 | 238.1 | 100 | 50 | 208.1 | 100 | 50 | 268.1 | 100 | 50 |
| Lemon Chiffon | #fffacd | 54 | 100 | 90.2 | 234 | 100 | 90.2 | 204 | 100 | 90.2 | 264 | 100 | 90.2 |
| Lemon Lime | #e3ff00 | 66.6 | 100 | 50 | 246.6 | 100 | 50 | 216.6 | 100 | 50 | 276.6 | 100 | 50 |
| Licorice | #1a1110 | 6 | 23.8 | 8.2 | 186 | 23.8 | 8.2 | 156 | 23.8 | 8.2 | 216 | 23.8 | 8.2 |
| Light Apricot | #fdd5b1 | 28.4 | 95 | 84.3 | 208.4 | 95 | 84.3 | 178.4 | 95 | 84.3 | 238.4 | 95 | 84.3 |
| Light Blue | #add8e6 | 194.7 | 53.3 | 79 | 14.7 | 53.3 | 79 | 344.7 | 53.3 | 79 | 44.7 | 53.3 | 79 |
| Light Brown | #b5651d | 28.4 | 72.4 | 41.2 | 208.4 | 72.4 | 41.2 | 178.4 | 72.4 | 41.2 | 238.4 | 72.4 | 41.2 |
| Light Carmine Pink | #e66771 | 355.3 | 71.8 | 65.3 | 175.3 | 71.8 | 65.3 | 145.3 | 71.8 | 65.3 | 205.3 | 71.8 | 65.3 |
| Light Coral | #f08080 | 0 | 78.9 | 72.2 | 180 | 78.9 | 72.2 | 150 | 78.9 | 72.2 | 210 | 78.9 | 72.2 |
| Light Cornflower Blue | #93ccea | 200.7 | 67.4 | 74.7 | 20.7 | 67.4 | 74.7 | 350.7 | 67.4 | 74.7 | 50.7 | 67.4 | 74.7 |
| Light Crimson | #f56991 | 342.9 | 87.5 | 68.6 | 162.9 | 87.5 | 68.6 | 132.9 | 87.5 | 68.6 | 192.9 | 87.5 | 68.6 |
| Light Cyan | #e0ffff | 180 | 100 | 93.9 | 0 | 100 | 93.9 | 330 | 100 | 93.9 | 30 | 100 | 93.9 |
| Light Fuchsia Pink | #f984ef | 305.1 | 90.7 | 74.7 | 125.1 | 90.7 | 74.7 | 95.1 | 90.7 | 74.7 | 155.1 | 90.7 | 74.7 |
| Light Goldenrod Yellow | #fafad2 | 60 | 80 | 90.2 | 240 | 80 | 90.2 | 210 | 80 | 90.2 | 270 | 80 | 90.2 |
| Light Gray | #d3d3d3 | 0 | 0 | 82.7 | 180 | 0 | 82.7 | 150 | 0 | 82.7 | 210 | 0 | 82.7 |
| Light Green | #90ee90 | 120 | 73.4 | 74.9 | 300 | 73.4 | 74.9 | 270 | 73.4 | 74.9 | 330 | 73.4 | 74.9 |
| Light Khaki | #f0e68c | 54 | 76.9 | 74.5 | 234 | 76.9 | 74.5 | 204 | 76.9 | 74.5 | 264 | 76.9 | 74.5 |
| Light Pastel Purple | #b19cd9 | 260.7 | 44.5 | 73.1 | 80.7 | 44.5 | 73.1 | 50.7 | 44.5 | 73.1 | 110.7 | 44.5 | 73.1 |

HSL Colour Model Values

Figure 40-7

| Name | Input Sensor Colour | | | | Equiluminant Colour | | | Split Complementary Colour 1 | | | Split Complementary Colour 2 | | |
|---|---|---|---|---|---|---|---|---|---|---|---|---|---|
| | Hexidecmal triplet | Hue | Saturation | Lightness | f=MOD(Kn+180,360) | f=same | f=same | f=MOD(Kn+150,360) | f=same | f=same | f=MOD(Kn+210,360) | f=same | f=same |
| | c | h | s% | l% | h | s | l | h | s | l | h | s | l |
| Light Pink | #ffb6c1 | 351 | 100 | 85.7 | 171 | 100 | 85.7 | 141 | 100 | 85.7 | 201 | 100 | 85.7 |
| Light Red Ochre | #e97451 | 13.8 | 77.6 | 61.6 | 193.8 | 77.6 | 61.6 | 163.8 | 77.6 | 61.6 | 223.8 | 77.6 | 61.6 |
| Light Salmon | #ffa07a | 17.1 | 100 | 73.9 | 197.1 | 100 | 73.9 | 167.1 | 100 | 73.9 | 227.1 | 100 | 73.9 |
| Light Salmon Pink | #ff9999 | 0 | 100 | 80 | 180 | 100 | 80 | 150 | 100 | 80 | 210 | 100 | 80 |
| Light Sea Green | #20b2aa | 176.7 | 69.5 | 41.2 | 356.7 | 69.5 | 41.2 | 326.7 | 69.5 | 41.2 | 26.7 | 69.5 | 41.2 |
| Light Sky Blue | #87cefa | 203 | 92 | 75.5 | 23 | 92 | 75.5 | 353 | 92 | 75.5 | 53 | 92 | 75.5 |
| Light Slate Gray | #778899 | 210 | 14.3 | 53.3 | 30 | 14.3 | 53.3 | 0 | 14.3 | 53.3 | 60 | 14.3 | 53.3 |
| Light Taupe | #b38b6d | 25.7 | 31.5 | 56.5 | 205.7 | 31.5 | 56.5 | 175.7 | 31.5 | 56.5 | 235.7 | 31.5 | 56.5 |
| Light Thulian Pink | #e68fac | 340 | 63.5 | 73.1 | 160 | 63.5 | 73.1 | 130 | 63.5 | 73.1 | 190 | 63.5 | 73.1 |
| Light Yellow | #ffffe0 | 60 | 100 | 93.9 | 240 | 100 | 93.9 | 210 | 100 | 93.9 | 270 | 100 | 93.9 |
| Lilac | #c8a2c8 | 300 | 25.7 | 71 | 120 | 25.7 | 71 | 90 | 25.7 | 71 | 150 | 25.7 | 71 |
| Lime (Color Wheel) | #bfff00 | 75.1 | 100 | 50 | 255.1 | 100 | 50 | 225.1 | 100 | 50 | 285.1 | 100 | 50 |
| Lime Green | #32cd32 | 120 | 60.8 | 50 | 300 | 60.8 | 50 | 270 | 60.8 | 50 | 330 | 60.8 | 50 |
| Lime (Web) (X11 Green) | #00ff00 | 120 | 100 | 50 | 300 | 100 | 50 | 270 | 100 | 50 | 330 | 100 | 50 |
| Limerick | #9dc209 | 72 | 91.1 | 39.8 | 252 | 91.1 | 39.8 | 222 | 91.1 | 39.8 | 282 | 91.1 | 39.8 |
| Lincoln Green | #195905 | 105.7 | 89.4 | 18.4 | 285.7 | 89.4 | 18.4 | 255.7 | 89.4 | 18.4 | 315.7 | 89.4 | 18.4 |
| Linen | #faf0e6 | 30 | 66.7 | 94.1 | 210 | 66.7 | 94.1 | 180 | 66.7 | 94.1 | 240 | 66.7 | 94.1 |
| Lion | #c19a6b | 32.8 | 41 | 58.8 | 212.8 | 41 | 58.8 | 182.8 | 41 | 58.8 | 242.8 | 41 | 58.8 |
| Little Boy Blue | #6ca0dc | 212.1 | 61.5 | 64.3 | 32.1 | 61.5 | 64.3 | 2.1 | 61.5 | 64.3 | 62.1 | 61.5 | 64.3 |
| Liver | #534b4f | 330 | 5.1 | 31 | 150 | 5.1 | 31 | 120 | 5.1 | 31 | 180 | 5.1 | 31 |
| Lust | #e62020 | 0 | 79.8 | 51.4 | 180 | 79.8 | 51.4 | 150 | 79.8 | 51.4 | 210 | 79.8 | 51.4 |
| Magenta | #ff00ff | 300 | 100 | 50 | 120 | 100 | 50 | 90 | 100 | 50 | 150 | 100 | 50 |
| Magenta (Dye) | #ca1f7b | 327.7 | 73.4 | 45.7 | 147.7 | 73.4 | 45.7 | 117.7 | 73.4 | 45.7 | 177.7 | 73.4 | 45.7 |
| Magenta (Process) | #ff0090 | 326.1 | 100 | 50 | 146.1 | 100 | 50 | 116.1 | 100 | 50 | 176.1 | 100 | 50 |
| Magic Mint | #aaf0d1 | 153.4 | 70 | 80.4 | 333.4 | 70 | 80.4 | 303.4 | 70 | 80.4 | 3.4 | 70 | 80.4 |
| Magnolia | #f8f4ff | 261.8 | 100 | 97.8 | 81.8 | 100 | 97.8 | 51.8 | 100 | 97.8 | 111.8 | 100 | 97.8 |
| Mahogany | #c04000 | 20 | 100 | 37.6 | 200 | 100 | 37.6 | 170 | 100 | 37.6 | 230 | 100 | 37.6 |
| Maize | #fbec5d | 54.3 | 95.2 | 67.5 | 234.3 | 95.2 | 67.5 | 204.3 | 95.2 | 67.5 | 264.3 | 95.2 | 67.5 |
| Majorelle Blue | #6050dc | 246.9 | 66.7 | 58.8 | 66.9 | 66.7 | 58.8 | 36.9 | 66.7 | 58.8 | 96.9 | 66.7 | 58.8 |
| Malachite | #0bda51 | 140.3 | 90.4 | 44.9 | 320.3 | 90.4 | 44.9 | 290.3 | 90.4 | 44.9 | 350.3 | 90.4 | 44.9 |
| Manatee | #979aaa | 230.5 | 10.1 | 62.9 | 50.5 | 10.1 | 62.9 | 20.5 | 10.1 | 62.9 | 80.5 | 10.1 | 62.9 |
| Mango Tango | #ff8243 | 20.1 | 100 | 63.1 | 200.1 | 100 | 63.1 | 170.1 | 100 | 63.1 | 230.1 | 100 | 63.1 |
| Mantis | #74c365 | 110.4 | 43.9 | 58 | 290.4 | 43.9 | 58 | 260.4 | 43.9 | 58 | 320.4 | 43.9 | 58 |
| Mardi Gras | #880085 | 301.3 | 100 | 26.7 | 121.3 | 100 | 26.7 | 91.3 | 100 | 26.7 | 151.3 | 100 | 26.7 |
| Maroon (Crayola) | #c32148 | 345.6 | 71.1 | 44.7 | 165.6 | 71.1 | 44.7 | 135.6 | 71.1 | 44.7 | 195.6 | 71.1 | 44.7 |
| Maroon (Html/Css) | #800000 | 0 | 100 | 25.1 | 180 | 100 | 25.1 | 150 | 100 | 25.1 | 210 | 100 | 25.1 |
| Maroon (X11) | #b03060 | 337.5 | 57.1 | 43.9 | 157.5 | 57.1 | 43.9 | 127.5 | 57.1 | 43.9 | 187.5 | 57.1 | 43.9 |
| Mauve | #e0b0ff | 276.5 | 100 | 84.5 | 96.5 | 100 | 84.5 | 66.5 | 100 | 84.5 | 126.5 | 100 | 84.5 |
| Mauve Taupe | #915f6d | 343.2 | 20.8 | 47.1 | 163.2 | 20.8 | 47.1 | 133.2 | 20.8 | 47.1 | 193.2 | 20.8 | 47.1 |
| Mauvelous | #ef98aa | 347.6 | 73.1 | 76.7 | 167.6 | 73.1 | 76.7 | 137.6 | 73.1 | 76.7 | 197.6 | 73.1 | 76.7 |
| Maya Blue | #73c2fb | 205.1 | 94.4 | 71.8 | 25.1 | 94.4 | 71.8 | 355.1 | 94.4 | 71.8 | 55.1 | 94.4 | 71.8 |
| Meat Brown | #e5b73b | 43.8 | 76.6 | 56.5 | 223.8 | 76.6 | 56.5 | 193.8 | 76.6 | 56.5 | 253.8 | 76.6 | 56.5 |
| Medium Aquamarine | #66ddaa | 154.3 | 63.6 | 63.3 | 334.3 | 63.6 | 63.3 | 304.3 | 63.6 | 63.3 | 4.3 | 63.6 | 63.3 |
| Medium Blue | #0000cd | 240 | 100 | 40.2 | 60 | 100 | 40.2 | 30 | 100 | 40.2 | 90 | 100 | 40.2 |
| Medium Candy Apple Red | #e2062c | 349.6 | 94.8 | 45.5 | 169.6 | 94.8 | 45.5 | 139.6 | 94.8 | 45.5 | 199.6 | 94.8 | 45.5 |
| Medium Carmine | #af4035 | 5.4 | 53.5 | 44.7 | 185.4 | 53.5 | 44.7 | 155.4 | 53.5 | 44.7 | 215.4 | 53.5 | 44.7 |
| Medium Champagne | #f3e5ab | 48.3 | 75 | 81.2 | 228.3 | 75 | 81.2 | 198.3 | 75 | 81.2 | 258.3 | 75 | 81.2 |
| Medium Electric Blue | #035096 | 208.6 | 96.1 | 30 | 28.6 | 96.1 | 30 | 358.6 | 96.1 | 30 | 58.6 | 96.1 | 30 |
| Medium Jungle Green | #1c352d | 160.8 | 30.9 | 15.9 | 340.8 | 30.9 | 15.9 | 310.8 | 30.9 | 15.9 | 10.8 | 30.9 | 15.9 |
| Medium Lavender Magenta | #dda0dd | 300 | 47.3 | 74.7 | 120 | 47.3 | 74.7 | 90 | 47.3 | 74.7 | 150 | 47.3 | 74.7 |
| Medium Orchid | #ba55d3 | 288.1 | 58.9 | 58 | 108.1 | 58.9 | 58 | 78.1 | 58.9 | 58 | 138.1 | 58.9 | 58 |
| Medium Persian Blue | #0067a5 | 202.5 | 100 | 32.4 | 22.5 | 100 | 32.4 | 352.5 | 100 | 32.4 | 52.5 | 100 | 32.4 |
| Medium Purple | #9370db | 259.6 | 59.8 | 64.9 | 79.6 | 59.8 | 64.9 | 49.6 | 59.8 | 64.9 | 109.6 | 59.8 | 64.9 |
| Medium Red-Violet | #bb3385 | 323.8 | 57.1 | 46.7 | 143.8 | 57.1 | 46.7 | 113.8 | 57.1 | 46.7 | 173.8 | 57.1 | 46.7 |
| Medium Ruby | #aaa069 | 336.8 | 45.3 | 45.9 | 156.8 | 45.3 | 45.9 | 126.8 | 45.3 | 45.9 | 186.8 | 45.3 | 45.9 |
| Medium Sea Green | #3cb371 | 146.7 | 49.8 | 46.9 | 326.7 | 49.8 | 46.9 | 296.7 | 49.8 | 46.9 | 356.7 | 49.8 | 46.9 |
| Medium Slate Blue | #7b68ee | 248.5 | 79.8 | 67.1 | 68.5 | 79.8 | 67.1 | 38.5 | 79.8 | 67.1 | 98.5 | 79.8 | 67.1 |
| Medium Spring Bud | #c9dc87 | 73.4 | 54.8 | 69.6 | 253.4 | 54.8 | 69.6 | 223.4 | 54.8 | 69.6 | 283.4 | 54.8 | 69.6 |
| Medium Spring Green | #00fa9a | 157 | 100 | 49 | 337 | 100 | 49 | 307 | 100 | 49 | 7 | 100 | 49 |
| Medium Taupe | #674c47 | 9.4 | 18.4 | 34.1 | 189.4 | 18.4 | 34.1 | 159.4 | 18.4 | 34.1 | 219.4 | 18.4 | 34.1 |
| Medium Turquoise | #48d1cc | 177.8 | 59.8 | 55.1 | 357.8 | 59.8 | 55.1 | 327.8 | 59.8 | 55.1 | 27.8 | 59.8 | 55.1 |
| Medium Tuscan Red | #79443b | 8.7 | 34.4 | 35.3 | 188.7 | 34.4 | 35.3 | 158.7 | 34.4 | 35.3 | 218.7 | 34.4 | 35.3 |
| Medium Vermilion | #d9603b | 14.1 | 67.5 | 54.1 | 194.1 | 67.5 | 54.1 | 164.1 | 67.5 | 54.1 | 224.1 | 67.5 | 54.1 |
| Medium Violet-Red | #c71585 | 322.2 | 80.9 | 43.1 | 142.2 | 80.9 | 43.1 | 112.2 | 80.9 | 43.1 | 172.2 | 80.9 | 43.1 |
| Mellow Apricot | #f8b878 | 30 | 90.1 | 72.2 | 210 | 90.1 | 72.2 | 180 | 90.1 | 72.2 | 240 | 90.1 | 72.2 |
| Mellow Yellow | #f8de7e | 47.2 | 89.7 | 73.3 | 227.2 | 89.7 | 73.3 | 197.2 | 89.7 | 73.3 | 257.2 | 89.7 | 73.3 |
| Melon | #fdbcb4 | 6.6 | 94.8 | 84.9 | 186.6 | 94.8 | 84.9 | 156.6 | 94.8 | 84.9 | 216.6 | 94.8 | 84.9 |
| Midnight Blue | #191970 | 240 | 63.5 | 26.9 | 60 | 63.5 | 26.9 | 30 | 63.5 | 26.9 | 90 | 63.5 | 26.9 |
| Midnight Green (Eagle Green) | #004953 | 187.2 | 100 | 16.3 | 7.2 | 100 | 16.3 | 337.2 | 100 | 16.3 | 37.2 | 100 | 16.3 |
| Mikado Yellow | #ffc40c | 45.4 | 100 | 52.4 | 225.4 | 100 | 52.4 | 195.4 | 100 | 52.4 | 255.4 | 100 | 52.4 |
| Mint | #3eb489 | 158.1 | 48.8 | 47.5 | 338.1 | 48.8 | 47.5 | 308.1 | 48.8 | 47.5 | 8.1 | 48.8 | 47.5 |
| Mint Cream | #f5fffa | 150 | 100 | 98 | 330 | 100 | 98 | 300 | 100 | 98 | 0 | 100 | 98 |
| Mint Green | #98ff98 | 120 | 100 | 79.8 | 300 | 100 | 79.8 | 270 | 100 | 79.8 | 330 | 100 | 79.8 |

HSL Colour Model Values        Figure 40-8

| | Input Sensor Colour | | | | Equiluminant Colour | | | Split Complementary Colour 1 | | | Split Complementary Colour 2 | | |
|---|---|---|---|---|---|---|---|---|---|---|---|---|---|
| | Hexidecmal triplet | Hue | Saturation | Lightness | f=MOD(Kn +180,360) | f=same | f=same | f=MOD(Kn +150,360) | f=same | f=same | f=MOD(Kn +210,360) | f=same | f=same |
| Name | c | h | s% | l% | h | s | l | h | s | l | h | s | l |
| Misty Rose | #ffe4e1 | 6 | 100 | 94.1 | 186 | 100 | 94.1 | 156 | 100 | 94.1 | 216 | 100 | 94.1 |
| Moccasin | #faebd7 | 34.3 | 77.8 | 91.2 | 214.3 | 77.8 | 91.2 | 184.3 | 77.8 | 91.2 | 244.3 | 77.8 | 91.2 |
| Mode Beige | #967117 | 42.5 | 73.4 | 33.9 | 222.5 | 73.4 | 33.9 | 192.5 | 73.4 | 33.9 | 252.5 | 73.4 | 33.9 |
| Moonstone Blue | #73a9c2 | 199 | 39.3 | 60.6 | 19 | 39.3 | 60.6 | 349 | 39.3 | 60.6 | 49 | 39.3 | 60.6 |
| Mordant Red 19 | #ae0c00 | 4.1 | 100 | 34.1 | 184.1 | 100 | 34.1 | 154.1 | 100 | 34.1 | 214.1 | 100 | 34.1 |
| Moss Green | #addfad | 120 | 43.9 | 77.6 | 300 | 43.9 | 77.6 | 270 | 43.9 | 77.6 | 330 | 43.9 | 77.6 |
| Mountain Meadow | #30ba8f | 161.3 | 59 | 45.9 | 341.3 | 59 | 45.9 | 311.3 | 59 | 45.9 | 11.3 | 59 | 45.9 |
| Mountbatten Pink | #997a8d | 323.2 | 13.2 | 53.9 | 143.2 | 13.2 | 53.9 | 113.2 | 13.2 | 53.9 | 173.2 | 13.2 | 53.9 |
| Msu Green | #18453b | 166.7 | 48.4 | 18.2 | 346.7 | 48.4 | 18.2 | 316.7 | 48.4 | 18.2 | 16.7 | 48.4 | 18.2 |
| Mulberry | #c54b8c | 328 | 51.3 | 53.3 | 148 | 51.3 | 53.3 | 118 | 51.3 | 53.3 | 178 | 51.3 | 53.3 |
| Mustard | #ffdb58 | 47.1 | 100 | 67.3 | 227.1 | 100 | 67.3 | 197.1 | 100 | 67.3 | 257.1 | 100 | 67.3 |
| Myrtle | #21421e | 115 | 37.5 | 18.8 | 295 | 37.5 | 18.8 | 265 | 37.5 | 18.8 | 325 | 37.5 | 18.8 |
| Nadeshiko Pink | #f6adc6 | 339.5 | 80.2 | 82.2 | 159.5 | 80.2 | 82.2 | 129.5 | 80.2 | 82.2 | 189.5 | 80.2 | 82.2 |
| Napier Green | #2a8000 | 100.3 | 100 | 25.1 | 280.3 | 100 | 25.1 | 250.3 | 100 | 25.1 | 310.3 | 100 | 25.1 |
| Naples Yellow | #fada5e | 47.7 | 94 | 67.5 | 227.7 | 94 | 67.5 | 197.7 | 94 | 67.5 | 257.7 | 94 | 67.5 |
| Navajo White | #ffdead | 35.9 | 100 | 83.9 | 215.9 | 100 | 83.9 | 185.9 | 100 | 83.9 | 245.9 | 100 | 83.9 |
| Navy Blue | #000080 | 240 | 100 | 25.1 | 60 | 100 | 25.1 | 30 | 100 | 25.1 | 90 | 100 | 25.1 |
| Neon Carrot | #ffa343 | 30.6 | 100 | 63.1 | 210.6 | 100 | 63.1 | 180.6 | 100 | 63.1 | 240.6 | 100 | 63.1 |
| Neon Fuchsia | #fe4164 | 348.9 | 99 | 62.5 | 168.9 | 99 | 62.5 | 138.9 | 99 | 62.5 | 198.9 | 99 | 62.5 |
| Neon Green | #39ff14 | 110.6 | 100 | 53.9 | 290.6 | 100 | 53.9 | 260.6 | 100 | 53.9 | 320.6 | 100 | 53.9 |
| New York Pink | #d7837f | 2.7 | 52.4 | 67.1 | 182.7 | 52.4 | 67.1 | 152.7 | 52.4 | 67.1 | 212.7 | 52.4 | 67.1 |
| Non-Photo Blue | #a4ded | 193.2 | 67 | 78.6 | 13.2 | 67 | 78.6 | 343.2 | 67 | 78.6 | 43.2 | 67 | 78.6 |
| North Texas Green | #059033 | 139.9 | 93.3 | 29.2 | 319.9 | 93.3 | 29.2 | 289.9 | 93.3 | 29.2 | 349.9 | 93.3 | 29.2 |
| Ocean Boat Blue | #0077be | 202.4 | 100 | 37.3 | 22.4 | 100 | 37.3 | 352.4 | 100 | 37.3 | 52.4 | 100 | 37.3 |
| Ochre | #cc7722 | 30 | 71.4 | 46.7 | 210 | 71.4 | 46.7 | 180 | 71.4 | 46.7 | 240 | 71.4 | 46.7 |
| Office Green | #008000 | 120 | 100 | 25.1 | 300 | 100 | 25.1 | 270 | 100 | 25.1 | 330 | 100 | 25.1 |
| Old Gold | #cfb53b | 49.5 | 60.7 | 52.2 | 229.5 | 60.7 | 52.2 | 199.5 | 60.7 | 52.2 | 259.5 | 60.7 | 52.2 |
| Old Lace | #fdf5e6 | 39.1 | 85.2 | 94.7 | 219.1 | 85.2 | 94.7 | 189.1 | 85.2 | 94.7 | 249.1 | 85.2 | 94.7 |
| Old Lavender | #796878 | 303.5 | 7.6 | 44.1 | 123.5 | 7.6 | 44.1 | 93.5 | 7.6 | 44.1 | 153.5 | 7.6 | 44.1 |
| Old Mauve | #673147 | 335.6 | 35.5 | 29.8 | 155.6 | 35.5 | 29.8 | 125.6 | 35.5 | 29.8 | 185.6 | 35.5 | 29.8 |
| Old Rose | #c08081 | 359.1 | 33.7 | 62.7 | 179.1 | 33.7 | 62.7 | 149.1 | 33.7 | 62.7 | 209.1 | 33.7 | 62.7 |
| Olive | #808000 | 60 | 100 | 25.1 | 240 | 100 | 25.1 | 210 | 100 | 25.1 | 270 | 100 | 25.1 |
| Olive Drab #7 | #3c341f | 43.4 | 31.9 | 17.8 | 223.4 | 31.9 | 17.8 | 193.4 | 31.9 | 17.8 | 253.4 | 31.9 | 17.8 |
| Olive Drab (Web) (Olive Drab #3) | #6b8e23 | 79.6 | 60.5 | 34.7 | 259.6 | 60.5 | 34.7 | 229.6 | 60.5 | 34.7 | 289.6 | 60.5 | 34.7 |
| Olivine | #9ab973 | 86.6 | 33.3 | 58.8 | 266.6 | 33.3 | 58.8 | 236.6 | 33.3 | 58.8 | 296.6 | 33.3 | 58.8 |
| Onyx | #353839 | 195 | 3.6 | 21.6 | 15 | 3.6 | 21.6 | 345 | 3.6 | 21.6 | 45 | 3.6 | 21.6 |
| Opera Mauve | #b784a7 | 318.8 | 26.2 | 61.8 | 138.8 | 26.2 | 61.8 | 108.8 | 26.2 | 61.8 | 168.8 | 26.2 | 61.8 |
| Orange (Color Wheel) | #ff7f00 | 29.9 | 100 | 500 | 209.9 | 100 | 500 | 179.9 | 100 | 500 | 239.9 | 100 | 500 |
| Orange Peel | #ff9f00 | 37.4 | 100 | 50 | 217.4 | 100 | 50 | 187.4 | 100 | 50 | 247.4 | 100 | 50 |
| Orange-Red | #ff4500 | 16.2 | 100 | 50 | 196.2 | 100 | 50 | 166.2 | 100 | 50 | 226.2 | 100 | 50 |
| Orange (Ryb) | #fb9902 | 36.4 | 98.4 | 49.6 | 216.4 | 98.4 | 49.6 | 186.4 | 98.4 | 49.6 | 246.4 | 98.4 | 49.6 |
| Orange (Web Color) | #ffa500 | 38.8 | 100 | 50 | 218.8 | 100 | 50 | 188.8 | 100 | 50 | 248.8 | 100 | 50 |
| Orchid | #da70d6 | 302.3 | 58.9 | 64.7 | 122.3 | 58.9 | 64.7 | 92.3 | 58.9 | 64.7 | 152.3 | 58.9 | 64.7 |
| Otter Brown | #654321 | 30 | 50.7 | 26.3 | 210 | 50.7 | 26.3 | 180 | 50.7 | 26.3 | 240 | 50.7 | 26.3 |
| Ou Crimson Red | #990000 | 0 | 100 | 30 | 180 | 100 | 30 | 150 | 100 | 30 | 210 | 100 | 30 |
| Outer Space | #414a4c | 190.9 | 7.8 | 27.6 | 10.9 | 7.8 | 27.6 | 340.9 | 7.8 | 27.6 | 40.9 | 7.8 | 27.6 |
| Outrageous Orange | #ff6e4a | 11.9 | 100 | 64.5 | 191.9 | 100 | 64.5 | 161.9 | 100 | 64.5 | 221.9 | 100 | 64.5 |
| Oxford Blue | #002147 | 212.1 | 100 | 13.9 | 32.1 | 100 | 13.9 | 2.1 | 100 | 13.9 | 62.1 | 100 | 13.9 |
| Pakistan Green | #006600 | 120 | 100 | 20 | 300 | 100 | 20 | 270 | 100 | 20 | 330 | 100 | 20 |
| Palatinate Blue | #273be2 | 233.6 | 76.3 | 52 | 53.6 | 76.3 | 52 | 23.6 | 76.3 | 52 | 83.6 | 76.3 | 52 |
| Palatinate Purple | #682860 | 307.5 | 44.4 | 28.2 | 127.5 | 44.4 | 28.2 | 97.5 | 44.4 | 28.2 | 157.5 | 44.4 | 28.2 |
| Pale Aqua | #bcd4e6 | 205.7 | 45.7 | 82 | 25.7 | 45.7 | 82 | 355.7 | 45.7 | 82 | 55.7 | 45.7 | 82 |
| Pale Blue | #afeeee | 180 | 64.9 | 81 | 0 | 64.9 | 81 | 330 | 64.9 | 81 | 30 | 64.9 | 81 |
| Pale Brown | #987654 | 30 | 28.8 | 46.3 | 210 | 28.8 | 46.3 | 180 | 28.8 | 46.3 | 240 | 28.8 | 46.3 |
| Pale Carmine | #af4035 | 5.4 | 53.5 | 44.7 | 185.4 | 53.5 | 44.7 | 155.4 | 53.5 | 44.7 | 215.4 | 53.5 | 44.7 |
| Pale Cerulean | #9bc4e2 | 205.4 | 55 | 74.7 | 25.4 | 55 | 74.7 | 355.4 | 55 | 74.7 | 55.4 | 55 | 74.7 |
| Pale Chestnut | #ddadaf | 357.5 | 41.4 | 77.3 | 177.5 | 41.4 | 77.3 | 147.5 | 41.4 | 77.3 | 207.5 | 41.4 | 77.3 |
| Pale Copper | #da8a67 | 18.3 | 60.8 | 62.9 | 198.3 | 60.8 | 62.9 | 168.3 | 60.8 | 62.9 | 228.3 | 60.8 | 62.9 |
| Pale Cornflower Blue | #abcdef | 210 | 68 | 80.4 | 30 | 68 | 80.4 | 0 | 68 | 80.4 | 60 | 68 | 80.4 |
| Pale Gold | #eebe8a | 33.9 | 64.8 | 72.2 | 213.9 | 64.8 | 72.2 | 183.9 | 64.8 | 72.2 | 243.9 | 64.8 | 72.2 |
| Pale Goldenrod | #eee8aa | 54.7 | 66.7 | 80 | 234.7 | 66.7 | 80 | 204.7 | 66.7 | 80 | 264.7 | 66.7 | 80 |
| Pale Green | #98fb98 | 120 | 92.5 | 79 | 300 | 92.5 | 79 | 270 | 92.5 | 79 | 330 | 92.5 | 79 |
| Pale Lavender | #dcd0ff | 255.3 | 100 | 90.8 | 75.3 | 100 | 90.8 | 45.3 | 100 | 90.8 | 105.3 | 100 | 90.8 |
| Pale Magenta | #f984e5 | 310.3 | 90.7 | 74.7 | 130.3 | 90.7 | 74.7 | 100.3 | 90.7 | 74.7 | 160.3 | 90.7 | 74.7 |
| Pale Pink | #fadadd | 354.4 | 76.2 | 91.8 | 174.4 | 76.2 | 91.8 | 144.4 | 76.2 | 91.8 | 204.4 | 76.2 | 91.8 |
| Pale Plum | #dda0dd | 300 | 47.3 | 74.7 | 120 | 47.3 | 74.7 | 90 | 47.3 | 74.7 | 150 | 47.3 | 74.7 |
| Pale Red-Violet | #db7093 | 340.4 | 59.8 | 64.9 | 160.4 | 59.8 | 64.9 | 130.4 | 59.8 | 64.9 | 190.4 | 59.8 | 64.9 |
| Pale Robin Egg Blue | #96ded1 | 169.2 | 52.2 | 72.9 | 349.2 | 52.2 | 72.9 | 319.2 | 52.2 | 72.9 | 19.2 | 52.2 | 72.9 |
| Pale Silver | #c9c0bb | 21.4 | 11.5 | 76.1 | 201.4 | 11.5 | 76.1 | 171.4 | 11.5 | 76.1 | 231.4 | 11.5 | 76.1 |
| Pale Spring Bud | #ecebbd | 58.7 | 55.3 | 83.3 | 238.7 | 55.3 | 83.3 | 208.7 | 55.3 | 83.3 | 268.7 | 55.3 | 83.3 |
| Pale Taupe | #bc987e | 25.2 | 31.6 | 61.6 | 205.2 | 31.6 | 61.6 | 175.2 | 31.6 | 61.6 | 235.2 | 31.6 | 61.6 |
| Pale Violet-Red | #db7093 | 340.4 | 59.8 | 64.9 | 160.4 | 59.8 | 64.9 | 130.4 | 59.8 | 64.9 | 190.4 | 59.8 | 64.9 |
| Pansy Purple | #78184a | 328.8 | 66.7 | 28.2 | 148.8 | 66.7 | 28.2 | 118.8 | 66.7 | 28.2 | 178.8 | 66.7 | 28.2 |

HSL Colour Model Values      Figure 40-9

| | Input Sensor Colour | | | | Equiluminant Colour | | | Split Complementary Colour 1 | | | Split Complementary Colour 2 | | |
|---|---|---|---|---|---|---|---|---|---|---|---|---|---|
| | Hexidecmal triplet | Hue | Saturation | Lightness | f=MOD(Kn+180,360) | f=same | f=same | f=MOD(Kn+150,360) | f=same | f=same | f=MOD(Kn+210,360) | f=same | f=same |
| Name | c | h | s% | l% | h | s | l | h | s | l | h | s | l |
| Papaya Whip | #ffefd5 | 37.1 | 100 | 91.8 | 217.1 | 100 | 91.8 | 187.1 | 100 | 91.8 | 247.1 | 100 | 91.8 |
| Paris Green | #50c878 | 140 | 52.2 | 54.9 | 320 | 52.2 | 54.9 | 290 | 52.2 | 54.9 | 350 | 52.2 | 54.9 |
| Pastel Blue | #aec6cf | 196.4 | 25.6 | 74.7 | 16.4 | 25.6 | 74.7 | 346.4 | 25.6 | 74.7 | 46.4 | 25.6 | 74.7 |
| Pastel Brown | #836953 | 27.5 | 22.4 | 42 | 207.5 | 22.4 | 42 | 177.5 | 22.4 | 42 | 237.5 | 22.4 | 42 |
| Pastel Gray | #cfcfc4 | 60 | 10.3 | 79 | 240 | 10.3 | 79 | 210 | 10.3 | 79 | 270 | 10.3 | 79 |
| Pastel Green | #77dd77 | 120 | 60 | 66.7 | 300 | 60 | 66.7 | 270 | 60 | 66.7 | 330 | 60 | 66.7 |
| Pastel Magenta | #f49ac2 | 333.3 | 80.4 | 78 | 153.3 | 80.4 | 78 | 123.3 | 80.4 | 78 | 183.3 | 80.4 | 78 |
| Pastel Orange | #ffb347 | 35.2 | 100 | 63.9 | 215.2 | 100 | 63.9 | 185.2 | 100 | 63.9 | 245.2 | 100 | 63.9 |
| Pastel Pink | #dea5a4 | 1 | 46.8 | 75.7 | 181 | 46.8 | 75.7 | 151 | 46.8 | 75.7 | 211 | 46.8 | 75.7 |
| Pastel Purple | #b39eb5 | 294.8 | 13.5 | 66.5 | 114.8 | 13.5 | 66.5 | 84.8 | 13.5 | 66.5 | 144.8 | 13.5 | 66.5 |
| Pastel Red | #ff6961 | 3 | 100 | 69 | 183 | 100 | 69 | 153 | 100 | 69 | 213 | 100 | 69 |
| Pastel Violet | #cb99c9 | 302.4 | 32.5 | 69.8 | 122.4 | 32.5 | 69.8 | 92.4 | 32.5 | 69.8 | 152.4 | 32.5 | 69.8 |
| Pastel Yellow | #fdfd96 | 60 | 96.3 | 79 | 240 | 96.3 | 79 | 210 | 96.3 | 79 | 270 | 96.3 | 79 |
| Patriarch | #800080 | 300 | 100 | 25.1 | 120 | 100 | 25.1 | 90 | 100 | 25.1 | 150 | 100 | 25.1 |
| Payne'S Grey | #536878 | 205.9 | 18.2 | 39.8 | 25.9 | 18.2 | 39.8 | 355.9 | 18.2 | 39.8 | 55.9 | 18.2 | 39.8 |
| Peach | #ffe5b4 | 39.2 | 100 | 85.3 | 219.2 | 100 | 85.3 | 189.2 | 100 | 85.3 | 249.2 | 100 | 85.3 |
| Peach (Crayola) | #ffcba4 | 25.7 | 100 | 82.2 | 205.7 | 100 | 82.2 | 175.7 | 100 | 82.2 | 235.7 | 100 | 82.2 |
| Peach-Orange | #ffcc99 | 30 | 100 | 80 | 210 | 100 | 80 | 180 | 100 | 80 | 240 | 100 | 80 |
| Peach Puff | #ffdab9 | 28.3 | 100 | 86.3 | 208.3 | 100 | 86.3 | 178.3 | 100 | 86.3 | 238.3 | 100 | 86.3 |
| Peach-Yellow | #fadfad | 39 | 88.5 | 82.9 | 219 | 88.5 | 82.9 | 189 | 88.5 | 82.9 | 249 | 88.5 | 82.9 |
| Pear | #d1e231 | 65.8 | 75.3 | 53.9 | 245.8 | 75.3 | 53.9 | 215.8 | 75.3 | 53.9 | 275.8 | 75.3 | 53.9 |
| Pearl | #eae0c8 | 42.4 | 44.7 | 85.1 | 222.4 | 44.7 | 85.1 | 192.4 | 44.7 | 85.1 | 252.4 | 44.7 | 85.1 |
| Pearl Aqua | #88d8c0 | 162 | 50.6 | 69 | 342 | 50.6 | 69 | 312 | 50.6 | 69 | 12 | 50.6 | 69 |
| Pearly Purple | #b768a2 | 315.9 | 35.4 | 56.3 | 135.9 | 35.4 | 56.3 | 105.9 | 35.4 | 56.3 | 165.9 | 35.4 | 56.3 |
| Peridot | #e6e200 | 59 | 100 | 45.1 | 239 | 100 | 45.1 | 209 | 100 | 45.1 | 269 | 100 | 45.1 |
| Periwinkle | #ccccff | 240 | 100 | 90 | 60 | 100 | 90 | 30 | 100 | 90 | 90 | 100 | 90 |
| Persian Blue | #1c39bb | 229.1 | 74 | 42.2 | 49.1 | 74 | 42.2 | 19.1 | 74 | 42.2 | 79.1 | 74 | 42.2 |
| Persian Green | #00a693 | 173.1 | 100 | 32.5 | 353.1 | 100 | 32.5 | 323.1 | 100 | 32.5 | 23.1 | 100 | 32.5 |
| Persian Indigo | #32127a | 258.5 | 74.3 | 27.5 | 78.5 | 74.3 | 27.5 | 48.5 | 74.3 | 27.5 | 108.5 | 74.3 | 27.5 |
| Persian Orange | #d99058 | 26 | 62.9 | 59.8 | 206 | 62.9 | 59.8 | 176 | 62.9 | 59.8 | 236 | 62.9 | 59.8 |
| Persian Pink | #f77fbe | 328.5 | 88.2 | 73.3 | 148.5 | 88.2 | 73.3 | 118.5 | 88.2 | 73.3 | 178.5 | 88.2 | 73.3 |
| Persian Plum | #701c1c | 0 | 60 | 27.5 | 180 | 60 | 27.5 | 150 | 60 | 27.5 | 210 | 60 | 27.5 |
| Persian Red | #cc3333 | 0 | 60 | 50 | 180 | 60 | 50 | 150 | 60 | 50 | 210 | 60 | 50 |
| Persian Rose | #fe28a2 | 325.8 | 99.1 | 57.6 | 145.8 | 99.1 | 57.6 | 115.8 | 99.1 | 57.6 | 175.8 | 99.1 | 57.6 |
| Persimmon | #ec5800 | 22.4 | 100 | 46.3 | 202.4 | 100 | 46.3 | 172.4 | 100 | 46.3 | 232.4 | 100 | 46.3 |
| Peru | #cd853f | 29.6 | 58.7 | 52.5 | 209.6 | 58.7 | 52.5 | 179.6 | 58.7 | 52.5 | 239.6 | 58.7 | 52.5 |
| Phlox | #df00ff | 292.5 | 100 | 50 | 112.5 | 100 | 50 | 82.5 | 100 | 50 | 142.5 | 100 | 50 |
| Phthalo Blue | #000f89 | 233.4 | 100 | 26.9 | 53.4 | 100 | 26.9 | 23.4 | 100 | 26.9 | 83.4 | 100 | 26.9 |
| Phthalo Green | #123524 | 150.9 | 49.3 | 13.9 | 330.9 | 49.3 | 13.9 | 300.9 | 49.3 | 13.9 | 0.9 | 49.3 | 13.9 |
| Piggy Pink | #fddde6 | 343.1 | 88.9 | 92.9 | 163.1 | 88.9 | 92.9 | 133.1 | 88.9 | 92.9 | 193.1 | 88.9 | 92.9 |
| Pine Green | #01796f | 175 | 98.4 | 23.9 | 355 | 98.4 | 23.9 | 325 | 98.4 | 23.9 | 25 | 98.4 | 23.9 |
| Pink | #ffc0cb | 349.5 | 100 | 87.6 | 169.5 | 100 | 87.6 | 139.5 | 100 | 87.6 | 199.5 | 100 | 87.6 |
| Pink Lace | #ffddf4 | 319.4 | 100 | 93.3 | 139.4 | 100 | 93.3 | 109.4 | 100 | 93.3 | 169.4 | 100 | 93.3 |
| Pink-Orange | #ff9966 | 20 | 100 | 70 | 200 | 100 | 70 | 170 | 100 | 70 | 230 | 100 | 70 |
| Pink Pearl | #e7accf | 324.4 | 55.1 | 79 | 144.4 | 55.1 | 79 | 114.4 | 55.1 | 79 | 174.4 | 55.1 | 79 |
| Pink Sherbet | #f78fa7 | 346.2 | 86.7 | 76.5 | 166.2 | 86.7 | 76.5 | 136.2 | 86.7 | 76.5 | 196.2 | 86.7 | 76.5 |
| Pistachio | #93c572 | 96.1 | 41.7 | 61 | 276.1 | 41.7 | 61 | 246.1 | 41.7 | 61 | 306.1 | 41.7 | 61 |
| Platinum | #e5e4e2 | 40 | 5.5 | 89.2 | 220 | 5.5 | 89.2 | 190 | 5.5 | 89.2 | 250 | 5.5 | 89.2 |
| Plum (Traditional) | #8e4585 | 307.4 | 34.6 | 41.4 | 127.4 | 34.6 | 41.4 | 97.4 | 34.6 | 41.4 | 157.4 | 34.6 | 41.4 |
| Plum (Web) | #dda0dd | 300 | 47.3 | 74.7 | 120 | 47.3 | 74.7 | 90 | 47.3 | 74.7 | 150 | 47.3 | 74.7 |
| Portland Orange | #ff5a36 | 10.7 | 100 | 60.6 | 190.7 | 100 | 60.6 | 160.7 | 100 | 60.6 | 220.7 | 100 | 60.6 |
| Powder Blue (Web) | #b0e0e6 | 186.7 | 51.9 | 79.6 | 6.7 | 51.9 | 79.6 | 336.7 | 51.9 | 79.6 | 36.7 | 51.9 | 79.6 |
| Princeton Orange | #ff8f00 | 33.6 | 100 | 50 | 213.6 | 100 | 50 | 183.6 | 100 | 50 | 243.6 | 100 | 50 |
| Prune | #701c1c | 0 | 60 | 27.5 | 180 | 60 | 27.5 | 150 | 60 | 27.5 | 210 | 60 | 27.5 |
| Prussian Blue | #003153 | 204.6 | 100 | 16.3 | 24.6 | 100 | 16.3 | 354.6 | 100 | 16.3 | 54.6 | 100 | 16.3 |
| Psychedelic Purple | #df00ff | 292.5 | 100 | 50 | 112.5 | 100 | 50 | 82.5 | 100 | 50 | 142.5 | 100 | 50 |
| Puce | #cc8899 | 345 | 40 | 66.7 | 165 | 40 | 66.7 | 135 | 40 | 66.7 | 195 | 40 | 66.7 |
| Pumpkin | #ff7518 | 24.2 | 100 | 54.7 | 204.2 | 100 | 54.7 | 174.2 | 100 | 54.7 | 234.2 | 100 | 54.7 |
| Purple Heart | #69359c | 270.3 | 49.3 | 41 | 90.3 | 49.3 | 41 | 60.3 | 49.3 | 41 | 120.3 | 49.3 | 41 |
| Purple (Html/Css) | #800080 | 300 | 100 | 25.1 | 120 | 100 | 25.1 | 90 | 100 | 25.1 | 150 | 100 | 25.1 |
| Purple Mountain Majesty | #9678b6 | 269 | 29.8 | 59.2 | 89 | 29.8 | 59.2 | 59 | 29.8 | 59.2 | 119 | 29.8 | 59.2 |
| Purple (Munsell) | #9f00c5 | 288.4 | 100 | 38.6 | 108.4 | 100 | 38.6 | 78.4 | 100 | 38.6 | 138.4 | 100 | 38.6 |
| Purple Pizzazz | #fe4eda | 312.3 | 98.9 | 65.1 | 132.3 | 98.9 | 65.1 | 102.3 | 98.9 | 65.1 | 162.3 | 98.9 | 65.1 |
| Purple Taupe | #50404d | 311.3 | 11.1 | 28.2 | 131.3 | 11.1 | 28.2 | 101.3 | 11.1 | 28.2 | 161.3 | 11.1 | 28.2 |
| Purple (X11) | #a020f0 | 276.9 | 87.4 | 53.3 | 96.9 | 87.4 | 53.3 | 66.9 | 87.4 | 53.3 | 126.9 | 87.4 | 53.3 |
| Quartz | #51484f | 313.3 | 5.9 | 30 | 133.3 | 5.9 | 30 | 103.3 | 5.9 | 30 | 163.3 | 5.9 | 30 |
| Rackley | #5d8aa8 | 204 | 30.1 | 51.2 | 24 | 30.1 | 51.2 | 354 | 30.1 | 51.2 | 54 | 30.1 | 51.2 |
| Radical Red | #ff355e | 347.8 | 100 | 60.4 | 167.8 | 100 | 60.4 | 137.8 | 100 | 60.4 | 197.8 | 100 | 60.4 |
| Rajah | #fbab60 | 29 | 95.1 | 68 | 209 | 95.1 | 68 | 179 | 95.1 | 68 | 239 | 95.1 | 68 |
| Raspberry | #e30b5d | 337.2 | 90.8 | 46.7 | 157.2 | 90.8 | 46.7 | 127.2 | 90.8 | 46.7 | 187.2 | 90.8 | 46.7 |
| Raspberry Glace | #915f6d | 343.2 | 20.8 | 47.1 | 163.2 | 20.8 | 47.1 | 133.2 | 20.8 | 47.1 | 193.2 | 20.8 | 47.1 |
| Raspberry Pink | #e25098 | 330.4 | 71.6 | 60 | 150.4 | 71.6 | 60 | 120.4 | 71.6 | 60 | 180.4 | 71.6 | 60 |
| Raspberry Rose | #b3446c | 338.4 | 44.9 | 48.4 | 158.4 | 44.9 | 48.4 | 128.4 | 44.9 | 48.4 | 188.4 | 44.9 | 48.4 |

HSL Colour Model Values  Figure 40-10

| Name | Input Sensor Colour | | | | Equiluminant Colour | | | Split Complementary Colour 1 | | | Split Complementary Colour 2 | | |
|---|---|---|---|---|---|---|---|---|---|---|---|---|---|
| | Hexidecmal triplet | Hue | Saturation | Lightness | f=MOD(Kn+180,360) | f=same | f=same | f=MOD(Kn+150,360) | f=same | f=same | f=MOD(Kn+210,360) | f=same | f=same |
| | c | h | s% | l% | h | s | l | h | s | l | h | s | l |
| Raw Umber | #826644 | 32.9 | 31.3 | 38.8 | 212.9 | 31.3 | 38.8 | 182.9 | 31.3 | 38.8 | 242.9 | 31.3 | 38.8 |
| Razzle Dazzle Rose | #FF33CC | 315 | 100 | 60 | 135 | 100 | 60 | 105 | 100 | 60 | 165 | 100 | 60 |
| Razzmatazz | #e3256b | 337.9 | 77.2 | 51.8 | 157.9 | 77.2 | 51.8 | 127.9 | 77.2 | 51.8 | 187.9 | 77.2 | 51.8 |
| Red | #ff0000 | 0 | 100 | 50 | 180 | 100 | 50 | 150 | 100 | 50 | 210 | 100 | 50 |
| Red-Brown | #a52a2a | 0 | 59.4 | 40.6 | 180 | 59.4 | 40.6 | 150 | 59.4 | 40.6 | 210 | 59.4 | 40.6 |
| Red Devil | #860111 | 352.8 | 98.5 | 26.5 | 172.8 | 98.5 | 26.5 | 142.8 | 98.5 | 26.5 | 202.8 | 98.5 | 26.5 |
| Red (Munsell) | #f2003c | 345.1 | 100 | 47.5 | 165.1 | 100 | 47.5 | 135.1 | 100 | 47.5 | 195.1 | 100 | 47.5 |
| Red (Ncs) | #c40233 | 344.8 | 98 | 38.8 | 164.8 | 98 | 38.8 | 134.8 | 98 | 38.8 | 194.8 | 98 | 38.8 |
| Red-Orange | #ff5349 | 3.3 | 100 | 64.3 | 183.3 | 100 | 64.3 | 153.3 | 100 | 64.3 | 213.3 | 100 | 64.3 |
| Red (Pigment) | #ed1c24 | 357.7 | 85.3 | 52 | 177.7 | 85.3 | 52 | 147.7 | 85.3 | 52 | 207.7 | 85.3 | 52 |
| Red (Ryb) | #fe2712 | 5.3 | 99.2 | 53.3 | 185.3 | 99.2 | 53.3 | 155.3 | 99.2 | 53.3 | 215.3 | 99.2 | 53.3 |
| Red-Violet | #c71585 | 322.2 | 80.9 | 43.1 | 142.2 | 80.9 | 43.1 | 112.2 | 80.9 | 43.1 | 172.2 | 80.9 | 43.1 |
| Redwood | #ab4e52 | 357.4 | 37.3 | 48.8 | 177.4 | 37.3 | 48.8 | 147.4 | 37.3 | 48.8 | 207.4 | 37.3 | 48.8 |
| Regalia | #522d80 | 266.7 | 48 | 33.9 | 86.7 | 48 | 33.9 | 56.7 | 48 | 33.9 | 116.7 | 48 | 33.9 |
| Resolution Blue | #002387 | 224.4 | 100 | 26.5 | 44.4 | 100 | 26.5 | 14.4 | 100 | 26.5 | 74.4 | 100 | 26.5 |
| Rich Black | #004040 | 180 | 100 | 12.5 | 0 | 100 | 12.5 | 330 | 100 | 12.5 | 30 | 100 | 12.5 |
| Rich Brilliant Lavender | #f1a7fe | 291 | 97.8 | 82.5 | 111 | 97.8 | 82.5 | 81 | 97.8 | 82.5 | 141 | 97.8 | 82.5 |
| Rich Carmine | #d70040 | 342.1 | 100 | 42.2 | 162.1 | 100 | 42.2 | 132.1 | 100 | 42.2 | 192.1 | 100 | 42.2 |
| Rich Electric Blue | #0892d0 | 198.6 | 92.6 | 42.4 | 18.6 | 92.6 | 42.4 | 348.6 | 92.6 | 42.4 | 48.6 | 92.6 | 42.4 |
| Rich Lavender | #a76bcf | 276 | 51 | 61.6 | 96 | 51 | 61.6 | 66 | 51 | 61.6 | 126 | 51 | 61.6 |
| Rich Lilac | #b666d2 | 284.4 | 54.5 | 61.2 | 104.4 | 54.5 | 61.2 | 74.4 | 54.5 | 61.2 | 134.4 | 54.5 | 61.2 |
| Rich Maroon | #b03060 | 337.5 | 57.1 | 43.9 | 157.5 | 57.1 | 43.9 | 127.5 | 57.1 | 43.9 | 187.5 | 57.1 | 43.9 |
| Rifle Green | #414833 | 80 | 17.1 | 24.1 | 260 | 17.1 | 24.1 | 230 | 17.1 | 24.1 | 290 | 17.1 | 24.1 |
| Robin Egg Blue | #00cccc | 180 | 100 | 40 | 0 | 100 | 40 | 330 | 100 | 40 | 30 | 100 | 40 |
| Rose | #ff007f | 330.1 | 100 | 50 | 150.1 | 100 | 50 | 120.1 | 100 | 50 | 180.1 | 100 | 50 |
| Rose Bonbon | #f9429e | 329.8 | 93.8 | 61.8 | 149.8 | 93.8 | 61.8 | 119.8 | 93.8 | 61.8 | 179.8 | 93.8 | 61.8 |
| Rose Ebony | #674846 | 3.6 | 19.1 | 33.9 | 183.6 | 19.1 | 33.9 | 153.6 | 19.1 | 33.9 | 213.6 | 19.1 | 33.9 |
| Rose Gold | #b76e79 | 351 | 33.6 | 57.5 | 171 | 33.6 | 57.5 | 141 | 33.6 | 57.5 | 201 | 33.6 | 57.5 |
| Rose Madder | #e32636 | 354.9 | 77.1 | 52 | 174.9 | 77.1 | 52 | 144.9 | 77.1 | 52 | 204.9 | 77.1 | 52 |
| Rose Pink | #ff66cc | 320 | 100 | 70 | 140 | 100 | 70 | 110 | 100 | 70 | 170 | 100 | 70 |
| Rose Quartz | #aa98a9 | 303.3 | 9.6 | 63.1 | 123.3 | 9.6 | 63.1 | 93.3 | 9.6 | 63.1 | 153.3 | 9.6 | 63.1 |
| Rose Taupe | #905d5d | 0 | 21.5 | 46.5 | 180 | 21.5 | 46.5 | 150 | 21.5 | 46.5 | 210 | 21.5 | 46.5 |
| Rose Vale | #ab4e52 | 357.4 | 37.3 | 48.8 | 177.4 | 37.3 | 48.8 | 147.4 | 37.3 | 48.8 | 207.4 | 37.3 | 48.8 |
| Rosewood | #65000b | 353.5 | 100 | 19.8 | 173.5 | 100 | 19.8 | 143.5 | 100 | 19.8 | 203.5 | 100 | 19.8 |
| Rosso Corsa | #d40000 | 0 | 100 | 41.6 | 180 | 100 | 41.6 | 150 | 100 | 41.6 | 210 | 100 | 41.6 |
| Rosy Brown | #bc8f8f | 0 | 25.1 | 64.9 | 180 | 25.1 | 64.9 | 150 | 25.1 | 64.9 | 210 | 25.1 | 64.9 |
| Royal Azure | #0038a8 | 220 | 100 | 32.9 | 40 | 100 | 32.9 | 10 | 100 | 32.9 | 70 | 100 | 32.9 |
| Royal Blue (Traditional) | #002366 | 219.4 | 100 | 20 | 39.4 | 100 | 20 | 9.4 | 100 | 20 | 69.4 | 100 | 20 |
| Royal Blue (Web) | #4169e1 | 225 | 72.7 | 56.9 | 45 | 72.7 | 56.9 | 15 | 72.7 | 56.9 | 75 | 72.7 | 56.9 |
| Royal Fuchsia | #ca2c92 | 321.3 | 64.2 | 48.2 | 141.3 | 64.2 | 48.2 | 111.3 | 64.2 | 48.2 | 171.3 | 64.2 | 48.2 |
| Royal Purple | #7851a9 | 266.6 | 35.2 | 49 | 86.6 | 35.2 | 49 | 56.6 | 35.2 | 49 | 116.6 | 35.2 | 49 |
| Royal Yellow | #fada5e | 47.7 | 94 | 67.5 | 227.7 | 94 | 67.5 | 197.7 | 94 | 67.5 | 257.7 | 94 | 67.5 |
| Rubine Red | #d10056 | 335.3 | 100 | 41 | 155.3 | 100 | 41 | 125.3 | 100 | 41 | 185.3 | 100 | 41 |
| Ruby | #e0115f | 337.4 | 85.9 | 47.3 | 157.4 | 85.9 | 47.3 | 127.4 | 85.9 | 47.3 | 187.4 | 85.9 | 47.3 |
| Ruby Red | #9b111e | 354.3 | 80.2 | 33.7 | 174.3 | 80.2 | 33.7 | 144.3 | 80.2 | 33.7 | 204.3 | 80.2 | 33.7 |
| Ruddy | #ff0028 | 350.6 | 100 | 50 | 170.6 | 100 | 50 | 140.6 | 100 | 50 | 200.6 | 100 | 50 |
| Ruddy Brown | #bb6528 | 24.9 | 64.8 | 44.5 | 204.9 | 64.8 | 44.5 | 174.9 | 64.8 | 44.5 | 234.9 | 64.8 | 44.5 |
| Ruddy Pink | #e18e96 | 354.2 | 58 | 72 | 174.2 | 58 | 72 | 144.2 | 58 | 72 | 204.2 | 58 | 72 |
| Rufous | #a81c07 | 7.8 | 92 | 34.3 | 187.8 | 92 | 34.3 | 157.8 | 92 | 34.3 | 217.8 | 92 | 34.3 |
| Russet | #80461b | 25.5 | 65.2 | 30.4 | 205.5 | 65.2 | 30.4 | 175.5 | 65.2 | 30.4 | 235.5 | 65.2 | 30.4 |
| Rust | #b7410e | 18.1 | 85.8 | 38.6 | 198.1 | 85.8 | 38.6 | 168.1 | 85.8 | 38.6 | 228.1 | 85.8 | 38.6 |
| Rusty Red | #da2c43 | 352.1 | 70.2 | 51.4 | 172.1 | 70.2 | 51.4 | 142.1 | 70.2 | 51.4 | 202.1 | 70.2 | 51.4 |
| Sacramento State Green | #00563f | 164 | 100 | 16.9 | 344 | 100 | 16.9 | 314 | 100 | 16.9 | 14 | 100 | 16.9 |
| Saddle Brown | #8b4513 | 25 | 75.9 | 31 | 205 | 75.9 | 31 | 175 | 75.9 | 31 | 235 | 75.9 | 31 |
| Safety Orange (Blaze Orange) | #ff6700 | 24.2 | 100 | 50 | 204.2 | 100 | 50 | 174.2 | 100 | 50 | 234.2 | 100 | 50 |
| Saffron | #f4c430 | 45.3 | 89.9 | 57.3 | 225.3 | 89.9 | 57.3 | 195.3 | 89.9 | 57.3 | 255.3 | 89.9 | 57.3 |
| Salmon | #ff8c69 | 14 | 100 | 70.6 | 194 | 100 | 70.6 | 164 | 100 | 70.6 | 224 | 100 | 70.6 |
| Salmon Pink | #ff91a4 | 349.6 | 100 | 78.4 | 169.6 | 100 | 78.4 | 139.6 | 100 | 78.4 | 199.6 | 100 | 78.4 |
| Sand | #c2b280 | 45.5 | 35.1 | 63.1 | 225.5 | 35.1 | 63.1 | 195.5 | 35.1 | 63.1 | 255.5 | 35.1 | 63.1 |
| Sand Dune | #967117 | 42.5 | 73.4 | 33.9 | 222.5 | 73.4 | 33.9 | 192.5 | 73.4 | 33.9 | 252.5 | 73.4 | 33.9 |
| Sandstorm | #ecd540 | 52 | 81.9 | 58.8 | 232 | 81.9 | 58.8 | 202 | 81.9 | 58.8 | 262 | 81.9 | 58.8 |
| Sandy Brown | #f4a460 | 27.6 | 87.1 | 66.7 | 207.6 | 87.1 | 66.7 | 177.6 | 87.1 | 66.7 | 237.6 | 87.1 | 66.7 |
| Sandy Taupe | #967117 | 42.5 | 73.4 | 33.9 | 222.5 | 73.4 | 33.9 | 192.5 | 73.4 | 33.9 | 252.5 | 73.4 | 33.9 |
| Sangria | #92000a | 355.9 | 100 | 28.6 | 175.9 | 100 | 28.6 | 145.9 | 100 | 28.6 | 205.9 | 100 | 28.6 |
| Sap Green | #507d2a | 92.5 | 49.7 | 32.7 | 272.5 | 49.7 | 32.7 | 242.5 | 49.7 | 32.7 | 302.5 | 49.7 | 32.7 |
| Sapphire | #0f52ba | 216.5 | 85.1 | 39.4 | 36.5 | 85.1 | 39.4 | 6.5 | 85.1 | 39.4 | 66.5 | 85.1 | 39.4 |
| Sapphire Blue | #0067a5 | 202.5 | 100 | 32.4 | 22.5 | 100 | 32.4 | 352.5 | 100 | 32.4 | 52.5 | 100 | 32.4 |
| Satin Sheen Gold | #cba135 | 43.2 | 59.1 | 50.2 | 223.2 | 59.1 | 50.2 | 193.2 | 59.1 | 50.2 | 253.2 | 59.1 | 50.2 |
| Scarlet | #ff2400 | 8.5 | 100 | 50 | 188.5 | 100 | 50 | 158.5 | 100 | 50 | 218.5 | 100 | 50 |
| Scarlet (Crayola) | #fd0e35 | 350.2 | 98.4 | 52.4 | 170.2 | 98.4 | 52.4 | 140.2 | 98.4 | 52.4 | 200.2 | 98.4 | 52.4 |
| School Bus Yellow | #ffd800 | 50.8 | 100 | 50 | 230.8 | 100 | 50 | 200.8 | 100 | 50 | 260.8 | 100 | 50 |
| Screamin' Green | #76ff7a | 121.8 | 100 | 73.1 | 301.8 | 100 | 73.1 | 271.8 | 100 | 73.1 | 331.8 | 100 | 73.1 |
| Sea Blue | #006994 | 197.4 | 100 | 29 | 17.4 | 100 | 29 | 347.4 | 100 | 29 | 47.4 | 100 | 29 |

HSL Colour Model Values　　　　Figure 40-11

| | Input Sensor Colour | | | | Equiluminant Colour | | | Split Complementary Colour 1 | | | Split Complementary Colour 2 | | |
|---|---|---|---|---|---|---|---|---|---|---|---|---|---|
| | Hexidecmal triplet | Hue | Saturation | Lightness | f=MOD(Kn+180,360) | f=same | f=same | f=MOD(Kn+150,360) | f=same | f=same | f=MOD(Kn+210,360) | f=same | f=same |
| Name | c | h | s% | l% | h | s | l | h | s | l | h | s | l |
| Sea Green | #2e8b57 | 146.5 | 50.3 | 36.3 | 326.5 | 50.3 | 36.3 | 296.5 | 50.3 | 36.3 | 356.5 | 50.3 | 36.3 |
| Seal Brown | #321414 | 0 | 42.9 | 13.7 | 180 | 42.9 | 13.7 | 150 | 42.9 | 13.7 | 210 | 42.9 | 13.7 |
| Seashell | #fff5ee | 24.7 | 100 | 96.7 | 204.7 | 100 | 96.7 | 174.7 | 100 | 96.7 | 234.7 | 100 | 96.7 |
| Selective Yellow | #ffba00 | 43.8 | 100 | 50 | 223.8 | 100 | 50 | 193.8 | 100 | 50 | 253.8 | 100 | 50 |
| Sepia | #704214 | 30 | 69.7 | 25.9 | 210 | 69.7 | 25.9 | 180 | 69.7 | 25.9 | 240 | 69.7 | 25.9 |
| Shadow | #8a795d | 37.3 | 19.5 | 45.3 | 217.3 | 19.5 | 45.3 | 187.3 | 19.5 | 45.3 | 247.3 | 19.5 | 45.3 |
| Shamrock Green | #009e60 | 156.5 | 100 | 31 | 336.5 | 100 | 31 | 306.5 | 100 | 31 | 6.5 | 100 | 31 |
| Shocking Pink | #fc0fc0 | 315.2 | 97.5 | 52.4 | 135.2 | 97.5 | 52.4 | 105.2 | 97.5 | 52.4 | 165.2 | 97.5 | 52.4 |
| Shocking Pink (Crayola) | #ff6fff | 300 | 100 | 71.8 | 120 | 100 | 71.8 | 90 | 100 | 71.8 | 150 | 100 | 71.8 |
| Sienna | #882d17 | 11.7 | 71.1 | 31.2 | 191.7 | 71.1 | 31.2 | 161.7 | 71.1 | 31.2 | 221.7 | 71.1 | 31.2 |
| Silver | #c0c0c0 | 0 | 0 | 75.3 | 180 | 0 | 75.3 | 150 | 0 | 75.3 | 210 | 0 | 75.3 |
| Sinopia | #cb410b | 16.9 | 89.7 | 42 | 196.9 | 89.7 | 42 | 166.9 | 89.7 | 42 | 226.9 | 89.7 | 42 |
| Skobeloff | #007474 | 180 | 100 | 22.7 | 0 | 100 | 22.7 | 330 | 100 | 22.7 | 30 | 100 | 22.7 |
| Sky Blue | #87ceeb | 197.4 | 71.4 | 72.5 | 17.4 | 71.4 | 72.5 | 347.4 | 71.4 | 72.5 | 47.4 | 71.4 | 72.5 |
| Sky Magenta | #cf71af | 320.4 | 49.5 | 62.7 | 140.4 | 49.5 | 62.7 | 110.4 | 49.5 | 62.7 | 170.4 | 49.5 | 62.7 |
| Slate Blue | #6a5acd | 248.3 | 53.5 | 57.8 | 68.3 | 53.5 | 57.8 | 38.3 | 53.5 | 57.8 | 98.3 | 53.5 | 57.8 |
| Slate Gray | #708090 | 210 | 12.6 | 50.2 | 30 | 12.6 | 50.2 | 0 | 12.6 | 50.2 | 60 | 12.6 | 50.2 |
| Smalt (Dark Powder Blue) | #003399 | 220 | 100 | 30 | 40 | 100 | 30 | 10 | 100 | 30 | 70 | 100 | 30 |
| Smokey Topaz | #933d41 | 357.2 | 41.3 | 40.8 | 177.2 | 41.3 | 40.8 | 147.2 | 41.3 | 40.8 | 207.2 | 41.3 | 40.8 |
| Smoky Black | #100c08 | 30 | 33.3 | 4.7 | 210 | 33.3 | 4.7 | 180 | 33.3 | 4.7 | 240 | 33.3 | 4.7 |
| Snow | #fffafa | 0 | 100 | 99 | 180 | 100 | 99 | 150 | 100 | 99 | 210 | 100 | 99 |
| Spiro Disco Ball | #0fc0fc | 195.2 | 97.5 | 52.4 | 15.2 | 97.5 | 52.4 | 345.2 | 97.5 | 52.4 | 45.2 | 97.5 | 52.4 |
| Spring Bud | #a7fc00 | 80.2 | 100 | 49.4 | 260.2 | 100 | 49.4 | 230.2 | 100 | 49.4 | 290.2 | 100 | 49.4 |
| Spring Green | #00ff7f | 149.9 | 100 | 50 | 329.9 | 100 | 50 | 299.9 | 100 | 50 | 359.9 | 100 | 50 |
| St. Patrick'S Blue | #23297a | 235.9 | 55.4 | 30.8 | 55.9 | 55.4 | 30.8 | 25.9 | 55.4 | 30.8 | 85.9 | 55.4 | 30.8 |
| Steel Blue | #4682b4 | 207.3 | 44 | 49 | 27.3 | 44 | 49 | 357.3 | 44 | 49 | 57.3 | 44 | 49 |
| Stil De Grain Yellow | #fada5e | 47.7 | 94 | 67.5 | 227.7 | 94 | 67.5 | 197.7 | 94 | 67.5 | 257.7 | 94 | 67.5 |
| Stizza | #990000 | 0 | 100 | 30 | 180 | 100 | 30 | 150 | 100 | 30 | 210 | 100 | 30 |
| Stormcloud | #4f666a | 188.9 | 14.6 | 36.3 | 8.9 | 14.6 | 36.3 | 338.9 | 14.6 | 36.3 | 38.9 | 14.6 | 36.3 |
| Straw | #e4d96f | 54.4 | 68.4 | 66.5 | 234.4 | 68.4 | 66.5 | 204.4 | 68.4 | 66.5 | 264.4 | 68.4 | 66.5 |
| Sunglow | #ffcc33 | 45 | 100 | 60 | 225 | 100 | 60 | 195 | 100 | 60 | 255 | 100 | 60 |
| Sunset | #fad6a5 | 34.6 | 89.5 | 81.4 | 214.6 | 89.5 | 81.4 | 184.6 | 89.5 | 81.4 | 244.6 | 89.5 | 81.4 |
| Tan | #d2b48c | 34.3 | 43.7 | 68.6 | 214.3 | 43.7 | 68.6 | 184.3 | 43.7 | 68.6 | 244.3 | 43.7 | 68.6 |
| Tangelo | #f94d00 | 18.6 | 100 | 48.8 | 198.6 | 100 | 48.8 | 168.6 | 100 | 48.8 | 228.6 | 100 | 48.8 |
| Tangerine | #f28500 | 33 | 100 | 47.5 | 213 | 100 | 47.5 | 183 | 100 | 47.5 | 243 | 100 | 47.5 |
| Tangerine Yellow | #ffcc00 | 48 | 100 | 50 | 228 | 100 | 50 | 198 | 100 | 50 | 258 | 100 | 50 |
| Tango Pink | #e4717a | 355.3 | 68 | 66.9 | 175.3 | 68 | 66.9 | 145.3 | 68 | 66.9 | 205.3 | 68 | 66.9 |
| Taupe | #483c32 | 27.3 | 18 | 23.9 | 207.3 | 18 | 23.9 | 177.3 | 18 | 23.9 | 237.3 | 18 | 23.9 |
| Taupe Gray | #8b8589 | 320 | 2.5 | 53.3 | 140 | 2.5 | 53.3 | 110 | 2.5 | 53.3 | 170 | 2.5 | 53.3 |
| Tea Green | #d0f0c0 | 100 | 61.5 | 84.7 | 280 | 61.5 | 84.7 | 250 | 61.5 | 84.7 | 310 | 61.5 | 84.7 |
| Tea Rose (Orange) | #f88379 | 4.7 | 90.1 | 72.4 | 184.7 | 90.1 | 72.4 | 154.7 | 90.1 | 72.4 | 214.7 | 90.1 | 72.4 |
| Tea Rose (Rose) | #f4c2c2 | 0 | 69.4 | 85.9 | 180 | 69.4 | 85.9 | 150 | 69.4 | 85.9 | 210 | 69.4 | 85.9 |
| Teal | #008080 | 180 | 100 | 25.1 | 0 | 100 | 25.1 | 330 | 100 | 25.1 | 30 | 100 | 25.1 |
| Teal Blue | #367588 | 193.9 | 43.2 | 37.3 | 13.9 | 43.2 | 37.3 | 343.9 | 43.2 | 37.3 | 43.9 | 43.2 | 37.3 |
| Teal Green | #00827f | 178.6 | 100 | 25.5 | 358.6 | 100 | 25.5 | 328.6 | 100 | 25.5 | 28.6 | 100 | 25.5 |
| Telemagenta | #cf3476 | 334.5 | 61.8 | 50.8 | 154.5 | 61.8 | 50.8 | 124.5 | 61.8 | 50.8 | 184.5 | 61.8 | 50.8 |
| Tenné (Tawny) | #cd5700 | 25.5 | 100 | 40.2 | 205.5 | 100 | 40.2 | 175.5 | 100 | 40.2 | 235.5 | 100 | 40.2 |
| Terra Cotta | #e2725b | 10.2 | 69.9 | 62.2 | 190.2 | 69.9 | 62.2 | 160.2 | 69.9 | 62.2 | 220.2 | 69.9 | 62.2 |
| Thistle | #d8bfd8 | 300 | 24.3 | 79.8 | 120 | 24.3 | 79.8 | 90 | 24.3 | 79.8 | 150 | 24.3 | 79.8 |
| Thulian Pink | #de6fa1 | 333 | 62.7 | 65.3 | 153 | 62.7 | 65.3 | 123 | 62.7 | 65.3 | 183 | 62.7 | 65.3 |
| Tickle Me Pink | #fc89ac | 341.7 | 95 | 76.3 | 161.7 | 95 | 76.3 | 131.7 | 95 | 76.3 | 191.7 | 95 | 76.3 |
| Tiffany Blue | #0ababs | 178.3 | 89.8 | 38.4 | 358.3 | 89.8 | 38.4 | 328.3 | 89.8 | 38.4 | 28.3 | 89.8 | 38.4 |
| Tiger'S Eye | #e08d3c | 29.6 | 72.6 | 55.7 | 209.6 | 72.6 | 55.7 | 179.6 | 72.6 | 55.7 | 239.6 | 72.6 | 55.7 |
| Timberwolf | #dbd7d2 | 33.3 | 11.1 | 84.1 | 213.3 | 11.1 | 84.1 | 183.3 | 11.1 | 84.1 | 243.3 | 11.1 | 84.1 |
| Titanium Yellow | #eee600 | 58 | 100 | 46.7 | 238 | 100 | 46.7 | 208 | 100 | 46.7 | 268 | 100 | 46.7 |
| Tomato | #ff6347 | 9.1 | 100 | 63.9 | 189.1 | 100 | 63.9 | 159.1 | 100 | 63.9 | 219.1 | 100 | 63.9 |
| Toolbox | #746cc0 | 245.7 | 40 | 58.8 | 65.7 | 40 | 58.8 | 35.7 | 40 | 58.8 | 95.7 | 40 | 58.8 |
| Topaz | #ffc87c | 34.8 | 100 | 74.3 | 214.8 | 100 | 74.3 | 184.8 | 100 | 74.3 | 244.8 | 100 | 74.3 |
| Tractor Red | #fd0e35 | 350.2 | 98.4 | 52.4 | 170.2 | 98.4 | 52.4 | 140.2 | 98.4 | 52.4 | 200.2 | 98.4 | 52.4 |
| Trolley Grey | #808080 | 0 | 0 | 50.2 | 180 | 0 | 50.2 | 150 | 0 | 50.2 | 210 | 0 | 50.2 |
| Tropical Rain Forest | #00755e | 168.2 | 100 | 22.9 | 348.2 | 100 | 22.9 | 318.2 | 100 | 22.9 | 18.2 | 100 | 22.9 |
| True Blue | #0073cf | 206.7 | 100 | 40.6 | 26.7 | 100 | 40.6 | 356.7 | 100 | 40.6 | 56.7 | 100 | 40.6 |
| Tufts Blue | #417dc1 | 211.9 | 50.8 | 50.6 | 31.9 | 50.8 | 50.6 | 1.9 | 50.8 | 50.6 | 61.9 | 50.8 | 50.6 |
| Tumbleweed | #deaa88 | 23.7 | 56.6 | 70.2 | 203.7 | 56.6 | 70.2 | 173.7 | 56.6 | 70.2 | 233.7 | 56.6 | 70.2 |
| Turkish Rose | #b57281 | 346.6 | 31.2 | 57.8 | 166.6 | 31.2 | 57.8 | 136.6 | 31.2 | 57.8 | 196.6 | 31.2 | 57.8 |
| Turquoise | #30d5c8 | 175.3 | 66.3 | 51.2 | 355.3 | 66.3 | 51.2 | 325.3 | 66.3 | 51.2 | 25.3 | 66.3 | 51.2 |
| Turquoise Blue | #00ffef | 176.2 | 100 | 50 | 356.2 | 100 | 50 | 326.2 | 100 | 50 | 26.2 | 100 | 50 |
| Turquoise Green | #a0d6b4 | 142.2 | 39.7 | 73.3 | 322.2 | 39.7 | 73.3 | 292.2 | 39.7 | 73.3 | 352.2 | 39.7 | 73.3 |
| Tuscan Red | #7c4848 | 0 | 26.5 | 38.4 | 180 | 26.5 | 38.4 | 150 | 26.5 | 38.4 | 210 | 26.5 | 38.4 |
| Twilight Lavender | #8a496b | 328.6 | 30.8 | 41.4 | 148.6 | 30.8 | 41.4 | 118.6 | 30.8 | 41.4 | 178.6 | 30.8 | 41.4 |
| Tyrian Purple | #66023c | 325.2 | 96.2 | 20.4 | 145.2 | 96.2 | 20.4 | 115.2 | 96.2 | 20.4 | 175.2 | 96.2 | 20.4 |
| Ua Blue | #0033aa | 222 | 100 | 33.3 | 42 | 100 | 33.3 | 12 | 100 | 33.3 | 72 | 100 | 33.3 |
| Ua Red | #d9004c | 339 | 100 | 42.5 | 159 | 100 | 42.5 | 129 | 100 | 42.5 | 189 | 100 | 42.5 |

HSL Colour Model Values                    Figure 40-12

| | Input Sensor Colour | | | Equiluminant Colour | | | Split Complementary Colour 1 | | | Split Complementary Colour 2 | | |
|---|---|---|---|---|---|---|---|---|---|---|---|---|
| | Hexidecmal triplet | Hue Saturation Lightness | | f=MOD(Kn +180,360) | f=same | f=same | f=MOD(Kn +150,360) | f=same | f=same | f=MOD(Kn +210,360) | f=same | f=same |
| Name | c | h | s% | l% | h | s | l | h | s | l | h | s | l |
| Ube | #8878c3 | 252.8 | 38.5 | 61.8 | 72.8 | 38.5 | 61.8 | 42.8 | 38.5 | 61.8 | 102.8 | 38.5 | 61.8 |
| Ucla Blue | #536895 | 220.9 | 28.4 | 45.5 | 40.9 | 28.4 | 45.5 | 10.9 | 28.4 | 45.5 | 70.9 | 28.4 | 45.5 |
| Ucla Gold | #ffb300 | 42.1 | 100 | 50 | 222.1 | 100 | 50 | 192.1 | 100 | 50 | 252.1 | 100 | 50 |
| Ufo Green | #3cd070 | 141.1 | 61.2 | 52.5 | 321.1 | 61.2 | 52.5 | 291.1 | 61.2 | 52.5 | 351.1 | 61.2 | 52.5 |
| Ultra Pink | #ff6fff | 300 | 100 | 71.8 | 120 | 100 | 71.8 | 90 | 100 | 71.8 | 150 | 100 | 71.8 |
| Ultramarine | #120a8f | 243.6 | 86.9 | 30 | 63.6 | 86.9 | 30 | 33.6 | 86.9 | 30 | 93.6 | 86.9 | 30 |
| Ultramarine Blue | #4166f5 | 227.7 | 90 | 60.8 | 47.7 | 90 | 60.8 | 17.7 | 90 | 60.8 | 77.7 | 90 | 60.8 |
| Umber | #635147 | 21.4 | 16.5 | 33.3 | 201.4 | 16.5 | 33.3 | 171.4 | 16.5 | 33.3 | 231.4 | 16.5 | 33.3 |
| Unbleached Silk | #ffddca | 21.5 | 100 | 89.6 | 201.5 | 100 | 89.6 | 171.5 | 100 | 89.6 | 231.5 | 100 | 89.6 |
| United Nations Blue | #5b92e5 | 216.1 | 72.6 | 62.7 | 36.1 | 72.6 | 62.7 | 6.1 | 72.6 | 62.7 | 66.1 | 72.6 | 62.7 |
| University Of California Gold | #b78727 | 40 | 64.9 | 43.5 | 220 | 64.9 | 43.5 | 190 | 64.9 | 43.5 | 250 | 64.9 | 43.5 |
| Unmellow Yellow | #ffff66 | 60 | 100 | 70 | 240 | 100 | 70 | 210 | 100 | 70 | 270 | 100 | 70 |
| Up Forest Green | #014421 | 148.7 | 97.1 | 13.5 | 328.7 | 97.1 | 13.5 | 298.7 | 97.1 | 13.5 | 358.7 | 97.1 | 13.5 |
| Up Maroon | #7b1113 | 358.9 | 75.7 | 27.5 | 178.9 | 75.7 | 27.5 | 148.9 | 75.7 | 27.5 | 208.9 | 75.7 | 27.5 |
| Upsdell Red | #ae2029 | 356.2 | 68.9 | 40.4 | 176.2 | 68.9 | 40.4 | 146.2 | 68.9 | 40.4 | 206.2 | 68.9 | 40.4 |
| Urobilin | #e1ad21 | 43.8 | 76.2 | 50.6 | 223.8 | 76.2 | 50.6 | 193.8 | 76.2 | 50.6 | 253.8 | 76.2 | 50.6 |
| Usafa Blue | #004f98 | 208.8 | 100 | 29.8 | 28.8 | 100 | 29.8 | 358.8 | 100 | 29.8 | 58.8 | 100 | 29.8 |
| Usc Cardinal | #990000 | 0 | 100 | 30 | 180 | 100 | 30 | 150 | 100 | 30 | 210 | 100 | 30 |
| Usc Gold | #ffcc00 | 48 | 100 | 50 | 228 | 100 | 50 | 198 | 100 | 50 | 258 | 100 | 50 |
| Utah Crimson | #d3003f | 342.1 | 100 | 41.4 | 162.1 | 100 | 41.4 | 132.1 | 100 | 41.4 | 192.1 | 100 | 41.4 |
| Vanilla | #f3e5ab | 48.3 | 75 | 81.2 | 228.3 | 75 | 81.2 | 198.3 | 75 | 81.2 | 258.3 | 75 | 81.2 |
| Vegas Gold | #c5b358 | 50.1 | 48.4 | 55.9 | 230.1 | 48.4 | 55.9 | 200.1 | 48.4 | 55.9 | 260.1 | 48.4 | 55.9 |
| Venetian Red | #c80815 | 355.9 | 92.3 | 40.8 | 175.9 | 92.3 | 40.8 | 145.9 | 92.3 | 40.8 | 205.9 | 92.3 | 40.8 |
| Verdigris | #43b3ae | 177.3 | 45.5 | 48.2 | 357.3 | 45.5 | 48.2 | 327.3 | 45.5 | 48.2 | 27.3 | 45.5 | 48.2 |
| Vermilion (Cinnabar) | #e34234 | 4.8 | 75.8 | 54.7 | 184.8 | 75.8 | 54.7 | 154.8 | 75.8 | 54.7 | 214.8 | 75.8 | 54.7 |
| Vermilion (Plochere) | #d9603b | 14.1 | 67.5 | 54.1 | 194.1 | 67.5 | 54.1 | 164.1 | 67.5 | 54.1 | 224.1 | 67.5 | 54.1 |
| Veronica | #a020f0 | 276.9 | 87.4 | 53.3 | 96.9 | 87.4 | 53.3 | 66.9 | 87.4 | 53.3 | 126.9 | 87.4 | 53.3 |
| Violet | #8f00ff | 273.6 | 100 | 50 | 93.6 | 100 | 50 | 63.6 | 100 | 50 | 123.6 | 100 | 50 |
| Violet-Blue | #324ab2 | 228.8 | 56.1 | 44.7 | 48.8 | 56.1 | 44.7 | 18.8 | 56.1 | 44.7 | 78.8 | 56.1 | 44.7 |
| Violet (Color Wheel) | #7f00ff | 269.9 | 100 | 50 | 89.9 | 100 | 50 | 59.9 | 100 | 50 | 119.9 | 100 | 50 |
| Violet (Ryb) | #8601af | 285.9 | 98.9 | 34.5 | 105.9 | 98.9 | 34.5 | 75.9 | 98.9 | 34.5 | 135.9 | 98.9 | 34.5 |
| Violet (Web) | #ee82ee | 300 | 76.1 | 72.2 | 120 | 76.1 | 72.2 | 90 | 76.1 | 72.2 | 150 | 76.1 | 72.2 |
| Viridian | #40826d | 160.9 | 34 | 38 | 340.9 | 34 | 38 | 310.9 | 34 | 38 | 10.9 | 34 | 38 |
| Vivid Auburn | #922724 | 1.6 | 60.4 | 35.7 | 181.6 | 60.4 | 35.7 | 151.6 | 60.4 | 35.7 | 211.6 | 60.4 | 35.7 |
| Vivid Burgundy | #9f1d35 | 348.9 | 69.1 | 36.9 | 168.9 | 69.1 | 36.9 | 138.9 | 69.1 | 36.9 | 198.9 | 69.1 | 36.9 |
| Vivid Cerise | #da1d81 | 328.3 | 76.5 | 48.4 | 148.3 | 76.5 | 48.4 | 118.3 | 76.5 | 48.4 | 178.3 | 76.5 | 48.4 |
| Vivid Tangerine | #ffa089 | 11.7 | 100 | 76.9 | 191.7 | 100 | 76.9 | 161.7 | 100 | 76.9 | 221.7 | 100 | 76.9 |
| Vivid Violet | #9f00ff | 277.4 | 100 | 50 | 97.4 | 100 | 50 | 67.4 | 100 | 50 | 127.4 | 100 | 50 |
| Warm Black | #004242 | 180 | 100 | 12.9 | 0 | 100 | 12.9 | 330 | 100 | 12.9 | 30 | 100 | 12.9 |
| Waterspout | #a4f4f9 | 183.5 | 87.6 | 81 | 3.5 | 87.6 | 81 | 333.5 | 87.6 | 81 | 33.5 | 87.6 | 81 |
| Wenge | #645452 | 6.7 | 9.9 | 35.7 | 186.7 | 9.9 | 35.7 | 156.7 | 9.9 | 35.7 | 216.7 | 9.9 | 35.7 |
| Wheat | #f5deb3 | 39.1 | 76.7 | 83.1 | 219.1 | 76.7 | 83.1 | 189.1 | 76.7 | 83.1 | 249.1 | 76.7 | 83.1 |
| White | #ffff | 0 | 0 | 100 | 180 | 0 | 100 | 150 | 0 | 100 | 210 | 0 | 100 |
| White Smoke | #f5f5f5 | 0 | 0 | 96.1 | 180 | 0 | 96.1 | 150 | 0 | 96.1 | 210 | 0 | 96.1 |
| Wild Blue Yonder | #a2add0 | 225.7 | 32.9 | 72.5 | 45.7 | 32.9 | 72.5 | 15.7 | 32.9 | 72.5 | 75.7 | 32.9 | 72.5 |
| Wild Strawberry | #ff43a4 | 329 | 100 | 63.1 | 149 | 100 | 63.1 | 119 | 100 | 63.1 | 179 | 100 | 63.1 |
| Wild Watermelon | #fc6c85 | 349.6 | 96 | 70.6 | 169.6 | 96 | 70.6 | 139.6 | 96 | 70.6 | 199.6 | 96 | 70.6 |
| Wine | #722f37 | 352.8 | 41.6 | 31.6 | 172.8 | 41.6 | 31.6 | 142.8 | 41.6 | 31.6 | 202.8 | 41.6 | 31.6 |
| Wine Dregs | #673147 | 335.6 | 35.5 | 29.8 | 155.6 | 35.5 | 29.8 | 125.6 | 35.5 | 29.8 | 185.6 | 35.5 | 29.8 |
| Wisteria | #c9a0dc | 281 | 46.2 | 74.5 | 101 | 46.2 | 74.5 | 71 | 46.2 | 74.5 | 131 | 46.2 | 74.5 |
| Wood Brown | #c19a6b | 32.8 | 41 | 58.8 | 212.8 | 41 | 58.8 | 182.8 | 41 | 58.8 | 242.8 | 41 | 58.8 |
| Xanadu | #738678 | 135.8 | 7.6 | 48.8 | 315.8 | 7.6 | 48.8 | 285.8 | 7.6 | 48.8 | 345.8 | 7.6 | 48.8 |
| Yale Blue | #0f4d92 | 211.6 | 81.4 | 31.6 | 31.6 | 81.4 | 31.6 | 1.6 | 81.4 | 31.6 | 61.6 | 81.4 | 31.6 |
| Yellow | #ffff00 | 60 | 100 | 50 | 240 | 100 | 50 | 210 | 100 | 50 | 270 | 100 | 50 |
| Yellow-Green | #9acd32 | 79.7 | 60.8 | 50 | 259.7 | 60.8 | 50 | 229.7 | 60.8 | 50 | 289.7 | 60.8 | 50 |
| Yellow (Munsell) | #efcc00 | 51.2 | 100 | 46.9 | 231.2 | 100 | 46.9 | 201.2 | 100 | 46.9 | 261.2 | 100 | 46.9 |
| Yellow (Ncs) | #ffd300 | 49.6 | 100 | 50 | 229.6 | 100 | 50 | 199.6 | 100 | 50 | 259.6 | 100 | 50 |
| Yellow Orange | #ffae42 | 34.3 | 100 | 62.9 | 214.3 | 100 | 62.9 | 184.3 | 100 | 62.9 | 244.3 | 100 | 62.9 |
| Yellow (Process) | #ffef00 | 56.2 | 100 | 50 | 236.2 | 100 | 50 | 206.2 | 100 | 50 | 266.2 | 100 | 50 |
| Yellow (Ryb) | #fefe33 | 60 | 99 | 59.8 | 240 | 99 | 59.8 | 210 | 99 | 59.8 | 270 | 99 | 59.8 |
| Zaffre | #0014a8 | 232.9 | 100 | 32.9 | 52.9 | 100 | 32.9 | 22.9 | 100 | 32.9 | 82.9 | 100 | 32.9 |
| Zinnwaldite Brown | #2c1608 | 23.3 | 69.2 | 10.2 | 203.3 | 69.2 | 10.2 | 173.3 | 69.2 | 10.2 | 233.3 | 69.2 | 10.2 |

Figure 41-1
| 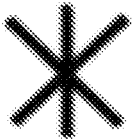 | Asterix |
|  | Aviform |
| 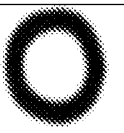 | Circle |
|  | Claviform |
|  | Cordiform |
| 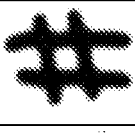 | Crosshatch |
|  | Cruciform |
| 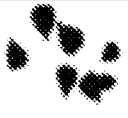 | Cupule |
| 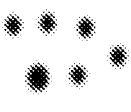 | Dot |
| 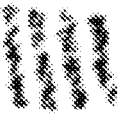 | Finger Fluting |
| 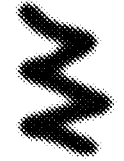 | Zigzag |

Figure 41-2
| | |
|---|---|
| 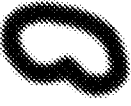 | Reniform |
| 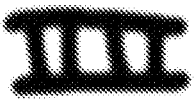 | Scalariform |
| 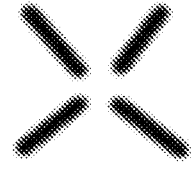 | Segmented Cruciform |
|  | Serpentiform |
|  | Spanish Tectiform |
|  | Spiral |
| 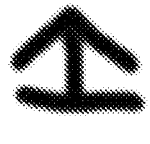 | Tectiform |
| 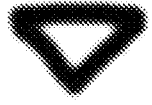 | Triangle |
| 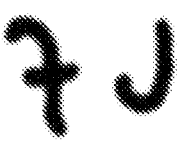 | Unciform |
| 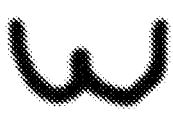 | W-Sign |

Figure 41-3
| 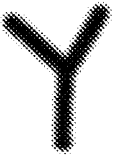 | Y-Sign |
| 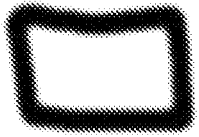 | Quadrangle |
|  | Positive Hand |
| 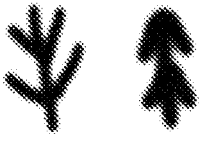 | Penniform |
| 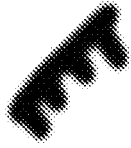 | Pectiform |
| 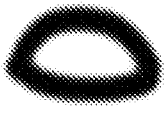 | Oval |
|  | Open-Angle |
|  | Negative Hand |

Figure 41-4
|  | Line |
|  | Half-Circle |
|  | Flabelliform |

OBJECT PERCEPTION SYSTEM AND METHOD

FIELD OF THE INVENTION

The present invention relates to the field of object perception in different environments, and more particularly systems and methods for sensing environmental conditions and how they change over time in order to generate light outputs designed to elicit targeted vision responses.

BACKGROUND OF THE INVENTION

The background to the invention provides information about the state of the art relating to currently used and otherwise disclosed object recognition technologies and strategies.

The senses are used to distinguish between what is or is not safe and one way of doing so is to facilitate the recognition of objects. Vision is the primary sense that humans use for object perception (including recognition), to be alerted about conditions, avoid collisions and evade danger.

The visual and other senses are increasingly overwhelmed in today's world of competing technologies, messaging and engagement strategies to catch the attention of consumers. For example, drivers are more desensitized to environmental cues and distracted while driving, e.g. talking on phones, reading information on screens, or otherwise operating in-vehicle navigation and entertainment systems. Standard approaches to preventing collisions on roadways are becoming increasingly ineffective at catching the visual attention of drivers to perceive an object.

The application of object recognition technology is generally characterized by the passive deployment of bright colours, contrasting colours, light reflector elements and blinking lights. Examples of standard, passive approaches to visual object recognition include bright and fluorescent safety vests, striped pylons, and reflectors on apparel, vehicles and signs, etc. On emergency vehicles, reflective units integrated into multi-colour chevron panels on the back of an ambulance. At crosswalks, painted patterns are applied to road and sidewalk surfaces. In all these cases, object perception is dependent on external light sources for illumination, e.g. daylight, street lights, and vehicle lights.

Light emissions emanating from an object to be recognized are generally preferable to the illumination of an object because it offers some object tracking capability. When light emitting devices are used on an object to facilitate its recognition, they generally function using one colour of light at a time. They will either provide a continuous light output or emit light in a blinking modality. Even when more than one colour can be selected or emitted in response to a sensed environmental condition, the colour options are not selected to dynamically change in order to elicit a particular kind of vision based response under changing environmental conditions, and thereby improve the chances of object recognition.

For example, U.S. Pat. No. 7,064,498 discloses a system that uses high-brightness, processor-controlled LEDs in combination with diffuse materials to produce color-changing effects. The systems described may be employed to bring autonomous color-changing ability and effects to a variety of consumer products and may include sensors so that the illumination of the LEDs might change in response to environmental conditions or a user input. While sensors for environmental measurements (temperature, ambient sound or light), physiological data (heart rate, body temperature), or other measurable quantities, provide signals that can be used to produce color-changing effects that are functions of these measurements, no disclosure is provided regarding the kind of colour changing effects needed to elicit a vision based response that can facilitate or improve object perception under changing environmental conditions.

Similarly, U.S. Pat. No. 9,408,422 discloses a garment that is designed to be worn over motorcyclist gear and create a warning for drivers behind them as to the delta of speed that the motorcycle or bike is travelling using high intensity LED lighting installed on the front and rear surfaces thereof and motion-sensing circuitry. Software is used to detect motorcycle deceleration and control the sequence, color and/or intensity of the LED lighting (e.g. red, blue and green lights). The light outputs are not modulated, however, in a manner so as to elicit a particularly kind of (targeted) vision based response, nor modulated for changing environmental conditions.

U.S. Pat. No. 8,791,811 discloses a system and method to change the colour of a vehicle based on the risk of an accident or collision with another object. A sensor collects relative distance, position and direction angle with a surrounding environment of the vehicle (e.g. another vehicle) and may also collect other information relating to weather conditions and the like. The risk measurement is performed to determine whether it is likely that a collision will occur based on the velocity and direction of movement of the vehicle and other information. An algorithm is used to determine an emitting color and an emitting position on the vehicle according to the risk measurement. The color determined according to the assessed risk may be a color having a high brightness or chroma may be selected, and a colour having a high contrast with a color of the surrounding information (environment) may be selected. No disclosure is provided, however, regarding what colours are emitted under what conditions, beyond the idea that if risk of a collision is low there is no colour change and if the risk is high enough, a colour change in the vehicle is triggered. As such, the system can only alert potential viewers to the presence of the vehicle once a certain risk threshold for a collision is crossed.

US Publication No. 2013/0179035 discloses a vehicle that includes a detection device and a colour change device that at least partially changes a colour of a body of the vehicle to one of three pre-selected colours. A controller scans the colours of the vehicle surroundings via a pair of cameras. The scanning of the colours may be performed by simply calculating an average value of colors in the image captured by the cameras and by comparing an average brightness of the scanned colors with a predetermined threshold value to determine whether or not the colors of the surroundings are dark. If the colors of the surroundings are dark, the controller energizes both a nichrome heater and a film heater to render the colour of the vehicle body to appear white. If the controller detects many achromatic colours in the vehicle surroundings, then the heaters are no longer energized and the body of the vehicle turns to red. Finally, if the controller does not detect many achromatic colours in the vehicle surroundings, then only the film heater is energized turning the colour of the vehicle body to black.

None of these systems trigger or facilitate colour (light) output changes according to how vision systems work under changing environmental conditions, in order to assist a viewer to perceive the object.

Accordingly, there remains a need to provide systems and methods that leverage how vision systems work under changing environmental conditions, to improve the ability of a viewer to perceive objects and thereby respond more effectively to presence of the object in an environment.

SUMMARY OF THE INVENTION

The present invention relates generally to systems and methods for object perception that can result in a desired degree of object recognition by accounting for how changing environmental conditions affect the ability of a viewer to perceive the object. More particularly, the systems modulate light outputs to modulate particular vision responses under changing environmental conditions. In this way, the system and methods of the present disclosure dynamically maintain light outputs that can optimize targeted vision responses. In so doing, the systems display from a given object(s), or from a location selected to give a viewer notice of the object(s), one or more wavelengths of light and, optionally, a pattern(s) of light in the visible spectrum selected to elicit a targeted vision response from a viewer. The notice provided may be of the object itself or a change in state of the object. For example, the systems and methods of the present disclosure can provide a dynamic display of equiluminant colours with reference to changing environmental conditions sensed in order to elicit a peripheral vision response. The peripheral vision response will typically further elicit a foveal vision response that results in vision acuity to enhance perception of an object. A foveal vision response can also be elicited and/or further sensitized by the systems and methods of the present disclosure using outputs of suitable wavelengths of light with reference to the changing environmental conditions.

In one aspect there is provided an object perception system comprising:
 a) a first sensor connected to an object in an environment, for continuously sensing one or more environmental parameters and delivering data sets to a processor;
 b) a processor for receiving and processing the data sets from the first sensor; and
 c) a display for emitting light outputs determined by the processor based on the processing of the data sets, wherein the light outputs emitted are modulated to comprise one or more wavelengths of light selected by the processor to elicit one or more targeted vision responses from a viewer, and thereby assist the viewer to perceive the object in the environment from a given viewing point of the object situated within a scenery of the environment, as the one or more environmental parameters sensed change over time.

In another aspect there is provided a method of facilitating object perception comprising the steps of:
 a) using a first sensor connected to an object in an environment, for continuously sensing one or more environmental parameters and delivering data sets to a processor;
 b) receiving and processing the first data set from the first sensor by the processor; and
 c) providing a light display operatively associated with the processor for emitting light outputs determined by the processor based on the processing of the data sets, wherein the light outputs emitted are modulated to comprise one or more wavelengths of light selected by the processor to elicit one or more targeted vision responses from a viewer, and thereby assist the viewer to perceive the object in the environment from a given viewing point of the object situated within a scenery of the environment, as the one or more environmental parameters sensed change over time.

In embodiments of the system and method, the one or more environmental parameters sensed is the quality of light of a portion of the scenery behind the object with reference to the given viewing point.

In other embodiments of the system and method, wherein a second sensor is connected to the object and is used for continuously sensing one or more environmental parameters, and delivering data sets to the processor, and wherein the processor processes the data sets from the second sensor together with the data sets from the first sensor to select the one or more wavelengths of light to elicit the one or more targeted vision responses from the viewer.

In still other embodiments of the system and method, at least one of said one or more environmental parameters sensed by the second sensor is distinct from the one or more environmental parameters sensed by the first sensor.

In yet further embodiments of the system and method, the second sensor senses the quality of light at the surface of the object in a line of sight from the given viewing point of the object.

In embodiments of the system and method, the one or more environmental parameters sensed provide data sets for the processor to determine lighting conditions and changing lighting conditions in the environment over time. In other embodiments of the system and method, the lighting conditions are determined by the processor to be photopic, mesopic, or scotopic lighting conditions.

In related embodiments of the system and method, the one or more environmental parameters sensed provide data sets for the processor to determine a lighting condition of the scenery, the lighting condition selected from the group consisting of a photopic, mesopic and scotopic lighting condition, and to determine how said lighting condition changes in the scenery over time.

In still other embodiments of the system and method, the processor determines the colour of the scenery in the environment based on the one or more environmental parameters sensed and wherein the light outputs comprise an equiluminance based wavelength of light selected by the processor with reference to said colour of the scenery. In yet further embodiments of the system and method, the equiluminance based wavelength of light is an equiluminant colour. In other embodiments of the system and method, the equiluminance based wavelength of light is a split equiluminant colour. In yet other embodiments of the system and method, the equiluminance based wavelength of light is a triadic equiluminant colour.

In related embodiments of the system and method, the processor determines the colour of the scenery, or a portion thereof, in the environment based on the one or more environmental parameters sensed and wherein the light outputs comprise an equiluminance based wavelength of light selected by the processor with reference to said colour of the scenery, or portion thereof, said selected equiluminance based wavelength of light having an equiluminant colour, a split equiluminant colour or a triadic equiluminant colour.

In still other embodiments of the system and method, the light outputs are modulated to account for the differential ability of a viewer to perceive red-based wavelengths of light compared to blue-based wavelengths of light under changing lighting conditions. In yet further embodiments of the system and method, the light outputs are modulated to account for the time it takes for a viewer's vision to adjust to changing lighting conditions. In embodiments of the system and method, the light outputs are modulated to account for if the viewer is using a UV vision protective means, based on an estimation of the UV Index of the lighting conditions. In other embodiments of the system and method, the light outputs are modulated to account for when the processor determines that the colour of the scenery is a greyscale colour.

In related embodiments of the system and method, the light outputs are modulated to account for a viewing parameter, the viewing parameter selected from the group consisting of a viewer's ability to perceive red-based wavelengths of light compared to blue-based wavelengths of light under a changing lighting condition, a time it takes for a viewer's vision to adjust to one or more changing lighting conditions, a use by the viewer of a UV vision protective means based on an estimation of the UV Index of a lighting condition, and a determination by the processor that the colour of the scenery, or a portion thereof, is a greyscale colour.

In still other embodiments of the system and method, the one or more targeted vision responses comprise a peripheral vision response. In yet further embodiments of the system and method, the one or more targeted vision responses comprise a foveal vision response. In other embodiments of the system and method, the one or more targeted vision responses comprise a guided vision response.

In related embodiments of the system and method, the one or more targeted vision responses comprise a peripheral vision response, a foveal vision response, or a guided vision response.

In embodiments of the system and method, the one or more wavelengths of light comprise a colour that peaks the sensitivity of the foveal vision response.

BRIEF DESCRIPTION OF THE DRAWINGS

These and other features of the invention will become more apparent in the following detailed description in which reference is made to the appended drawings.

The drawings which constitute a part of this specification, exemplify the embodiments of the present invention. Together with the description, they explain and illustrate aspects of the invention and are not intended to depict every feature of actual embodiments nor relative dimensions of the depicted elements and are not drawn to scale.

FIG. 3: The embodiment of FIG. 1 and embodiment of FIG. 2 in various inter-communication configurations: A) where the one-way system of FIG. 1 senses another one-way system of FIG. 1; B) where each of the FIG. 2 systems can sense the other; and c) where a one-way system of FIG. 1 senses a two-way system of FIG. 2.

FIG. 6: Two dimensional schematic drawings illustrating an object perception system according to the present disclosure, and depicting the light emission features presented in a triangle form factor including front, side (left and right), and top views.

FIG. 7: Two dimensional schematic drawings illustrating an object perception system according to the present disclosure, and depicting the light emission features presented in a triangle form factor including rear, side (left and right), and top views.

FIG. 8: Two dimensional schematic drawings illustrating an object perception system according to the present disclosure, and depicting the light emission features presented in a circle form factor including front, side (left and right), and top views.

FIG. 9: Two dimensional schematic drawings illustrating an object perception system according to the present disclosure, and depicting the light emission features presented in a circle form factor including rear, side (left and right), and top views.

FIG. 16: An embodiment of an object perception process or method according to the present disclosure illustrating the operation of the ongoing engines of FIG. 11 (e.g. the Purkinje, UV Adaptation, Blue Light Blocking and Zero Saturation engines) to produce a display (light) output.

FIG. 39 (1-12): Exemplary colour model—Table of HSL colour values including equiluminant and triadic colour values according to the system and methods of the present disclosure.

FIG. 40 (1-12): Exemplary colour model—Table of HSL colour values including equiluminant and split equiluminant colour values according to the system and methods of the present disclosure.

FIG. 41 (1-4): Table illustrating exemplary geometric symbols that can be displayed by the system of the present disclosure.

DETAILED DESCRIPTION OF THE INVENTION

Figure 1:
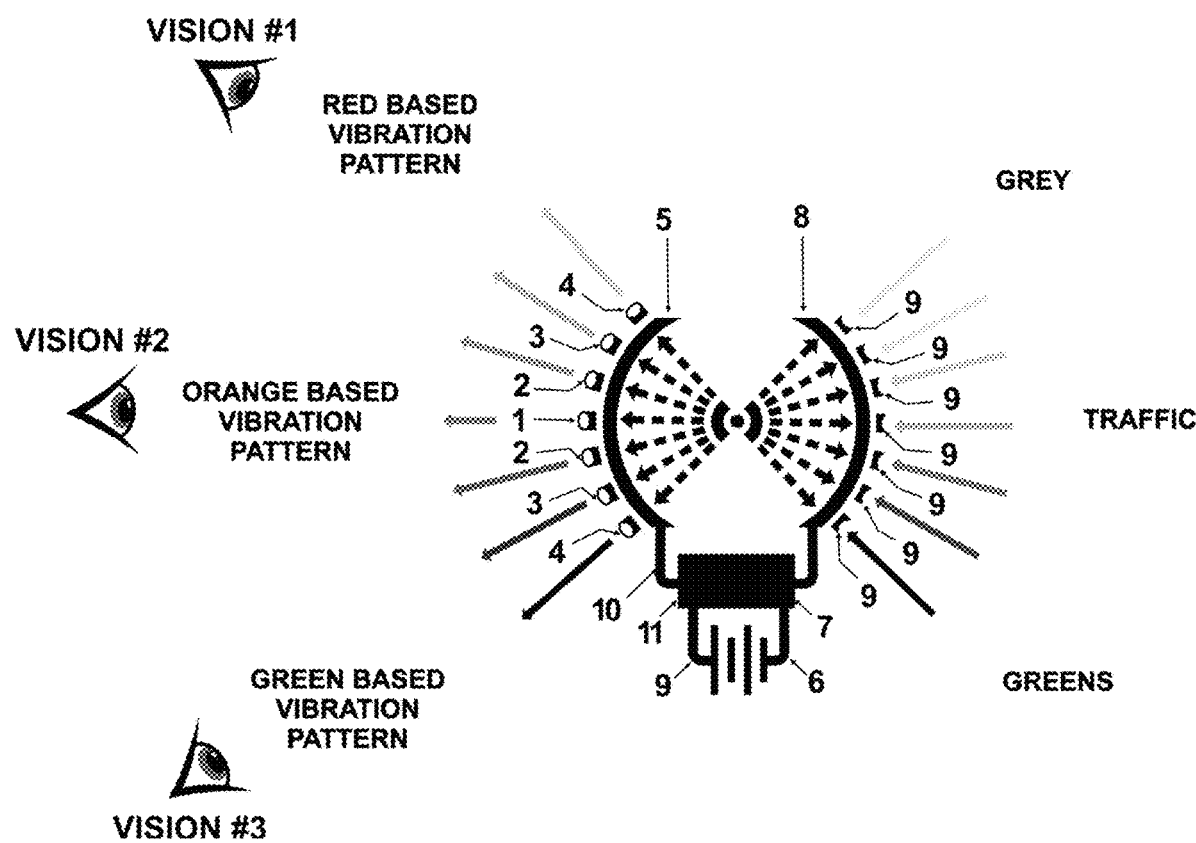
FIG. 1: An embodiment of an object perception system according to the present disclosure comprising one-way input sensors operatively configured with light displays to emit specified light outputs.

The present invention relates to the field of object recognition by facilitating the ability of a viewer to perceive an object in a given environment under changing environmental conditions, for example, when those conditions affect the visibility of the object, or when those conditions affect the state of an object.

Various features of the invention will become apparent from the following detailed description taken together with the illustrations in the Figures. The design factors, construction and application of the systems (including sub-systems, and components however configured) and methods (processes) disclosed herein are described with reference to various examples representing embodiments, which are not intended to limit the scope of the invention as described and claimed herein. The skilled technician in the field to which the invention pertains will appreciate that there may be other variations, examples and embodiments of the invention not disclosed herein that may be practiced according to the teachings of the present disclosure without departing from the scope and spirit of the invention.

Definitions

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or method steps. The term "consisting essentially of" when used herein in relation to a composition, device, article, system, use or method, denotes that additional elements and/or method steps may be present, but that these additions do not materially affect the manner in which the recited device, article, system, method or use functions. The term "consisting of" when used herein in relation to a device, article, system, use or method, excludes the presence of additional elements and/or method steps. A device, article, system, use or method described herein as comprising certain elements and/or steps may also, in certain embodiments consist essentially of those elements and/or steps, and in other embodiments consist of those elements and/or steps, whether or not these embodiments are specifically referred to.

As used herein, the terms "about", "approximately", or symbol '—', refer to +/−10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical and non-physical functional associations between elements or features of the system of the present disclosure, as well as any direct or indirect physical and non-physical functional associations between elements or features of the system and an object to be viewed or being viewed by a viewer. Accordingly, these terms may be understood to denote elements or features that are partly or completely contained within one another, attached, coupled, disposed on, mounted on, fitted with, or to one another, joined together, in communication with one another (e.g. using electricity or electromagnetic waves), etc., and even if there are other elements or features intervening between the elements or features described as being connected.

As used herein, the term "environment" refers to the one or more conditions (visible or invisible to the eye) within an area or volume that is adjacent to, or surrounds an object, or part thereof. Such environmental conditions may include, without limitation, one or more other objects, physical features, atmospheric elements, and the quality of light which can vary according to the time of day/night, time of the year and geolocation of the viewer and object. An environmental condition may also include the colour of the object to be, or being viewed. Each of the one or more conditions may be referred to interchangeably herein as an environmental parameter, when a specified environmental condition is capable of affecting the visibility of an object and being sensed by a sensor. The term "scenery" refers to one or more environmental conditions in the same field of view as the object to be, or being viewed from a given viewing point. A portion of a scenery corresponds to part of the totality of the scenery that an object is situated within as viewed by a viewer from a particular vantage point, such as a portion behind the object, a portion in front of the object, or another (pre)defined portion of the scenery that may be used by the system and method of the present disclosure in operation. In the context of the operation of the system and methods of the present disclosure, the term "scenery" can also be understood to denote selected environmental parameters sensed and processed in order to produce light outputs that will assist a viewer to perceive an object from a given viewing point.

As used herein, the term "equiluminance" or "equiluminant" refers to colours that differ in hue, but not substantially in brightness. When two colours are equiluminant to each other and are viewed essentially next/adjacent to one another, it elicits a vision-based response from a viewer (e.g. a peripheral visions response) that draws the attention of the viewer to exert effort to process and comprehend (perceive) what has been seen. An equiluminance based wavelength of light may be an equiluminant, a split equiluminant or triadic equiluminant colour, having regard to a reference colour (e.g. of the scenery surrounding an object) as determined by the system and methods according to the present disclosure. As referred to herein, an equiluminant colour in the context of a grey scale environment is also understood to refer to a white, or black hue selected to provide the greatest contrast for the grey scale value detected in the environment. In this context, the amount of light emitted by the system of the present disclosure may also have to be adjusted to account for dim lighting conditions to facilitate object perception.

As used herein, the term "light" refers to electromagnetic radiation that can be detected or sensed by the eye/vision system. Detection or the sensing of light by the eye may be aided or unaided and may include the sensing of a band of wavelengths ranging from about 750 nanometres (nm) for red light down to about 380 nm for violet light. The spectral regions adjacent to this band of wavelengths of light are known as infrared light at the one end (longer wavelength than red light) and ultraviolet light at the other (shorter wavelength than violet light).

As used herein, the term "object" is understood to be a reference to a tangible thing, including the object as a whole and/or any particular part(s) of the object to which a system, or part of a system according the present disclosure is connected to. An object may be any kind of matter, including without limitation, a living organism (e.g. human person, animal, or plant), or an inanimate object. An inanimate object is understood to be an object that may or may not have the ability to sense (detect) other objects. If able to detect other objects, an object that can sense another object may also be able to process indicia of said other object. For example, an inanimate object fitted with, or otherwise configured with a system, network of component features, or one or more component features of the present disclosure (e.g. a sensing and a processing means) can be said to be an inanimate object able to detect the presence of another object. When an object is a living organism, e.g. a human subject, animal or plant the object may similarly be fitted with a system, network of component features, or one or more component features of the present disclosure. In one embodiment, the living being can be an object to be viewed and the viewer of another object to be viewed.

As used herein, the terms "on", "at" and "from" with reference to an object are understood to refer to a position, or occurrence substantially coincident with the location of the object or a location in proximity to the object. When a system, a network of component features of the system, or component feature of the system is in proximity to an object, or when an environmental parameter is measured in proximity to an object, the location is understood to be sufficiently close so as to be representative of the object's location, such that a viewer could perceive the location of the object using the systems and methods according to the present disclosure. When a system, a network of component features of the system, or component feature of the system is connected to an object it is understood to be either on, at or from the object, or it can be located at a remote location from the object, but still configured to inform a viewer of the object's location, or location from which an environmental parameter is measured.

As used herein, the term "sensitivity" refers to the ability of matter to be activated or stimulated, e.g. as in the case of a sensor, or the cells/photoreceptors (rods and cones) of the eye. When matter is activated or stimulated, there may be a processing response sufficient to give rise to a change in state (e.g. perception by the eye, or a display output (of light) in the case of a system according to the present disclosure). When an activation occurs, or a stimulus is applied with a view to maximize the sensitivity of the matter (e.g. sensor or photoreceptors), this is understood to correlate to the greatest potential under a set of defined circumstances to yield a response sufficient to give rise to a change in state of the matter activated, or stimulated, and/or other matter operatively associated with it. When photoreceptors are stimulated to the greatest extent possible, this is referred to as the peak sensitivity of the rods or cones of a vision system, or a peak vision response. Photoreceptors can be sensitized from one state to another state, e.g. from a dormant (inactive) state to an active state, or from a partially sensitized state to a greater or fully sensitized state. In other cases, the sensitization of photoreceptors can occur after being desensitized.

As used herein, the term "sensor" comprises one or more sensing elements, and the way said one or more sensing elements is configured with other components to detect, or sense one or more environmental parameters (measurand(s)) and then transmit a usable output (information/data) for a downstream application responsive to, corresponding or otherwise indicative of the detected or sensed environmental parameter. A "sensor system" is understood to comprise one or more sensors combined with a processing means for receiving and processing the usable outputs of the one or more sensors. Reference to a "sensing means" may refer to a sensing element, sensor or sensor system. The processing means (one or more processors) of a sensor system may be packaged in a single device with one or more sensors/sensing elements, or may be housed in a separate device(s) distinguishable from the device(s) housing the one or more sensors/sensing elements. When reference is made to an environmental parameter that is "sensed" according to the systems and methods of the present disclosure, it is understood to mean one or more information inputs that have been captured to detect, identify, measure and/or otherwise record the environmental parameter in a manner suitable for use to determine what light outputs will be emitted from a display. Once an information input is captured it may or may not require further processing.

As used herein, the term "vision" refers to the ability to sense (detect), using the eye (e.g. human eye), one or more qualities or characteristics (indicia) of an object. The degree to which said one or more object indicia is sensed may result in the viewer becoming alerted to the presence of the object, aware of the object, and/or conscious of the object. The viewer may also be alerted to, or be able to process a change in state of the object. An object can, thereby, be perceived or seen to varying degrees of comprehension. Engaging the sense of vision need not cognitively result in understanding what has been seen, only that something has been perceived. For example, a viewer who has a vision deficiency or impairment may only perceive shadows, or contours of objects and would still be considered to have a sense of vision. The ability to cognitively identify one or more qualities or characteristics (indicia) is an aspect of perceiving, or seeing an object. In the present disclosure, when perceiving or seeing an object reaches the level of object recognition, the viewer has comprehended enough about the object to be able to have a desired pre-motor, or motor (cortex) response, if required. In one embodiment, the desired pre-motor, or motor response is to prepare to avoid contact with the object. In another embodiment, the desired motor response is a course of action taken to avoid contact with the object. In still another embodiment, the desired motor response is something other than avoiding contact with the object. In yet another embodiment, the desired motor response relates to a change in state of an object. Unless otherwise qualified or described herein, use of the terms "viewer", viewed, or "viewable" refers to the ability of a subject (e.g. human subject) to see and discern light and the absence of light, and the colour, contours, shapes, forms, contrasts and other visually perceivable indicia of an object in an environment.

It is contemplated that any embodiment of the systems, methods and uses disclosed herein can be implemented by one skilled in the art, as is, or by making such variations or equivalents without departing from the scope and spirit of the invention.

Overview of Dynamic Visual Vibration Systems and Methods

The systems and methods of the present disclosure are directed to facilitate object perception by a viewer. The manner in which the systems and methods do this is based on the physiology of how vision systems in a subject work under different environmental conditions (such as changing lighting conditions). In one embodiment, the systems and methods of the present disclosure elicit a targeted vision response from a viewer. Eliciting a targeted vision response is understood to include the initial stimulation or activation of the particular vision response targeted, as well as the modulation thereof once stimulated or activated.

More particularly, the systems and methods of the present disclosure measure environmental parameters to generate actively changing (dynamic) light outputs emitted (displayed) from an object to be, or being viewed. The light outputs partially or fully sensitize the peripheral and/or foveal visions systems of the eye for the viewer to perceive the object from a given viewing point. This entails accounting for, among other things, how the quality of light in the object's surrounding environment and at it surface changes over time and space with reference to a given object viewing point. In this way, the systems and methods of the present disclosure are also understood to be dynamic visual vibration (DVV) systems and methods.

Some of the advantages of the systems and methods of the present disclosure are: a) they do not depend on the presence of an external light source directed at the object to illuminate it, for it to be perceived, b) they account for the viewable scenery around an object, c) they account for different object viewing points, and d) they provide to a viewer of an object an active and dynamically changing visual vibration output (i.e., display output of selected wavelengths of light) to facilitate object perception.

An object viewing point with reference to the location of an object is understood to refer to any location/position in a space surrounding the object (vantage point) from which a viewer can perceive the object, or the emission of light coming from a display connected to the object, e.g. on the surface of the object, in front of, behind, above, below, or to the side of the object. An object viewing point includes, without limitation, vantage points that are within viewing distance of the object, as determined by the ability of the eye to perceive the emission of light from the surface of the object, or display connected to the object. In other cases, the object viewing point may include technology aided vantage points which allow the viewer to be at locations remote from the object, or not in a direct line of sight to the object itself.

A given viewing point is accounted for by a system according to the present disclosure when a display output of light by a system connected to an object is viewable under prevailing environmental conditions. A given viewing point can change depending on the location of the display(s) relative to an object, whether or not the object is stationary, or moving, whether or not the viewer is stationary or moving and the proximity of the display output to the object.

In one embodiment, the system operates to elicit a targeted vision response from the viewer for the viewer to perceive an object. In a related embodiment, the system operates to elicit a peripheral vision response from the viewer. When a peripheral vision response is engaged, the attention of the viewer is drawn to the object. In another related embodiment, the system operates system to elicit a foveal vision response from the viewer. When a foveal vision response is engaged, the viewer is able to actively process the image of an object.

By eliciting targeted vision responses from a viewer of an object from a given viewing point, visual obstructions, desensitization and circumstances that may disrupt the visual attention and acuity of the viewer are mitigated. This in turn makes a wider range of desirable motor responses available to the viewer, as a result of having perceived the object.

Vision Systems

The systems and methods of the present disclosure are designed to increase the efficiency and accuracy of vision-based responses, such as peripheral and foveal vision responses, and visual search tasks (i.e. as guided by visual factors including without limitation colour, shape, size and orientation). By generating light outputs that are emitted/displayed from an object to be or being viewed, and that are selected to elicit one or more particular (target) vision responses, the 'vision attention' of a viewer can be leveraged in a way that improves motor responses in respect of objects (e.g. to avoid collisions).

The design of the systems and methods of the present disclosure are based on an understanding of how vision systems operate. In Hullman, Adar, Shah (2011) "Benefitting InfoVis with Visual Difficulties", IEEE Transactions on Visualization and Computer Graphics, Volume: 17, Issue 12, pp. 2213-2222 it was shown that making visual information harder to perceive will cause the brain to become aware more quickly that there is an object and expend more effort to process the information about the object. By creating such "desirable difficulties" for vision systems, more active neuro-processing takes place to facilitate object perception and by extension, recognition to the degree needed so that the viewer can react in a way to prevent harm, or achieve a desired motor response.

Rods and Cones

The rods and cones of vision systems can impact the activity and other behavioural patterns of a subject (viewer) to avoid harm and be safe by way of firing motor neurons. Understanding how rods and cones can lead to the firing of motor neurons is material to creating an improvement in visually based object recognition technology. Rods and cones have different visible wavelength peak sensitivities. Rods are more sensitive overall. Rods peak lower on the spectrum towards blue wavelengths of light. Cones peak higher on the spectrum towards yellow wavelengths of light.

There is only one type of rod and it senses only levels of brightness (luminance), not colour. Rods can trigger the firing of motor neurons most effectively with information from sensed luminance at night and from the periphery of the eye (peripheral vision system).

There are three types of cones, each sensitive to different wavelengths of visible light (red, green, blue). Cones can trigger the firing of motor neurons most effectively with information from sensing colour during the day and from the centre-gaze of the eye (foveal vision system).

As light dims, vision shifts from relying on the functioning of cones to the functioning of rods. This results in the relative luminance (or brightness) of colours changing. Reds appear darker and blues appear brighter.

Blue cones are short, green are longer and red are the longest. When we centre-gaze (look directly at an object), we use only the middle cones (Green) and long cones (Red). At the periphery, we use short (Blue), middle (Green), long (Red) and the rods (to be able to also detect luminance).

Lighting Conditions and Optimization of Light Outputs

The wavelengths of light that can be output by the systems of the present disclosure and that are most likely to elicit a targeted vision response from a viewer of an object from a given viewing point in an environment, changes between the day, dusk, night and dawn. In one embodiment, the targeted vision response of the viewer is elicited under scotopic lighting conditions. In another embodiment, the targeted vision response is elicited under mesopic lighting conditions. In yet another embodiment, the targeted vision response is elicited under photopic lighting conditions.

There are no chemicals, materials, or surfaces that will respond to changes in light, in a constant manner, across all parts of the visible spectrum. For example, there is no cycling jacket, blinking red or yellow light, or safety vest that will maintain its hue and luminance (colour) as the light changes in the vicinity of and greater surrounding environment as you move towards and away from the object.

Under day lighting conditions (photopic), vision relies more heavily on cone photoreceptors and is best able to sense and discern colour. Under night lighting conditions (scotopic), vision relies more heavily on rod photoreceptors and are in effect, colour blind.

Under dusk and dawn lighting conditions (mesopic), vision can rely substantially on both cone and rod photoreceptors and are only partially colour blind. The wavelengths of light that eyes are most responsive to when using both cone and rod photoreceptors differs from the wavelengths of light that eyes are most responsive to when only rod photoreceptors, and differs again when only cone photoreceptors are substantially in use, respectively.

In the case of artificial light conditions, depending on the type of lighting used, photopic, mesopic or scotopic lighting conditions may be simulated Moreover, unlike the systems and methods of the present disclosure that are able to determine when a fully optimized versus partially optimized light output can be displayed, prior art systems and methods that purport to change light outputs based on a change in the environment offer no guidance on how to optimize, or otherwise modulate said light outputs with regard to how vision systems work (including without limitation, how they are stimulated, adapt and respond) under changing environmental conditions.

Figure 34:
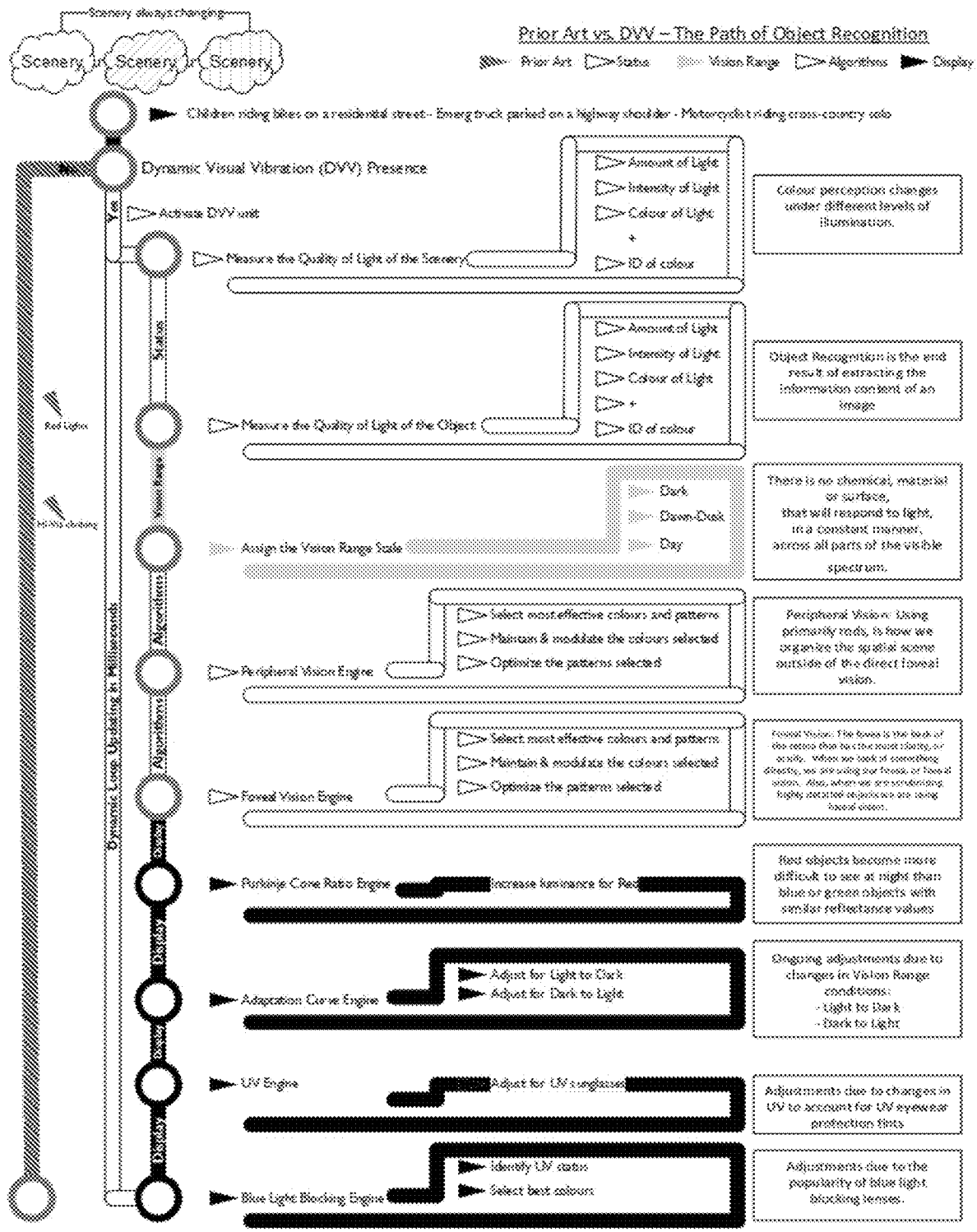
FIG. 34 Schematic comparison of the prior art approach to assisting a viewer to perceive an object in an environmental and the approach applied by the systems and methods of the present disclosure to assist a viewer to perceive an object under changing environmental conditions.

With reference to FIG. 34 the operation of the systems and methods of the present disclosure, the choice of colour(s) to be displayed is determined by the quality of light and other parameters that can be sensed in the environment where the object to be, or being viewed by a viewer is located. This overcomes many of the deficiencies in the prior art because the systems and methods described herein provide and can modulate light outputs from displays that are selected to elicit a particular kind of (targeted) vision response, and do this by taking into account how vision systems work, including without limitation, how they are stimulated, adapt and respond in changing environmental conditions.

Figure 35:
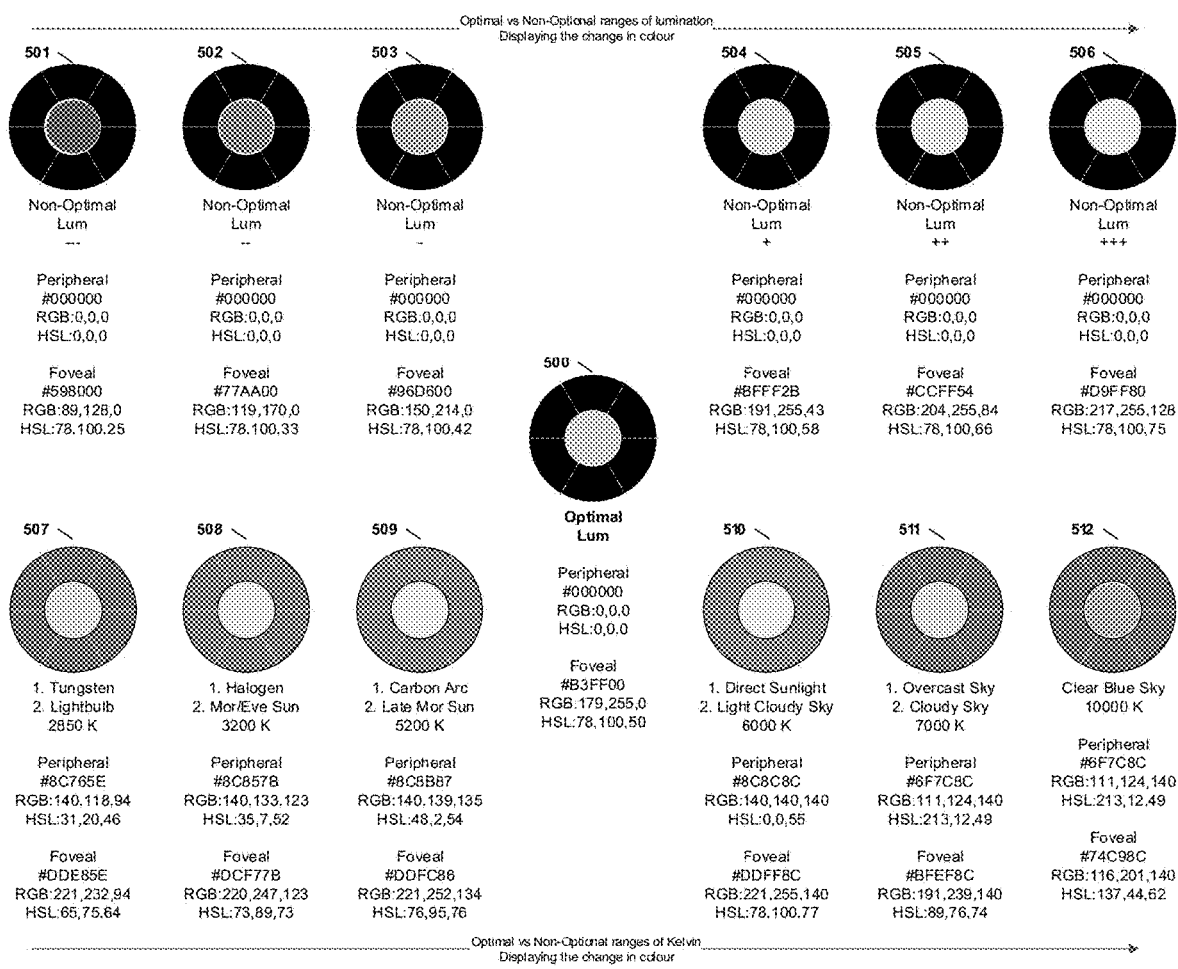
FIG. 35: Schematic representation of how the colour of an object is perceived depending on the level luminance and kelvin (temperature of light) available to view an object.

FIG. 35 illustrates the significance of having a system that provides such a dynamically changing light output with a view to elicit targeted vision responses (e.g. peripheral and/or foveal), including the modulation of said responses to a desired degree of sensitization. It does this by indicating the difference between an optimized light output and light output that is not optimized, as well as what happens when a desired degree of light output optimization is not dynamically maintained.

As shown in FIG. 35, the colour combination 500 represents a selected light output by the system of the present disclosure. The colour combination 500 of colour hues and luminance shown (black and green) can be understood as an optimized light output with reference to a set of environmental parameters sensed and processed by the system. In other words, this light output is intended to elicit fully sensitized peripheral and foveal vision responses for the detected environmental conditions. By contrast, colour combination/light outputs 501 to 506 would not elicit targeted vision responses that are fully sensitized for the environmental parameters sensed by the system, particularly with regard to the foveal vision response. Partially optimized light outputs may be desirable when the ability to facilitate object perception would not be materially compromised and said outputs could provide additional benefits, such as, operational efficiencies and extending system component life-cycles or performance.

The systems and methods of the present disclosure also account for the colour of light falling on the object requiring recognition. The colour of light is measured in Kelvin and can range from commonly known values, characterized as 'warm' to 'cool' light in different environments, e.g. at different time points during the day. Depending on environmental lighting conditions, the colour combination 500 may appear to a viewer to be other colours or variations of the colours, such as, but not limited to the colour combinations 507-512, e.g. from a pale, yellow green to a grey and to blue-green colour hues.

When one or more wavelengths of light (colours) has been chosen by the systems and methods of the present disclosure to be output in order to elicit a targeted vision response, the selection is based on and adjusted (modulated) to take into account sensed colour of light conditions. This functionality and the resulting light outputs provides viewable colour(s) most likely to facilitate object perception. In this way, changing colour temperature conditions is compensated for to ensure that the selected display output (wavelengths of light) can be viewed in a manner most likely to result in a desired degree of object perception and thereby result in the desired degree of motor responsiveness, as may be required under the circumstances.

In one embodiment, the system determines when to emit from a display a fully optimized output of one or more wavelengths of light to facilitate object perception. In another embodiment, the system modulates the degree of optimization of the display output of one or more wavelengths of light to facilitate object perception. In a related embodiment, the system modulates the colour hue of a display output of one or more wavelengths of light to facilitate object perception. In yet another related embodiment, the system modulates the luminance of a display output of one or more wavelengths of light to facilitate object perception. In still another related embodiment, the system determines how to adjust (modulate) the colour of light of a display output of one or more wavelengths of light to facilitate object perception. In still a further related embodiment, the system determines how to adjust (modulate) the amount of light of a display output of one or more wavelengths of light to facilitate object perception. In another related embodiment the system modulates the intensity of light of a display output of one or more wavelengths of light to facilitate object perception.

Peripheral and Foveal Vision Systems

Neuroscientists define the two visual systems for primates as: "Where" and "What". For effective object perception (including recognition), you need both. Whereas our colour-blind visual (peripheral) system is fast at locating information and contrast to detect or sense contours, our slower, colour-based visual (foveal) system is better for seeing the details of an object to achieve visual acuity.

Visual acuity relates to the clarity with which we can perceive or see an object. Our visual acuity is very low when we are not looking at something directly. The fovea, at the back of the retina facilitates visual acuity. In one embodiment, the systems and methods of the present disclosure elicit a foveal vision response from a viewer of an object, which can lead to greater visual acuity of the object. When we look at something directly, and are scrutinizing object detail, we are using our fovea, or foveal vision. Peripheral vision detects and can direct foveal vision towards an object to be or being viewed by a viewer. In another embodiment, the systems and methods of the present disclosure elicit a peripheral vision response from a viewer of an object to be or being perceived, which can further elicit a foveal vision response from the viewer of the object.

In still another embodiment, the systems and methods of the present disclosure elicit a guided vision response from a viewer of an object to be, or being viewed by a viewer, which can be also understood as comprising one or more targeted vision responses, such as, but not necessarily limited to, peripheral and/or foveal vision responses.

Environmental Parameters—Quality of Light

Colour is defined by the combination of the hue and luminance of light. Hues are the mix of red, green and blue as perceived by cones. Luminance is a measurable parameter sensed by rods and that a viewer experiences as the brightness of perceived light. Luminance measures the amount of light emitted or the amount of light reflected off a surface. A luminance value indicates how much incandescent intensity can be perceived by the eye.

In one embodiment, the system and method of the present disclosure senses the luminance level behind the object to be perceived from a given viewing point. Accounting for this environmental parameter supports the operation of the Foveal Vision Engine. In another embodiment, the system and method of the present disclosure senses the (generalized or averaged) colour of the scenery behind an object to be perceived from a given viewing point. Accounting for this environmental parameter supports the operation of the Peripheral Vision Engine.

In yet another embodiment, the quality of light is the environmental parameter sensed by the system and method of the present disclosure. There are three components to the quality of light; the amount of light, the intensity of light and the colour of light. Each of these components may also be understood as distinct environmental parameters. In one embodiment, the environmental parameters sensed are selected to characterize the quality of light of the scenery in which an object is situated (located). In another embodiment, the environmental parameters sensed are selected to characterize the quality of light at the surface of an object. In still another embodiment, the environmental parameters sensed are selected to characterize the quality of light of the scenery in which an object is situated/located, and the quality of light at the surface of an object.

The amount of light is measured using radiometry, which is the measurement of light waves in the optical portion of the electromagnetic spectrum. A measurement of the amount of light is called Radiant Flux, which is the total amount of light emitted from a light source, for example a 100-watt light bulb. There are, without limitation, other indicators that can be measured to compliment Radiant Flux. Radiant Intensity is the amount of light from the 100-watt light bulb measured at a known angle. Irradiance is the amount of light from the 100-watt light bulb measured on a known surface area. Radiance is the amount of light from the 100-watt light bulb measured at a known angle on a known surface area. In one embodiment the systems and methods of the present disclosure sense in an environment, one or more parameters selected from Radiant Flux, Radiant Intensity, Irradiance and Radiance.

The intensity of light is measured using photometry, which is the measurement of visible light from a person's perspective. A measurement of the intensity of light is called Luminous Flux, which is the total perceived power of light emitted from a light source, for example how much light a person sees from a 100-watt light bulb. Without limitation there are other indicators that can be measured to compliment Luminous Flux. Luminous Intensity is how much light a person sees from the 100-watt light bulb measured at a known angle. Illuminance is how much light a person sees from the 100-watt light bulb measured on a known surface area. Luminance is how much light a person sees from the 100-watt light bulb measured at a known angle on a known surface area. In one embodiment the systems and methods of the present disclosure sense in an environment, one or more parameters selected from Luminous Flux, Luminous Intensity, Illuminance and Luminance.

The colour of light is the measurement of the temperature of a light source. Temperature is the appearance provided by a light source. For example, natural daylight at noon appears as a crisp light that appears as a blue colour. Natural daylight one hour after dawn does not appear as a blue colour but will be in the visible wavelengths of light characterized by warmer, redder hues. Artificial light also has different colours of light. A fluorescent bulb in an office appears as a crisp light that appears to be a blue colour. An incandescent bulb in a home does not appear as a blue colour but will be in the visible wavelengths of light characterized by warmer, redder hues. In one embodiment, the systems and methods of the present disclosure sense the colour of light in an environment, otherwise known as the temperature of light.

The amount, intensity and colour components of the quality of light are variables (environmental parameters) accounted for in the systems and methods designed to facilitate object perception (and to achieve a desired degree of object recognition) according to the present disclosure. By contrast, a green safety vest will rarely be viewed as it was designed, due to the changes in the amount, intensity and colour of light striking the object throughout the day and into the night. At dawn, it will appear paler and during a bright day it will appear darker. The effectiveness of the green safety vest is materially compromised by the amount, intensity and colour components of the quality of light that change throughout the day.

Scenery and Object Colour—Selecting Equiluminant Colours

To perceive an object situated in an environment in accordance with the present disclosure, the overall colour of the scenery behind an object, as sensed (and representative of what is seen from a given viewing point) facilitates the selection of one or more wavelengths of light (colours) by the processing means of the system to be emitted by a display output on the object in the line of sight of a viewer. In one embodiment, a display output of light that is equiluminance-based with reference to overall colour of the scenery sensed by the system is provided to facilitate object perception by the viewer. The selection of one or more wavelengths of light that is/are equiluminance-based can be refined if the colour of the object is also sensed and input into the processor of the system. In a related embodiment, a display output of light that is equiluminance-based with reference to overall colour of the scenery and colour of the object sensed by the system is provided to facilitate object perception by the viewer.

When two colours differ in hue but have the same luminance, they are called 'equiluminance' or 'equiluminant' colours. Using equiluminant colours creates an unstable image from a static image. It catches the attention of a viewer quickly and elicits extra effort from the viewer to resolve what is being viewed. In one embodiment the system and methods of the present disclosure is configured to output one or more wavelengths of light from an object, which is/are equiluminance-based with reference to the overall colour of the scenery behind an object to be, or being viewed by a viewer from a given viewing point.

With reference to primate vision, there are two visual systems: 1) the older, colour-blind system helping us to perceive where an object is, and 2) the newer, colour visual system helping us to perceive what an object is. When equiluminance based colours are presented to a viewer, the "What" (foveal) system sees the shapes because of sensing colour differences, and the "Where" (peripheral) system is not able to discern shapes because the colours have a similar luminance. This period of imbalance between the "Where" and "What" visual systems will make an object look peculiar when being perceived and can generate a sense of vibration, or motion.

In one embodiment, the system will output one or more wavelengths of light that are equiluminance based with reference to the colour of the scenery behind the object to be, or being viewed by a viewer. Using equiluminance based colours creates an unstable image from a static image that results in an unexpected change of visual sensory input. It is an effective means of catching the attention of a viewer and causing the viewer to exert additional effort to process what has initially been perceived and thereby be more likely to result in object recognition. In other words, the unexpectedly sensed peculiarity of equiluminance based colour(s) drives the viewer to resolve what has been perceived with greater acuity.

In one embodiment, the system will output one or more wavelengths of light that comprise the equiluminant colour of the colour of the scenery behind the object to be, or being viewed by a viewer from a given viewing point. In another embodiment, the system will output one or more wavelengths of light that comprise the equiluminant colour determined based on the colour of the scenery behind the object to be, or being viewed and the colour of the object to be, or being viewed by a viewer from a given viewing point. To identify and output a sensed colour's equiluminant colour, the colour 180 degrees opposite on a colour wheel is selected. This equiluminant colour when output by the system, will be opposite in hue, and have the same brightness (luminance) as the overall sensed colour with reference to a scene behind an object to be viewed or being viewed, or with reference to said scene and the object.

In another embodiment, the system will output one or more wavelengths of light that comprise the split equiluminant colour of the colour of the scenery behind the object to be, or being viewed by the viewer from a given viewing point. In another embodiment, the system will output one or more wavelengths of light that comprise the split equiluminant colour determined based on the colour of the scenery behind the object to be, or being viewed and the colour of the object to be, or being viewed by a viewer from a given viewing point. In this embodiment, the sensed colour of the object is used to further inform the determination of the equiluminance based wavelength of light to be output. To identify and output a sensed colour's split equiluminant colours, the two colours adjacent to its complement is selected. Therefore, the two colours are +150 degrees and −150 degrees opposite the sensed colour on a colour wheel. This split equiluminant colour when output by the system, will be substantially opposite in hue, and have the same brightness (luminance) as the overall sensed colour used to make the determination of the split equiluminant colour.

In still another embodiment, the system will output one or more wavelengths of light that comprise the triadic equiluminant colour of the colour of the scenery behind the object to be or being viewed by the viewer from a given viewing point. In another embodiment, the system will output one or more wavelengths of light that comprise the triadic equiluminant colour determined based on the colour of the scenery behind the object to be, or being viewed and the colour of the object to be or being viewed by a viewer from a given viewing point. In this embodiment, the sensed colour of the object is used to further inform the determination of the equiluminance based wavelength of light to be output. To identify and output a sensed colour's split equiluminant colours, the two colours adjacent to its complement is selected. To define a sensed colour's triadic equiluminant colours, the two colours that are evenly spaced around the colour wheel relative to the sensed colour are selected. Therefore, the two colours are +120 degrees and −120 degrees away on a colour wheel. The triadic equiluminant colour when output by the system, will be different in hue, effective as an equiluminance based colour, and have the same brightness (luminance) as the overall sensed colour used to make the determination of the triadic equiluminant colour.

Colour Model Protocol

The Tables of FIGS. 39 and 40 provide colour values, their equiluminant, split equiluminant and triadic equiluminant colour values based on one embodiment of a colour model protocol according to the present disclosure, namely the Hue-Saturation-Lightness (HSL) colour model. The identification of colour is not limited to the HSL colour model. In other embodiments, a suitable colour model protocol may be based on one or more of the HSL, CMYK, Bitmap, HSV, RGB, Duotone, Indexed colour, LAB, NCS, Greyscale, Halftone, Pantone Matching System, Hexachrome, ANPA, HKS, DIC, Munsell, TOYO, FOCOLTONE and TRUEMATCH colour models.

A colour sensor for a scene will detect and measure a range of visible colours and translate the input into codes that can be further processed to select and output one or more wavelengths of light to create an unrealistic luminance effect. For example, a colour sensor may identify and classify a scene as 'Air Force Blue (Raf)', or the equivalent hexadecimal colour code '#5d8aa8' or the equivalent HSL codes of '204, 30, 51'. The HSL colour model protocol will accept the data from the colour sensor and can determine a number of unrealistic luminance colour based variants: 1) the Identification of Equiluminant Colour '24, 30, 51'; 2) the Identification of Split Equiluminant Colour 1 '354, 30, 51'; 3) the Identification of Split Equiluminant Colour 2 '54, 30, 51'; 4) Identification of Triadic Equiluminant Colour 1 '324, 30, 51'; and 5) the Identification of Identification of Triadic Equiluminant Colour 2 '84, 30, 51'.

Geometric Symbols and Patterned Light Outputs

There are multiple theories and concepts regarding 'vision attention' and 'visual search tasks'. One major theory is the Feature Integration Theory (FIT; Treisman and Gelade, 1980, Treisman and Souther, 1985). FIT is a perceptual and attentional theory that describes the visual search paradigm when an odd element differs significantly from all the distractors by the same elemental feature, such as colour. Without intending to limit the present disclosure, this theory is referenced herein as one way describe and account for how during a visual search, a person uses cues like colour, shape, and size to distinguish objects from one another and there are two stages that can affect the efficiency of object perception.

Figure 36:
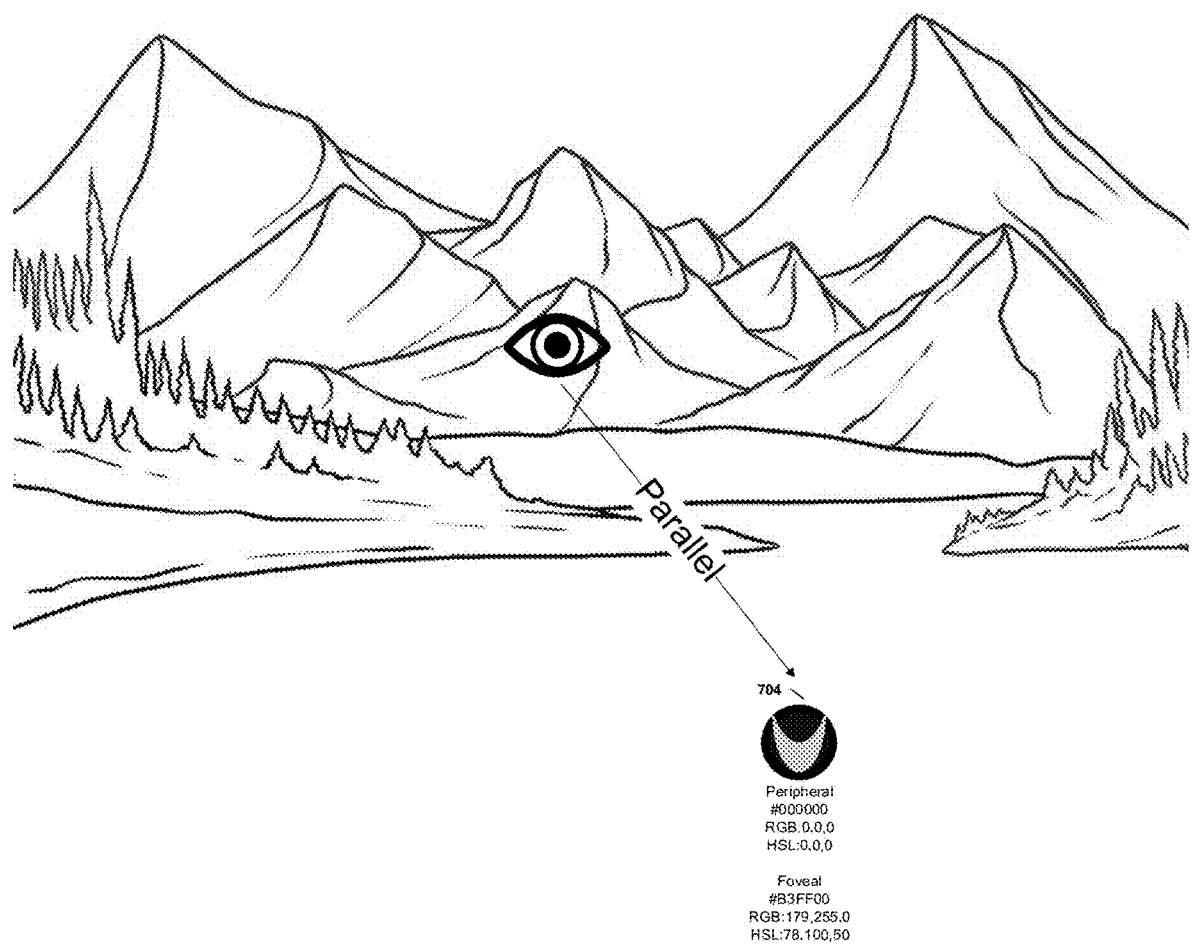
FIG. 36: Schematic representation of a human visual search modality—parallel mode.

The first is the pre-attention stage in which an individual can focus on one distinguishing attribute of the object (parallel search tasking; FIG. 36). The second stage is focused attention, when an individual takes all of the observed features and combines them to perceive (including recognize) an object. This second stage process occurs if the object does not stand out immediately.

Figure 37:
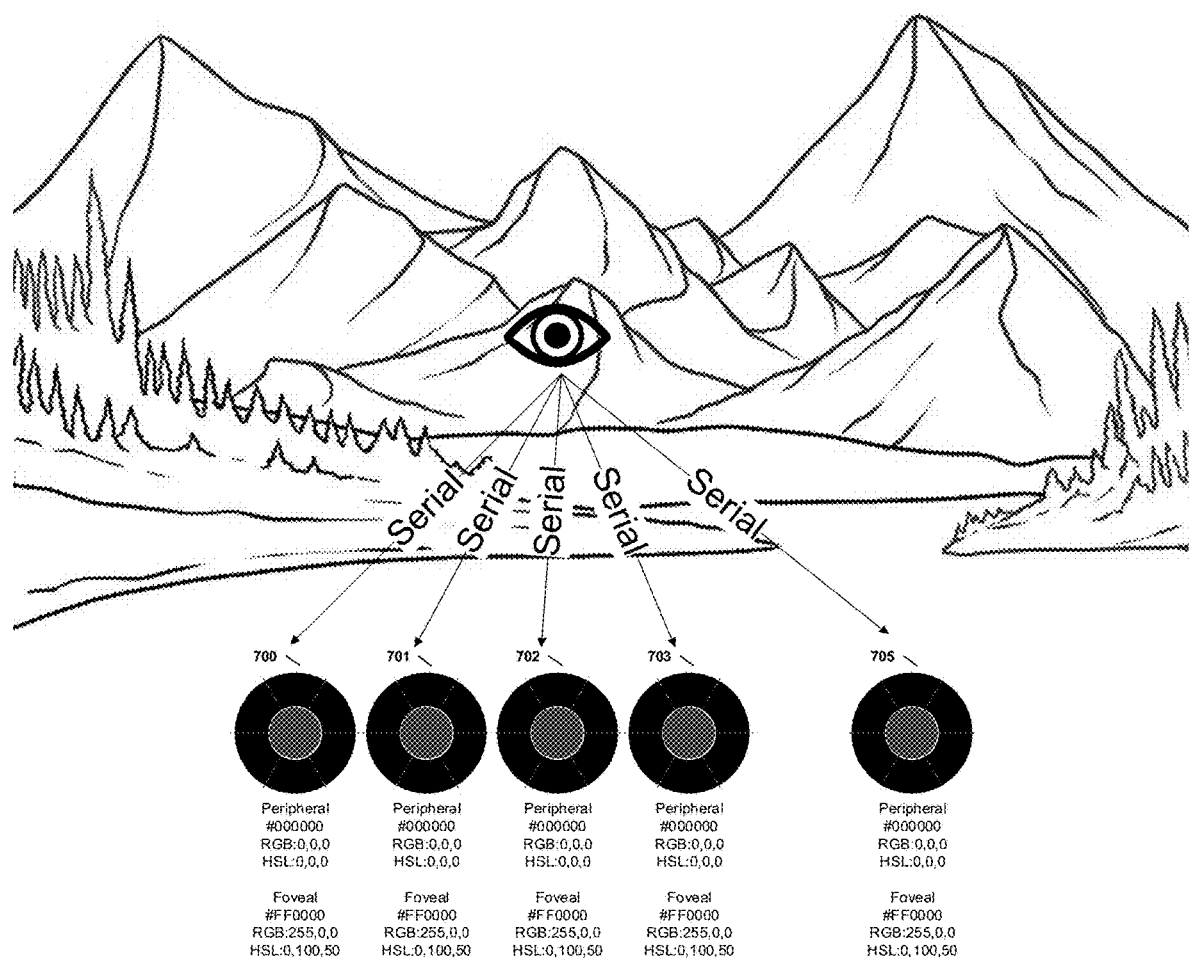
FIG. 37: Schematic representation of a human visual search modality—serial mode.

If you were looking for a cyclist using the current, commonly deployed red lighting conventions, you would have to engage focused attention type visual search tasks (serial search tasking; FIG. 37) to spot the cyclist's rear red light at night from among the red lights of other vehicles. By contrast, if you were looking for a cyclist using the system and methods of the present disclosure among cars at night from the rear, it would be easier to spot. Therefore, the systems and methods of the present disclosure provide the "pop-out" effect of equiluminant colours and variants from the environment or scenery in which the object requiring recognition is located.

Figure 38:
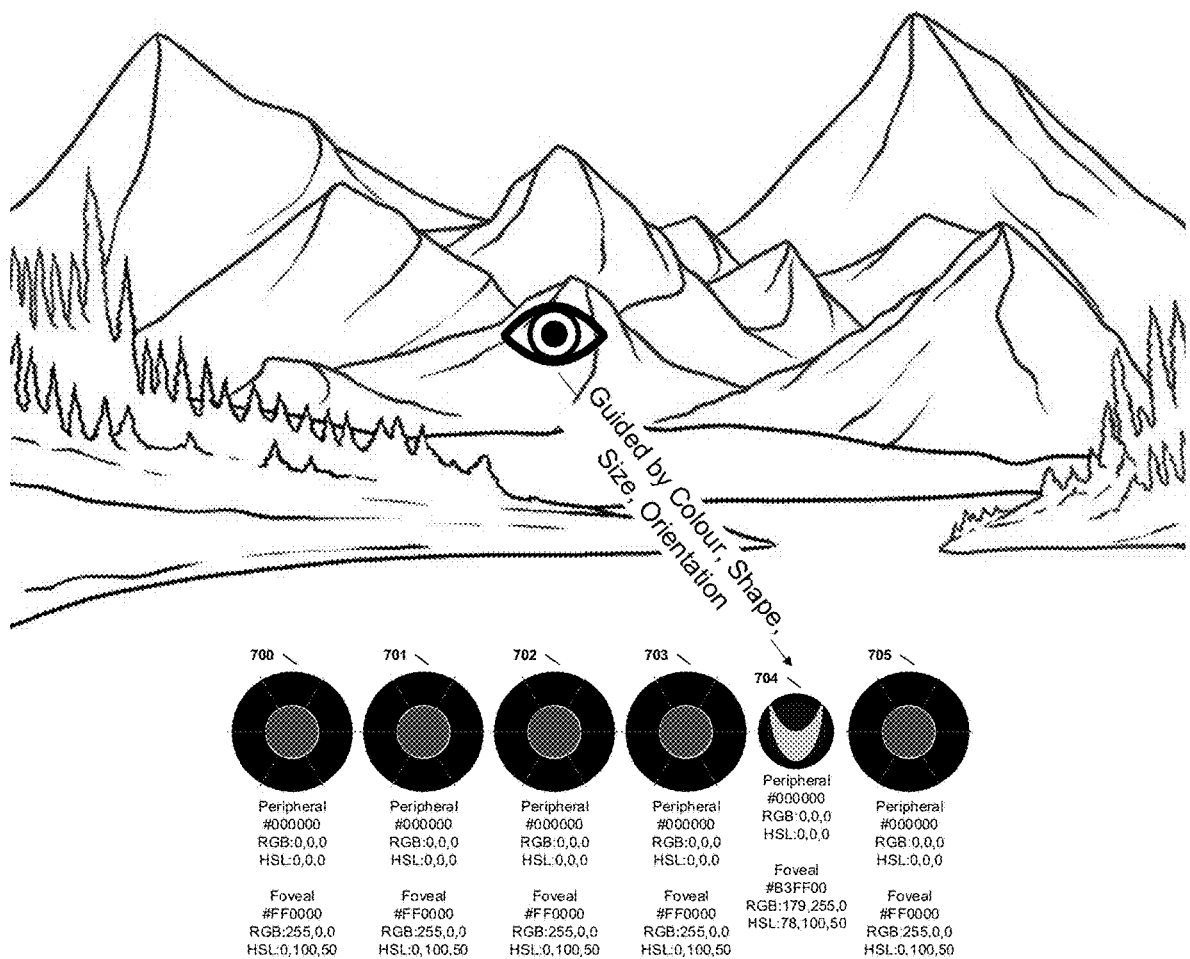
FIG. 38: Schematic representation of a human visual search modality—guided to transition from a serial to a parallel mode.

Colour has long been accepted as a pre-attentive feature (Bundesen, C., & Pedersen, L. F. (1983), "Color segregation and visual search", Perception & Psychophysics, 33(5), 487-493; Carter, R. C. (1982), "Visual search with color", Journal of Experimental Psychology: Human Perception and Performance, 8 (1982), pp. 127-136; Farmer, E. and Taylor, R. (1980), "Visual search through color displays: Effects of target-background similarity and background uniformity", Perception & Psychophysics, 27 (1980), pp. 267-272; Green, B. F. and Anderson, L. K. (1956), "Color coding in a visual search task", Journal of Experimental Psychology, 51 (1956), pp. 19-24; Smith, 1962; Williams, 1966a). Searching for a target colour among homogeneous distractors is efficient if the target and distractor colours are not too similar (A. Nagy and R. Sanchez, "Critical color differences determined with a visual search task," J. Opt. Soc. Am. A 7, 1209-1217 (1990); A. Nagy, R. Sanchez, and T. Hughes, "Visual search for color differences with foveal and peripheral vision," J. Opt. Soc. Am. A 7, 1995-2001 (1990)). The systems and methods of the present disclosure present to a viewer sufficiently dissimilar colours on a continual and dynamic basis to account for changing environmental conditions and thereby elicit guided visual responses that approach the efficiency of parallel search tasking. The systems and methods of the present disclosure are also able to generate additional visual cues to improve the efficiency of a viewer's visual search tasking responses, such as the presentation of light outputs with different shape and emission patterns (e.g. see FIG. 38 and the Examples). In one embodiment, the systems and methods provide a display output of light that elicits a guided vision response.

Geometric symbols appeared as the first symbolic communication system with early humans. They are known as non-figurative images, as opposed to figurative imagery like animals or humans. There are 32 symbols that have appeared repeatedly in human history, suggesting that symbolic communication through geometric signs arose with early humans, and has been rooted into our visual development since the start of the Paleolithic Period, 2.58 million years ago. In one embodiment, the systems and methods of the present disclosure emits light patterned on a display to present one or more of these 32 geometric symbols to assist with eliciting a peripheral vision response from a viewer of an object and thereby direct their foveal vision towards the object requiring recognition.

Exemplary geometric symbols that can be displayed by the system of the present disclosure are provided in a Table as FIG. 41:

Inhibition-of-Return and Vision Desensitization

Inhibition of return (IOR) refers to the relative suppression of visual processing of stimuli previously focused on or having the subject of a viewer's attention. An IOR effect occurs once attention has been withdrawn from an object or event making it harder to return attention back to the object, or otherwise delaying the return of one's attention back to the object in the absence of a change in visual stimulation to do so. This creates in effect a form of visual desensitization to previously detected objects or events in favour of new objects and events based on new visual stimuli. For example, when a driver at night travels on a busy road and sees only the rear red lights of moto vehicles, drawing the attention of a driver towards the red light of a cyclist may be harder to achieve in the absence of a new stimulus to distinguish the cyclist from other vehicles on the road.

Colour Vision Deficiency (CVD)

CVDs affects 8% of the North American male population and 0.5% of the female population. 99% of all people with a CVD suffer from red/green color blindness. Therefore, there are about 46 million people in North America that experience a level of CVD. This means that one or more of the Red, Green or Blue cones are missing or malfunctioning in these individuals which impairs their ability to distinguish between certain pairs of colours compared to individuals who do not have a CVD.

There are four types of CVD:
1. Protanopia/protanomaly—Red cannot be fully perceived and purple is perceived as blue.
2. Deuteranopia/deuteranomaly—Green cannot be fully perceived and is perceived as brown.
3. Tritanopia/tritanomaly—Blue cannot be fully perceived and yellow is perceived as red.
4. Monochromacy—Colour in the red to purple spectrum is not perceived at all and everything is seen in grey scale.

For an individual with CVD to be able to perceive the presence of two different colours, the following combinations are to be avoided—Green & Red; Green & Brown; Blue & Purple; Green & Blue; Light Green & Yellow; Blue & Grey; Green & Grey; Green & Black. Some mildly "colour blind" people are able to see a colour, but only if there is a sufficient amount of the colour. If a line of color is too thin, it may not be detected, but if the line is thick enough it the colour may be detected.

The systems and methods of the present disclosure account for such CVD challenges by presenting to a viewer equiluminant and related variant colours based on the sensed colour of a scene. The emission of equiluminant, split equiluminant and triadic equiluminant colour variants result in colour pairings that can still be perceived by an individual with Protanopia, Deuteranopia, or Tritanopia (e.g. Green & Purple, Blue & Yellow, Light Green & Light Purple and their respective+4 variants), irrespective of whether or not the resulting colour combinations are perceived as their "true" colours.

Additionally, since individuals with a monochromacy CVD can see contrasts, the system and methods of the present disclosure ensures light outputs have a luminance levels which provide for the greatest contrast possible relative to sensed scenic conditions. This is further ensured with the use of a "Zero Saturation Engine" in the systems and methods of the present disclosure to account for scenic conditions when no colour is sensed or detectable by a system sensor(s). When the system processor makes a determination of 0% (colour) saturation, it adjusts (modulates) the light outputs to create contrasts still viewable when viewers are experiencing actual or near 'monochromacy' effects. Under these sensed conditions, the systems of the present disclosure may emit patterned light outputs that may include geometric symbols and/or lines thick enough to be viewable.

Dynamic Visual Vibration System and Method

Generally, the systems and methods of the present disclosure comprise and use one or more sensing means, processing means and displays to sense environmental parameters, process data and dynamically output wavelengths of light that engage the peripheral and/or foveal vision systems of a viewer when viewing an object from a given viewing point (see FIGS. 1-9). In this way, the viewer will have the greatest potential to perceive an object under changing environmental conditions, and perceive said object to a degree needed to elicit a suitable response (e.g. cognitive awareness, or motor response).

The systems and methods according to the present disclosure may be configured and operated as single devices comprising all required component features electrically, or as several operatively associated devices that are associated with, or connected to an object. A system according to the present disclosure will comprise at least one sensing means, a processing means and a display to form a network of component features operatively associated with one another. Component features are operatively associated with one another using cables, electrical connections or any one of number of suitable wireless (network) communication protocols such as Wi-Fi, Bluetooth, cellular, RFID known to one skilled in the art.

In one embodiment, the systems of the present disclosure may comprise one or more networks of sensing means, processing means and one or more displays. Each network of component features can operate independently, at different times, at the same time and/or in communication with one another, as selected by the user or activated by the environmental conditions affecting the visibility of an object at any given point in time. In this sense, a system can have one or more modes of operation using one or more networks of component features. Individual sensing means, processing means, and displays may operate in one or more networks. A network of component features of a system may be fully contained within one or more devices that are connected to an object. Alternatively, a network of component features may comprise sensing means, processing means and displays that are not connected to an object. Such component features may or may not be in communication with other sensing means, processing means and/or displays of the system connected to the object, using cables and/or wireless communication protocols. When using wireless communication protocols, systems, networks of component features, or individual component features thereof that not connected to an object can be said to be associated with, instead of connected to an object.

In one embodiment, the system is positioned on, or at the surface of an object. In another embodiment, a network of component features of the system is positioned on, or at the surface of an object. In still another embodiment, a component feature of the system is positioned on, or at the surface of an object. In related embodiments, the system, network of component features, or component feature is connected to the object. Suitable connecting means, such as a bracket, mount, clamp, screws, bolts, hinges and the like can be used to connect a system, network of component features, or individual component features to the object.

In one embodiment, the system is associated with an object. In another embodiment, a network of component features of the system associated with an object. In still another embodiment, a component feature of the system is associated with an object. In related embodiments, the system, network of component features, or component feature are associated with one or more other systems, networks of component features, or component features connected to the object.

For the purposes of the illustrating the operation of the systems and methods according to the present disclosure with reference to a variety of embodiments, Tables 1 to 3 provide numbered feature listings and the Figures they relate to.

TABLE 1

System Overview-Feature Numbering (see FIGS. 1-9)

1. 1$^{st}$ Display and Foveal Vision Engine Display for Vision 2 Viewing Point
2. 2$^{nd}$ Display and Peripheral Vision Engine Display for Vision 2 Viewing Point
3. 3$^{rd}$ Display and Peripheral Vision Engine Display for Vision 2 Viewing Point
4. 4$^{th}$ Display and Peripheral Vision Engine Display for Vision 2 Viewing Point
5. Enclosure
6. Power Supply Variant
7. Processing Unit
8. Input Sensor Bracket
9. Input Sensor
10. Connectivity Port
11. Connectivity Port
12. GPS
13. Switch In the embodiment of FIG. 1, the system is a one-way sensing and display configuration. It comprises a power supply 6, connectivity ports 10 and 11, and enclosure 5 for housing the various components of the system. A processing unit 7, sensor bracket 8, array of (input) sensors 9 and displays 1, 2, 3, and 4 provide the functionality of the system for facilitating object perception.

The side(s) of the object with sensors 9 is/are opposite the side(s) of the object in the direct line of sight of a viewer at one or more viewing points. In FIG. 1, displays 1, 2, 3, and 4 are situated on the side(s) of the object in a line of sight of different viewing points, labelled as "Vision #1", "Vision 2" and "Vision 3", respectively. When a different sensed scenery parameter is processed, the processing unit 7 determines an appropriate and distinct light output for each of the displays. For example, if the scenery parameter sensed is Green the display output of light selected has a red colour or vibration pattern at viewing point "Vision #1". If the scenery parameter sensed is Grey the display output of light selected has a green colour (e.g. to elicit a foveal vision response), or vibration pattern at viewing point "Vision #3".

To illustrate the ability of the embodiment of the system to elicit peripheral and foveal vision responses from the viewer, consider viewing point, "Vision 2". The placement of the peripheral engine displays 2, 3, and 4 flank the foveal vision display 1. If a viewer at the position corresponding to viewing point, Vision #2 is going to have the best chance of perceiving the object to which the system is connected to, it is possible to target both the peripheral and foveal vision systems of the viewer. Depending on how the viewer is, or is not paying visual attention to the object, one or both of the peripheral and foveal vision responses can be targeted by the system sequentially, or at the same time. To elicit a peripheral vision response, display 2 will emit a particular wavelength of light (colour) selected by the processing unit 7. To elicit a foveal vision response, display 1 will emit another particular wavelength of light selected by the processing unit 7. The wavelengths of light selected by the processing unit 7 for emission by each display, are determined based on protocols that determine what hues of colour and luminance are most likely to catch the attention of the viewer and result in object perception.

Figure 2:
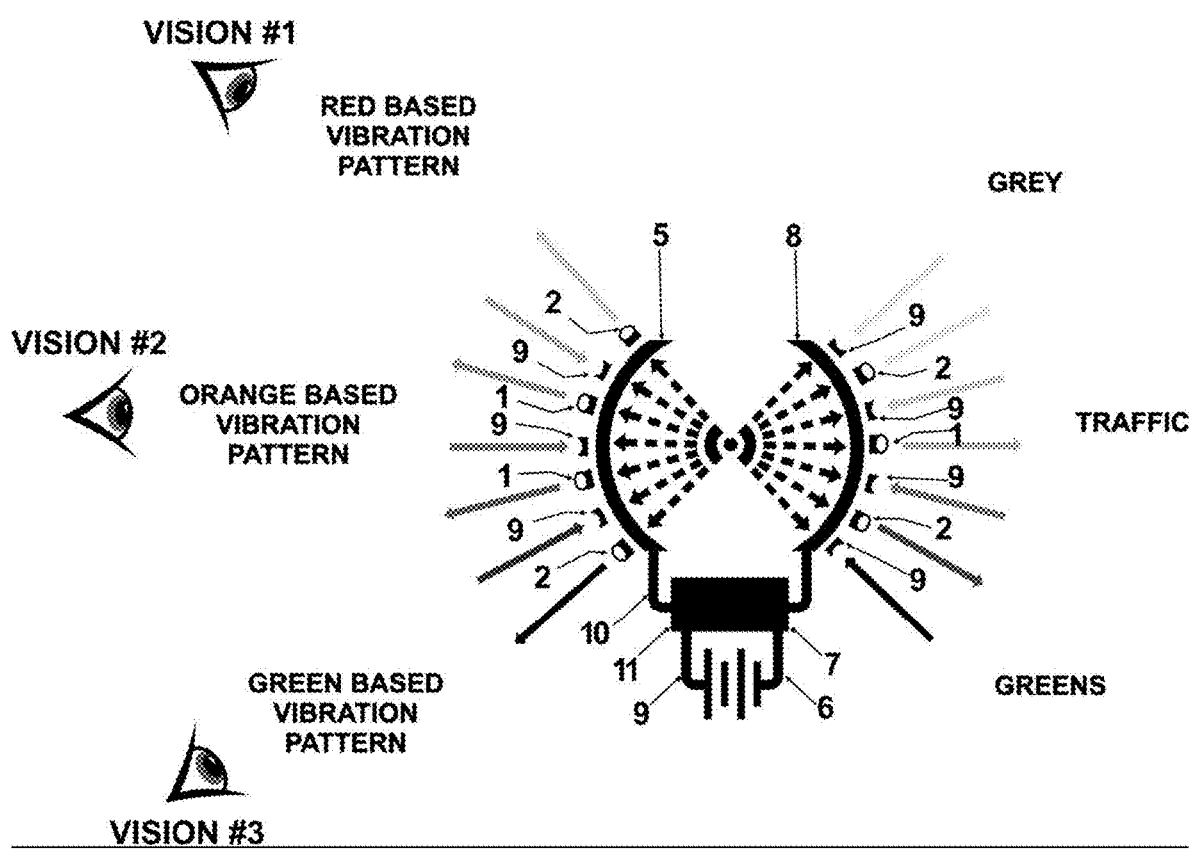
FIG. 2: An embodiment of an active object perception system according to the present disclosure comprising two-way input sensors operatively configured with light displays to emit specified light outputs.
Figure 4:
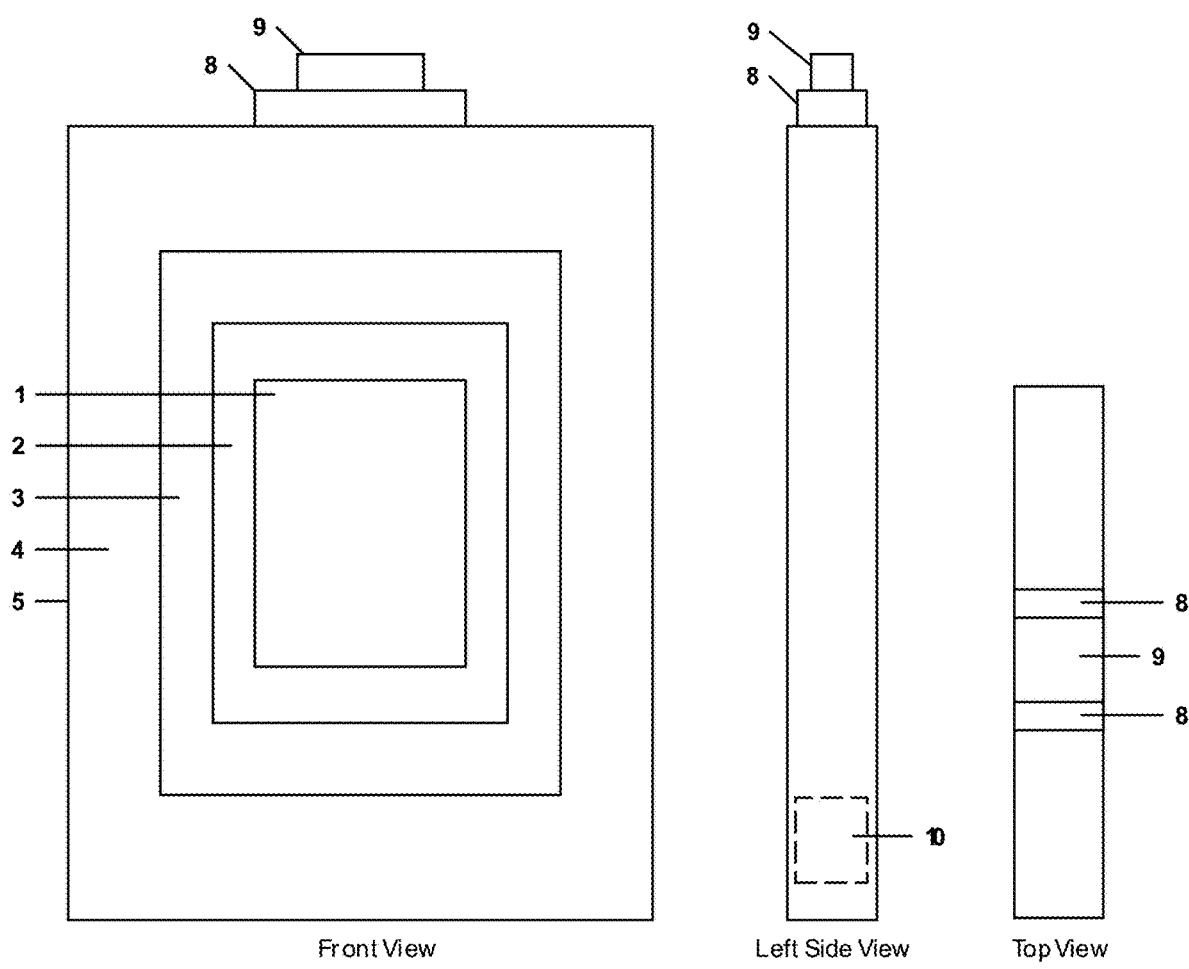
FIG. 4: Two dimensional schematic drawings illustrating an object perception system according to the present disclosure, and depicting the light emission features presented in a rectangle form factor including front, left side and top views.
Figure 5:
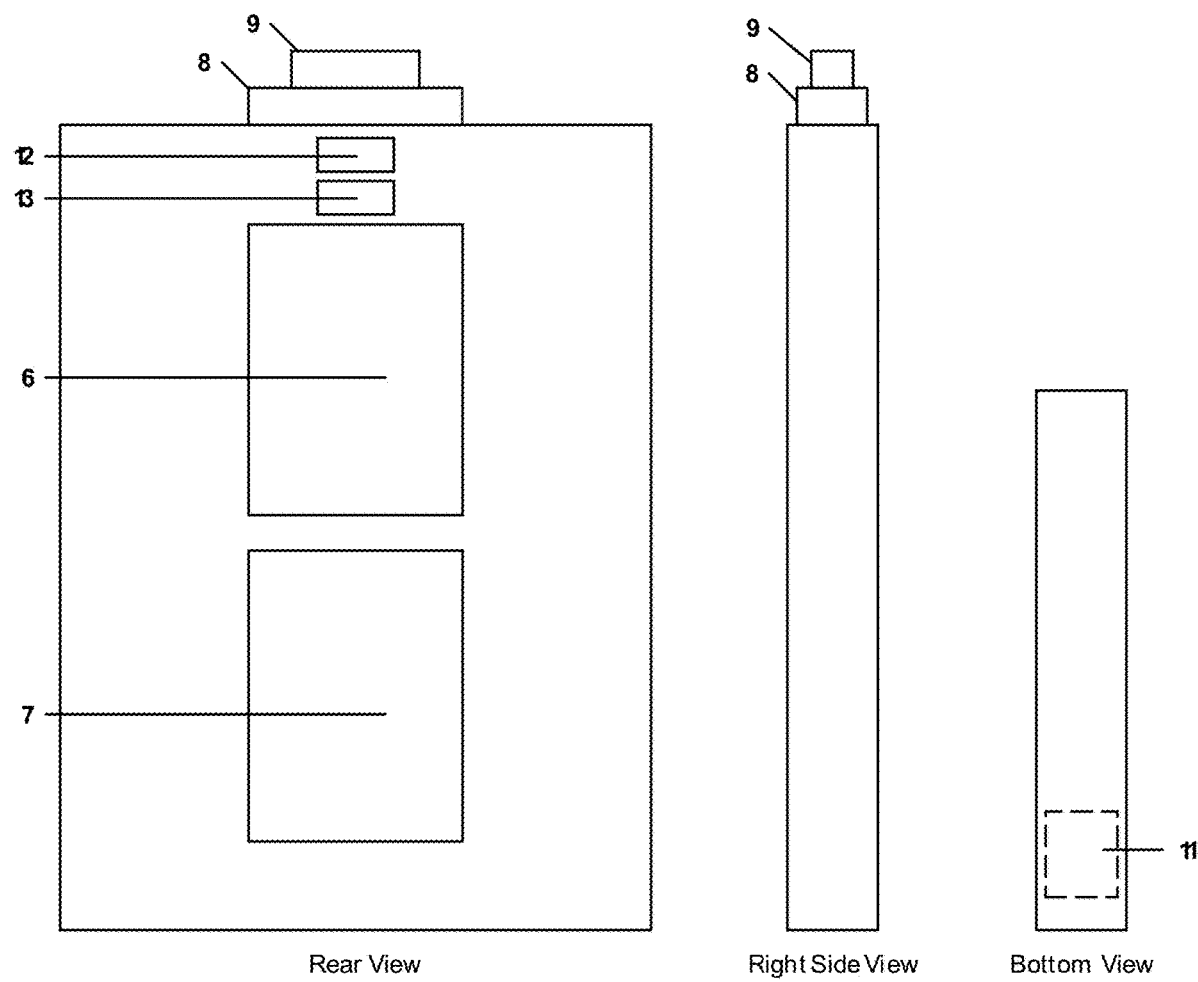
FIG. 5: Two dimensional schematic drawings illustrating an object perception system according to the present disclosure, and depicting the light emission features presented in a rectangle form factor including rear, right side and bottom views.

The embodiment of FIG. 2 is similar to that of FIG. 1 except that a two-way system configuration is illustrated with sensors 9 and displays 1 and 2 on two or more sides of the object.

In the embodiments of FIG. 3, inter-communication configurations of systems, networks or component features are illustrated. The systems and methods of the present disclosure can function in a chain configuration, where the lead system will sense what the next system will sense in a nanosecond. By passing along what the lead system has sensed and output, system hardware life-cycles and battery power can be preserved. For example, if using the systems of FIGS. 1 and 2, the light outputs by the displays 1, 2, 3, and 4 of one system can be sensed by the (input) sensors 9 of another system. Alternatively, information sensed by the sensors 9 can be transmitted to the processing units 7 of both systems. In each case the information received by one system from another can be processed to facilitate the determination of the dynamic output of one or more wavelengths of light from the system receiving information from the other system. In this manner, the information sensed and/or light outputs of one system can be taken into account by another system as environmental parameter(s).

Embodiments may comprise two or more systems, two or more networks of component features, or two or more component features of distinct systems or networks operatively associated with one another. In related embodiments, two or more systems, two or more networks of component features, or two or more component features of distinct systems or networks are operatively associated in association with, or connected to one or more objects. In other embodiments, two or more systems, two or more networks of component features, or two or more component features of distinct systems or networks are operatively associated in association with, or connected to one object. In still other embodiments, two or more systems, two or more networks of component features, or two or more component features of distinct systems or networks are operatively associated in association with, or connected to two or more objects.

In embodiments, the object to be, or being viewed may be a living being (person, animal, plant), or an inanimate object. In other embodiments, the viewer may be a living being, or an inanimate object. An inanimate object is understood to be an object that may or may not have the ability to sense other objects and in this sense may be able to detect the presence of another object and even process indicia of said object, for example, if said object is fitted with a system, network of component features or certain component features of present disclosure (e.g. a sensing and a processing means).

In one embodiment, an object to be, or being viewed is stationary and the viewer is in motion relative to the object. In another embodiment, the object to be, or being viewed is in motion and the viewer is in motion. In still another embodiment, the object to be, or being viewed is in motion and the viewer is stationary. In embodiments, the object to be, or being viewed may be a living being (person, animal, plant), or an inanimate object.

With reference to FIGS. 4 to 9 embodiments of systems contained within a single device are schematically illustrated. Note the nested configuration of displays 1, 2, 3 and 4 and ability to encase the system in a variety of shapes and sized device footprints (e.g. rectangular, triangular and circular configurations). It will be appreciated that the system is also amenable to being configured into devices with other shapes, such as oval, crescent-shaped, wave-shaped, elliptical, diamond-shaped and other polygons or irregular shapes.

Figure 17:
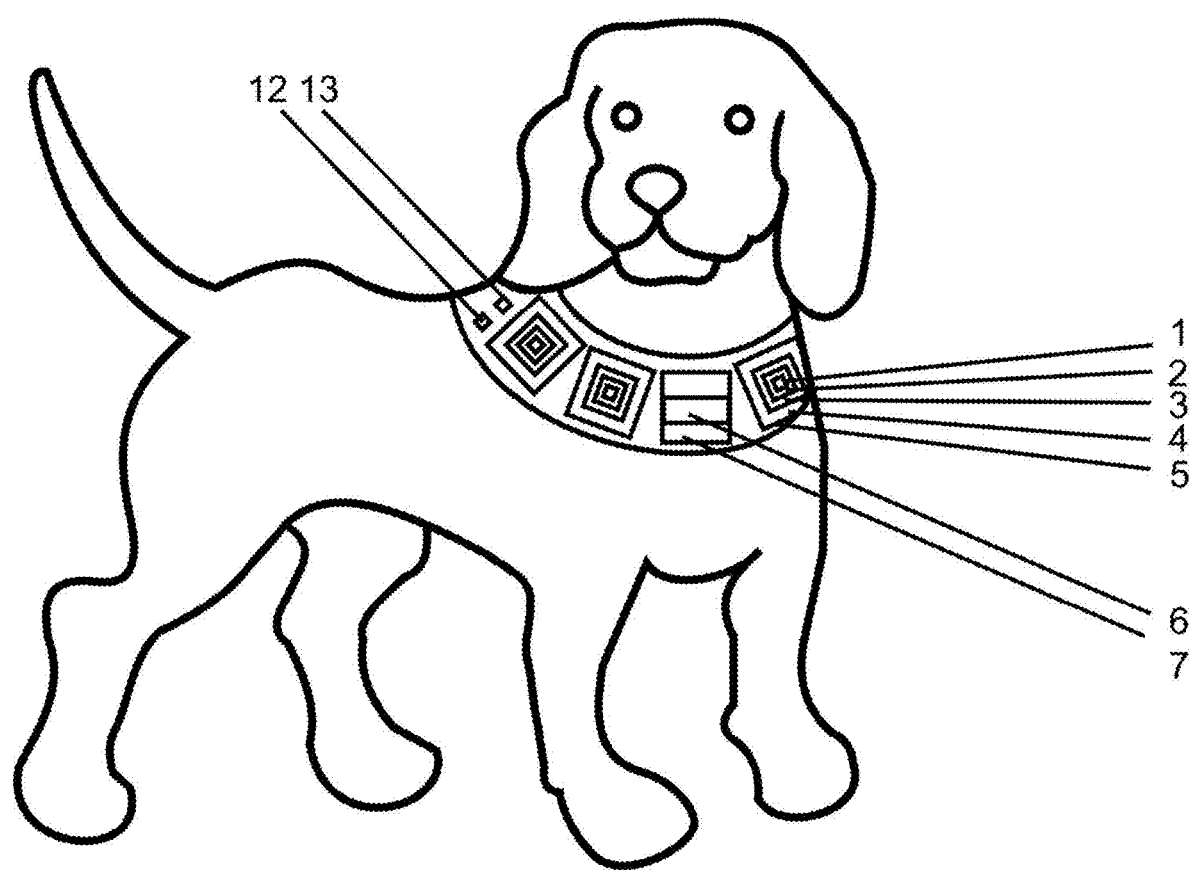
FIG. 17: An embodiment of an object perception system according to the present disclosure integrated into a consumer product, e.g. pet product such as a dog collar.
Figure 18:
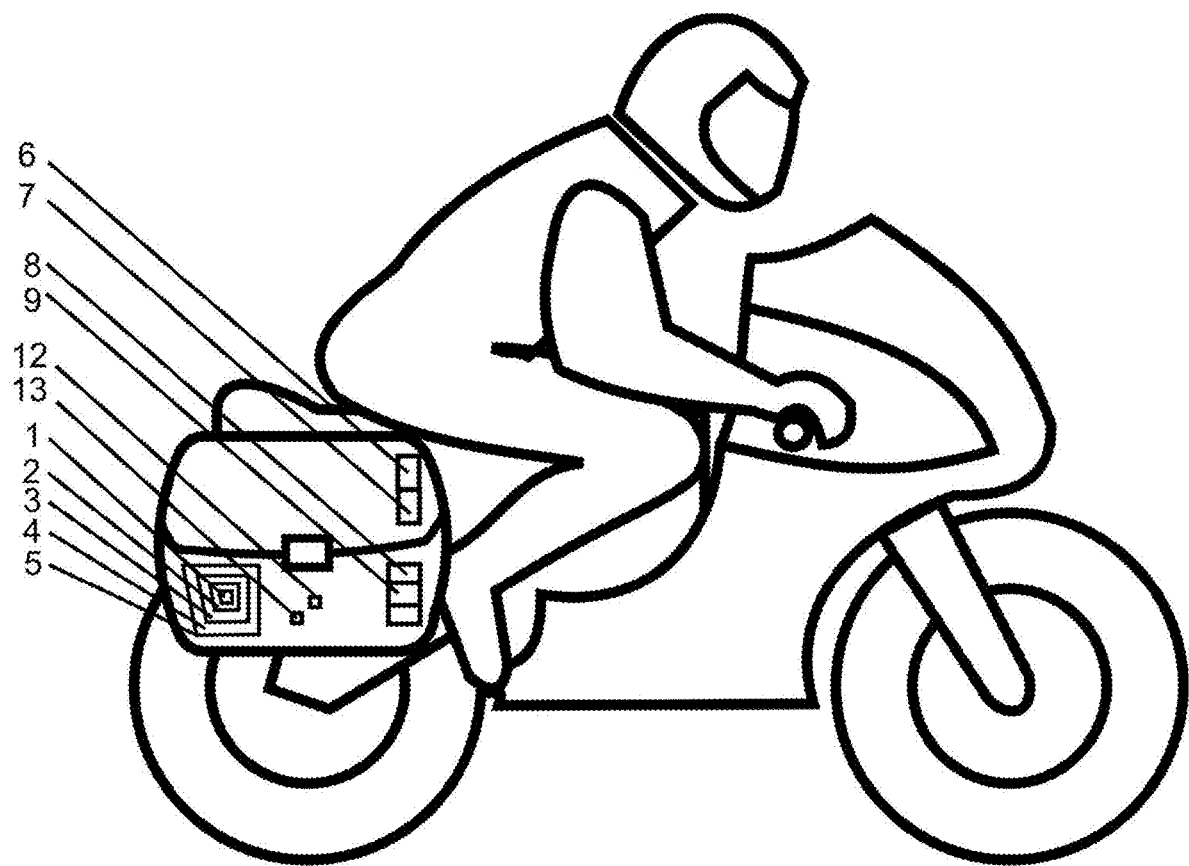
FIG. 18: An embodiment of an object perception system according to the present disclosure integrated into a consumer product, e.g. a storage case on a motorcycle (panier).
Figure 19:
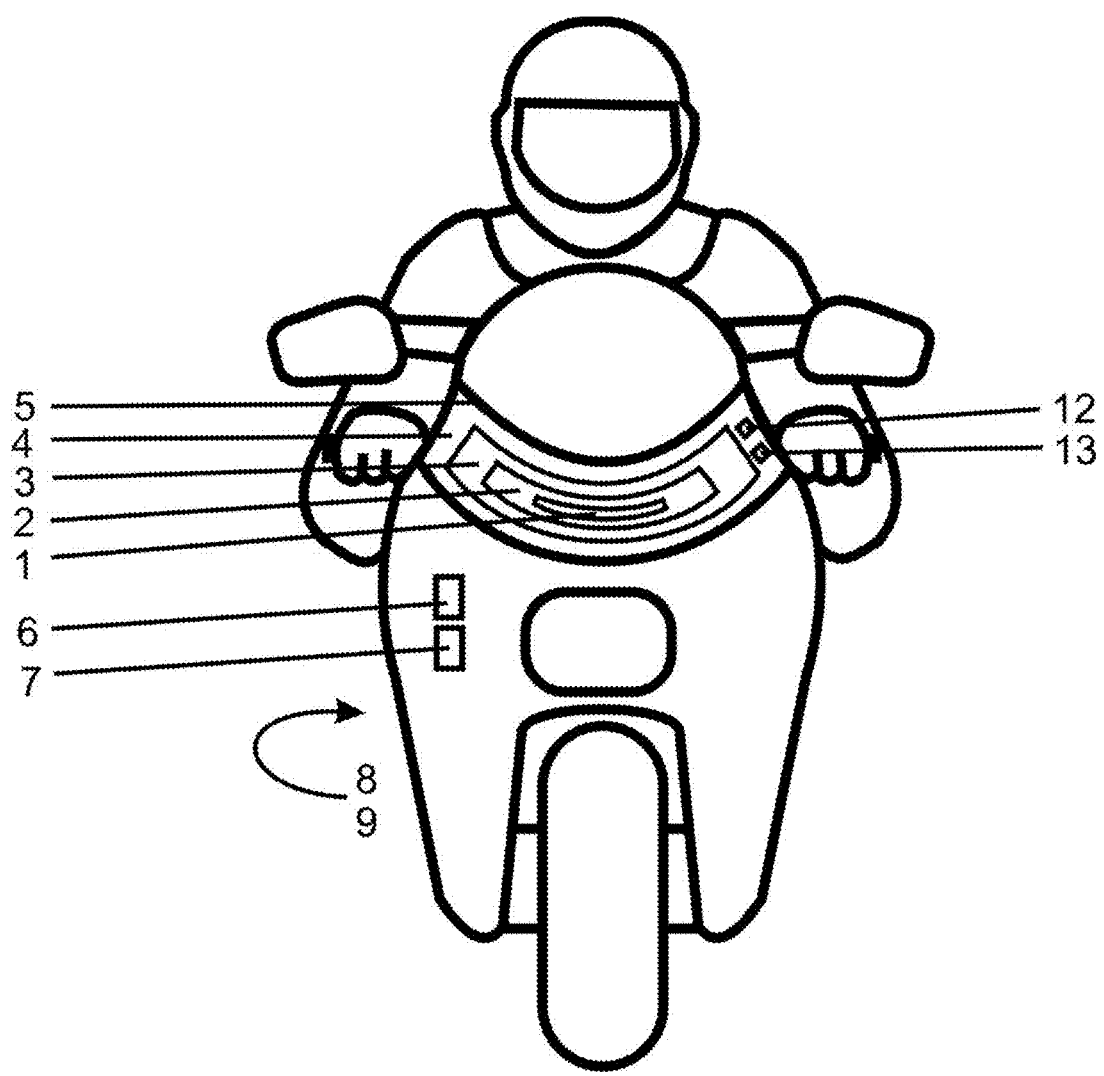
FIG. 19: An embodiment of an object perception system according to the present disclosure integrated into a consumer product, e.g. a motorcycle panel (windshield strip).
Figure 20:
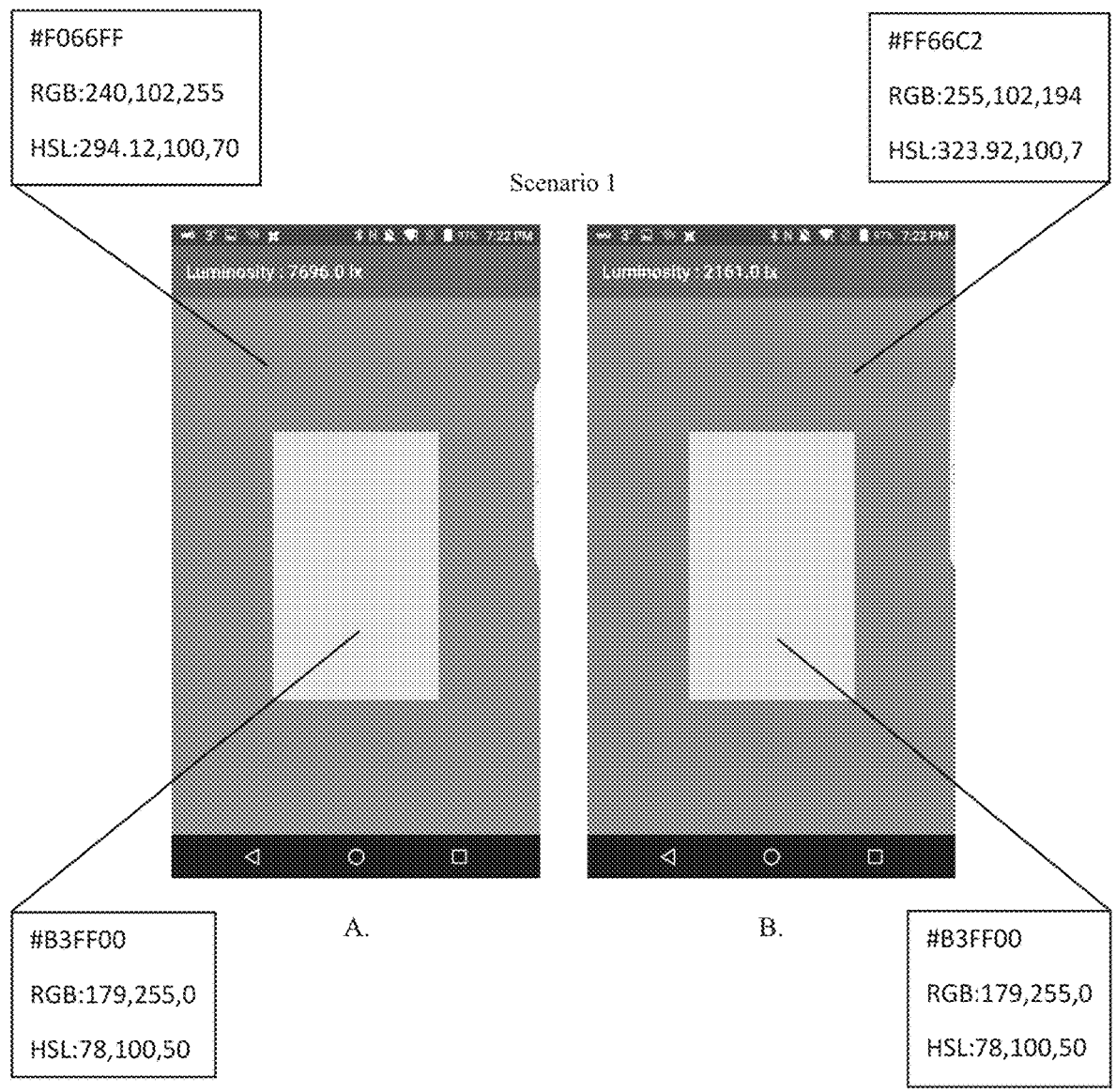
FIGS. 20A and 20B: An embodiment of an object perception system and method according to the present disclosure configured as an application integrated with the sensor and display output hardware of a mobile device. Display outputs illustrate the system's operation in a changing (photopic) environment, e.g. during the day.
Figure 21:
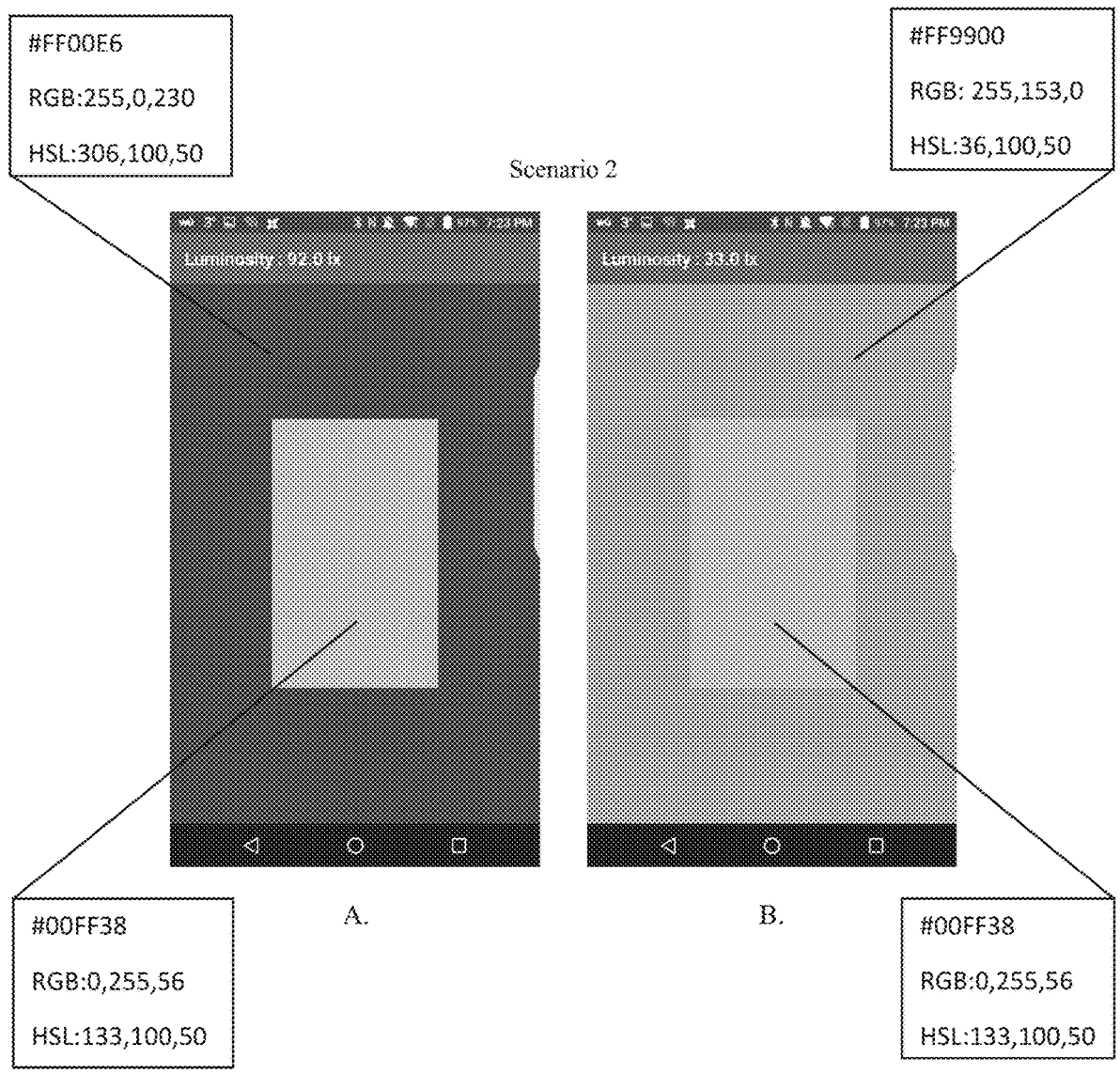
FIGS. 21A and 21B: An embodiment of an object perception system and method according to the present disclosure configured as an application integrated with the sensor and display output hardware of a mobile device. Display outputs illustrate the system's operation in a changing (mesopic) environment, e.g. at dusk or dawn.
Figure 22:
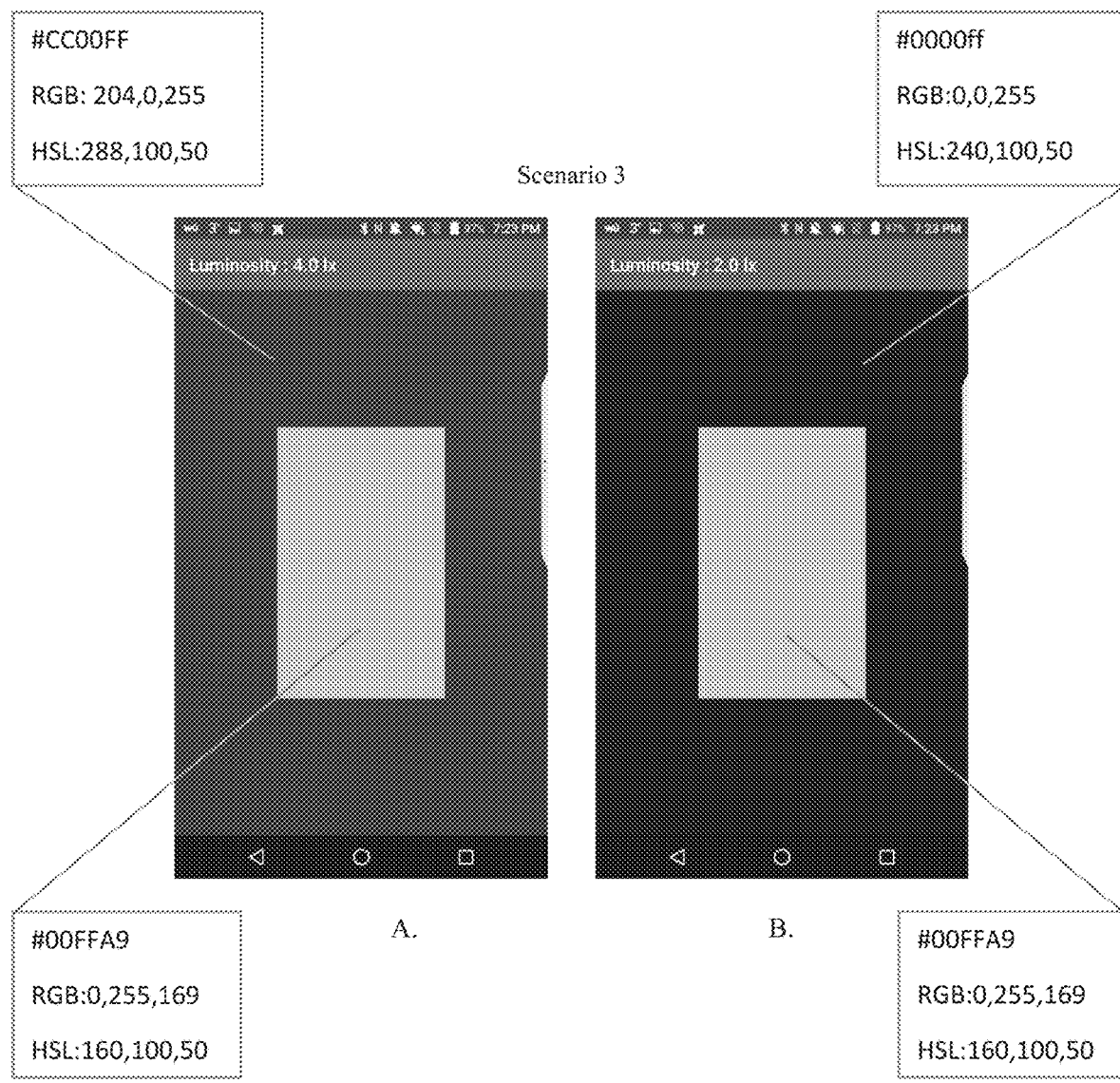
FIGS. 22A and 22B: An embodiment of an object perception system and method according to the present disclosure configured as an application integrated with the sensor and display output hardware of a mobile device. Display outputs illustrate the system's operation in a changing (scotopic) environment, e.g. at night.
Figure 23:
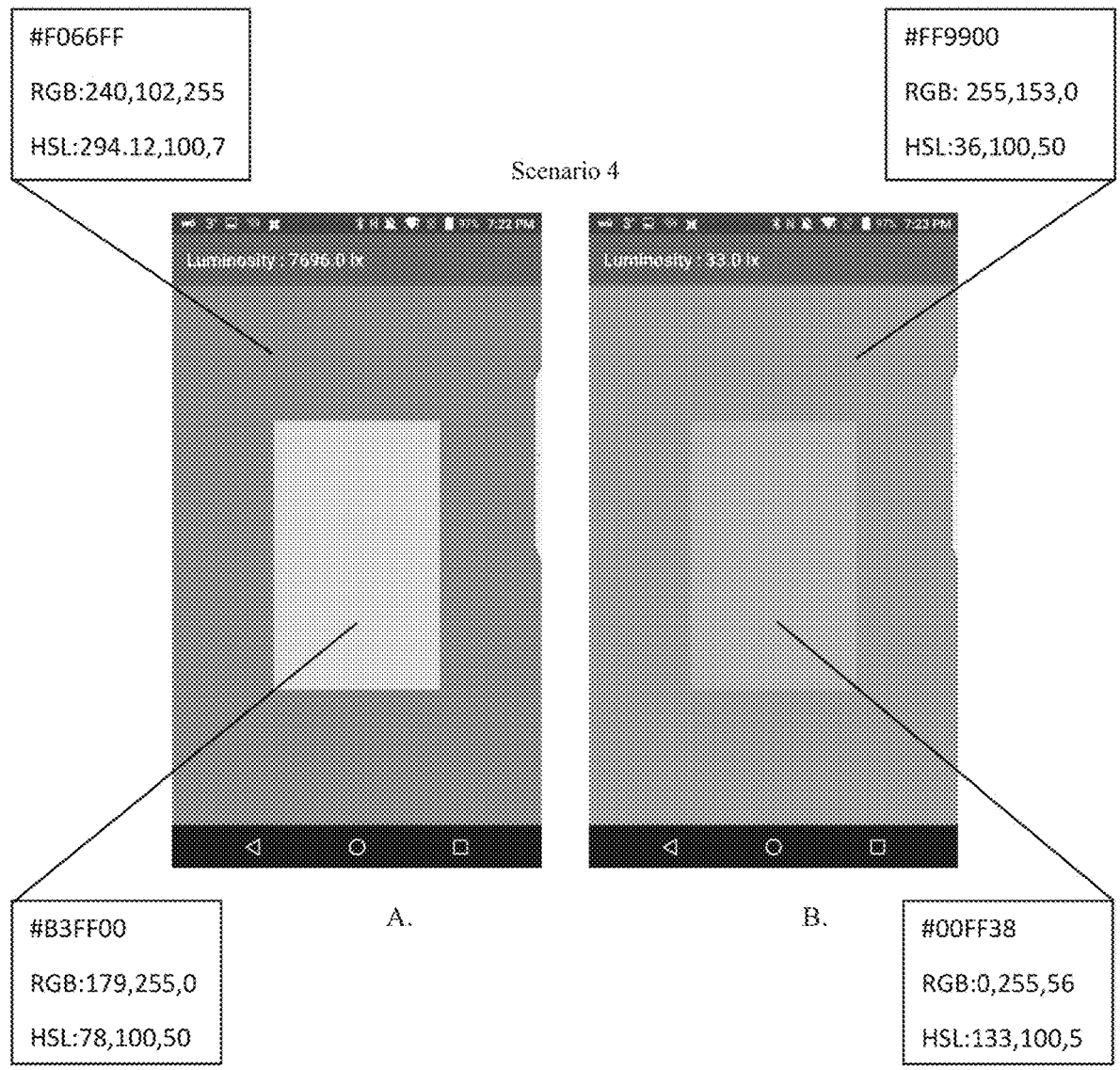
FIGS. 23A and 23B: An embodiment of an object perception system and method according to the present disclosure configured as an application integrated with the sensor and display output hardware of a mobile device. Display outputs illustrate the system's operation in a changing environment starting during the day and ending at dusk.
Figure 24:
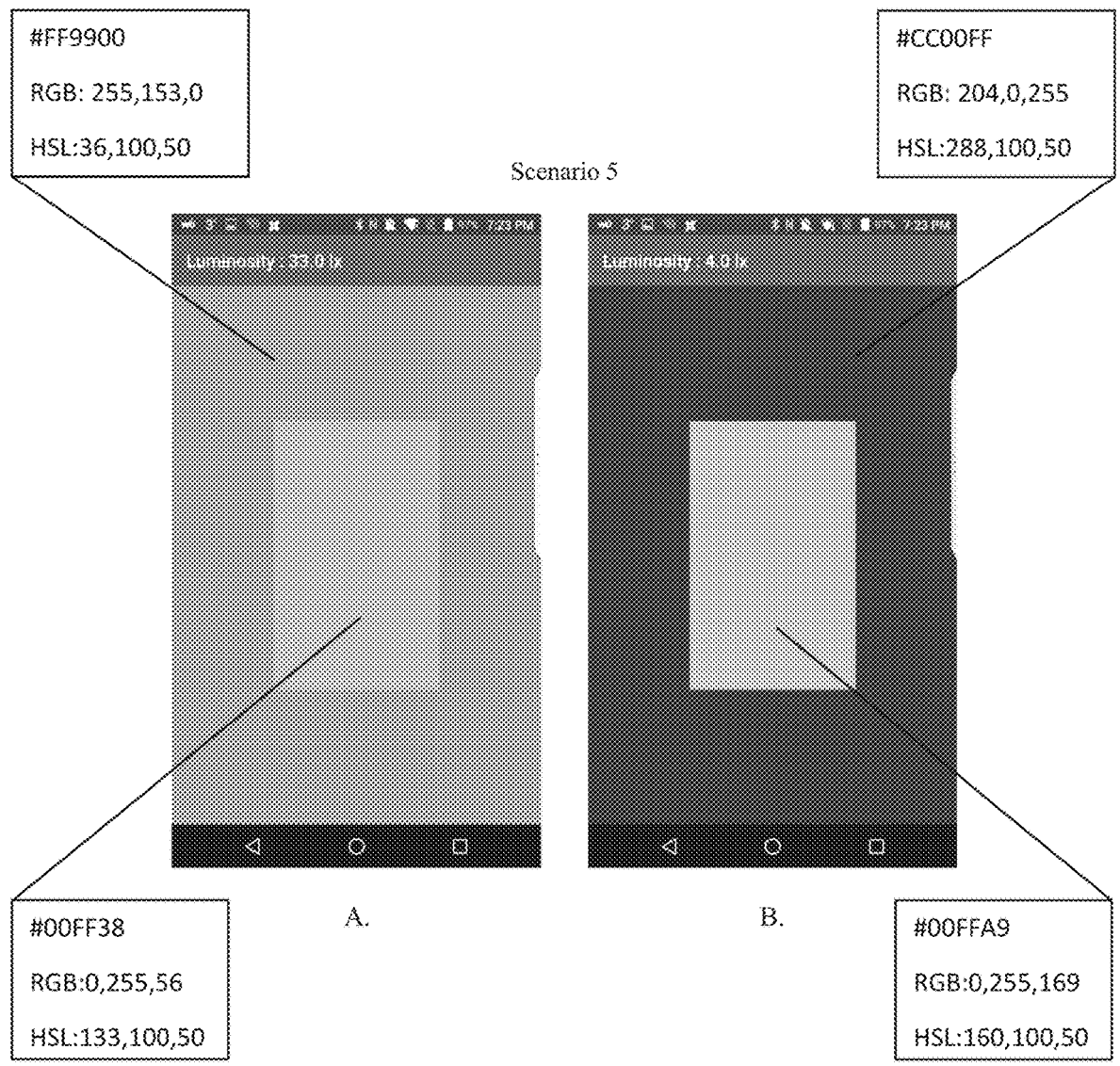
FIGS. 24A and 24B: An embodiment of an object perception system and method according to the present disclosure configured as an application integrated with the sensor and display output hardware of a mobile device. Display outputs illustrate the system's operation in a changing environment starting during dusk and ending at night.
Figure 25:
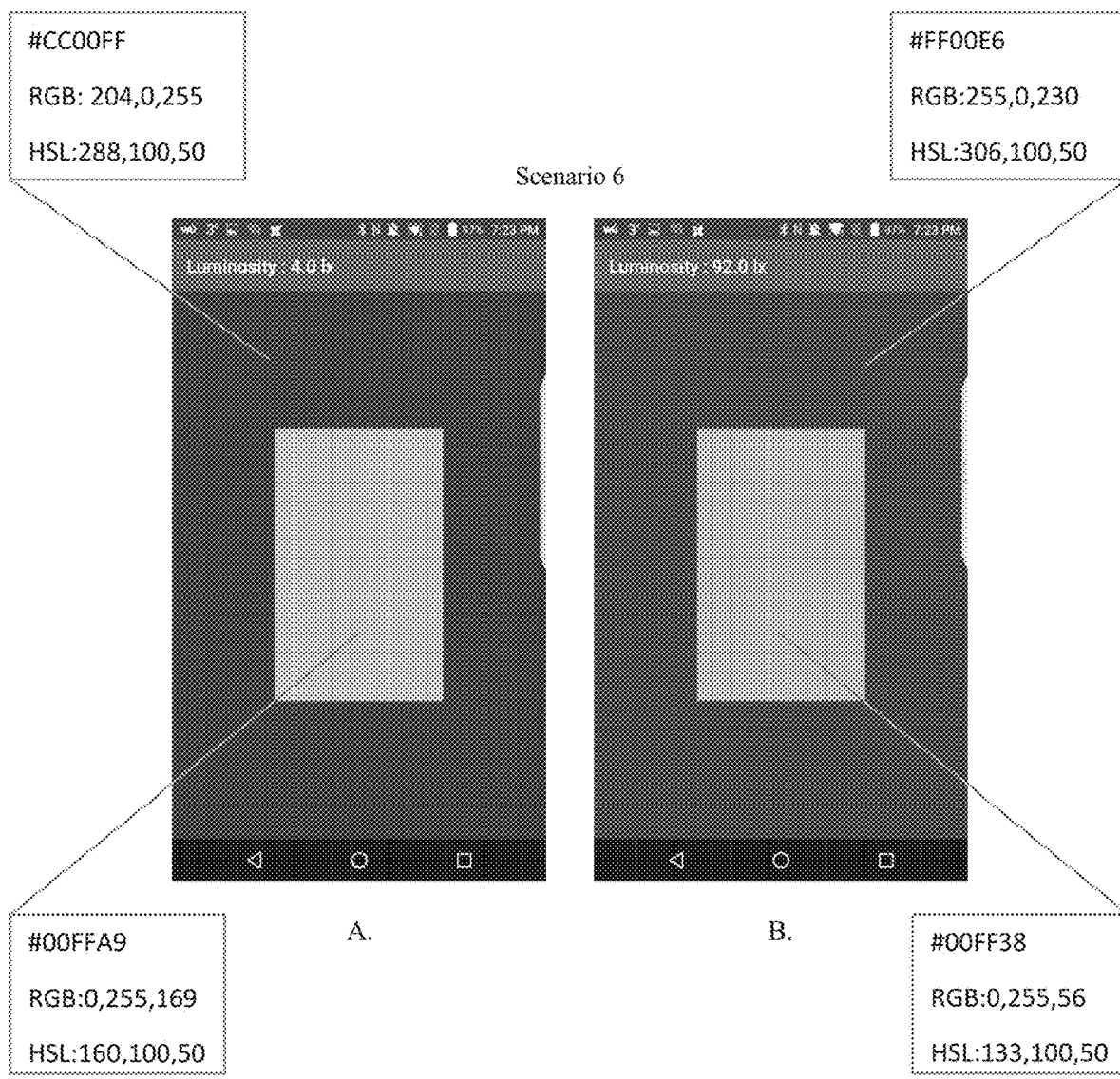
FIGS. 25A and 25B: An embodiment of an object perception system and method according to the present disclosure configured as an application integrated with the sensor and display output hardware of a mobile device. Display outputs illustrate the system's operation in a changing environment starting during the night and ending at dawn.
Figure 26:
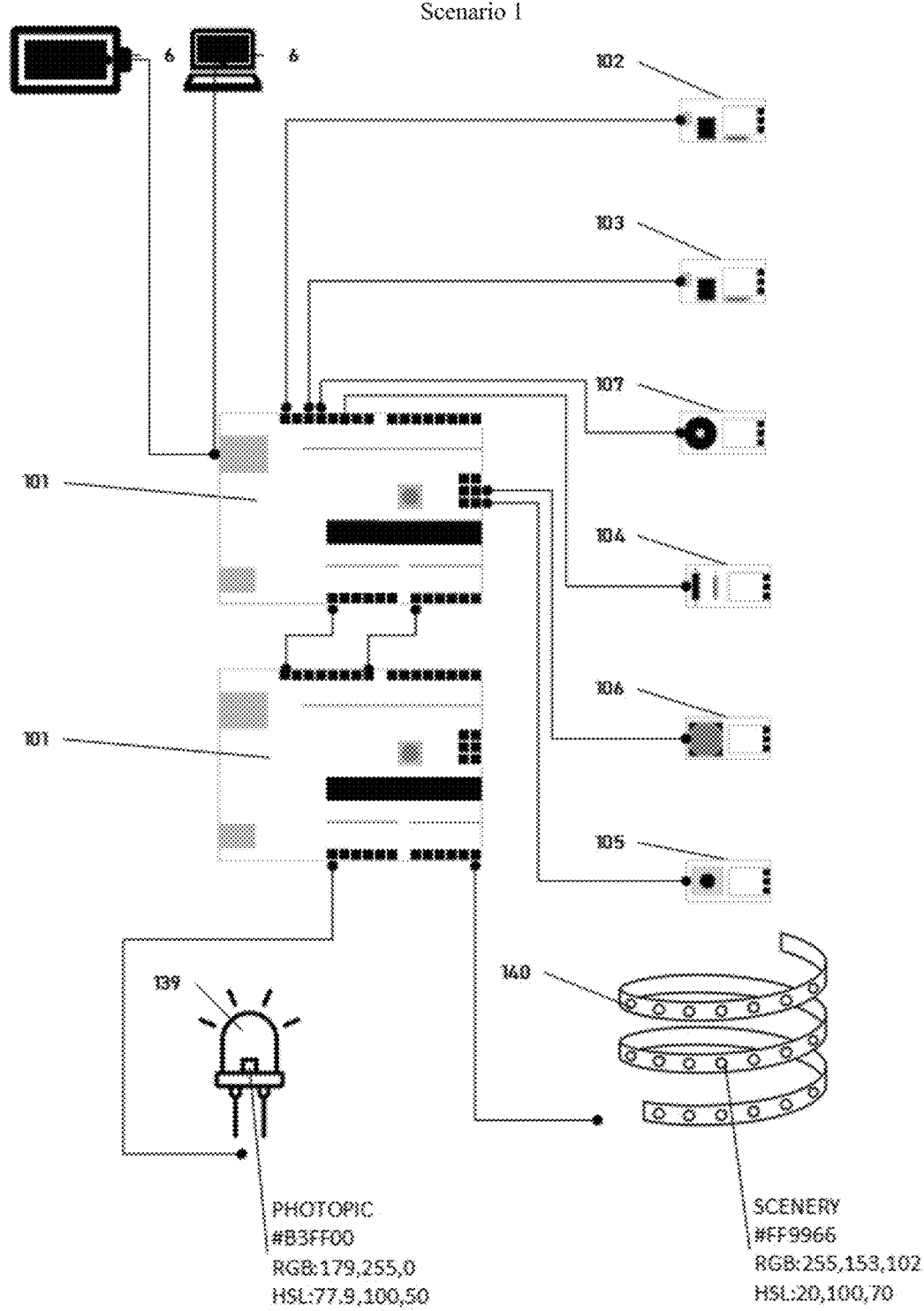
FIG. 26: An embodiment of the system and method of the present disclosure configured as a consumer (band) product operating under a first set of environmental conditions: day/photopic in a first scene.
Figure 27:
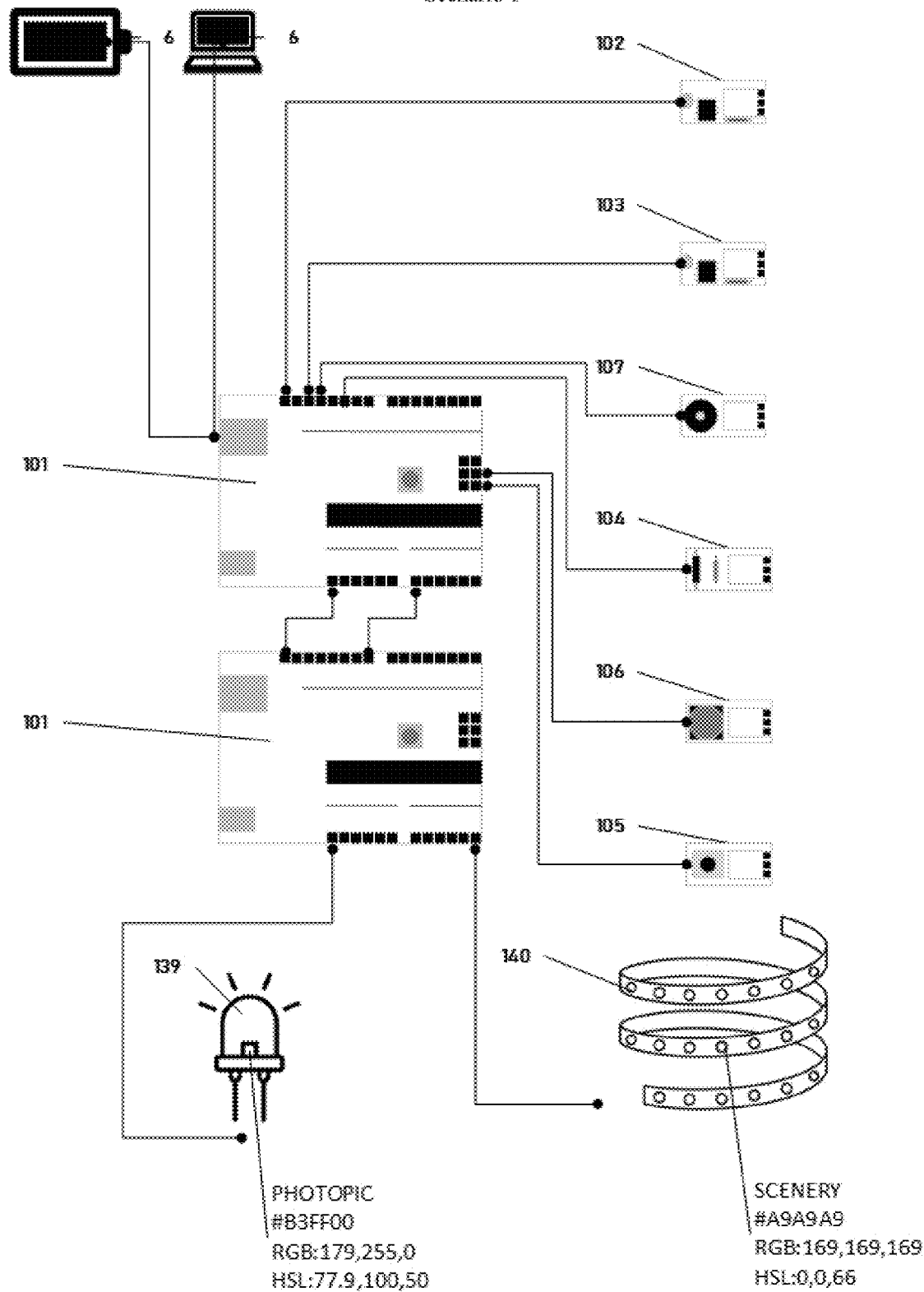
FIG. 27: An embodiment of the system and method of the present disclosure configured as a consumer (band) product operating under a second set of environmental conditions: day/photopic in a second scene.
Figure 28:
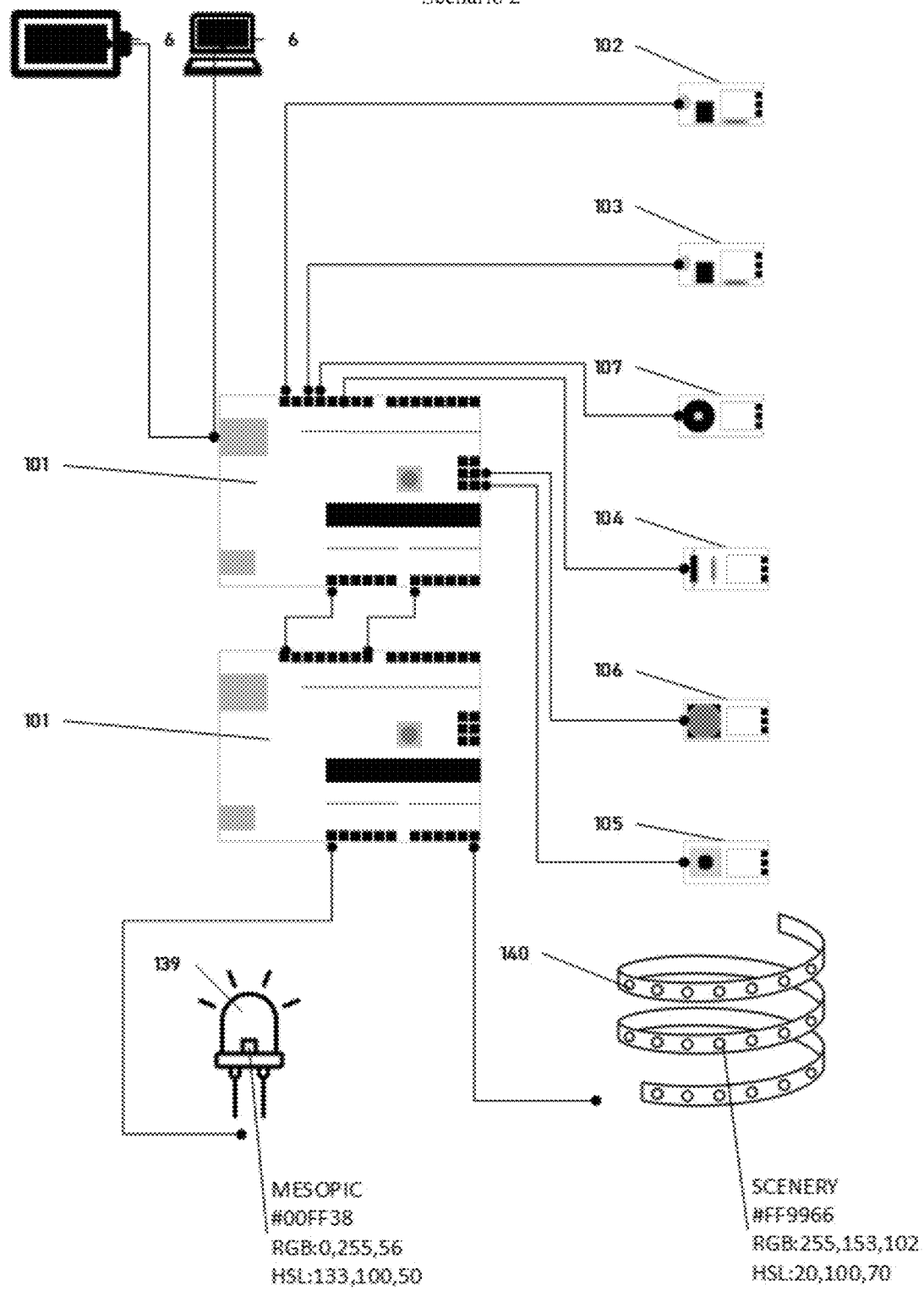
FIG. 28: An embodiment of the system and method of the present disclosure configured as a consumer (band) product operating under a first set of environmental conditions: dusk/mesopic in a first scene.
Figure 29:
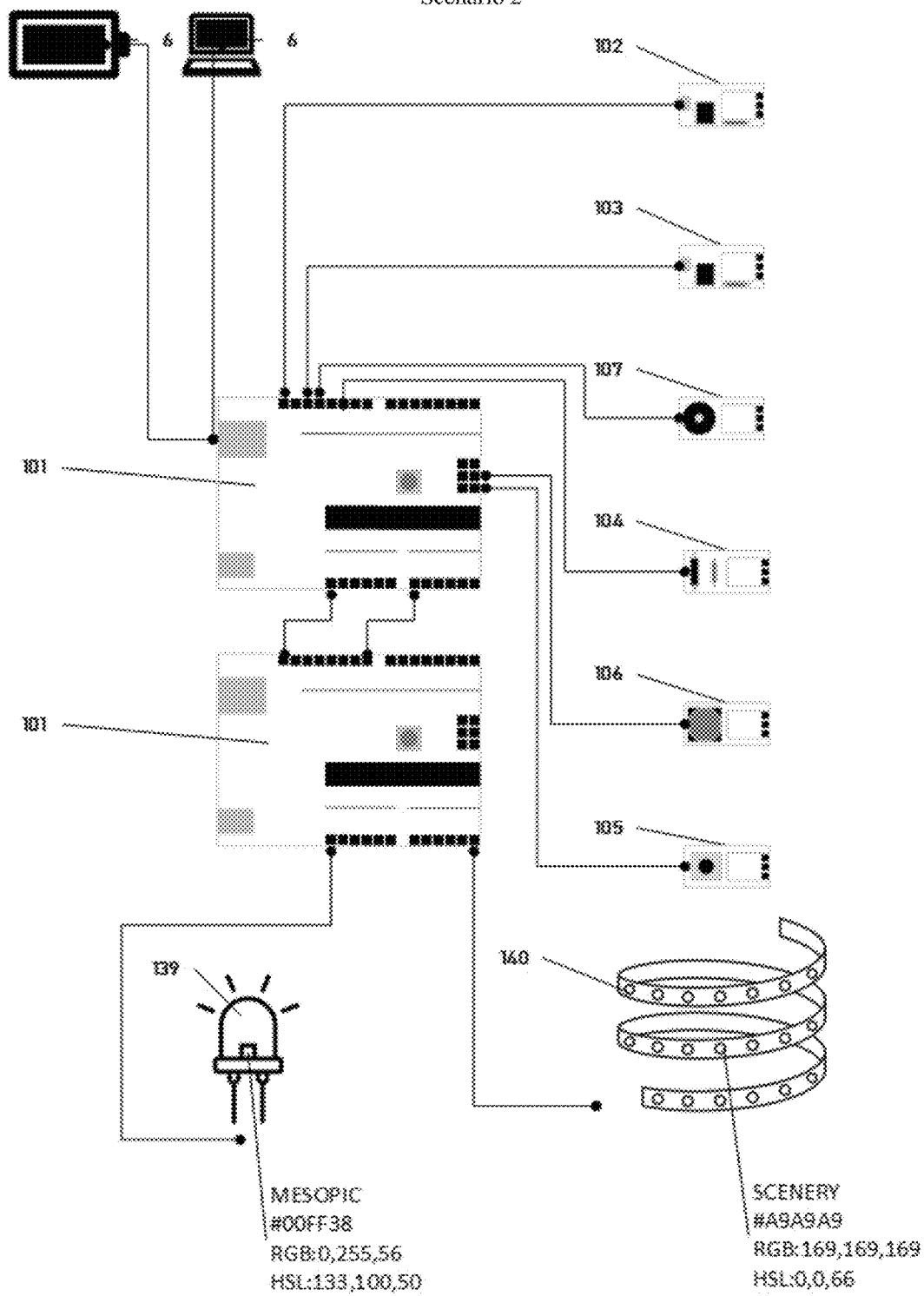
FIG. 29: An embodiment of the system and method of the present disclosure configured as a consumer (band) product operating under a second set of environmental conditions: dusk/mesopic in a second scene.
Figure 30:
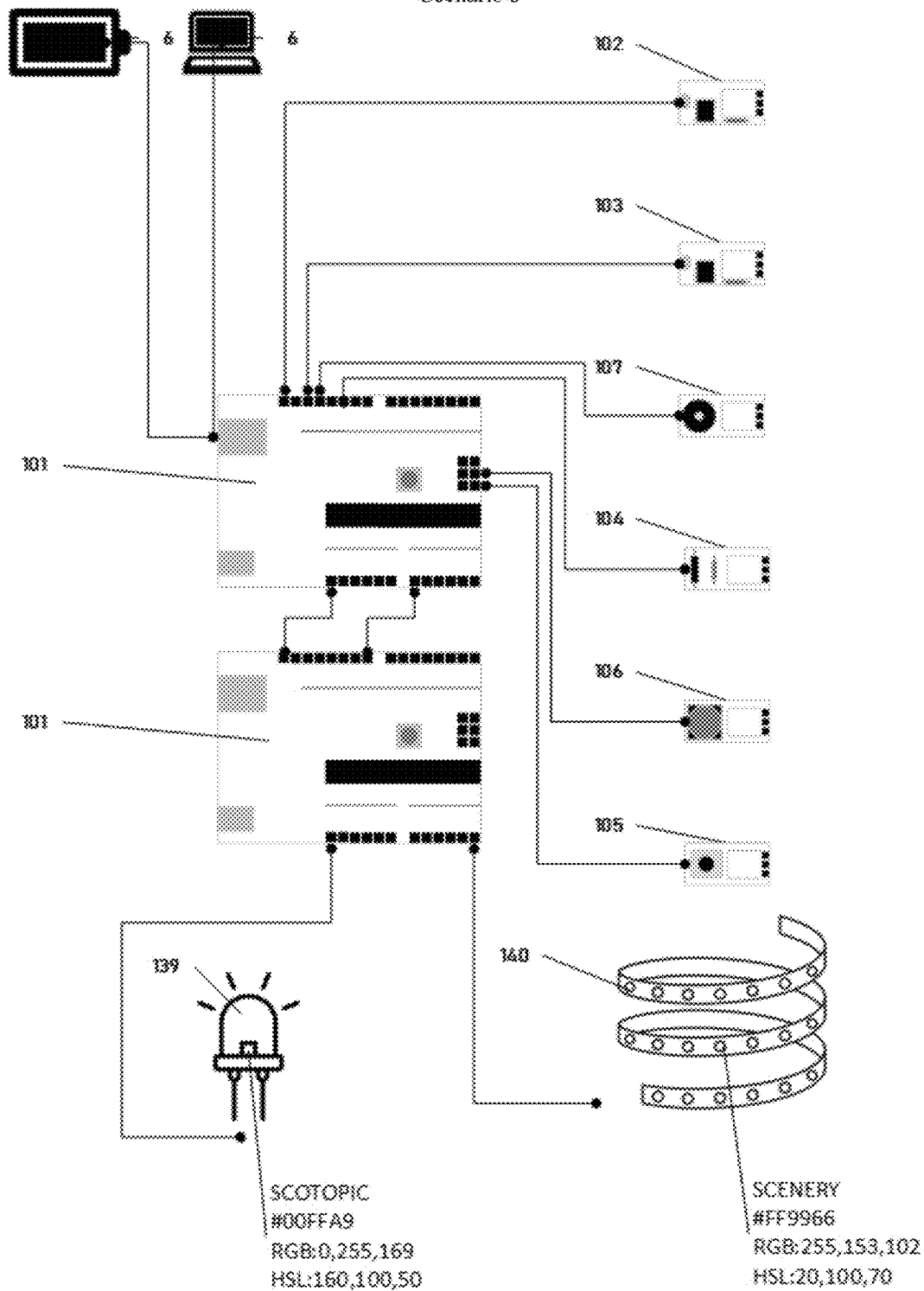
FIG. 30: An embodiment of the system and method of the present disclosure configured as a consumer (band) product operating under a first set of environmental conditions: night/scotopic in a first scene.
Figure 31:
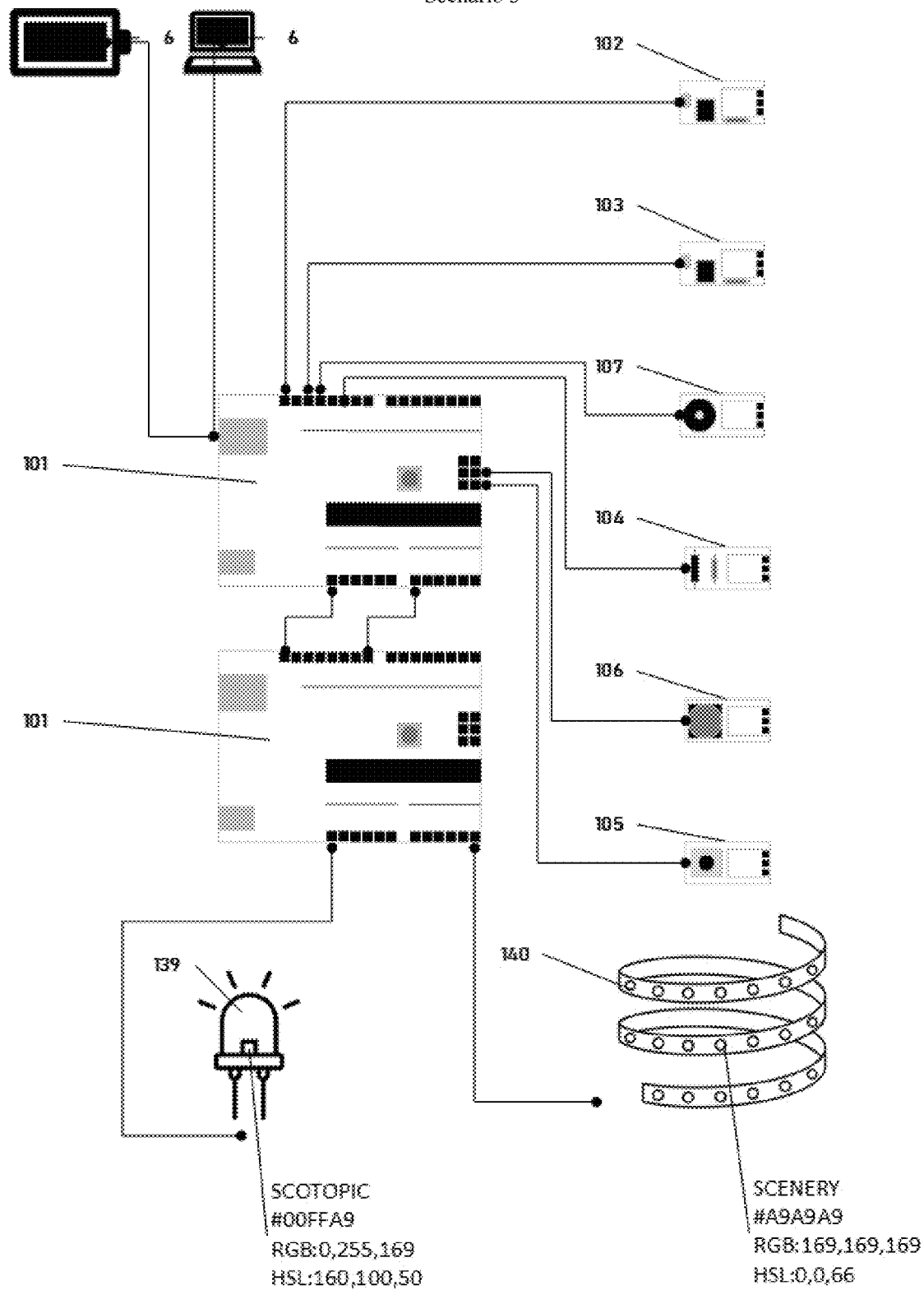
FIG. 31: An embodiment of the system and method of the present disclosure configured as a consumer (band) product operating under a second set of environmental conditions: night/scotopic in a second scene.
Figure 32:
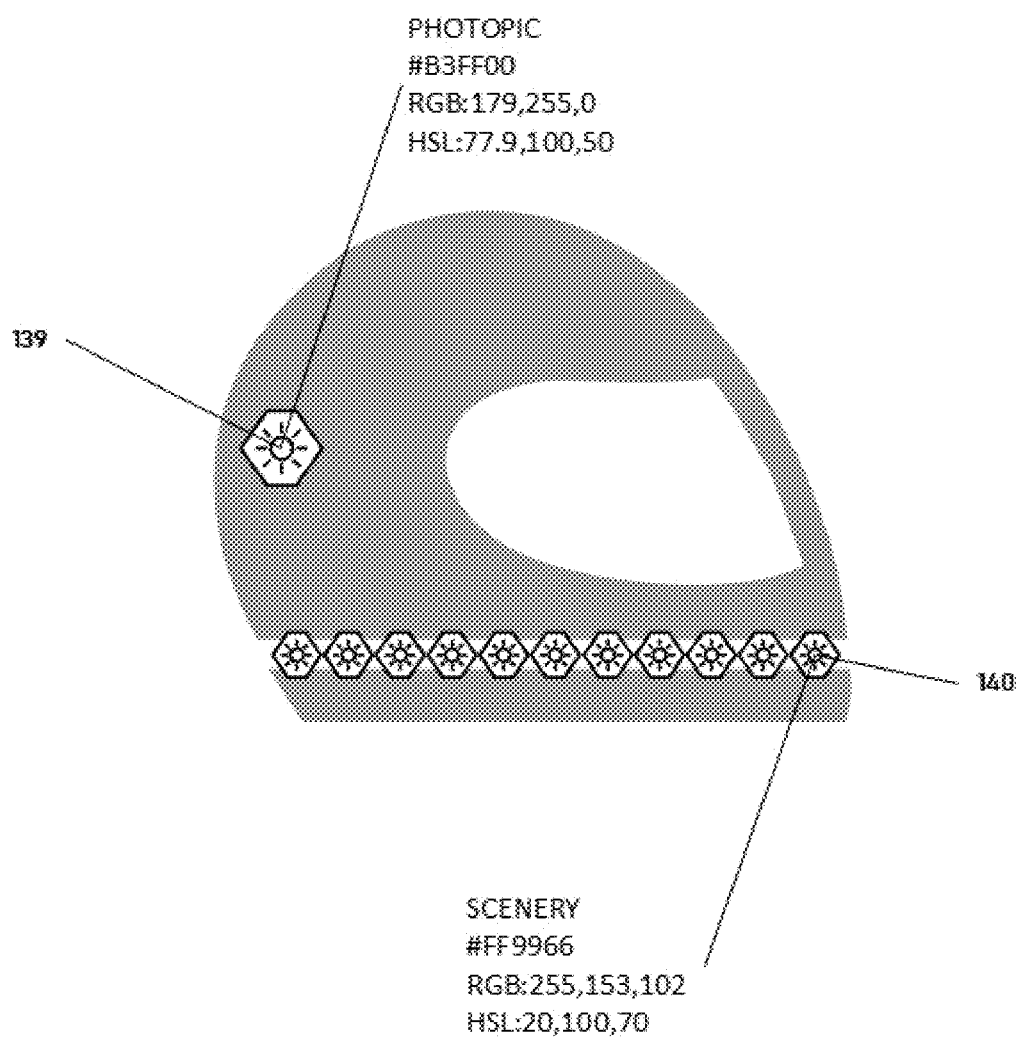
FIG. 32: A consumer (band) product applied to a bicycle helmet illustrating how a viewer can be aided to perceive the helmet and person wearing it (phototopic conditions, corresponding to FIG. 26 at a first viewing point).
Figure 33:
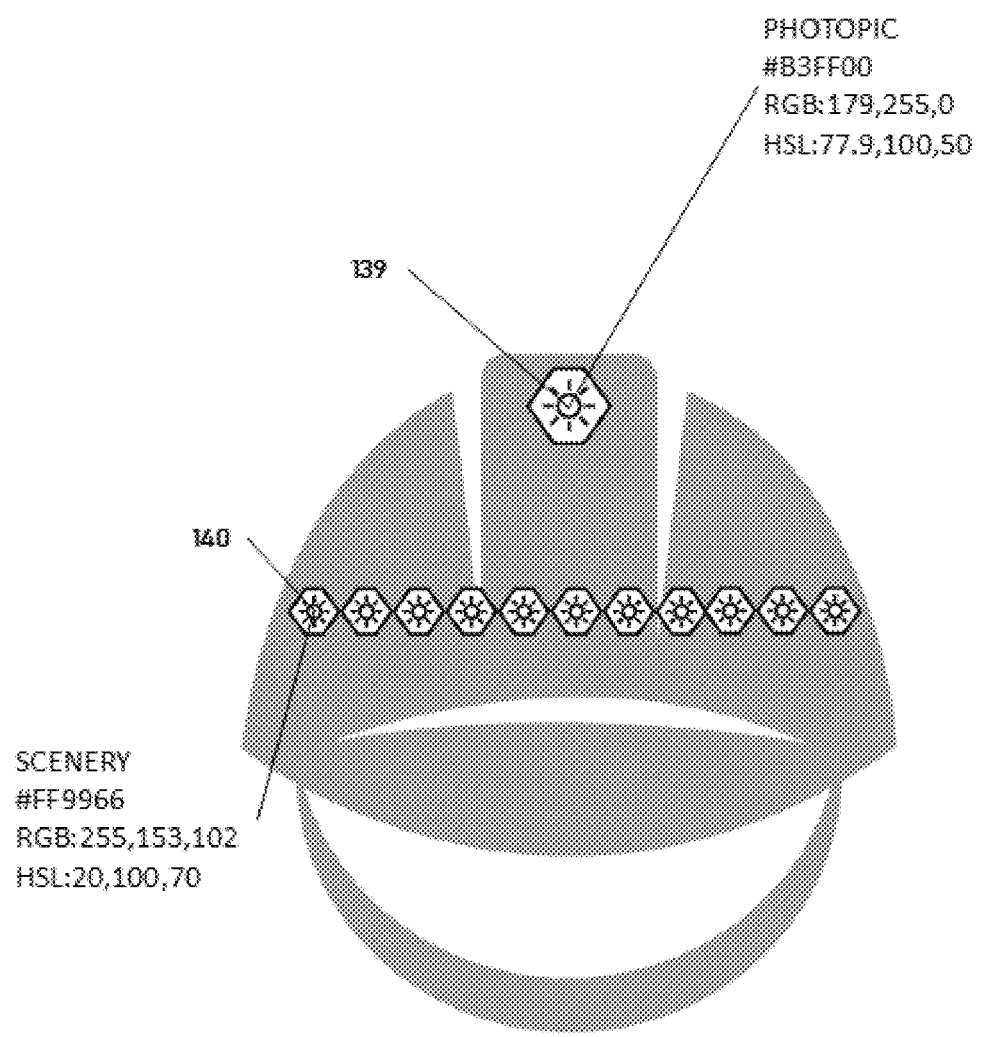
FIG. 33: A consumer (band) product applied to a bicycle helmet illustrating how a viewer can be aided to perceive the helmet and person wearing it (phototopic conditions, corresponding to FIG. 26 at a second viewing point).

This versatility makes the system amenable to a multitude of consumer product embodiments, such as those depicted in FIGS. 17 to 19 (i.e. pet collar, bag and motorcycle panel, respectively. Additional component features shown in FIGS. 4 to 9 and FIGS. 17 to 19 include a GPS 12 and switch 13. These features illustrate distinct networks of component features that can be operationally switched between in the event of a failure of the sensors 9, or ability of the processing unit 7 to process information/data received from the sensors 9. By flipping a switch 13, the system can operate using a GPS component in communication with any suitable satellite imaging or sensor systems about current weather/climate conditions and location of the object, as well as one or more processing units associated with or connected to a satellite (not shown) to process data and/or access pre-programmed information about the geographical/geological topology of an object's location (as may be updated from time to time). Such information can act as a reasonable approximation of the impact of such topologies on the quality of light at the scenery around the object at the pinpointed location. Accordingly, this information can be used to inform the determination of one or more wavelengths of light to be emitted from the displays, 1, 2, 3, and 4 and thereby facilitate object perception. In addition, or alternatively, the switch can be configured to provide for the operation of the sensors 9, processing unit 7 at the same time as the GPS 12 and the sensor systems and processing units of a satellite associated with the object, in order to inform the determination of one or more wavelengths of light to be emitted from the displays 1, 2, 3 and 4.

TABLE 2

Figure 10:
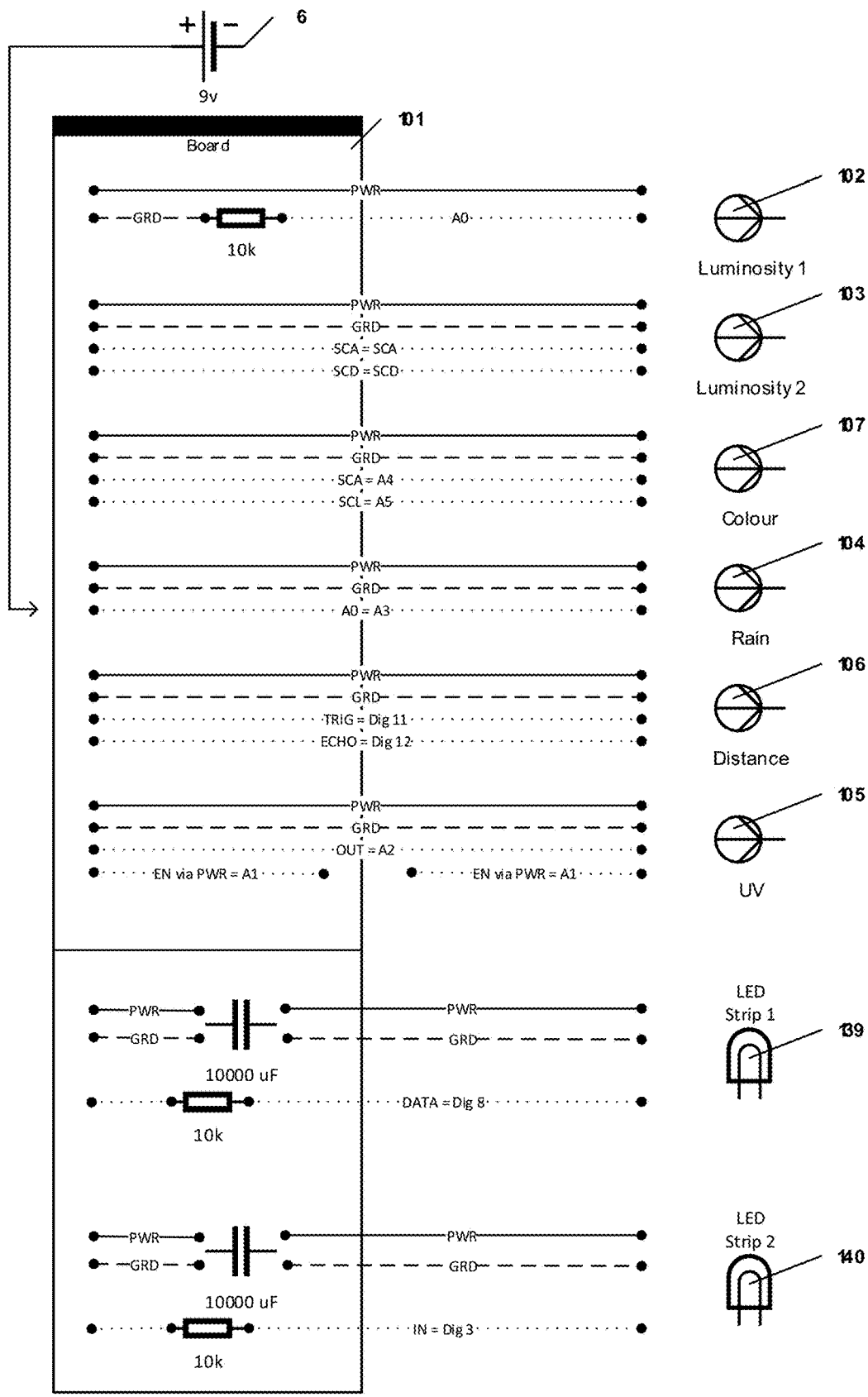
FIG. 10: An electronic circuit schematic for an embodiment of an object perception system according to the present disclosure.
Figure 11:
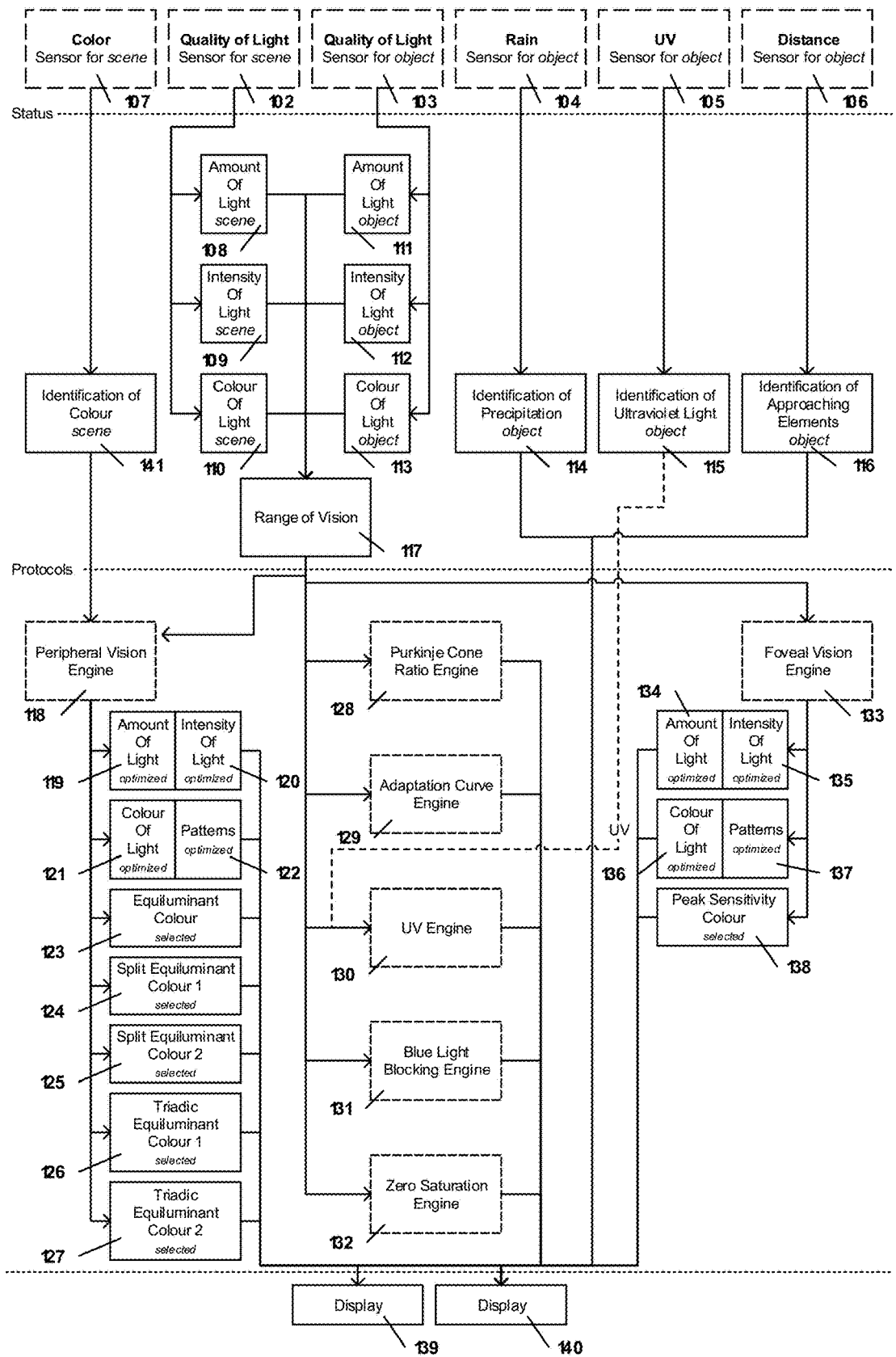
FIG. 11: A block diagram of an embodiment of an object perception system according to the present disclosure.

Exemplary System (Circuit) Hardware, Protocols and System Inputs Feature Numbering (see FIGS. 10 and 11)

| Number | Name | Description of Function Provided |
|---|---|---|
| 101 | Circuit Board Processing Unit | |
| 102 | Quality of Light Sensor for Scene | Detect and measure the amount, intensity and colour of light |
| 103 | Quality of Light Sensor for Object | Detect and measure the amount, intensity and colour of light |
| 104 | Rain Sensor for Object | Detect and measure the amount of precipitation |
| 105 | UV Sensor for Object | Detect and measure the amount of UVA and UVB spectrum |
| 106 | Distance Sensor for Object | Detect and measure the amount of distance between the object and viewer |
| 107 | Sensor for Identification of Colour scene | Values measured for a range of visible colours |
| 108 | Amount of Light scene | Radiant Flux, Radiant Intensity, Irradiance and Radiance values measured for a scene |
| 109 | Intensity of Light scene | Luminous Flux, Luminous Intensity, Illuminance, Luminance values measured for a scene |
| 110 | Colour of Light scene | Kelvin values measured for a scene |
| 111 | Amount of Light object | Radiant Flux, Radiant Intensity, Irradiance and Radiance values measured for an object |
| 112 | Intensity of Light object | Luminous Flux, Luminous Intensity, Illuminance, Luminance values measured for an object |
| 113 | Colour of Light object | Kelvin values measured for an object |
| 114 | Identification of Precipitation object | Precipitation values measured for an object |
| 115 | Identification of Ultraviolet Light object | UVA and UVB spectrum values measured for an object |
| 116 | Identification of Approaching Elements object | Distance values between the object and a viewer |

TABLE 2-continued

Exemplary System (Circuit) Hardware, Protocols and System Inputs Feature Numbering (see FIGS. 10 and 11)

| Number | Name | Description of Function Provided |
|---|---|---|
| 117 | Range of Vision | Luminance measured for scene and object to determine scotopic, mesopic or photopic vision |
| 118 | Peripheral Vision Engine | Create a 'desirable difficulty by-way-of unrealistic luminance using the colours and optionally patterns in the visible wavelengths of light to elicit a peripheral vision response. |
| 119 | Amount of Light Modulation | Radiant Flux, Radiant Intensity, Irradiance and Radiance values modulated to elicit a peripheral vision response |
| 120 | Intensity of Light Modulation | Luminous Flux, Luminous Intensity, Illuminance, Luminance values modulated for the desired peripheral vision response |
| 121 | Colour of Light Modulation | Kelvin values modulated to elicit a peripheral vision response |
| 122 | Patterns Modulation | Patterns modulated to elicit a peripheral vision response |
| 123 | Equiluminant Colour selected | Selection of the equiluminant colour in the visible wavelengths of light to elicit a peripheral vision response |
| 124 | Split Equiluminant Colour 1 selected | Selection of the first split equiluminant colour in the visible wavelengths of light to elicit a peripheral vision response |
| 125 | Split Equiluminant Colour 2 selected | Selection of the second split equiluminant colour in the visible wavelengths of light to elicit a peripheral vision response |
| 126 | Triadic Equiluminant Colour 1 selected | Selection of the first triadic equiluminant colour in the visible wavelengths of light to elicit a peripheral vision response |
| 127 | Triadic Equiluminant Colour 2 selected | Selection of the second triadic equiluminant colour in the visible wavelengths of light to elicit a peripheral vision response |
| 128 | Purkinje Cone Ratio Engine | Ongoing adjustments (modulation) to the Peripheral Vision Engine due to the shift of vision's peak sensitivity in the mesopic vision range. |
| 129 | Adaptation Curve Engine | Ongoing adjustments (modulation) due to rapid changes in Range of Vision (lighting) conditions |
| 130 | UV Engine | Ongoing adjustments (modulation) due to changes in UV to account for UV eyewear protection tints |
| 131 | Blue Light Blocking Engine | Ongoing adjustments (modulation) due to blue light blocking lenses and screens |
| 132 | Zero Saturation Engine | Ongoing adjustments (modulation) due to the presence of white, black or tints/shades of grey (i.e. grey scale, when there are no red to purple colour saturation values) in the environment sensed. |
| 133 | Foveal Vision Engine | Select the maximum peak sensitivity colour, for the given quality of light in the environment, in the visible wavelengths of light to elicit a foveal vision response. |
| 134 | Amount of Light Modulation | Radiant Flux, Radiant Intensity, Irradiance and Radiance values modulated to elicit a foveal vision response |
| 135 | Intensity of Light Modulation | Luminous Flux, Luminous Intensity, Illuminance, Luminance values modulated to elicit a foveal vision response |
| 136 | Colour of Light Modulation | Kelvin values modulated to elicit a foveal vision response |
| 137 | Patterns Modulation | Patterns modulated to elicit a foveal vision response |
| 138 | Peak Sensitivity Colour selected | Selection of the maximum peak sensitivity colour in the visible wavelengths of light to elicit a foveal vision response |
| 139 | Display 1 | Exhibits results visually |
| 140 | Display 2 | Exhibits results visually |
| 141 | Identification of Colour of Scene | Colour for scene determined by using suitable colour model protocol like Hue-Saturation-Lightness (HSL) colour model |

General Embodiment—Hardware and Protocols of System and Method (See FIGS. 12 to 16)

TABLE 3

General Embodiment Feature Numbering (see FIGS. 12-16)

212. Scenery-Radiant Flux (sRFx)
213. Scenery-Radiant Intensity (sRIn)
214. Scenery-Irradiance (sIRr)
215. Scenery-Radiance (sRAd)
216. Scenery-Luminous Flux (sLUx)
217. Scenery-Luminous Intensity (sLIn)
218. Scenery-Illuminance (sILu)
219. Scenery-Luminance (sLUm)
220. Scenery-Kelvin (sK)
221. Scenery-Hue (sH)
222. Scenery-Saturation (sS)
223. Scenery-Lightness (sL)
224. Object-Radiant Flux (oRFx)
225. Object-Radiant Intensity (oRIn)
226. Object-Irradiance (oIRr)
227. Object-Radiance (oRAd)
228. Object-Luminous Flux (oLUx)
229. Object-Luminous Intensity (oLIn)
230. Object-Illuminance (oILu)
231. Object-Luminance (oLUm)
232. Object-Kelvin (oK)
233. Object-Hue (oH)
234. Object-Saturation (oS)
235. Object-Lightness (oL)
236. Peripheral Vision Engine
237. Peripheral Vision Engine-Radiant Flux (pRFx)
238. Peripheral Vision Engine-Radiant Intensity (pRIn)
239. Peripheral Vision Engine-Irradiance (pIRr)
240. Peripheral Vision Engine-Radiance (pRAd)
241. Peripheral Vision Engine-Luminous Flux (pLUx)
242. Peripheral Vision Engine-Luminous Intensity (pLIn)
243. Peripheral Vision Engine-Illuminance (pILu)
244. Peripheral Vision Engine-Luminance (pLUm)
245. Peripheral Vision Engine-Kelvin (pK)
246. Peripheral Vision Engine-Identification of Equiluminant Colour (pEQ)
247. Peripheral Vision Engine-Identification of Equiluminant Colour (pEQ)-Hue (pEQuH)
248. Peripheral Vision Engine-Identification of Equiluminant Colour (pEQ)-Saturation (pEQuS)
249. Peripheral Vision Engine-Identification of Equiluminant Colour (pEQ)-Lightness (pEQuL)
250. Peripheral Vision Engine-Identification of Split Equiluminant Colour 1 (pSE1)
251. Peripheral Vision Engine-Identification of Split Equiluminant Colour 1 (pSE1)-Hue (pSE1H)
252. Peripheral Vision Engine-Identification of Split Equiluminant Colour 1 (pSE1)-Saturation (pSE1S)
253. Peripheral Vision Engine-Identification of Split Equiluminant Colour 1 (pSE1)-Lightness (pSE1L)
254. Peripheral Vision Engine-Identification of Split Equiluminant Colour 2 (pSE2)
255. Peripheral Vision Engine-Identification of Split Equiluminant Colour 2 (pSE2)-Hue (pSE2H)
256. Peripheral Vision Engine-Identification of Split Equiluminant Colour 2 (pSE2)-Saturation (pSE2S)
257. Peripheral Vision Engine-Identification of Split Equiluminant Colour 2 (pSE2)-Lightness (pSE2L)
258. Peripheral Vision Engine-Identification of Identification of Triadic Equiluminant Colour 1 (pTR1)
259. Peripheral Vision Engine-Identification of Identification of Triadic Equiluminant Colour 1 (pTR1)-Hue (pTR1H)
260. Peripheral Vision Engine-Identification of Identification of Triadic Equiluminant Colour 1 (pTR1)-Saturation (pTR1S)
261. Peripheral Vision Engine-Identification of Identification of Triadic Equiluminant Colour 1 (pTR1)-Lightness (pTR1L)
262. Peripheral Vision Engine-Identification of Identification of Triadic Equiluminant Colour 2 (pTR2)
263. Peripheral Vision Engine-Identification of Identification of Triadic Equiluminant Colour 2 (pTR2)-Hue (pTR2H)
264. Peripheral Vision Engine-Identification of Identification of Triadic Equiluminant Colour 2 (pTR2)-Saturation (pTR2S)
265. Peripheral Vision Engine-Identification of Identification of Triadic

TABLE 3-continued

General Embodiment Feature Numbering (see FIGS. 12-16)

Equiluminant Colour 2 (pTR2)-Lightness (pTR2L)
266. Peripheral Vision Engine-Diurnal Vision (pDIu)
267. Peripheral Vision Engine-Edges (pEDg)
268. Peripheral Vision Engine-Facial Features (pFAc)
269. Peripheral Vision Engine-Contrasts (pCOn)
270. Foveal Vision Engine
271. Foveal Vision Engine-Radiant Flux (fRFx)
272. Foveal Vision Engine-Radiant Intensity (fRIn)
273. Foveal Vision Engine-Irradiance (fIRr)
274. Foveal Vision Engine-Radiance (fRAd)
275. Foveal Vision Engine-Luminous Flux (fLUx)
276. Foveal Vision Engine-Luminous Intensity (fLIn)
277. Foveal Vision Engine-Illuminance (fILu)
278. Foveal Vision Engine-Luminance (fLUm)
279. Foveal Vision Engine-Kelvin (fK)
280. Foveal Vision Engine-Identification of Peak Sensitivity Colour (oPEk)
281. Foveal Vision Engine-Identification of Peak Sensitivity Colour (oPEk)-Hue (fPEkH)
282. Foveal Vision Engine-Identification of Peak Sensitivity Colour (oPEk)-Saturation (fPEkS)
283. Foveal Vision Engine-Identification of Peak Sensitivity Colour (oPEk)-Lightness (fPEkL)
284. Foveal Vision Engine-Centre/Surround (fCSu)
285. Foveal Vision Engine-Cone Ratios (fCOn)
286. Foveal Vision Engine-Purkinje Shift (fPRj)
287. Purkinje Cone Ratio Engine
288. Adaptation Curve Engine
289. UV Engine
290. Blue Light Blocking Engine
291. Zero Saturation Engine Sensing Means Generally speaking and referring to FIGS. 4-9, the (input) sensor component feature can take the form of several variants, such as a lens module, camera module, smartphone lens, infrared sensor, electromagnetic sensor, ultraviolet sensor, humidity sensor, pollen sensor, soot/ash sensors and other particulate matter sensors, ultraviolet-induced visible fluorescence modules and a radar module.

Processing Means

Generally speaking and referring to FIGS. 4-9, and FIG. 17-19, the processing unit component feature can take the form of several variants, such as field-programmable gate array (FPGA), complex programmable logic device (CPLD), application-specific integrated circuit (ASIC), erasable programmable logic device (EPLD), simple programmable logic device (SPLD), macrocell array, programmable array logic (PAL), programmable logic array (PLA), programmable logic device (PLD), generic array logic (GAL), programmable electrically erasable logic (PEEL), single-board microcontroller, single-board computer (SBC).

The processing unit 7 described herein may include a computer-readable medium on which is stored one or more sets of instructions for carrying out the method steps according to the present disclosure (e.g. as software). The software implemented engines/protocols may also reside, completely, or partially, within memory and/or within a processor within a controller during execution thereof by the controller, the memory and the processor also constituting computer-readable media. The software implemented engines/protocols may further be transmitted or received over a network via a network interface device, or using any other suitable communication means.

The term "computer-readable medium" can be understood to include a single medium or multiple media that store one or more sets of instructions. The term can also be understood to include any medium that can store, encode or carry a set of instructions for execution by a machine and that can cause the machine to perform any one or more of functions of the systems and methods of according to the present disclosure. As such, a "computer-readable storage medium" can include, without limitation, a solid-state memory, and optical and magnetic media.

The processing unit 7 of FIGS. 1 to 3 has been described herein as performing particular functions. It will be appreciated that the controller includes executable code which is stored on a computer-readable medium for execution on the controller. Said various functions can be performed by hardware and/or software coded and stored on a computer-readable medium in any suitable manner. The controller may be any type of device or combination of devices which can carry out the disclosed functions in response to computer readable instructions recorded on media.

Processes and techniques described herein are not inherently related to any particular apparatus and may be implemented by any suitable combination of components and machine executed instructions, which may or may not include options for inputs, or functions selection by a user of the system. Various types of general-purpose devices may be used in accordance with the teachings described herein and be integrated into systems of the present disclosure. Further, it is possible to construct specialized apparatuses to perform the method steps described herein. Those skilled in the art will appreciate that many different combinations of hardware, software, and firmware that can be suitably combined to construct and apply the systems and methods of the present disclosure.

Display

Generally speaking and referring to FIGS. 4-9, and FIG. 17-19, the display (output) component feature can take the form of several video-based variants, such as segment display, tactile display, Incandescent filaments, vacuum fluorescent display, cold cathode gas discharge, light-emitting diode (LED), liquid crystal display (LCD), physical vane with electromagnetic activation, Light-emitting diode display (LED), electroluminescent display (ELD), electronic paper, e Ink, plasma display panel (PDP), liquid crystal display (LCD), high-Performance Addressing display (HPA), thin-film transistor display (TFT), Organic light-emitting diode display (OLED), interferometric modulator display (IMOD), digital microshutter display (DMS), split-flap display, flip-disc display, organic light-emitting diode (OLED), active-matrix organic light-emitting diode (AMO-LED), organic light-emitting transistor (OLET), Surface-conduction electron-emitter display (SED), field emission display (FED), laser T, quantum dot, liquid crystal, MEMS display, IMoD, TMOS, DMS, quantum dot display (QD-LED), ferro liquid crystal display (FLCD), thick-film dielectric electroluminescent technology (TDEL), telescopic pixel display (TPD), laser-powered phosphor display (LPD).

Generally speaking, the display (output) component feature can also take the form of cathode ray tube display (CRT), surface-conduction electron-emitter display (SED), field emission display (FED), laser TV, carbon nanotube display, and quantum dot display.

Generally speaking and referring to FIGS. 4-9, and FIGS. 17-19, the display (output) component feature can also take the form of several non-video-based variants, such as electromechanical, flip-dot, split-flap, vane, eggcrate, nixie tube, vacuum fluorescent display (VFD), light-emitting electrochemical cell (LEC), lightguide display, dot-matrix display, seven-segment display (SSD), nine-segment display, fourteen-segment display (FSD), sixteen-segment display (SISD).

Generally speaking, the display (output) component feature can also take the form of several 3D-based variants, such as stereoscopic, autostereoscopic, multiscopic, hologram, holographic display, computer-generated holography, volumetric, Musion eyeliner, fog display.

It will be appreciated that the system may be manufactured as multiple components that are assembled together to form a design of either single or multiple points of failure.

Further, various types of general-purpose devices may be used in accordance with the teachings described herein. The present invention has been described in relation to examples, which are intended in all respects to be illustrative rather than restrictive. Those skilled in the art will appreciate that many different combinations will be suitable for embodiments of the systems and methods of the present disclosure.

With reference to FIG. 10, an exemplary hardware and electrical configuration of a system according the disclosure is provided wherein the sensor inputs 9 of FIGS. 1-3 are specified as including luminosity 102, 103, colour 107, rain 104, distance 106 and UV 105 sensors. Light displays are indicated as LED strips 109, 140. The processor means 7 in FIGS. 1-3 is specified in this embodiment as a processing board 101. The function of a related embodiment based on the embodiment of FIG. 10, is further described in Example 2 (Consumer Band Product).

With reference to FIG. 11, the method performed by the embodiment of FIG. 10 is shown as a block diagram. Inputs from a scene in which an object to be perceived is located are captured by the sensors 102 to 107. Said inputs result in the detection, measurement, or identification of environmental parameters including the identification of the colour of a scene, as provided by the sensor 107, and other parameters 108 to 116. A determination of the Range of Vision is made based on parameters 108 to 110 (quality of light of the scene) and on parameters 111 to 113 (quality of light at the object), as available. These parameters and the Range of Vision determination are then processed according to one or more of the protocols indicated as the Peripheral Vision Engine 118, Foveal Vision Engine 133, Purkinje Cone Ratio Engine 128, Adaptation Curve Engine 129, UV Engine 130, Blue Light Engine 131, and Zero Saturation Engine 132, to provide specified light outputs to be emitted by the display 139.

In one embodiment, the Peripheral Vision Engine 118 determines a first light output to be emitted by the display 139. The characteristics or indicia of the first light output are defined by the values or parameters 119 to 127 to provide a light output that elicits a peripheral vision response from a viewer. A peripheral vision response that is elicited by the operation of the systems and methods of the present disclosure can direct the viewer to look head on at the object and thereby elicit a foveal vision response.

In another embodiment, the Foveal Vision Engine 133 determines a second light output to be emitted by the display 139. The characteristics or indicia of the first light output are defined by the values or parameters 134 to 138 to provide a light output most likely to elicit a foveal vision response from a viewer.

The additional engines/protocols 128 to 132 provide further opportunities for the method of the present disclosure to provide light outputs most likely to support a viewer's ability to perceive an object by eliciting further optimized peripheral and foveal vision responses under changing and anticipated types of environmental conditions that may be present in a given circumstance. FIGS. 12-16 provide further details of the operation and method steps performed by the various engines/protocols.

The following description presents a more detailed generalized embodiment of the systems and methods of the present disclosure with reference to FIGS. 12-16. This embodiment can be described and exemplified for the perception of an object situated in different environments. In one embodiment, the environment is a rural, desert environment during the day (photopic conditions). There are four operational stages for the general embodiment described herein: Object Status, Range of Vision, Protocols and Display.

Object Status in Environment

Figure 12:
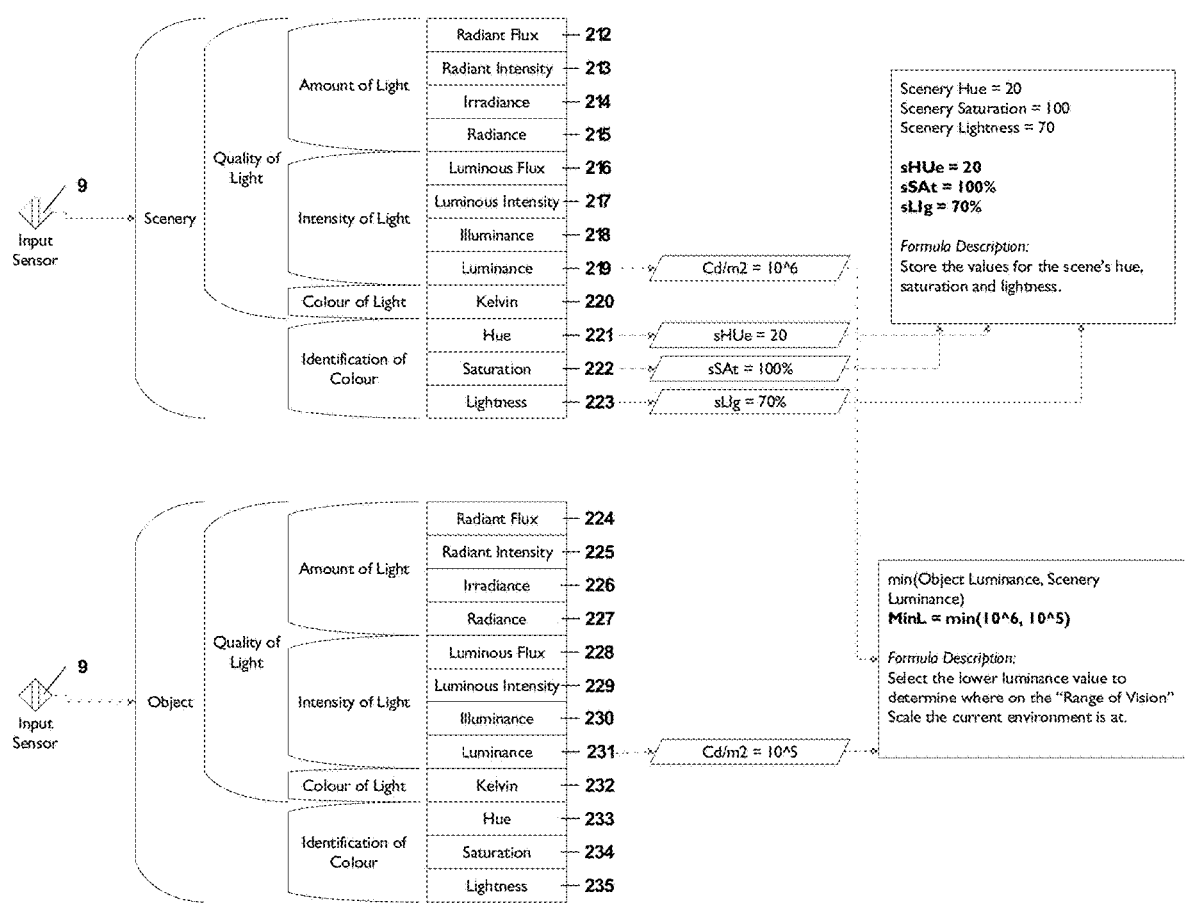
FIG. 12: An embodiment of an object perception process or method according to the present disclosure to determine the quality of light (object status) in the vicinity of or at the surface of an object and the scenery behind the object relative to a selected viewing point.

In FIG. 12, an embodiment of the system receives power and is ON. To determine the status of the object relative to the environmental parameters measured, input sensors 9 monitor: a) the quality of light of the scenery surrounding the object to be, or being perceived, and in given circumstances, requiring recognition; the values determined are provided at value features 212-220; b) the identification of colour on the scenery surrounding the object to be, or being perceived, and in given circumstances, requiring recognition; the values determined are provided at value features 221-223; c) the quality of light on the object to be, or being perceived, and in given circumstances, requiring recognition; the values determined are provided at value features 224-232; and d) the identification of colour on the object to be, or being perceived, and in given circumstances, requiring recognition; the values determined are provided at value features 233-235. The values determined and provided at value features 212-235 (as monitored by the input sensors 9) are sent to the processing unit 7 for analysis.

Range of Vision

Figure 13:
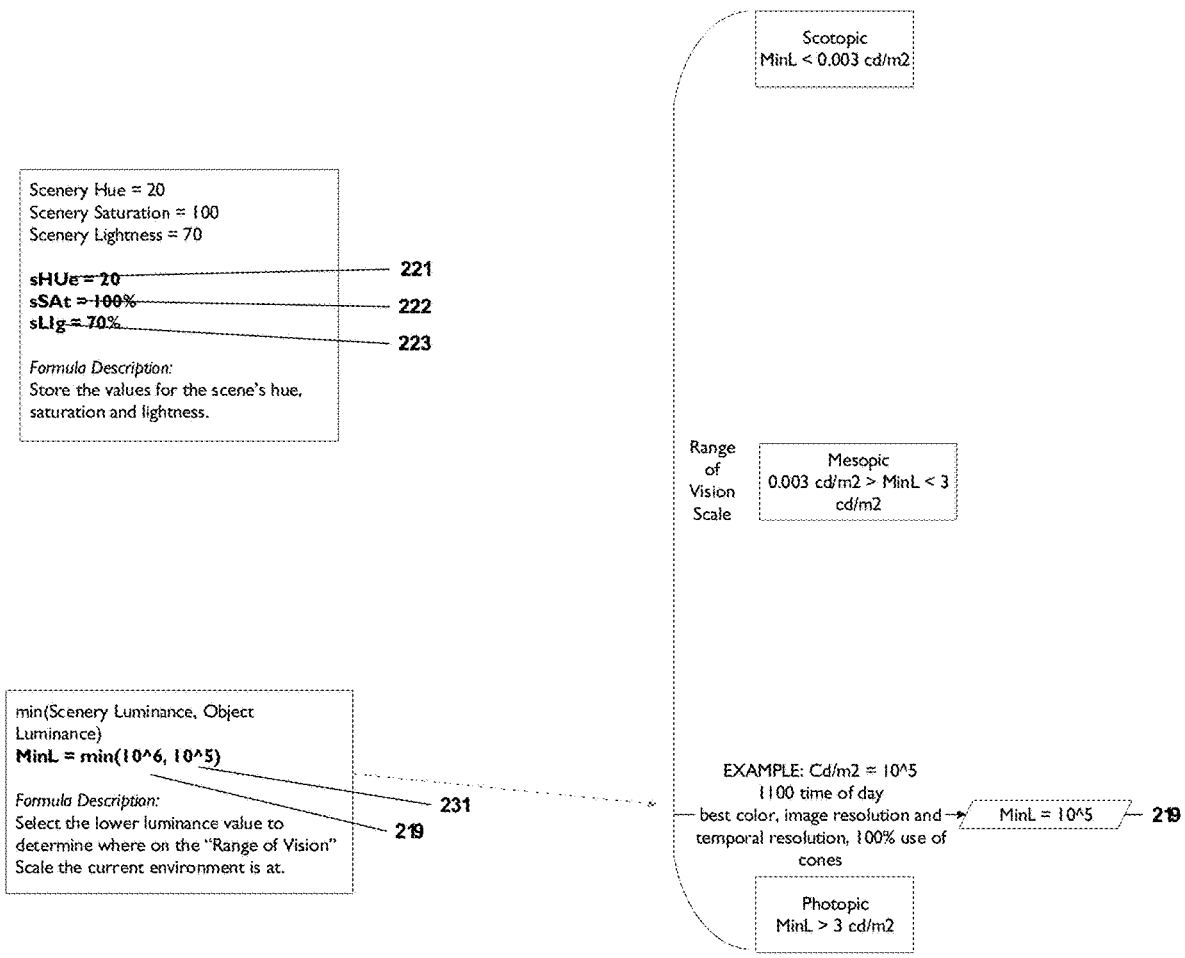
FIG. 13: An embodiment of an object perception process or method according to the present disclosure to determine the range of vision under scotopic, mesopic and photopic lighting conditions based on quality of light inputs processed from the applicable sensors of FIG. 11.

In FIG. 13, the presently described generalized embodiment of the system of the present disclosure accesses the values provided at value features 219, 231 for luminance selection and value features 221, 222, 223 for identification of a scene's colour.

Quality of Light

The processing unit 7 uses the values provided at value features 212-235 to calculate the quality of light. The calculated quality of light is located on the "Range of Vision Scale". More particularly, the values provided at value features 212-220 relate to the quality of light of the scenery, the values provided at value features 221-223 relate to the colour on the scenery, the values provided at value features 224-232 relate to the quality of light of the object, and the values provided at value features 233-235 relate to the colour on the object.

The "Range of Vision Scale" indicates the mix of sight photoreceptors functioning in a human being (subject viewer) under the environmental conditions sensed. In human eyes, rods and cones are the two types of photoreceptors in the human retina. The lower on the scale, the darker the environment measured. The higher on the scale, the brighter the environment measured.

In the General Embodiment example, the "Range of Vision Scale" is the measurement of luminance from level ~0.003 cd/m2 to ~108 cd/m2. There are three categories within the "Range of Vision Scale". These categories indicate the mix of rods and cones used given the luminance at that measured point of time.

Scotopic vision is any level of luminance <0.003 cd/m2. Scotopic vision uses only rods to see, meaning that objects are visible, but appear in black and white. Photopic vision is any level of luminance >3 cd/m2. Photopic vision uses cones and provides colour. Mesopic vision is any level of luminance between 0.003 cd/m2 and 3 cd/m2. Mesopic vision is the combination of the two and is used for most scenarios.

The processing unit 7 uses the Scenery-Luminance (sLUm) value provided at value feature 219 to determine the quality of light on the scenery surrounding the object requiring recognition. The processing unit 7 uses the Object-Luminance (oLUm) value provided at value feature 231 to determine the quality of light on the object requiring recognition.

The values for FIG. 13 are: Scenery-Luminance (sLUm) value (provided at value feature 219)=$10^6$ and Object-Luminance (oLUm) value (provided at value feature 231)=$10^5$.

The processing unit 7 selects the lower of the two numbers, therefore the lower is Object-Luminance (sLUm) value (provided at value feature 231)=$10^5$ in FIG. 13. Selecting the lower of the two values represents a cautious or conservative implementation of the methods according to the present disclosure. Therefore, FIG. 13 is in the "photopic" stage in the "Range of Vision Scale". This status of "photopic" will be used in the next stage of Protocols according to the methods of the present disclosure.

The continual monitoring of the "Range of Vision Scale" is used to determine and generate dynamically changing colours and patterns in the visible wavelengths of light for a) eliciting an optimized peripheral vision response, b) eliciting a foveal vision response towards the object requiring recognition, and c) facilitating the viewer to actively perceive the object by processing what is viewed.

Identification of Colour

The processing unit 7 uses the values provided at value features 212-235 to determine the identification of colour. More particularly, the values provided at value features 212-220 relate to the quality of light of the scenery, the values provided at value features 221-223 relate to the colour on the scenery, the values provided at value features 224-232 relate to the quality of light of the object and the values provided at value features 233-235 relate to the colour on the object. The identification of colour value as provided at value feature 141 is determined by the application of a colour model protocol based on a colour model framework (e.g. HSL, RGB, Pantone, etc.).

The values for FIG. 13 are: Scenery-Hue (sH) (provided at value feature 221)=20; Scenery-Saturation (sS) (provided at value feature 222)=100; and Scenery-Lightness (sL) (provided at value feature 223)=70.

The processing unit 7 stores the values for the scene's hue, saturation and lightness for the current environment being monitored. The continual changing of the scene's colour as monitored by the system is used to determine and generate dynamically changing colours and patterns of light outputs in the visible wavelengths of light for a) eliciting an optimized peripheral vision response, b) eliciting a foveal vision response towards the object requiring recognition, and c) facilitating the viewer to actively perceive the object by processing what is viewed.

Protocols

The processing unit 7 contains numerous 'engines' of protocols that are continually operating to generate the colours and patterns in the visible wavelengths of light for a) eliciting an optimized peripheral vision response, b) eliciting a foveal vision response towards the object requiring recognition, and c) facilitating the viewer to actively perceive the object by processing what is viewed.

The processing unit 7 operates the Peripheral Vision Engine 236, the Foveal Vision Engine 270, Purkinje Cone Ratio Engine 287, the Adaptation Curve Engine 288, the UV Engine 289, the Blue Light Blocking Engine 290 the Zero Saturation Engine 291. The processing unit's 7 capabilities are not necessarily limited to these listed engines. The values determined for light outputs in the general embodiment represent values optimized for human vision.

Peripheral Vision Engine

Figure 14:
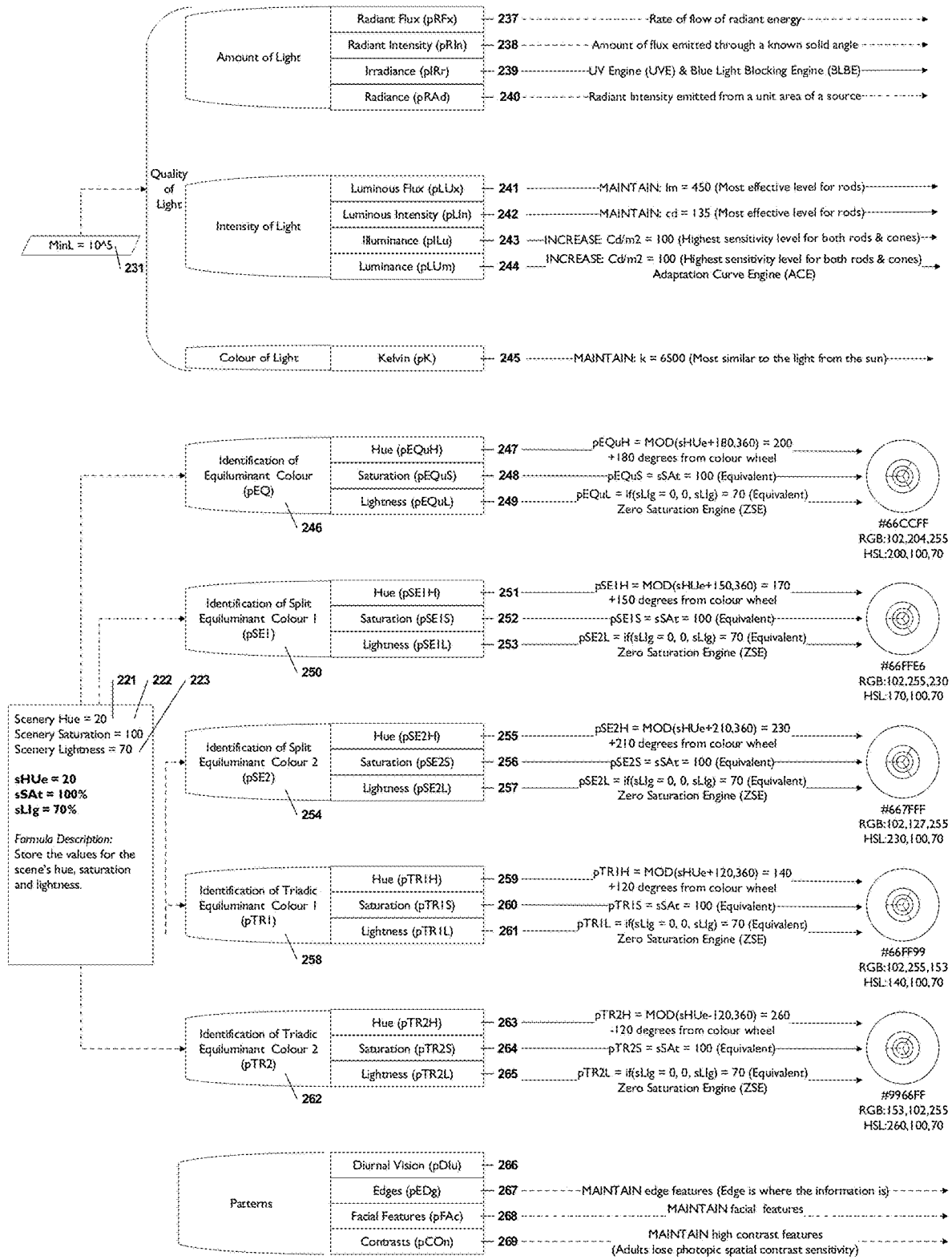
FIG. 14: An embodiment of an object perception process or method according to the present disclosure illustrating the operation of the peripheral vision engine of FIG. 11 to produce a display (light) output.

In FIG. 14, the processing unit 7 operates the Peripheral Vision Engine 236 which generates the colours and, optionally, patterns in the visible wavelengths of light to elicit from a viewer a peripheral vision response. The selected colours and patterns in the visible wavelengths of light are selected to create a desirable vision (or visual) difficulty. In one embodiment, the desirable vision (or visual) difficulty can be understood as an unexpected visual sensory input characterized by unrealistic luminance. The selected colours and patterns in the visible wavelengths of light are also selected to dynamically maintain the desired quality of light of the selected unrealistic luminance.

Unrealistic luminance is generated from calculating the equiluminance variants based on the continual identification of colour of the scenery surrounding the object requiring recognition. Dynamically maintaining an effective quality of light for the selected unrealistic luminance is continual and targeted as a means to achieve the desired peripheral vision response by the viewer with regard to the object requiring recognition.

To dynamically maintain an effective quality of light, the Peripheral Vision Engine 236 requires the "Range of Vision Scale" of the environment. The Peripheral Vision Engine 236 input is Object-Luminance (sLUm) value (provided at value feature 231)=10^5. The Peripheral Vision Engine 236 uses the values provided at value features 237-245 to dynamically maintain a quality of light that is optimal for a viewer's vision under the circumstances. The Peripheral Vision Engine-Irradiance (pIRr) 239 value is calculated through the UV Engine 289 and the Blue Light Blocking Engine 290. The Peripheral Vision Engine-Luminous Flux (pLUx) value provided at value feature 241 is maintained at 450 lm, the level most effective for rod photoreceptors. The Peripheral Vision Engine-Luminous Intensity (pLIn) value provided at value feature 242 is maintained at 135 cd, the level most effective for rod photoreceptors. The Peripheral Vision Engine-Illuminance (pILu) value provided at value feature 243 is increased to 100 Cd/m2, the level for the highest sensitivity for both rod photoreceptors and cone photoreceptors. The Peripheral Vision Engine-Luminance (pLUm) value provided at value feature 244 is increased to 100 Cd/m2, the level for the highest sensitivity for both rod photoreceptors and cone photoreceptors. The Peripheral Vision Engine-Luminance (pLUm) value provided at value feature 244 is calculated through the Adaptation Curve Engine 288. The Peripheral Vision Engine-Kelvin (pK) value provided at value feature 245 is maintained at 6500 k, the value most like the sun and the most effective for both rod photoreceptors and cone photoreceptors.

To create a desirable vision or visual difficulty, or an unexpected vision sensory input, the Peripheral Vision Engine 236 requires the hue, saturation and lightness of the environment. The Peripheral Vision Engine 236 inputs are Scenery-Hue (sH) value (provided at value feature 221)=20, the Scenery-Saturation (sS) value (provided at value feature 222)=100 and the Scenery-Lightness (sL) value (provided at value feature 223)=70.

The Peripheral Vision Engine 236 uses the values provided at value features 246-269 to create a light output characterized by unrealistic luminance. The Peripheral Vision Engine 236 generates 5 variants, the Identification of Equiluminant Colour (pEQ) value provided at value feature 246, the Identification of Split Equiluminant Colour 1 (pSE1) value provided at value feature 250, the Identification of Split Equiluminant Colour 2 (pSE2) value provided at value feature 254, the Identification of Triadic Equiluminant Colour 1 (pTR1) value provided at value feature 258 and the Identification of Triadic Equiluminant Colour 2 (pTR2) value provided at value feature 262.

The Identification of Equiluminant Colour (pEQ) value provided at value feature 246 is the complimentary colour that is approximately +180° on the color wheel from the identification of colour on the scenery surrounding the object requiring recognition. The Identification of Equiluminant Colour (pEQ)-Hue (pEQuH) value provided at value feature 247 value equals 200 because it is +180° degrees from the Scenery-Hue (sH) value (provided at value feature 221)=20. The Identification of Equiluminant Colour (pEQ)-Saturation (pEQuS) value provided at value feature 248 value is equal to the Scenery-Saturation (sS) value (provided at value feature 222)=100. The Identification of Equiluminant Colour (pEQ)-Lightness (pEQuL) value provided at value feature 249 is equal to the Scenery-Lightness (sL) value (provided at value feature 223)=70.

The Identification of Split Equiluminant Colour 1 (pSE1) value provided at value feature 250 is the complimentary colour that is approximately +150° on the color wheel from the identification of colour on the scenery surrounding the object requiring recognition. The Identification of Split Equiluminant Colour 1 (pSE1)-Hue (pSE1H) value provided at value feature 251 equals 170 because it is +150° degrees from the Scenery-Hue (sH) value (provided at value feature 221)=20. The Identification of Split Equiluminant Colour 1 (pSE1)-Saturation (pSE1S) value provided at value feature 252 is equal to the Scenery-Saturation (sS) value (provided at value feature 222)=100. The Identification of Split Equiluminant Colour 1 (pSE1)-Lightness (pSE1L) value provided at value feature 253 is equal to the Scenery-Lightness (sL) value (provided at value feature 223)=70.

The Identification of Split Equiluminant Colour 2 (pSE2) value provided at value feature 254 is the complimentary colour that is approximately +210° on the color wheel from the identification of colour on the scenery surrounding the object requiring recognition. The Identification of Split Equiluminant Colour 2 (pSE2)-Hue (pSE2H) value provided at value feature 255 equals 230 because it is +210° degrees from the Scenery-Hue (sH) value (provided at value feature 221)=20. The Identification of Split Equiluminant Colour 2 (pSE2)-Saturation (pSE2S) value provided at value feature 256 is equal to the Scenery-Saturation (sS) value (provided at value feature 222)=100. The Identification of Split Equiluminant Colour 1 (pSE1)-Lightness (pSE1L) value provided at value feature 257 is equal to the Scenery-Lightness (sL) value (provided at value feature 223)=70.

The Identification of Triadic Equiluminant Colour 1 (pTR1) value provided at value feature 258 is the complimentary colour that is approximately +120° on the color wheel from the identification of colour on the scenery surrounding the object requiring recognition. The Identification of Triadic Equiluminant Colour 1 (pTR1)-Hue (pTR1H) value provided at value feature 259 equals 140 because it is +120° degrees from the Scenery-Hue (sH) value (provided at value feature 221)=20. The Identification of Triadic Equiluminant Colour 1 (pTR1)-Saturation (pTR1S) value provided at value feature 260 is equal to the Scenery-Saturation (sS) value (provided at value feature 222)=100. The Identification of Triadic Equiluminant Colour 1 (pTR1)-Lightness (pTR1L) value provided at value feature 261 is equal to the Scenery-Lightness (sL) value (provided at value feature 223)=70.

The Identification of Triadic Equiluminant Colour 2 (pTR2) value provided at value feature 262 is the complimentary colour that is approximately −120° on the color wheel from the identification of colour on the scenery surrounding the object requiring recognition. The Identification of Triadic Equiluminant Colour 2 (pTR2)-Hue (pTR2H) value provided at value feature 263 equals 260 because it is −120° degrees from the Scenery-Hue (sH) value (provided at value feature 221)=20. The Identification of Triadic Equiluminant Colour 2 (pTR2)-Saturation (pTR2S) value provided at value feature 264 is equal to the Scenery-Saturation (sS) value (provided at value feature 222)=100. The Identification of Triadic Equiluminant Colour 2 (pTR2)-Lightness (pTR2L) value provided at value feature 265 is equal to the Scenery-Lightness (sL) value (provided at value feature 223)=70.

The Peripheral Vision Engine 236 uses the values provided at value features 266-269 to create a desirable vision difficulty by way of edges, faces, contrasts, and compensation protocols for diurnal vision.

The protocols generate patterns of edges, faces, and contrasts which are most effective to maximize object recognition in the widest scope of viewer age groups. Humans have specialized processing areas in their brains for facial recognition and can quickly recognize an entire face or just facial features from memory. Some facial features are more readily perceived than others, such as eyes and overall facial shape. The Peripheral Vision Engine 236 generates simplified representations of features that are highly effective at being recognized by human vision.

Foveal Vision Engine

Figure 15:
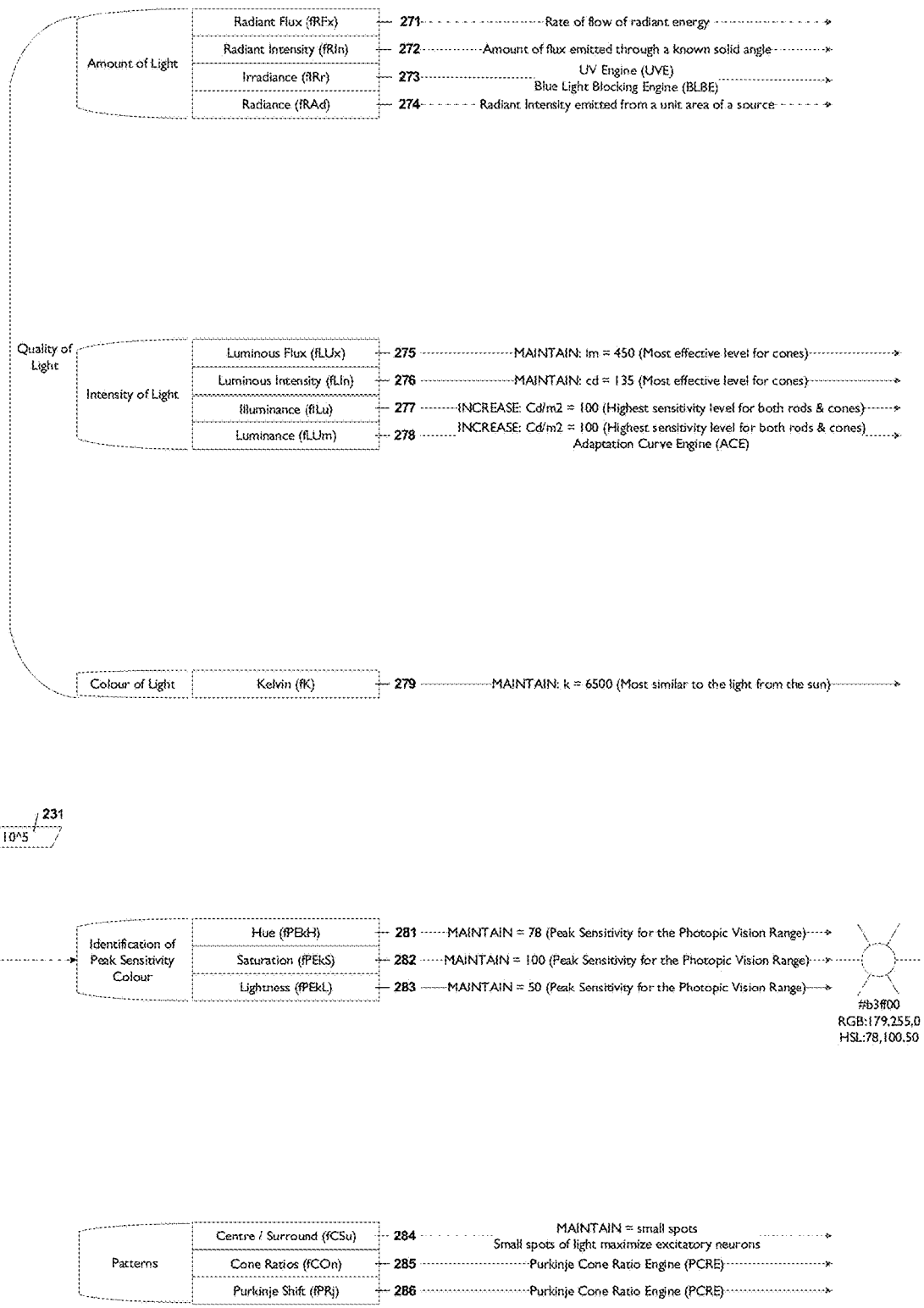
FIG. 15: An embodiment of an object perception process or method according to the present disclosure illustrating the operation of the foveal vision engine of FIG. 11 to produce a display (light) output.

The highest acuity of human vision arises from engaging the foveal vision system. In FIG. 15, the processing unit 7 operates the Foveal Vision Engine 270 which generates the colours and patterns of light outputs in the visible wavelengths for an optimized foveal vision response. To achieve an optimized foveal vision response, the selected colours and patterns of the light outputs in the visible wavelength are chosen by what the maximum peak sensitivity is for the quality of light in the environment.

The maximum peak sensitivity colour for human vision is dependent on which of the three ranges the environment is currently in. Under day lighting conditions (photopic), humans use cone photoreceptors which have a peak sensitivity ~555 nm. Under night lighting conditions (scotopic), humans use rod photoreceptors which have a peak sensitivity ~498 nm. In dusk, dawn and most artificial lighting conditions (mesopic), humans use both cone and rod photoreceptors, which have a combined peak sensitivity of ~507 nm. The systems and methods of the present disclosure can provide for a smooth transition of light outputs between the photopic, mesopic and scotopic peak sensitivities based on the "Range of Vision Scale" value determined at any point in time as environmental conditions change.

The maximum peak sensitivity for the given quality of light in the environment requires the "Range of Vision Scale" of the environment. The Foveal Vision Engine 270 input has been determined to be Object-Luminance (sLUm) value (provided at value feature 231)=10^5. The Foveal Vision Engine 270 uses the values provided at value features 271-279 to dynamically maintain a quality of light that is optimal for human vision under the circumstances. The Foveal Vision Engine-Irradiance (fIRr) value provided at value feature 273 is calculated through the UV Engine 289 and the Blue Light Blocking Engine 290. The Foveal Vision Engine-Luminous Flux (fLUx) value provided at value feature 275 is maintained at 450 lm, the level most effective for cone photoreceptors. The Foveal Vision Engine-Luminous Intensity (fLIn) value provided at value feature 276 is maintained at 135 cd, the level most effective for cone photoreceptors. The Foveal Vision Engine-Illuminance (fILu) value provided at value feature 277 is increased to 100 Cd/m2, the level for the highest sensitivity for both rod photoreceptors and cone photoreceptors. The Foveal Vision Engine-Luminance (fLUm) value provided at value feature 278 is increased to 100 Cd/m2, the level for the highest sensitivity for both rod photoreceptors and cone photoreceptors. The Foveal Vision Engine-Luminance (fLUm) value provided at value feature 278 is calculated through the Adaptation Curve Engine 288. The Foveal Vision Engine-Kelvin (fK) value provided at value feature 279 is maintained at 6500 k, the value most like the sun and the most effective for both rod photoreceptors and cone photoreceptors.

To create the maximum peak sensitivity for the given quality of light in the environment, The Foveal Vision Engine 270 requires the "Range of Vision Scale" of the environment. The processing unit 7 has previously selected the Object-Luminance (sLUm) value provided at value feature 231 to determine the quality of light on the scenery surrounding the object requiring recognition. The Foveal Vision Engine 270 input is Object-Luminance (sLUm) value (provided at value feature 231)=10^5. The quality of light in the environment is in the "photopic" stage in the "Range of Vision Scale".

The Identification of Peak Sensitivity Colour (oPEk) value provided at value feature 280 in the visible wavelengths of light for an optimized foveal vision response for the "photopic" stage is ~555 nm. The Identification of Peak Sensitivity Colour (oPEk)-Hue (fPEkH) value provided at value feature 281 equals 78 to display hue of the ~555 nm wavelength. The Identification of Peak Sensitivity Colour (oPEk)-Saturation (fPEkS) value provided at value feature 282 equals 100 to display saturation of the ~555 nm wavelength. The Identification of Peak Sensitivity Colour (oPEk)-Lightness (fPEkL) value provided at value feature 283 equals 50 to display lightness of the ~555 nm wavelength.

The Foveal Vision Engine 270 uses the values provided at value features 284-286 to elicit an optimized foveal vision response by-way-of centre/surround spot size, cone ratios and the Purkinje shift.

The centre/surround spot size protocol generates patterns of spots of light with defined dimensions, which are most likely to stimulate excitatory neurons. These spot sizes can therefore be adjusted (modulated) according to the systems and methods of the present disclosure as lighting conditions change during the day or when going from one environment to another (e.g. from an open road surrounded by fields into a tunnel). Neurons used in object perception (including recognition) are either excitatory or inhibitory. Excitatory neurons also fire adjacent neurons in contrast to inhibitory neurons that do not stimulate the firing of adjacent neurons.

The Purkinje Cone Ratio Engine

The processing unit 7 operates the Purkinje Cone Ratio Engine 298 which contributes to dynamically maintaining the colours and patterns of light outputs in the visible wavelengths to elicit the desired peripheral and/or foveal vision responses from a viewer. Reds, oranges, and yellows appear relatively light in bright illumination whereas blues and greens appear relatively light in dim illumination. This is demonstrated by finding red and blue objects that appear equally light under bright daylight illumination and then viewing them in twilight or dim illumination, where the red will appear very much darker than the blue. The Purkinje Cone Ratio Engine 287 continually adjusts (modulates) for relative light changes by increasing luminance for red colours selected by the Peripheral Vision Engine if in the "mesopic" stage in the "Range of Vision Scale".

The Adaptation Curve Engine

The processing unit 7 operates the Adaptation Curve Engine 288 to dynamically maintain the colours and patterns of light outputs in the visible wavelengths and elicit the desired peripheral and/or foveal vision responses from a viewer. The systems and methods of the present disclosure can account for rapid changes in the "Range of Vision" while in operation and the Adaptation Curve Engine 288 adjusts for both the Dark Adaptation Curve (DAC) and the Light Adaptation Curve (LAC).

The Dark Adaptation Curve (DAC) provides a means for determining when there is a change from light to dark and will for the first eight minutes rapidly increase the amount of light for the Identification of Peak Sensitivity Colour (oPEk) value provided at value feature 280 for cone photoreceptors while dynamically maintaining the amount of light for the five variants from the Peripheral Vision Engine 236 for rod photoreceptors. After the eight-minute mark, The Dark Adaptation Curve (DAC) dynamically maintains the new amount of light level for the Identification of Peak Sensitivity Colour (oPEk) value provided at value feature 280 for cone photoreceptors while rapidly increasing the amount of light for the five variants from the Peripheral Vision Engine 236 for rod photoreceptors. The methodology reflects the biological functions of cones and rods to a change from light to dark.

The Light Adaptation Curve (LAC) provides a means for determining a change from dark to light and will for the first eight minutes rapidly increase the amount of light for the 5 variants from the Peripheral Vision Engine 236 for rod photoreceptors while dynamically maintaining luminance for the Identification of Peak Sensitivity Colour (oPEk) value provided at value feature 280 for cone photoreceptors. After the eight-minute mark, The Light Adaptation Curve (LAC) dynamically maintains the new amount of light level for the 5 variants from the Peripheral Vision Engine 236 for rod photoreceptors while rapidly increasing the amount of light for the Identification of Peak Sensitivity Colour (oPEk) value provided at value feature 280 for cone photoreceptors. The methodology reflects the biological functions of cones and rods to a change from dark to light.

For example, when driving through Tokyo's 18.2 km Yamate Tunnel, a motorcyclist using an embodiment of the systems and methods of the present disclosure with the Adaptation Curve Engine 288 will actively implement, on entry to the tunnel, the Dark Adaptation Curve (DAC) and then, on exit to the tunnel, the Light Adaptation Curve (LAC).

The following exemplary scene change scenarios illustrate how the systems and methods of the present disclosure operate to activate or stimulate a viewer's peripheral vision system and notice an object, which can then direct viewer's foveal vision system to actively process the image of the object.

Exemplary Scene Change—Between Sparse Vegetation-Clear Skies-Noon and a Tunnel-Artificial Light A driver is following a motorcycle configured with a system according to the present disclosure. The environment surrounding the motorcycle is a mix of sparsely vegetated mountains, under a clear blue sky, and the time of day is 1200 hrs (noon). The driver following the motorcycle views light outputs from a display of the system comprising the equiluminant colour for the sparsely vegetated mountains, and the peak (foveal) sensitivity colour for the noon sun.

Entering a tunnel, the driver continues to follow the motorcycle from the same distance when the surrounding environment of the motorcycle abruptly changes to grey concrete and artificial light that is dimmer than the natural light of the noon day sun. The driver following the motorcycle now sees from the display, the highest contrast light for the dark grey concrete, and the peak (foveal) sensitivity colour adjusted for the dimmer artificial light of the tunnel. The system and method performed by the system according to the present disclosure has sensed the grey environment and delivered the highest contrast (white) light to attract the driver's peripheral vision instead of an equiluminant colour in the red to purple wavelength spectrum. Due to the dimmer artificial light, the system increases the amount of light the display emits while providing the optimal wavelengths of light (colours) selected according to the other environmental parameters sensed (such as the overall colour of the environment). The system is also optionally able to vary the pattern of light emitted, for example, from one size of dots of light outputs to larger sized dots of light outputs.

Exiting the tunnel, the driver continues to follow the motorcycle from the same distance when the surrounding environment of the motorcycle abruptly changes back to a mix of sparsely vegetated mountains, clear sky and time of day at 12:05 pm. The driver now views light emitted from the display comprising the equiluminant colour for the sparsely vegetated mountains, as seen previously prior to entering the tunnel, and the peak (foveal) sensitivity colour for the clear blue skies with full sun. Due to the brighter daylight conditions, relative to the dimmer artificial light in the tunnel, the amount of light emitted from the display is reduced while providing the optimal light colours selected according to the other environmental parameters sensed.

Before, during and after driving through the tunnel, the system outputs wavelengths of light in the visible spectrum. These outputs of light elicit peripheral and foveal vision responses most likely to result in the degree of object perception needed for the driver to recognize the object and take appropriate measures to evade colliding with the object, if necessary. In this way, the systems and methods of the present disclosure is able to account for rapid "Range of Vision" changes due to sudden changes in the environment in which an object is located in. This is the case, whether or not the object is moving or stationary.

Exemplary Scene Change—Between Dense Vegetation and Rocky Environments on a Clear Day A driver is following a motorcycle configured with a system according to the present disclosure. The surrounding environment of the motorcycle is a densely vegetated mountain road and the sky is clear. The driver following the motorcycle views wavelengths of light emitted from a display of the system, comprising the equiluminant colour for the densely vegetated mountains of dark greens, and the peak (foveal) sensitivity colour for the clear, blue sky.

As the driver continues to follow the motorcycle, the environment changes from densely vegetated mountains to rock. In other words, the surrounding environment of the motorcycle abruptly changes from dark green to light grey colours. The driver following the motorcycle views the light emitted from the display change from the equiluminant colour for dark greens (purple) to the equiluminant colour for light grey (black), and the peak (foveal) sensitivity colour for the clear day is maintained, a green hue at a wavelength of approximately 555 nm.

As the driver continues to follow the motorcycle the environment changes back to the densely vegetated mountains, and therefore abruptly changes from light grey to dark green colours. The driver following the motorcycle views light emitted from the display change from the equiluminant colour for light grey (black) to the equiluminant colour for dark greens (purple), while the peak (foveal) sensitivity colour for the clear day is maintained, the green hue at a wavelength of approximately 555 nm.

Before, during and after driving along the mountain side on a clear day, the system outputs wavelengths of light in the visible spectrum. These outputs of light elicit peripheral and foveal vision responses most likely to result in the degree of object perception needed for the driver to recognize the object and take appropriate measures to evade colliding with the object, if necessary. In this way, the systems and methods of the present disclosure is able to account for rapid "Range of Vision" changes due to sudden changes in the environment in which an object is located in. This is the case, whether or not the object is moving or stationary.

Exemplary Scene Changes—Between Dense Vegetation and Rocky Environments on a Cloudy Day A driver is following a motorcycle configured with a system according to the present disclosure. The surrounding environment is a densely vegetated mountain road and the sky is cloud covered. The driver following the motorcycle views wavelengths of light emitted from a display of the system comprising the equiluminant colour for the densely vegetated mountains of dark greens, and the peak (foveal) sensitivity colour for the cloudy, grey skies.

As the driver continues to follow the motorcycle, the environment changes from densely vegetated mountains to grey rock. In other words, the surrounding environment of the motorcycle abruptly changes from dark green to light grey colours. The driver following the motorcycle views the light emitted from the display change from the equiluminant colour for dark greens (purple) to the equiluminant colour for light grey (black), and the peak (foveal) sensitivity colour for the cloudy day is maintained, a blue-green hue at a wavelength of approximately 507 nm.

As the driver continues to follow the motorcycle, the environment changes back to densely vegetated mountains. The surrounding environment of the motorcycle abruptly changes from light grey to dark green colours. The driver following the motorcycle views the light emitted from the display change from the equiluminant colour for light grey (black) to the equiluminant colour for dark greens (purple), and the peak (foveal) sensitivity colour for the cloudy, grey day is maintained as a blue-green hue at the wavelength of approximately 507 nm.

Before, during and after driving along the mountain side on a cloudy day, the system outputs wavelengths of light in the visible spectrum. These outputs of light elicit peripheral and foveal vision responses most likely to result in the degree of object perception needed for the driver to recognize the object and take appropriate measures to evade colliding with the object, if necessary. In this way, the systems and methods of the present disclosure is able to account for rapid "Range of Vision" changes due to sudden changes in the environment in which an object is located in. This is the case, whether or not the object is moving or stationary.

The UV Engine

The processing unit 7 operates the UV Engine 289 which contributes to dynamically maintaining the colours and patterns of light outputs in the visible wavelengths and eliciting the desired peripheral and/or foveal vision responses from a viewer. The systems and methods of the present disclosure can account for changes in UV levels to account for UV eyewear protection tints during operation. The UV Engine 289 adjusts to consider the behaviour of wearing UV sunglasses as UV increases. UV is measured by irradiance which measures the non-visible wavelengths characterised by wavelengths in the range 190-380 nm. Estimation of the UV Index can be obtained from irradiance measurements average photosensitivity (COST-713, 2000): low (0-2), medium (3-4), moderate (5-6), and high (>7).

At 1000 w/m2 level, close to a clear day with peak sun, the UV Engine 289 accepts that sunglasses are worn with brown and copper tints for increased visual clarity but also because they enhance the color red. While Scenery-Irradiance (sIRr) 214 is above 1000 w/m2 level, the UV Engine 289 will rapidly increase overall luminance and not include the range of 380-440 nms (violet) for the Identification of Peak Sensitivity Colour (oPEk) value provided at value feature 280 for cone photoreceptors. In the event the Peripheral Vision Engine 236 for rod photoreceptors determines that the violet wavelengths of light would provide an optimized peripheral vision response, it will select another of the four remaining variants as an alternative that have substantially the same effect.

The Blue Light Blocking Engine

The processing unit 7 operates the Blue Light Blocking Engine 290 which contributes to dynamically maintaining the colours and patterns of light outputs in the visible wavelengths and eliciting the desired peripheral and/or foveal vision responses from a viewer. The system and method of the present disclosure accounts for changes in UV levels to account for blue light blocking lenses, windshields and variants during the operation of the system and methods of the present disclosure. UV is measured by irradiance which measures the non-visible wavelengths characterised by wavelengths in the range 190-380 nm. Estimation of the UV Index can be obtained from irradiance measurements average photosensitivity (COST-713, 2000): low (0-2), medium (3-4), moderate (5-6), and high (>7). Blue-violet wavelengths between 380 nm and 440 nm are seen as potentially damaging and have been implicated as one of the possible causes of photoretinitis.

At 1000 w/m2 level, close to a clear day with peak sun, the Blue Light Blocking Engine 290 accepts that blue light blocking lenses are worn with yellow and amber tints for blocking blue light to help reduce eye fatigue and strain. While Scenery-Irradiance (sIRr) 214 is above 1000 w/m2 level, the Blue Light Blocking Engine 290 will rapidly increase overall luminance and not include the range of 380-440 nms (violet) for the Identification of Peak Sensitivity Colour (oPEk) value provided at value feature 280 for cone photoreceptors. In the event the Peripheral Vision Engine 236 for rod photoreceptors has determined that the violet wavelength gives an optimized peripheral vision response, it will select another of the four remaining variants as an alternative that have substantially the same effect.

The Zero Saturation Engine

The processing unit 7 operates the Zero Saturation Engine 291 which contributes to dynamically maintaining the colours and patterns of light outputs in the visible wavelengths and eliciting the desired peripheral and/or foveal vision responses from a viewer. The system and methods of the present disclosure accounts for colours that have no saturation value. Colour that is fully saturated is considered the truest version and vice versa. A greyscale colour is known as having a 0% saturation level and will appear to a viewer as white, black or a tint/shade of grey. The detection or determination of a greyscale colour will only allow the determination of high contrast greyscale colours according to the present disclosure. As understood herein, such high contrast light outputs, such as white against a dark grey or black backdrop (scene), or black against a white or light grey backdrop (scene), are also referred to herein as equiluminance based wavelengths of light even though they have no (red to purple wavelength) colour saturation per se.

At a 0% saturation level, unrealistic luminance is generated from calculating an optimal level of grey-scale contrast based on the continual identification of colour of the scenery surrounding the object to be perceived (i.e. behind the object as perceived from a given viewing point). Dynamically maintaining an effective quality of light for the selected unrealistic luminance is continual and helps to achieve an optimal peripheral vision response by the viewer of the object to be perceived.

While Scenery-Saturation (sS) 222 value is equal to 0%, the Zero Saturation Engine 291 is enabled. The Zero Saturation Engine 291 requires Scenery-Lightness (sL) 223 value, which is either above or below 50%.

If Scenery-Saturation (sS) 222 value is equal to 0% and Scenery-Lightness (sL) 223 value is below 50% (dark grey to black), The Identification of Equiluminant Colour (pEQ)-Lightness (pEQuL) 249 value increases to the value of 100% (white).

If Scenery-Saturation (sS) 222 value is equal to 0% and Scenery-Lightness (sL) 223 value is above 50% (light grey to white), The Identification of Equiluminant Colour (pEQ)-Lightness (pEQuL) 249 value decreases to the value of 0% (black).

The Zero Saturation Engine 291 logic is enabled and executed in the same manner for The Identification of Split Equiluminant Colour 1 (pSE1) 250, The Identification of Split Equiluminant Colour 2 (pSE2) 254, The Identification of Triadic Equiluminant Colour 1 (pTR1) 258 and The Identification of Triadic Equiluminant Colour 2 (pTR2) 262.

Extending the General Embodiment example, the continual monitoring of the "Range of Vision Scale" during a nighttime scenario is measured as "scotopic". All protocols of the systems and methods of the present disclosure function as in the photopic and mesopic scenarios and the Foveal Vision Engine 270 generates the visible wavelength of light for an optimized foveal vision response for the "scotopic" stage at ~498 nm.

Extending the General Embodiment example, the continual monitoring of the "Range of Vision Scale" during a dusk scenario is measured as "mesopic". All protocols of the invention are identical in operation and the Foveal Vision Engine 270 generates the visible wavelength of light for an optimized foveal vision response for the "scotopic" stage at ~507 nm.

Display

In one embodiment, the processing unit operates one or more displays (display outputs). Each display (output) can provide one or more light outputs.

In a related embodiment the processing unit 7 operates four display outputs. The Foveal Vision Engine Display Output 1 displays the result from the Foveal Vision Engine 270. The Peripheral Vision Engine Display Output (A) 2, the Peripheral Vision Engine Display Output (B) 3 and the Peripheral Vision Engine Display Output (C) 4 displays the results from the Peripheral Vision Engine 236.

Uses of Dynamic Visual Vibration Systems and Methods

Exemplary uses for systems and methods of the present disclosure are contemplated in all contexts where object perception is desirable and more particularly where changing environmental conditions need to be accounted for to improve or maximize the ability of a viewer to recognize an object, so the viewer can initiate an effective motor response with respect to said object. This may include, for example, avoiding a collision with the object. Challenges with object perception may arise from the natural, unassisted vision system capabilities of a viewer and/or the environmental conditions affecting the ability of a view to perceive an object. The systems and methods of the present disclosure can be used to help overcome challenges to object perception such as: environmental conditions where there are many visual stimuli for the eyes of a viewer, where the natural colouring of an object blends into the environment, where environmental conditions change abruptly (e.g. geological and ecological topologies, lighting, or weather), where an object becomes partially or fully obscured by another object, and where environmental conditions would otherwise impair a viewer's ability to perceive an object to one degree or another.

In one embodiment, the systems and methods of the present disclosure are used to make an inanimate object perceivable. In another embodiment, the systems and methods of the present disclosure are used to make a human individual perceivable. In still another embodiment, the systems and methods of the present disclosure are used to make an animal perceivable.

In still a further embodiment, the systems and methods of the present disclosure are used to make a transport means perceivable. A transport means can include without limitation: motorized and un-motorized vehicles, such as a car, truck, plough, tractor, bus, motor home/camper, motorcycle, wheelchair, bicycle, scooter; other transport devices and systems for individuals and items, such as a skate board, skies, skates, snow board, toboggan, go-cart, flat-bed trailer, wheel barrow, conveyor, crane and gondola; marine vessels, such as a cargo ship, barge, tanker, navy ship, cruise ship, ferry, riverboat, motorboat, tugboat, coast guard ship, yacht, canoe, row boat, kayak; trains, for passengers, or cargo; and aircraft, such as planes, helicopters, blimps, air balloons, and gliders.

In one embodiment, the systems of the present disclosure are manufactured, or otherwise configured as an application on a mobile communication device. In another embodiment, the systems of the present disclosure are manufactured, or otherwise configured as a consumer product. Consumer products can include without limitation: apparel, accessories, bags and luggage, footwear, protective gear, and sport equipment. In still another embodiment, systems of the present disclosure are manufactured, or otherwise configured to be integrated into building structures. Integration into building structures can be on the outside or inside (e.g. in hallways and stairwells). In yet another embodiment, systems of the present disclosure are manufactured, or otherwise configured to be integrated into signage.

In still a further embodiment, systems of the present disclosure are manufactured, or otherwise configured to be integrated into an infrastructure. Infrastructures can include without limitation: emergency lighting systems, airports, railways, train yards and strain stations, ship yards, industrial plants, bridges, amusement parks, museums, recreational resorts, playgrounds, stadiums, roadways, truck stops, roadside rest stops, crosswalks, and intersections. In these contexts the system of the present disclosure functions as a navigational aid.

In still a further embodiment, systems of the present disclosure are manufactured, or otherwise configured to be integrated into a beacon-type framework to give a viewer notice of a change in the state of an object, which can also be representative of a change in state of the environment. In this sense, the object connected to the display means of the system of the present disclosure may function as a notification means of changing environmental conditions, or changes in another object that requires the attention of a viewer. Beacon-type frameworks integrating the systems and methods of the present disclosure can be applied, without limitation: forest fire prevention, natural disaster detection, cellular inflammation detection, forensic applications, allergy profiling, weight-loss supervising, soil composition monitoring, drought preclusion analysis, flooding/erosion indicators, airborne particle quality, and embodiments to obviate passive prior art frameworks.

To gain a better understanding of the systems and methods described herein, the following examples are set forth. It will be understood that these examples are intended to describe illustrative embodiments of the invention and are not intended to limit the scope of the invention in any way.

EXAMPLES

The following examples illustrate embodiments of the systems and methods according to the present disclosure.

Example 1: Mobile Device and Application

With reference to FIGS. 20-25 the systems and methods of the application are exemplified in the form of a mobile device (e.g. smartphone, or tablet) and application. All the hardware required to operate the system of this example is provided by the Mobile Device and comprises:
  An Input Sensor to measure colour
  An Input Sensor to measure the quality of light
  A Processing Unit to operate protocols
  A Display Output to emit the wavelengths of light resulting from the Processing Unit running the protocols
  An operating system to power and regulate the mobile device
  A power supply The embodiment receives power from the power supply variant 6 and is ON.

The protocols executed by the application direct the sensor(s) of the Mobile Device to record or measure the quality of light and the identification of colour of the scenery. More particularly, Input Sensors 9 monitor:
  a) the quality of light on the scenery surrounding the object requiring recognition. The value is Scenery-Luminance (sLUm) 219. The unit of measurement is lux.
  b) the identification of colour on the scenery surrounding the object. The values are Scenery-Hue (sH) 221, Scenery-Saturation (sS) 222, and Scenery-Lightness (sL) 223. The units of measurement are hue as a degree on the colour wheel from 0 to 360, saturation as a percentage value from 0% being a tint/shade of grey and 100% is the full colour (in the red to purple spectrum), and lightness as a percentage where 0% is black and 100% is white.

In one embodiment the Input Sensors 9 are a single sensor or sensor system. In another embodiment the Input Sensors 9 are distinct sensors or sensor systems. All data from the Input Sensors 9 is delivered to the Processing Unit 7.

The Processing Unit 7 uses the lux value of Scenery-Luminance (sLUm) 219 to determine the location on the "Range of Vision Scale". The lux value of Scenery-Luminance (sLUm) 219 is classified into one of three categories in order to deliver the colours and optionally patterns in the visible wavelengths of light for the peak sensitivity for human foveal vision.

For example, a lux value of 0.1 is classified as Scotopic, and corresponds to the visible wavelength ~498 nm for the peak sensitivity for human foveal vision.

If (lux>=0 AND lux <=10) {visible wavelength for the peak sensitivity for human foveal vision rgb(0,255,169)); // Scotopic visible wavelength ~498 nm}. Else if (lux>10 AND lux <=100) {visible wavelength for the peak sensitivity for human foveal vision rgb(0,255,56)); // Mesopic visible wavelength ~507 nm}. Else {visible wavelength for the peak sensitivity for human foveal vision rgb(179,255, 0)); //Photopic visible wavelength ~555 nm}

The Processing Unit 7 uses the values are Scenery-Hue (sH) 221, Scenery-Saturation (sS) 222, and Scenery-Lightness (sL) 223 to determine the colours and patterns in the visible wavelengths of light for an optimized peripheral vision response. Reference is made to the Colour Model Protocol Table to lookup the five variants that the Peripheral Vision Engine requires 1) Equiluminant Colour; 2) Split Equiluminant Colour 1; 3) Split Equiluminant Colour 2; 4) Triadic Equiluminant Colour 1; and 5) Triadic Equiluminant Colour 2:

Equiluminant Colour Hue=MOD(Scenery-Hue (sH)+180,360)
  Equiluminant Colour Saturation=Scenery-Saturation (sS)
  Equiluminant Colour Lightness=Scenery-Scenery-Lightness (sL)
  Split Equiluminant Colour 1 Hue=MOD(Scenery-Hue (sH)+150,360)
  Split Equiluminant Colour 1 Saturation=Scenery-Saturation (sS)
  Split Equiluminant Colour 1 Lightness=Scenery-Scenery-Lightness (sL)
  Split Equiluminant Colour 2 Hue=MOD(Scenery-Hue (sH)+210,360)
  Split Equiluminant Colour 2 Saturation=Scenery-Saturation (sS)
  Split Equiluminant Colour 2 Lightness=Scenery-Scenery-Lightness (sL)
  Triadic Equiluminant Colour 1 Hue=MOD(Scenery-Hue (sH)+120,360)
  Triadic Equiluminant Colour 1 Saturation=Scenery-Saturation (sS)
  Triadic Equiluminant Colour 1 Lightness=Scenery-Scenery-Lightness (sL)
  Triadic Equiluminant Colour 2 Hue=MOD(Scenery-Hue (sH)-120,360)
  Triadic Equiluminant Colour 2 Saturation=Scenery-Saturation (sS)
  Triadic Equiluminant Colour 2 Lightness=Scenery-Scenery-Lightness (sL)

In order to calculate the five variants that the Peripheral Vision Engine provides, the following exemplary steps may be executed by the system's protocols:
  1. Convert the colour to the HSL Colour Model colour value
  2. Change the Hue value to that of the complimentary Hue
    a. if the Hue is 30°, the Equiluminant Colour is 210° on the colour wheel moving 180° around
    b. if the Hue is 30°, the Split Equiluminant Colour 1 is 180° on the colour wheel moving 150° around
    c. if the Hue is 30°, the Split Equiluminant Colour 2 is 240° on the colour wheel moving 210° around
    d. if the Hue is 30°, the Triadic Equiluminant Colour 1 is 150° on the colour wheel moving+120° around e. if the Hue is 30°, the Triadic Equiluminant Colour 2 is 270° on the colour wheel moving −120° around
3. Saturation and Lightness values remain unchanged
4. Convert new HSL values in the HSL Colour Model back to the original colour notation, i.e. RGB The Processing Unit 7 operates the Display Output to demonstrate the results from the Processing Unit as produced by the Foveal Vision Engine and Peripheral Vision Engine. The Display Output has the ability to communicate all of the protocol engine outputs and blinking rates to further attract human vision.

The following scenarios and referenced figure screen shots illustrate the functionality of the Mobile Device and Application of the present exemplary embodiment. The screen shots illustrate wavelengths of light emitted by a display of an embodiment of the system according to the present disclosure in a nested rectangle pattern.

Scenario 1 (FIGS. 20*a* and 20*b*)— The two screenshots display the results of the Mobile Device and Application operating in a changing environment during the day. The embodiment's Colour Sensor (Input Sensor) senses a change in the environment with the identification of colour in the scenery. The system's Quality of Light Sensor (also the Input Sensor) does not identify a change in the "Range of Vision Scale". With the transition from Screenshot 1 (FIG. 20*a*) to Screenshot 2 (FIG. 20*b*), the Peripheral Vision Engine alters the colours (outer rectangle) and optionally patterns in the visible wavelengths of light to elicit a peripheral vision response due to the change in the environment based on the identification of colour in the scenery. The Foveal Vision Engine maintains the maximum peak sensitivity colour of ~555 nm for day lighting conditions given there is no change in the "Range of Vision Scale". The Display Output generated (based on the engine outputs) is thereby designed to continuously and dynamically elicit a peripheral vision response and thereby direct the foveal vision of a viewer to the Mobile Device that may be mounted or otherwise located on the object that is to be, or being viewed (e.g. a person, an article of clothing a person is wearing, the bag a person is carrying, the helmet a person is wearing, or the bicycle being used by a person). The peak sensitivity colour emitted (inner rectangle) supports the viewer to process the object to which the Mobile Device is connected.

Scenario 2 (FIGS. 21*a* and 21*b*)— The two screenshots display the results of the Mobile Device and Application operating in a changing environment during (at) dusk. The embodiment's Input Sensor senses a change in the environment with the identification of colour in the scenery and does not identify a change in the "Range of Vision Scale". With the transition from Screenshot 1 (FIG. 21*a*) to Screenshot 2 (FIG. 21*b*), the Peripheral Vision Engine alters the colours (outer rectangle) and optionally patterns in the visible wavelengths of light to elicit a peripheral vision response due to the change in the environment based on the identification of colour in the scenery. The Foveal Vision Engine maintains the maximum peak sensitivity colour of ~507 nm for dusk time conditions given there are been no change in the "Range of Vision Scale". The Display Output generated (based on the engine outputs) is thereby designed to continuously and dynamically elicit a peripheral vision response to direct the foveal vision of a viewer to the Mobile Device that may be mounted or otherwise located on the object that is to be, or being viewed (e.g. a person, an article of clothing a person is wearing, the bag a person is carrying, the helmet a person is wearing, or the bicycle being used by a person). The peak sensitivity colour emitted (inner rectangle) supports the viewer to process the object to which the Mobile Device is connected.

Scenario 3 (FIGS. 22*a* and 22*b*)—The two screenshots display the results of the Mobile Device and Application operating in a changing environment during night. The embodiment's Input Sensor senses a change in the environment with the identification of colour in the scenery and does not identify a change in the "Range of Vision Scale". With the transition from Screenshot 1 (FIG. 22*a*) to Screenshot 2 (FIG. 22*b*), the Peripheral Vision Engine alters the colours (outer rectangle) and optionally patterns in the visible wavelengths of light to elicit a peripheral vision response due to the change in the environment with the identification of colour in the scenery. The Foveal Vision Engine maintains the maximum peak sensitivity colour of ~498 nm for night lighting conditions given there are been no change in the "Range of Vision Scale". The Display Output generated (based on the engine outputs) is thereby designed to continuously and dynamically elicit a peripheral vision response to direct the foveal vision of a viewer to the Mobile Device that may be mounted or otherwise located on the object that is to be, or being viewed (e.g. a person, an article of clothing a person is wearing, the bag a person is carrying, the helmet a person is wearing, or the bicycle being used by a person). The peak sensitivity colour emitted (inner rectangle) supports the viewer to process the object to which the Mobile Device is connected.

Scenario 4 (FIGS. 23*a* and 23*b*)—The two screenshots display the results of the Mobile Device and Application operating in a changing environment during the day and ending in (at) dusk. The embodiment's Input Sensor senses a change in the environment with the identification of colour in the scenery and a change in the "Range of Vision Scale" is detected by the system. With the transition from Screenshot 1 (FIG. 23*a*) to Screenshot 2 (FIG. 23*b*), the Peripheral Vision Engine alters the colours (outer rectangle) and optionally patterns in the visible wavelengths of light to elicit a peripheral vision response due to the change in the environment with the identification of colour in the scenery. The Foveal Vision Engine alters the maximum peak sensitivity colour from ~555 nm for day lighting conditions to ~507 nm for dusk time conditions given there has been a change in the "Range of Vision Scale". The Display Output generated (based on the engine outputs) is thereby designed to continuously and dynamically elicit a peripheral vision response to direct the foveal vision of a viewer to the Mobile Device that may be mounted or otherwise located on the object that is to be, or being viewed (e.g. a person, an article of clothing a person is wearing, the bag a person is carrying, the helmet a person is wearing, or the bicycle being used by a person). The peak sensitivity colour emitted (inner rectangle) supports the viewer to process the object to which the Mobile Device is connected.

Scenario 5 (FIGS. 24*a* and 24*b*)—The two screenshots display the results of the Mobile Device and Application operating in a changing environment during the (at) dusk and ending in night. The embodiment's Input Sensor senses a change in the environment with the identification of colour in the scenery and a change in the "Range of Vision Scale" is detected by the system. With the transition from Screenshot 1 (FIG. 24*a*) to Screenshot 2 (FIG. 24*b*), the Peripheral Vision Engine alters the colours (outer rectangle) and optionally patterns in the visible wavelengths of light to elicit a peripheral vision response due to the change in the environment with the identification of colour in the scenery. The Foveal Vision Engine alters the maximum peak sensitivity colour from ~507 nm for dusk time conditions to ~498 nm for night time conditions given there are been a change in the "Range of Vision Scale". The Display Output generated (based on the engine outputs) is thereby designed to continuously and dynamically elicit a peripheral vision response to direct the foveal vision of a viewer to the Mobile Device that may be mounted or otherwise located on the object that is to be, or being viewed (e.g. a person, an article of clothing a person is wearing, the bag a person is carrying, the helmet a person is wearing, or the bicycle being used by a person). The peak sensitivity colour emitted (inner rectangle) supports the viewer to process the object to which the Mobile Device is connected.

Scenario 6 (FIGS. 25a and 25b)— The two screenshots display the results of the Mobile Device and Application operating in a changing environment during the night and ending in (at) dawn. The embodiment's Input Sensor senses a change in the environment with the identification of colour in the scenery and a change in the "Range of Vision Scale" is detected by the system. With the transition from Screenshot 1 (FIG. 25a) to Screenshot 2 (FIG. 25b), the Peripheral Vision Engine alters the colours (outer rectangle) and optionally patterns in the visible wavelength of light to elicit a peripheral vision response due to the change with the identification of colour in the scenery. The Foveal Vision Engine alters the maximum peak sensitivity colour from ~498 nm for night time conditions to ~507 nm for dawn time conditions given there are been a change in the "Range of Vision Scale". The Display Output generated (based on the engine outputs) is thereby designed to continuously and dynamically elicit a peripheral vision response to direct the foveal vision of a viewer to the Mobile Device that may be mounted or otherwise located on the object that is to be, or being viewed (e.g. a person, an article of clothing a person is wearing, the bag a person is carrying, the helmet a person is wearing, or the bicycle being used by a person). The peak sensitivity colour emitted (inner rectangle) supports the viewer to process the object to which the Mobile Device is connected.

Example 2: Consumer Band Product

With reference to FIG. 10 and FIGS. 26-32, the systems and methods of the application are exemplified in the form of a Consumer (Band) Product. The system and method of this embodiment is implemented with an electronics platform with components and programmed protocols.

The system hardware comprises:
An Input Sensor to measure colour 107
An Input Sensor to measure the quality of light 102, 103
An Input Sensor to measure precipitation 104
An Input Sensor to measure distance between the embodiment and approaching objects 106
An Input Sensor to measure the amount of ultraviolet light 105
A Processing Unit to operate protocols 101
A Display Output(s) to emit the wavelengths of light resulting from the Processing Unit running the protocols 139, 140
An operating system to power and regulates the Consumer Smartphone
A power supply (variant) 6

The system receives power from the power supply 6 and is ON. In one embodiment, the power supply is built into the system and not (readily) removable to be replaced. In another embodiment the power supply is removable. Examples of removable power supplies are a battery or solar power supply.

The quality of light and the identification of colour of the scenery are measured to generate colours and optionally patterns in the visible wavelengths of light to elicit a peripheral vision response and direct foveal vision towards an object to be recognized in a given environment.

The protocols executed by the system operate and direct the collection of Input Sensors 102, 103, 104, 105, 106, 107 to monitor:
 a) the quality of light on the scenery surrounding the object requiring recognition. The value is Scenery-Luminance (sLUm) 219. The unit of measurement is lux. The embodiment has two separate Input Sensors to measure the quality of light 102, 103.
 b) the identification of colour on the scenery surrounding the object. The values are Scenery-Hue (sH) 221, Scenery-Saturation (sS) 222, and Scenery-Lightness (sL) 223. The units of measurement are hue as a degree on the colour wheel from 0 to 360, saturation as a percentage value from 0% being a tint/shade of grey and 100% is the full colour (in the red to purple spectrum), and lightness as a percentage where 0% is black and 100% is white. The embodiment has one Input Sensor to measure colour 107.
 c) The embodiment has one Input Sensor to measure precipitation 104
 d) The embodiment has one Input Sensor to measure distance between the embodiment and approaching objects 106
 e) The embodiment has one Input Sensor to measure the amount of ultraviolet light 105

All data from the Input Sensors 102, 103, 104, 105, 106, 107 is delivered to the Processing Unit 101.

The Circuit Board Processing Unit 101 uses the lux value of Scenery-Luminance (sLUm) 219 to determine the location on the "Range of Vision Scale". The Consumer (Band) Product classifies the lux value of Scenery-Luminance (sLUm) 219 into one of three categories in order to deliver the colours and patterns in the visible wavelengths of light for the peak sensitivity of a viewer's foveal vision.

For example, a lux value of 1105 is classified as Photopic, therefore the visible wavelength ~555 nm for the peak sensitivity for a human viewer's foveal vision.

If (lux>=0 AND lux <=10) {visible wavelength for the peak sensitivity for human foveal vision rgb(0,255,169)); I/Scotopic visible wavelength ~498 nm}

Else if (lux>10 AND lux <=100) {visible wavelength for the peak sensitivity for human foveal vision rgb(0,255,56)); I/Mesopic visible wavelength ~507 nm}

Else {visible wavelength for the peak sensitivity for human foveal vision rgb (179,255,0)); I/Photopic visible wavelength ~555 nm}

The Processing Unit 101 uses the values Scenery-Hue (sH) 221, Scenery-Saturation (sS) 222, and Scenery-Lightness (sL) 223 to determine the colours and optionally patterns in the visible wavelengths of light to elicit a peripheral vision response. The protocols refer to the Colour Model Protocol Table to lookup the five variants that the Peripheral Vision Engine requires 1) Equiluminant Colour; 2) Split Equiluminant Colour 1; 3) Split Equiluminant Colour 2; 4) Triadic Equiluminant Colour 1; and 5) Triadic Equiluminant Colour 2.

Equiluminant Colour Hue=MOD(Scenery-Hue (sH)+ 180,360)

Equiluminant Colour Saturation=Scenery-Saturation (sS)

Equiluminant Colour Lightness=Scenery-Scenery-Lightness (sL)

Split Equiluminant Colour 1 Hue=MOD(Scenery-Hue (sH)+150,360)

Split Equiluminant Colour 1 Saturation=Scenery-Saturation (sS)

Split Equiluminant Colour 1 Lightness=Scenery-Scenery-Lightness (sL)

Split Equiluminant Colour 2 Hue=MOD(Scenery-Hue (sH)+210,360)

Split Equiluminant Colour 2 Saturation=Scenery-Saturation (sS)

Split Equiluminant Colour 2 Lightness=Scenery-Scenery-Lightness (sL)

Triadic Equiluminant Colour 1 Hue=MOD(Scenery-Hue (sH)+120,360)

Triadic Equiluminant Colour 1 Saturation=Scenery-Saturation (sS)

Triadic Equiluminant Colour 1 Lightness=Scenery-Scenery-Lightness (sL)

Triadic Equiluminant Colour 2 Hue=MOD(Scenery-Hue (sH)−120,360)

Triadic Equiluminant Colour 2 Saturation=Scenery-Saturation (sS)

Triadic Equiluminant Colour 2 Lightness=Scenery-Scenery-Lightness (sL)

The protocols also can determine the five variants that the Peripheral Vision Engine requires using the following exemplary steps:
1. Convert colour to the HSL Colour Model
2. Change the Hue value to that of the complimentary Hue
   a. if the Hue is 30°, the Equiluminant Colour is 210° on the colour wheel moving 180° around
   b. if the Hue is 30°, the Split Equiluminant Colour 1 is 180° on the colour wheel moving 150° around
   c. if the Hue is 30°, the Split Equiluminant Colour 2 is 240° on the colour wheel moving 210° around
   d. if the Hue is 30°, the Triadic Equiluminant Colour 1 is 150° on the colour wheel moving+120° around
   e. if the Hue is 30°, the Triadic Equiluminant Colour 2 is 270° on the colour wheel moving −120° around
3. Saturation and Lightness values remain unchanged
4. Convert new HSL values in the HSL Colour Model back to the original colour notation, i.e. RGB The Processing Unit 101 monitors precipitation levels 104 to dynamically maintain the optimal levels of Luminous Flux, Luminous Intensity, Illuminance, Luminance, Kelvin and blinking rate patterns effective for both rod photoreceptors and cone photoreceptors. The presence of precipitation limits the ability of a viewer to recognize objects and a viewer can benefit from receiving amplified sensory stimulation such as blinking of the display outputs.

The Processing Unit 101 monitors distance between the embodiment and approaching objects 106 to determine the optimal levels of Luminous Flux, Luminous Intensity, Illuminance, Luminance, Kelvin and blinking rate patterns effective for both rod photoreceptors and cone photoreceptors. When a viewer is presented with a rapidly approaching object, the viewer can benefit from receiving amplified sensory stimulation such as blinking of the Display Outputs.

The Processing Unit 101 monitors the amount of ultraviolet light 105 to dynamically maintain the colours and optionally patterns in the visible wavelengths of light to elicit peripheral and foveal vision responses accounting for UV eyewear protection tints that a viewer may be wearing. The presence of high levels of UV light triggers the system to do additional processing to determine the selection of colours of the Display Outputs.

The Processing Unit 101 operates the Display Outputs 139,140 to display the results from the Processing Unit 101. The embodiment displays the results from the Foveal Vision Engine 270, Peripheral Vision Engine 236, Purkinje Cone Ratio Engine 287, Adaptation Curve Engine 288, UV Engine 289, Blue Light Blocking Engine 290, and Zero Saturation Engine 291.

The following scenarios and referenced figure screen shots illustrate the functionality of the Consumer (Band) Product of the present exemplary embodiment.

Scenario 1 (FIGS. 26 and 27)—The two screenshots display the results of the Consumer (Band) Product operating in a changing environment during (at) day. The embodiment's first Quality of Light Input Sensor 102 does not identify a change in the "Range of Vision Scale" on the scenery surrounding the object that is to be recognized. The embodiment's second Quality of Light Input Sensor 103 does not identify a change in the "Range of Vision Scale" on the object to be recognized. The embodiment's Colour Input Sensor 107 senses a change in the environment with the identification of colour in the scenery. The embodiment's Rain Input Sensor 104 does not detect precipitation. The embodiment's Distance Input Sensor 106 detects a distance between the object to be recognized and an approaching object (e.g. viewer). In one embodiment, the distance is about 1.5 meters. In other embodiments the distance may fall between a range of about 2 cm to 400 cm (4 meters). The embodiment's UV Input Sensor 105 senses high levels of ultraviolet light in the scenery.

With the transition from Screenshot 1 (FIG. 26) to Screenshot 2 (FIG. 27), the Peripheral Vision Engine 236 alters the colours and optionally patterns in the visible wavelengths of light to elicit a peripheral vision response due to the change in the environment with the identification of colour in the scenery. The Foveal Vision Engine 270 maintains the maximum peak sensitivity colour of ~555 nm for day time conditions given there is no change in the "Range of Vision Scale" in either the First Quality of Light Input Sensor 102 or Second Quality of Light Input Sensor 103. The UV Engine 105 increases overall luminance and does not include the range of 380-440 nm (violet) for the Identification of Peak Sensitivity Colour with the Foveal Vision Engine 270.

Scenario 2 (FIGS. 28 and 29)—The two screenshots display the results of the Consumer (Band) Product operating in a changing environment during (at) dusk. The embodiment's first Quality of Light Input Sensor 102 does not identify a change in the "Range of Vision Scale" on the scenery surrounding the object to be recognized. The embodiment's second Quality of Light Input Sensor 103 does not identify a change in the "Range of Vision Scale" on the object that requires recognition. The embodiment's Colour Input Sensor 107 detects a change with the identification of colour in the scenery. The embodiment's Rain Input Sensor 104 detects precipitation. The embodiment's Distance Input Sensor 106 detects a distance between the object and approaching objects. The embodiment's UV Input Sensor 105 detects a low level of ultraviolet light in the scenery.

With the transition from Screenshot 1 (FIG. 28) to Screenshot 2 (FIG. 29), the Peripheral Vision Engine 236 alters the colours and optionally patterns in the visible wavelengths of light for eliciting a peripheral vision response due to the change in environment conditions with the identification of colour on the scenery. The Foveal Vision Engine 270 maintains the maximum peak sensitivity colour of ~507 nm for dusk time conditions given there is no change in the "Range of Vision Scale". The Display Outputs 139, 140 can be delivered in blinking patterns to amplify sensory stimulation of a viewer with regard to the object to be viewed or requiring recognition in the presence of precipitation.

Scenario 3 (FIGS. 30 and 31)—The two screenshots display the results of the Consumer (Band) Product operating in a changing environment during (at) night and ending in (at) dawn. The embodiment's first Quality of Light Input Sensor 102 does identify a change in the "Range of Vision Scale" on the scenery surrounding the object to be recognized. The embodiment's second Quality of Light Input Sensor 103 does identify a change in the "Range of Vision Scale" on the object to be recognized. The embodiment's Colour Input Sensor 107 recognizes a change with the identification of colour in the scenery. The embodiment's Rain Input Sensor 104 recognizes no precipitation. The embodiment's Distance Input Sensor 106 detects a distance between the embodiment and approaching objects, for example about 1.5 meters. The embodiment's UV Input Sensor 105 detects low levels of ultraviolet light in the scenery.

With the transition from Screenshot 1 (FIG. 30) to Screenshot 2 (FIG. 31), the Peripheral Vision Engine 236 alters the colours and optionally patterns in the visible wavelengths of light for eliciting a peripheral vision response due to the change with the identification of colour in the scenery. The Foveal Vision Engine 270 alters the maximum peak sensitivity colour from ~498 nm for night time conditions to ~507 nm for dawn time conditions given the change in the "Range of Vision Scale" 109.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The invention claimed is:

1. An object perception system comprising:
  a) a first sensor connected to an object in an environment, for continuously sensing one or more environmental parameters and delivering data sets to a processor;
  b) a processor for receiving and processing the data sets from the first sensor; and
  c) a display for emitting light outputs determined by the processor based on the processing of the data sets, wherein the light outputs emitted are modulated to comprise one or more wavelengths of light selected by the processor to elicit one or more targeted vision responses from a viewer, and thereby assist the viewer to perceive the object in the environment from a given viewing point of the object situated within a scenery of the environment, as the one or more environmental parameters sensed change over time.

2. The system according to claim 1, wherein the one or more environmental parameters sensed is the quality of light of a portion of the scenery behind the object with reference to the given viewing point.

3. The system according to claim 1, wherein a second sensor is connected to the object for continuously sensing one or more environmental parameters, and delivering data sets to the processor, wherein the processor processes the data sets from the second sensor together with the data sets from the first sensor to select the one or more wavelengths of light to elicit the one or more targeted vision responses from the viewer.

4. The system according to claim 3, wherein at least one of said one or more environmental parameters sensed by the second sensor is distinct from the one or more environmental parameters sensed by the first sensor.

5. The system according to claim 4, wherein the second sensor senses the quality of light at the surface of the object in a line of sight from the given viewing point of the object.

6. The system according to claim 1, wherein the one or more environmental parameters sensed provide data sets for the processor to determine a lighting condition of the scenery, the lighting condition selected from the group consisting of a photopic, mesopic and scotopic lighting condition, and to determine how said lighting condition changes in the scenery over time.

7. The system according to claim 1, wherein the processor determines the colour of the scenery, or a portion thereof, in the environment based on the one or more environmental parameters sensed and wherein the light outputs comprise an equiluminance based wavelength of light selected by the processor with reference to said colour of the scenery, or a portion thereof, said selected equiluinance based wavelength of light having an equiluminant colour, a split equiluminant colour or a triadic equiluminant colour.

8. The system according to claim 1, wherein the light outputs are modulated to account for a viewing parameter, the viewing parameter selected from the group consisting of a viewer's ability to perceive red-based wavelengths of light compared to blue-based wavelengths of light under a changing lighting condition, a time it takes for a viewer's vision to adjust to one or more changing lighting conditions, a use by the viewer of a UV vision protective means based on an estimation of the UV Index of a lighting condition, and a determination by the processor that the colour of the scenery, or a portion thereof, is a greyscale colour.

9. The system according to claim 1, wherein the one or more targeted vision responses comprise a peripheral vision response, a foveal vision response, or a guided vision response.

10. The system according to claim 9, wherein the one or more wavelengths of light comprise a colour that peaks the sensitivity of the foveal vision response.

11. A method of facilitating object recognition comprising the steps of:
  a) using a first sensor connected to an object in an environment, for continuously sensing one or more environmental parameters and delivering data sets to a processor;
  b) receiving and processing a first data set from the first sensor by the processor; and
  c) providing a light display operatively associated with the processor for emitting light outputs determined by the processor based on the processing of the data sets, wherein the light outputs emitted are modulated to comprise one or more wavelengths of light selected by the processor to elicit one or more targeted vision responses from a viewer, and thereby assist the viewer to perceive the object in the environment from a given viewing point of the object situated within a scenery of the environment, as the one or more environmental parameters sensed change over time.

12. The method according to claim 11, wherein the one or more environmental parameters sensed is the quality of light of a portion of the scenery behind the object with reference to the given viewing point.

13. The method according to claim 11, wherein a second sensor connected to the object is used for continuously sensing one or more environmental parameters, and delivering data sets to the processor, and wherein the processor processes the data sets from the second sensor together with the data sets from the first sensor to select the one or more wavelengths of light to elicit the one or more targeted vision responses from the viewer.

14. The method according to claim 13, wherein at least one of said one or more environmental parameters sensed by the second sensor is distinct from the one or more environmental parameters sensed by the first sensor.

15. The method according to claim 14, wherein the second sensor senses the quality of light at the surface of the object in a line of sight from the given viewing point of the object.

16. The method according to claim 11, wherein the one or more environmental parameters sensed provide data sets for the processor to determine a lighting condition of the scenery, the lighting condition selected from the group consisting of a photopic, mesopic and scotopic lighting condition, and to determine how said lighting condition changes in the scenery over time.

17. The method according to claim 11, wherein the processor determines the colour of the scenery, or a portion thereof, in the environment based on the one or more environmental parameters sensed and wherein the light outputs comprise an equiluminance based wavelength of light selected by the processor with reference to said colour of the scenery, or portion thereof, said selected equiluminance based wavelength of light having an equiluminant colour, a split equiluminant colour or a triadic equiluminant colour.

18. The method according to claim 16, wherein the light outputs are modulated to account for a viewing parameter, the viewing parameter selected from the group consisting of a viewer's ability to perceive red-based wavelengths of light compared to blue-based wavelengths of light under a changing lighting condition, a time it takes for a viewer's vision to adjust to one or more changing lighting conditions, a use by the viewer of a UV vision protective means based on an estimation of the UV Index of a lighting condition, and a determination by the processor that the colour of the scenery, or a portion thereof, is a greyscale colour.

19. The method according to any one of claim 11, wherein the one or more targeted vision responses comprise a peripheral vision response, a foveal vision response or a guided vision response.

20. The method according to claim 19, wherein the one or more wavelengths of light comprise a colour that peaks the sensitivity of the foveal vision response.

* * * * *